US011413682B2

(12) United States Patent
Matsumoto et al.

(10) Patent No.: US 11,413,682 B2
(45) Date of Patent: Aug. 16, 2022

(54) METHOD FOR PRODUCING SURFACE-MODIFIED METAL OXIDE FINE PARTICLE, METHOD FOR PRODUCING IMPROVED METAL OXIDE FINE PARTICLES, SURFACE-MODIFIED METAL OXIDE FINE PARTICLES, AND METAL OXIDE FINE PARTICLE DISPERSION LIQUID

(71) Applicant: TOKYO OHKA KOGYO CO., LTD., Kawasaki (JP)

(72) Inventors: Naozumi Matsumoto, Kawasaki (JP); Kazuya Someya, Kawasaki (JP); Dai Shiota, Kawasaki (JP)

(73) Assignee: Tokyo Ohka Kogyo Co., Ltd., Kawasaki (JP)

( * ) Notice: Subject to any disclaimer, the term of this patent is extended or adjusted under 35 U.S.C. 154(b) by 106 days.

(21) Appl. No.: 16/670,537

(22) Filed: Oct. 31, 2019

(65) Prior Publication Data

US 2020/0139433 A1 May 7, 2020

(30) Foreign Application Priority Data

Nov. 5, 2018 (JP) ............................ JP2018-208495
Oct. 30, 2019 (JP) ............................ JP2019-197337

(51) Int. Cl.
*B22F 1/102* (2022.01)
*C09C 1/00* (2006.01)
*C09C 3/08* (2006.01)

(52) U.S. Cl.
CPC ................ *B22F 1/102* (2022.01); *C09C 1/00* (2013.01); *C09C 3/08* (2013.01); *B22F 2301/25* (2013.01); *B22F 2301/30* (2013.01); *B22F 2301/45* (2013.01); *B22F 2302/253* (2013.01)

(58) Field of Classification Search
CPC .......................... B22F 1/0062; B22F 2301/25; B22F 2301/30; B22F 2301/45; B22F 2302/253; C09C 1/00; C09C 3/08
See application file for complete search history.

(56) References Cited

U.S. PATENT DOCUMENTS

2018/0369991 A1* 12/2018 Yan .......................... C08K 3/22

FOREIGN PATENT DOCUMENTS

| | | | | | |
|---|---|---|---|---|---|
| JP | 2015-017026 A | | 1/2015 | | |
| JP | 2015017026 A | * | 1/2015 | | |
| JP | 2017025226 A | * | 2/2017 | ............. | C08K 3/013 |

OTHER PUBLICATIONS

JP-2017025226-A english translation. (Year: 2017).*
JP-2015017026-A englsih translation (Year: 2015).*

* cited by examiner

*Primary Examiner* — Anthony J Zimmer
*Assistant Examiner* — Ricardo D Morales
(74) *Attorney, Agent, or Firm* — Knobbe Martens Olson & Bear LLP

(57) ABSTRACT

To provide a method for producing surface-modified metal oxide fine particles, which can produce surface-modified metal oxide fine particles having excellent dispersion stability in dispersion liquids having various compositions; a method for producing improved metal oxide fine particles, suitable as a method for producing metal oxide fine particles to be surface-modified in production of the surface-modified metal oxide fine particles; surface-modified metal oxide fine particles which can be produced by the method for producing surface-modified metal oxide fine particles; and a metal oxide fine particle dispersion liquid including the surface-modified metal oxide fine particles. Surface-modified metal oxide fine particles are produced by a method including coating at least a part of surfaces of metal oxide fine particles with a carboxylic acid compound having a certain structure substituted with an amino group which may be cyclic, and/or carboxylate thereof.

7 Claims, No Drawings

METHOD FOR PRODUCING SURFACE-MODIFIED METAL OXIDE FINE PARTICLE, METHOD FOR PRODUCING IMPROVED METAL OXIDE FINE PARTICLES, SURFACE-MODIFIED METAL OXIDE FINE PARTICLES, AND METAL OXIDE FINE PARTICLE DISPERSION LIQUID

This application is based on and claims the benefit of priority from Japanese Patent Application Nos. 2018-208495 and 2019-197337, respectively filed on 5 Nov. 2018 and 30 Oct. 2019, the content of which is incorporated herein by reference.

BACKGROUND OF THE INVENTION

Field of the Invention

The present invention relates to a method for producing surface-modified metal oxide fine particle; a method for producing improved metal oxide fine particles suitable as a method for producing metal oxide fine particles to be surface-modified in the method for producing the surface-modified metal oxide fine particle; surface-modified metal oxide fine particles, and a metal oxide fine particle dispersion liquid including the surface-modified metal oxide fine particles.

Related Art

Metal oxide fine particles are widely used as optical materials and electronic component materials, and materials, for example, abrasives, used for processing various articles. Such metal oxide fine particles are often used as a dispersion liquid because they are easily transported, weighed, handled, and the like. However, in a case where untreated metal oxide fine particles are dispersed in a dispersion medium such as an organic solvent, there is a problem that the metal oxide fine particles easily agglomerate. When the metal oxide fine particles agglomerate in the dispersion medium, the function of the metal oxide fine particles is not easily exhibited. Therefore, in order to impart metal oxide fine particles with satisfactory dispersion stability with respect to the dispersion medium such as an organic solvent, the surface treatment method of metal oxide fine particles has been proposed.

As such a surface treatment method, a method of coating a part of the surface of metal oxide fine particles with a carboxylic acid compound having an aromatic structure has been proposed (Patent Document 1).

Patent Document 1: Japanese Unexamined Patent Application, Publication No. 2015-017026

SUMMARY OF THE INVENTION

However, there has been room for further improvement in the dispersion stability of metal oxide fine particles surface-treated by the method described in Patent Document 1. Furthermore, the metal oxide fine particles surface-treated by the method described in Patent Document 1 may easily agglomerate depending on types of components included in the dispersion liquid.

The present invention has been made in view of the above-mentioned problem. An object of the present invention is to provide a method for producing surface-modified metal oxide fine particles, which can produce surface-modified metal oxide fine particles having excellent dispersion stability in dispersion liquids having various compositions; a method for producing metal oxide fine particles suitable as a method for producing improved metal oxide fine particles to be surface-modified in the producing of the surface-modified metal oxide fine particles; surface-modified metal oxide fine particles which can be produced by the method for producing surface-modified metal oxide fine particles; and a metal oxide fine particle dispersion liquid including the surface-modified metal oxide fine particles.

The present inventors have found that the above-mentioned problem can be solved by producing surface-modified metal oxide fine particles by a method including coating at least a part of surfaces of metal oxide fine particles with a carboxylic acid compound having a certain structure substituted with an amino group which may be cyclic, and/or carboxylate of the carboxylic acid compound, and have reached completion of the present invention. Specifically, the present invention provides the following.

A first aspect of the present invention is a method for producing surface-modified metal oxide fine particles, the method including coating at least a part of surfaces of metal oxide fine particles with a carboxylic acid compound represented by the following formula (1):

[Chem. 1]

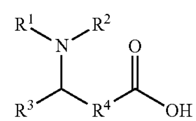

(1)

(In the formula (1), $R^1$ and $R^2$ are each independently a hydrogen atom, or a monovalent organic group, $R^1$ and $R^2$ may be bonded to each other to form a ring, the ring may include one or more elements selected from the group consisting of N, S, and O as a ring constituent element; $R^3$ is a monovalent organic group; and $R^4$ is a methylene group or a single bond), and/or carboxylate derived from the carboxylic acid compound represented by the formula (1).

A second aspect of the present invention is a method for producing improved metal oxide fine particles, the method including preparing metal oxide fine particles in a solution or a suspension containing a compound having an amide structure, or dispersing metal oxide fine particles in a presence of a dispersion medium including a compound having an amide structure.

A third aspect of the present invention is a surface-modified metal oxide fine particles in which at least a part of a surface is coated with a carboxylic acid compound represented by the following formula (1):

[Chem. 2]

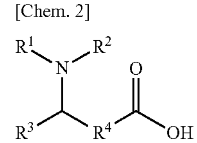

(1)

(In the formula (1), $R^1$ and $R^2$ are each independently a hydrogen atom, or a monovalent organic group, $R^1$ and $R^2$ may be bonded to each other to form a ring, the ring may include one or more elements selected from the group consisting of N, S, and O as a ring constituent element; $R^3$ is a monovalent organic group; and $R^4$ is a methylene group or a single bond), and/or carboxylate derived from the carboxylic acid compound represented by the formula (1).

A fourth aspect of the present invention is a metal oxide fine particle dispersion liquid including the surface-modified metal oxide fine particle according to the third aspect of the present invention as the metal oxide (A).

The present invention can provide a method for producing surface-modified metal oxide fine particles, which can produce surface-modified metal oxide fine particles having excellent dispersion stability in dispersion liquids; a method for producing improved metal oxide fine particles, suitable as a method for producing metal oxide fine particles to be surface-modified in production of the surface-modified metal oxide fine particles; surface-modified metal oxide fine particles which can be produced by the method for producing surface-modified metal oxide fine particles; and a metal oxide fine particle dispersion liquid including the surface-modified metal oxide fine particles.

DETAILED DESCRIPTION OF THE INVENTION

<<Method for Producing Surface-Modified Metal Oxide Fine Particles>>

A method for producing surface-modified metal oxide fine particle is a method including coating at least a part of surfaces of metal oxide fine particles with a carboxylic acid compound represented by the following formula (1):

[Chem. 3]

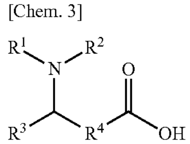

(1)

(In the formula (1), $R^1$ and $R^2$ are each independently a hydrogen atom, or a monovalent organic group, $R^1$ and $R^2$ may be bonded to each other to form a ring, the ring may include one or more elements selected from the group consisting of N, S, and O as a ring constituent element; $R^3$ is a monovalent organic group; and $R^4$ is a methylene group or a single bond), and/or carboxylate derived from the carboxylic acid compound represented by the formula (1).

Note here that the carboxylate is a carboxylic acid anion derived from the carboxylic acid compound represented by the formula (1) which can be bonded or adhere to the surface of the metal oxide fine particles, or a salt of the carboxylic acid compound represented by the formula (1). Note here that bond or adhesion to the surface of the metal oxide fine particles can be determined by, for example, an X-ray photoelectron spectrometer (XPS), and the like. In the salt of the carboxylic acid compound represented by the formula (1), a counter cation to the carboxylic acid anion may be an inorganic cation or an organic cation, and an inorganic cation is preferable. The counter cation may be a monovalent cation or a polyvalent cation of divalent or more.

The inorganic cation is not particularly limited, but preferable examples of the inorganic cation include alkali metal cations such as a sodium ion and a potassium ion, cation derived from a metal element included in the metal oxide fine particle, and the like. Preferable metal element that can be included in the metal oxide fine particles will be described later.

The surface-modified metal oxide fine particles produced by the above method and coated with the carboxylic acid compound represented by the formula (1) and/or the carboxylate derived from the carboxylic acid compound represented by the formula (1) show satisfactory dispersion stability in various liquids. The surface-modified metal oxide fine particles produced by the above method are stably dispersed in dispersion liquids regardless of compositions of the dispersion liquid, and, in particular, shows satisfactory dispersion stability even in a liquid containing a compound having an aromatic ring having a fluorene skeleton.

<Metal Oxide Fine Particles>

As metal oxide fine particles, various metal oxide fine particles conventionally used for various purposes can be used without particular limitation. For example, metal oxide like $ZrO_2$ fine particles is used as a filler for achieving high refractive index in the high refractive material.

Shapes of the metal oxide fine particle are not particularly limited. Examples of the shapes of the metal oxide fine particle include a spherical shape, a granular shape, an elliptical spherical shape, a cubic shape, a rectangular parallelepiped shape, a pyramidal shape, a needle-like shape, a columnar shape, a rod-like shape, a cylindrical shape, a scale shape, a plate shape, and a flake-like shape. A spherical shape, a granular shape, columnar shape, and the like, are preferable.

Types of metal oxides forming the metal oxide fine particle are not particularly limited within a range where the objects of the present invention are not impaired. The metal oxide fine particles may be particles formed of a single metal oxide, and may be particles formed of two or more metal oxides. Furthermore, for the coating treatment with the carboxylic acid compound represented by the formula (1) and the like, one type of metal oxide fine particle may be used alone or two or more types of metal oxide fine particles may be used in combination.

As the metal forming metal oxide fine particle, at least one element selected from the group consisting of Ag, Cu, In, Sn, Ti, Hf, Al, Zr, Zn, Sn, and Ce is preferable. Among the above metal elements, from the viewpoint that metal oxide having a high refractive index can be provided, at least one element selected from the group consisting of Ti, Al, Zr, Zn, Sn and Ce is preferable, and Zr is particularly preferable. Suitable examples of the metal oxide forming metal particles include single metal oxide such as aluminum oxide ($Al_2O_3$), titanium oxide ($TiO_2$), hafnium oxide ($HfO_2$), zirconium oxide ($ZrO_2$), indium oxide ($In_2O_3$), zinc oxide (ZnO), tin oxide ($SnO_2$), lanthanum oxide ($La_2O_3$), yttrium oxide ($Y_2O_3$), ceric oxide ($CeO_2$), and magnesium oxide (MgO); solid solution of metal oxides such as ITO and ATO; composite metal oxides such as barium titanate ($BaTiO_3$), perovskite ($CaTiO_3$), and spinel ($MgAl_2O_4$).

The average particle diameter of the metal oxide fine particles is not particularly limited within a range where the objects of the present invention are not impaired. The average particle diameter of the metal oxide fine particles is, for example, 50 nm or less, more preferably 20 nm or less, further preferably 10 nm or less, and particularly preferably 5 nm or less. The lower limit of the average particle diameter of the metal oxide fine particles is, for example, 1 nm or more, and may be 2 nm or more. The average particle diameter of metal oxide fine particles is a volume average particle diameter measured using a dynamic light-scattering method. In the cumulative particle size volume distribution of metal oxide fine particles, the particle diameter of the cumulative value of 99.99% is, for example, preferably 50 nm or less, more preferably 30 nm or less, and further preferably, 20 nm or less, from the viewpoint of increase in the refractive index. The lower limit value is not particularly limited, but it is, for example, 5 nm or more. The particle size distribution (cumulative particle size volume distribution) of metal oxide fine particles is also measured by the dynamic light scattering method.

<Carboxylic Acid Compound>

For coating the surface of the metal oxide fine particles as described above, a carboxylic acid compound represented by the following formula (1) and/or carboxylate derived from the carboxylic acid compound represented by the formula (1) is used. Note here that the carboxylic acid compound represented by the formula (1), or carboxylate derived from the carboxylic acid compound includes two or more optical isomers, any optical isomers can be used for the coating of the surface of the metal oxide fine particles. Furthermore, a mixture of the plurality of optical isomers can be used for coating of the surface of the metal oxide fine particles.

[Chem. 4]

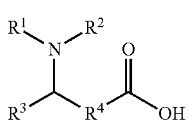

(1)

(In the formula (1), $R^1$ and $R^2$ are each independently a hydrogen atom, or a monovalent organic group, $R^1$ and $R^2$ may be bonded to each other to form a ring, the ring may include one or more elements selected from the group consisting of N, S, and O as a ring constituent element; $R^3$ is a monovalent organic group; and $R^4$ is a methylene group or a single bond.)

Hereinafter, for the sake of convenience, only the carboxylic acid compound represented by the formula (1) is described, but the carboxylate derived from the carboxylic acid compound represented by the formula (1) can be also used for coating as the carboxylic acid compound represented by the formula (1).

In the formula (1), $R^1$ and $R^2$ are each independently a hydrogen atom, or a monovalent organic group. The monovalent organic group is not particularly limited. Examples of the monovalent organic group may include an optionally substituted alkyl group, an optionally substituted cycloalkyl group, an optionally substituted aralkyl group, an optionally substituted heterocyclic group, and an optionally substituted aromatic group, and the like. When $R^1$ and $R^2$ are a monovalent organic group, the number of carbon atoms of the organic group is preferably 1 or more and 40 or less, more preferably 1 or more and 30 or less, further preferably 1 or more and 20 or less, and particularly preferably 1 or more and 10 or less. Furthermore, $R^1$ and $R^2$ may be bonded to each other to form a ring.

As $R^1$ and $R^2$, it is preferable that $R^1$ and $R^2$ are each independently a hydrogen atom, an optionally substituted alkyl group, or an optionally substituted aromatic group, or that $R^1$ and $R^2$ are bonded to each other to form a ring.

When $R^1$ and $R^2$ are an alkyl group, the alkyl group may include an ether bond, an ester bond, an amide bond, a sulfide bond, a disulfide bond, and the like, in the chain. The number of carbon atoms of the alkyl group as $R^1$ and $R^2$ is preferably 1 or more and 40 or less, more preferably 1 or more and 30 or less, further preferably 1 or more and 20 or less, particularly preferably 1 or more and 10 or less, and the most preferably 1 or more and 5 or less.

There is no particular limitation to the substituent which $R^1$ and $R^2$ as the alkyl group may have, within a range where the objects of the present invention are not impaired. Specific examples of substituent which the alkyl group may have include a hydroxyl group, an alkoxy group, an amino group, a cyano group, and a halogen atom, and the like. The alkylene group may be linear alkyl group, or a branched alkyl group, and a linear alkyl group is preferable.

Specific examples of the alkyl group suitable as $R^1$ and $R^2$ include a methyl group, an ethyl group, an n-propyl group, an isopropyl group, an n-butyl group, an isobutyl group, an sec-butyl group, a tert-butyl group, an n-pentyl group, an isopentyl group, a tert-pentyl group, an n-hexyl group, an n-heptyl group, an n-octyl group, a 2-ethyl-n-hexyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group, and an n-icosyl group.

Optionally substituted aromatic group as $R^1$ and $R^2$ may be an optionally substituted aromatic hydrocarbon group, or an optionally substituted aromatic heterocyclic group.

The type of the aromatic hydrocarbon group is not particularly limited without interfering with the object of the present invention. The aromatic hydrocarbon group may be a monocyclic aromatic group, may be formed by fusion of two or more aromatic hydrocarbon groups, or may be formed by bonding of two or more aromatic hydrocarbon groups through a single bond. The aromatic hydrocarbon group is preferably a phenyl group, a naphthyl group, a biphenylyl group, an anthryl group, or a phenanthrenyl group.

The type of the aromatic heterocyclic group is not particularly limited without interfering with the object of the present invention. The aromatic heterocyclic group may be either a monocyclic group or a polycyclic group. The aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, and a benzimidazolyl group.

Examples of the substituent, which a phenyl group, a polycyclic aromatic hydrocarbon group, or an aromatic heterocyclic group may have, include a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, and an organic group. When the phenyl group, the polycyclic aromatic hydrocarbon group, or the aromatic heterocyclic group have plural substituents, the plural substituents may be the same or different.

When the substituent, which the aromatic group has, is an organic group, examples of the organic group include an alkyl group, an alkenyl group, a cycloalkyl group, a cycloalkenyl group, an aryl group, an aralkyl group, or the like. This organic group may have a bond or a substituent, other than a hydrocarbon group such as a heteroatom, in the organic group. This organic group may be either linear, branched, or cyclic, and combination of these structures.

This organic group is usually monovalent, but can be a divalent or higher polyvalent organic group when forming a cyclic structure, for example.

When the aromatic group has a substituent on neighboring carbon atoms, two substituents bonded on neighboring carbon atoms may be bonded to form a cyclic structure. Examples of the cyclic structure include an aliphatic hydrocarbon ring, and an aliphatic ring having a heteroatom.

When the substituent, which the aromatic group has, is an organic group, the bond included in the organic group is not particularly limited, as long as the effect of the present invention is not impaired; and the organic group may include a bond having a heteroatom such as an oxygen atom, a nitrogen atom, or a silicon atom. Specific examples of the bonded containing a heteroatom include, an ether bond, a thioether bond, a carbonyl bond, a thiocarbonyl bond, a ester bond, a amide bond, a urethane bond, an imino bond (—N═C(—R)—, —C(═NR)—: R represents a hydrogen atom or an organic group), a carbonate bond, a sulfonyl bond, a sulfinyl bond, an azo bond, and the like.

From the viewpoint of heat resistance of the carboxylic acid compound represented by the formula (1), the bond containing a heteroatom, which an organic group may have, is preferably an ether bond, a thioether bond, a carbonyl bond, a thiocarbonyl bond, an ester bond, an amide bond, an amino bond (—NR—: R represents a hydrogen atom or a monovalent organic group), an urethane bond, an imino bond (—N═C(—R)—, —C(═NR)—: R represents a hydrogen atom or a monovalent organic group), a carbonate bond, a sulfonyl bond, or a sulfinyl bond.

When the organic group is a substituent other than the hydrocarbon group, the type of the substituent other than the hydrocarbon group is not particularly limited without interfering with the object of the present invention. Specific examples of the substituent other than the hydrocarbon group include a halogen atom, a hydroxyl group, a mercapto group, a sulfide group, a cyano group, an isocyano group, a cyanato group, an isocyanato group, a thiocyanato group, an isothiocyanato group, an silyl group, an silanol group, an alkoxy group, an alkoxycarbonyl group, an amino group, a monoalkylamino group, a dialkylamino group, a monoarylamino group, a diarylamino group, a carbamoyl group, a thiocarbamoyl group, a nitro group, a nitroso group, a carboxylate group, an acyl group, an acyloxy group, a sulfino group, a sulfonato group, a phosphino group, a phosphinyl group, a phosphonato group, an alkyl ether group, an alkenyl ether group, an alkyl thioether group, an alkenyl thioether group, an aryl ether group, an aryl thioether group, and the like. The hydrogen atom included in the substituent mentioned above may be substituted with a hydrocarbon group. The hydrocarbon group included in the substituent mentioned above may be either linear, branched, or cyclic.

The substituent, which a phenyl group, a polycyclic aromatic hydrocarbon group, or an aromatic heterocyclic group has, is preferably an alkyl group having 1 or more and 12 or less carbon atoms, an aryl group having 1 or more and 12 or less carbon atoms, an alkoxy group having 1 or more and 12 or less carbon atoms, an aryloxy group having 1 or more and 12 or less carbon atoms, an arylamino group having 1 or more and 12 or less carbon atoms, and a halogen atom.

$R^1$ and $R^2$ may be bonded to each other to form a ring. A ring formed by bonding $R^1$ and $R^2$ is a nitrogen-containing heterocyclic ring. The nitrogen-containing ring includes one or more elements selected from the group consisting of N, S, and O, as a ring constituent element. The nitrogen-containing ring may be monocyclic or polycyclic, and the monocyclic is preferable. Furthermore, the nitrogen-containing heterocyclic ring may be an aliphatic ring, or an aromatic ring, or a fused polycyclic ring in which one or more aliphatic monocyclic ring and one or more aromatic monocyclic ring are fused to each other.

Suitable examples of the nitrogen-containing heterocyclic ring formed by bonding of $R^1$ and $R^2$ include piperidine, piperazine, morpholine, pyrrolidine, pyrrole, imidazole, pyrazole, indole, benzimidazole, purine, phenoxazine, and phenothiazine. Among these, pyrrolidine, pyrrole, imidazole, and pyrazole are preferable, and imidazole is more preferable. In other words, in the formula (1), it is preferable that $R^1$ and $R^2$ are bonded to each other to form an imidazole ring. A carboxylic acid compound having an imidazole ring formed by bonding of $R^1$ and $R^2$ is excellent in the effect by coating at the time of coating with a metal oxide fine particle.

A nitrogen-containing heterocyclic ring formed by bonding of $R^1$ and $R^2$ may have a substituent. Examples of the substituent include a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group. The number of the substituents on the nitrogen-containing heterocyclic ring is not particularly limited. When a plurality of substituents is present on the nitrogen-containing heterocyclic ring, the plurality of substituents may be the same as or different from each other.

When the substituent of the nitrogen-containing heterocyclic ring is an organic group, the organic group is the same as the organic group when $R^1$ and $R^2$ are optionally substituted aromatic group.

When a substituent of the nitrogen-containing heterocyclic ring is an organic group, the organic group is preferably an alkyl group, an aromatic hydrocarbon group, and an aromatic heterocyclic group. The alkyl group is preferably a linear or branched alkyl group having 1 or more and 8 or less carbon atoms, and more preferably a methyl group, an ethyl group, an n-propyl group, and an isopropyl group. The aromatic hydrocarbon group is preferably a phenyl group, a naphthyl group, a biphenylyl group, an anthryl group, and a phenanthrenyl group, more preferably a phenyl group and a naphthyl group, and particularly preferably a phenyl group. The aromatic heterocyclic group is preferably a pyridyl group, a furyl group, a thienyl group, an imidazolyl group, a pyrazolyl group, an oxazolyl group, a thiazolyl group, an isoxazolyl group, an isothiazolyl group, a benzoxazolyl group, a benzothiazolyl group, and a benzimidazolyl group, and more preferably a furyl group, and a thienyl group.

In the formula (1), $R^3$ is a monovalent organic group. The monovalent organic group as $R^3$ is preferably an optionally substituted aromatic hydrocarbon group, and an aliphatic group which may include hetero atoms such as N, S, O, P, and a halogen atom. When $R^3$ is a monovalent organic group, the number of carbon atoms of the organic group is preferably 1 or more and 40 or less, more preferably 1 or more and 30 or less, further preferably 1 or more and 20 or less, and particularly preferably 1 or more and 10 or less. The optionally substituted aromatic group as $R^3$ is the same as the optionally substituted aromatic group as $R^1$ and $R^2$.

$R^4$ is a single bond, or a methylene group. When $R^4$ is a methylene group, the compound represented by the formula (1) is preferably a carboxylic acid compound represented by the following formula (1-1) from the viewpoint that a desired effect by coating is easily obtained.

[Chem. 5]

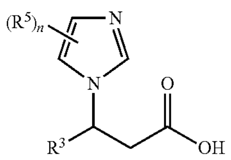

(1-1)

(In the formula (1-1), $R^3$ represents an optionally substituted aromatic group, $R^5$ represents a halogen atom, a hydroxyl group, a mercapto group, a sulfide group, a silyl group, a silanol group, a nitro group, a nitroso group, a sulfonato group, a phosphino group, a phosphinyl group, a phosphonato group, or an organic group; and n is an integer of 0 or more and 3 or less.)

When $R^4$ is a single bond, the compound represented by the formula (1) is preferably various amino acids having a structure included in the formula (1). Such amino acids are easily available. Furthermore, when a metal oxide fine particle is coated with such an amino acid, a desired effect by coating is easily obtained. The amino acid may be an L body or a D body, or a mixture of an L body and a D body. Preferable examples of the amino acid include alanine, arginine, asparagine, aspartic acid, cysteine, glutamine, glutamic acid, histidine, isoleucine, leucine, lysine, methionine, phenylalanine, serine, threonine, tryptophan, tyrosine, valine, ornithine, citrulline, and theanine. Furthermore, an amino group on a carbon atom neighboring to a carbonyl group of an amino acid may be substituted with an organic group such as an alkyl group having 1 or more and 4 or less carbon atoms, a phenyl group, and an acetyl group. The carboxylic acid compound having such a substituted amino group may be an N-monosubstituted carboxylic acid compound, or an N,N-disubstituted carboxylic acid compound.

$R^3$ in the above formula (1-1) is the same as described in the formula (1). The $R^3$ in the above formula (1-1) is an optionally substituted aromatic group. Furthermore, when the $R^5$ in the above formula (1-1) is an organic group, the organic group is the same as the organic group as the substituent in the case where $R^1$ and $R^2$ are an optionally substituted aromatic group. When n is 2 or 3, a plurality of $R^5$ may be the same or different from each other.

Among the carboxylic acid compounds represented by the formula (1-1), compounds represented by the following formula (1-2) are preferable since they can be synthesized inexpensively and easily.

[Chem. 6]

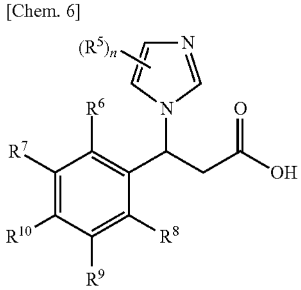

(1-2)

(In the formula (1-2), $R^5$ and n are the same as those defined in the (1-1), $R^6$, $R^7$, $R^8$, $R^9$, and $R^{10}$ are each independently a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group. However, at least one of $R^6$, $R^7$, $R^8$, $R^9$, and $R^{10}$ is a group other than a hydrogen atom. At least two of $R^6$, $R^7$, $R^8$, $R^9$, and $R^{10}$ may be bonded to each other to form a cyclic structure. $R^1$ may be bonded to $R^8$ to form a cyclic structure.)

In the formula (1-2), when $R^6$, $R^7$, $R^8$, $R^9$, and $R^{10}$ are an organic group, the organic group is the same as the organic group which $R^1$ and $R^2$ in the formula (1) have as a substituent. $R^6$, $R^7$, $R^8$, and $R^9$ are preferably a hydrogen atom from the viewpoint of solubility in a solvent of a carboxylic acid compound.

Especially, at least one of $R^6$, $R^7$, $R^8$, $R^9$, and $R^{10}$ is preferably the substituent, and particularly preferably $R^{22}$ is the substituent. When $R^{10}$ is the following substituent, $R^6$, $R^7$, $R^8$, and $R^9$ are preferably a hydrogen atom.

$$—O—R^{11}$$

($R^{11}$ is a hydrogen atom or an organic group.)

When $R^{11}$ is an organic group, the organic group is the same as an organic group, which $R^1$ and $R^2$ in the formula (1) have as a substituent. $R^{11}$ is preferably an alkyl group, more preferably an alkyl group having 1 or more and 8 or less carbon atoms, particularly preferably an alkyl group having 1 or more and 3 or less carbon atoms, and the most preferably a methyl group.

Suitable examples of the carboxylic acid compound represented by the formula (1) in which $R^4$ in the formula (1) is a methylene group include the following compounds.

[Chem. 7]

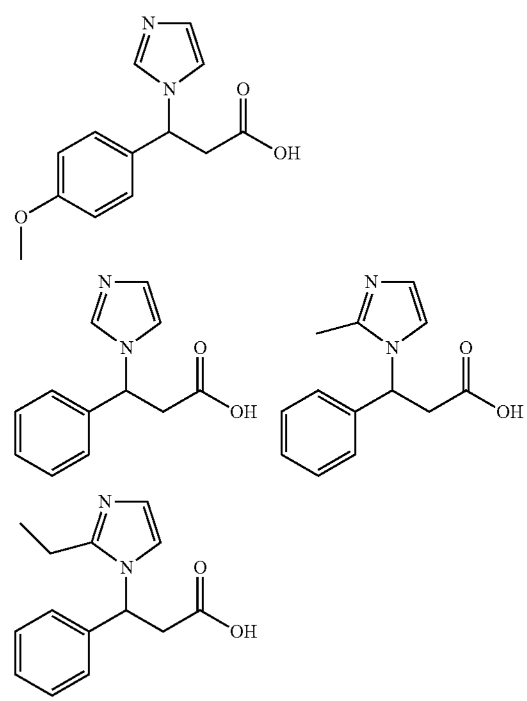

-continued

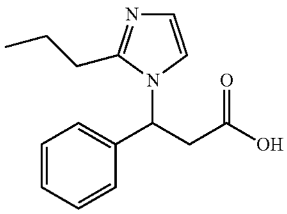

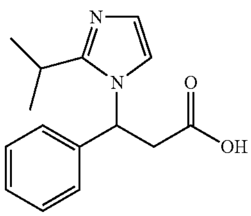

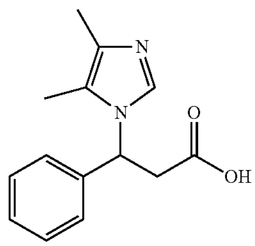

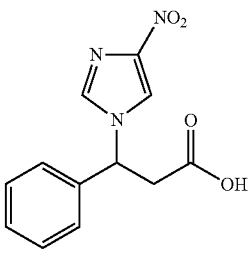

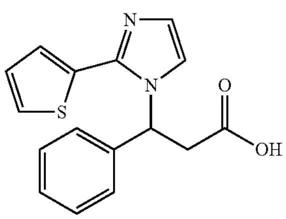

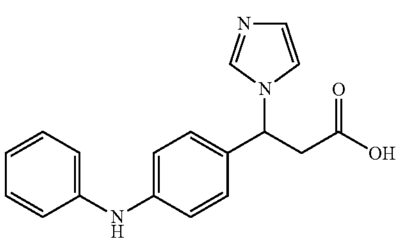

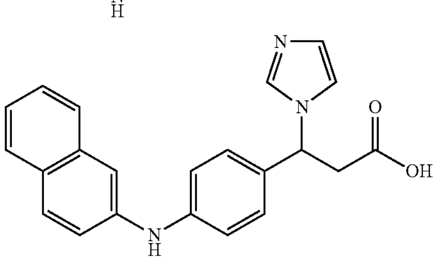

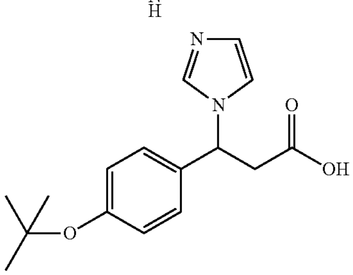

-continued

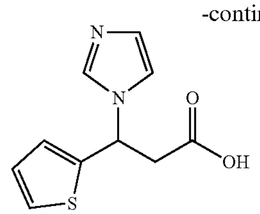

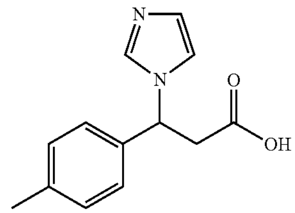

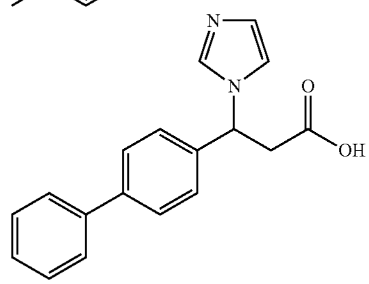

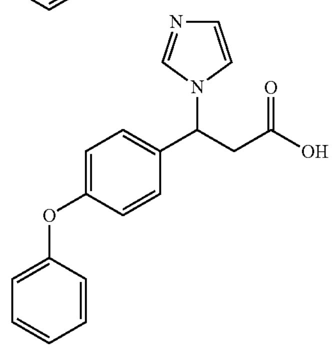

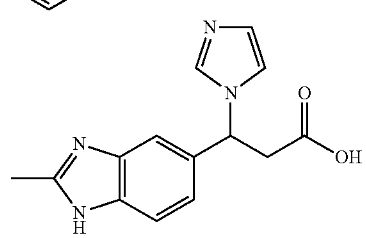

<Surface Modification Method>

A surface modification method is not particularly limited as long as it is a method capable of bringing a metal oxide fine particle and the carboxylic acid compound represented by the formula (1) and/or carboxylate derived from the carboxylic acid compound represented by the formula (1) into contact with each other. Usually, surface modification is carried out by stirring and mixing a metal oxide fine particle, and the carboxylic acid compound represented by the formula (1) and/or carboxylate derived from the carboxylic acid compound represented by the formula (1) as a coating material are stirred and mixed with each other in a dispersion medium.

A temperature at which a surface modification is carried out is not particularly limited as long as the temperature does not cause deterioration or decomposition of the metal oxide fine particles or the coating material by heating. Furthermore, stirring and mixing time at which a surface modification is carried out is not particularly limited.

The amount of the carboxylic acid compound represented by the formula (1) and/or carboxylate derived from the carboxylic acid compound represented by the formula (1) to be used in the surface modification is preferably 0.01 parts by mass or more and 100 parts by mass or less, more preferably 0.1 parts by mass or more and 50 parts by mass or less, further preferably 1 part by mass or more and 20 parts by mass or less, and further more preferably 6 parts by mass or more and 20 parts by mass or less relative to 100 parts by mass of metal oxide fine particles.

The dispersion medium that can be used at the time of surface modification is not particularly limited as long as it is a medium capable of dispersing metal oxide fine particles, and solving the carboxylic acid compound represented by the formula (1) and/or carboxylate derived from the carboxylic acid compound represented by the formula (1). The dispersion medium may be water, or an organic solvent, an aqueous solution of an organic solvent. An organic solvent is preferable.

Specific examples of the organic solvent which can be used as the dispersion medium include (poly)alkyleneglycol monoalkylethers such as ethyleneglycol monomethylether, ethyleneglycol monoethylether, ethyleneglycol n-propylether, ethyleneglycol mono-n-butylether, diethyleneglycol monomethylether, diethyleneglycol monoethylether, diethyleneglycol mono-n-propylether, diethyleneglycol mono-n-butylether, triethyleneglycol monomethylether, triethyleneglycol monoethylether, propyleneglycol monomethylether, propyleneglycol monoethylether, propyleneglycol mono-n-propylether, propyleneglycol mono-n-butylether, dipropyleneglycol monomethylether, dipropyleneglycol monoethylether, dipropyleneglycol mono-n-propylether, dipropyleneglycol mono-n-butylether, tripropyleneglycol monomethylether, and tripropyleneglycol monoethylether; (poly)alkyleneglycol monoalkylether acetates such as ethyleneglycol monomethylether acetate, ethyleneglycol monoethylether acetate, diethyleneglycol monomethylether acetate, diethyleneglycol monoethylether acetate, propyleneglycol monomethylether acetate, and propyleneglycol monoethylether acetate; other ethers such as diethyleneglycol dimethylether, diethyleneglycol methylethylether, diethyleneglycol diethylether, and tetrahydrofuran; ketones such as methylethylketone, cyclohexanone, 2-heptanone, and 3-heptanone; lactic acid alkyl esters such as methyl 2-hydroxypropionate, and ethyl 2-hydroxyprpionate; other esters such as ethyl 2-hydroxy-2-methylpropionate, methyl 3-methoxypropionate, ethyl 3-methoxypropionate, methyl 3-ethoxypropionate, ethyl 3-ethoxypropionate, ethyl ethoxyacetate, ethyl hydroxyacetate, methyl 2-hydroxy-3-methylbutanoate, 3-methyl-3-methoxybutyl acetate, 3-methyl-3-methoxybutyl propionate, ethyl acetate, n-propyl acetate, isopropyl acetate, n-butyl acetate, isobutyl acetate, n-pentyl formate, isopentyl acetate, n-butyl propionate, ethyl butanoate, n-propyl butanoate, isopropyl butanoate, n-butyl butanoate, methyl pyruvate, ethyl pyruvate, n-propyl pyruvate, methyl acetoacetate, ethyl acetoacetate, and ethyl 2-oxobutanoate; and aromatic hydrocarbons such as toluene and xylene, and the like.

The use amount of the dispersion medium is not particularly limited, and typically preferably 0.1 parts by mass or more and 5000 parts by mass or less, more preferably 50 parts by mass or more and 1000 parts by mass or less, and further preferably 100 parts by mass or more and 500 parts by mass or less relative to 100 parts by mass of metal oxide fine particles.

The coating with carboxylic acid compound and/or carboxylate mentioned above is preferably carried out with respect to improved metal oxide fine particles, prepared in a solution or a suspension containing a compound having an amide structure, or dispersed in a presence of a dispersion medium containing a compound having an amide structure.

When the improved metal oxide fine particles are produced by such a method, it is considered that a compound having an amide structure has some action on the functional group on the surface of the metal oxide fine particles. As a result, the improved metal oxide fine particles are produced by the above method are applied as particles to be surface-modified in the above method for producing the surface-modified metal oxide fine particles, coating treatment to the surface of the improved metal oxide fine particles with the above carboxylic acid compound and/or carboxylate thereof is satisfactorily carried out, dispersion stability in a dispersion liquid in the surface-modified metal oxide fine particle is considered to be particularly preferable.

The method for preparing metal oxide fine particles in a solution or a suspension containing a compound having an amide structure, and a method for dispersing metal oxide fine particles in the presence of a dispersion medium containing a compound having an amide structure are not particularly limited as long as they are a method for producing metal oxide fine particles under the conditions in which the compound having an amide structure is not vaporized or thermally decomposed. Metal oxide fine particles may be adjusted using a solution in which the carboxylic acid compound represented by the formula (1) and/or the carboxylate derived from the carboxylic acid compound represented by the formula (1) is dissolved in a solvent including a compound having an amide structure.

The use amount of the compound having an amide structure is not particularly limited as long as a desired effect can be obtained. The use amount of the compound having an amide structure is not particularly limited, and is typically preferably 10 parts by mass or more and 5000 parts by mass or less, more preferably 20 parts by mass or more and 1000 parts by mass or less, and further preferably 50 parts by mass or more and 500 parts by mass or less relative to 100 parts by mass of produced metal oxide fine particles or dispersed metal oxide fine particles.

The amide structure in the compound having an amide structure is a structure represented by —(C=O)—N<. Preferable examples of the compound having an amide structure include a compound represented by the following formula (S01).

[Chem. 8]

(S01)

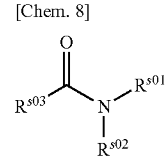

(In the formula (S01), $R^{s01}$ and $R^{s02}$ are each independently an alkyl group having 1 or more and 3 or less carbon atoms, $R^{s03}$ is a group represented by the following formula (S01-1) or the following formula (S01-2):

[Chem. 9]

(S01-1)

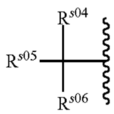

(S01-2)

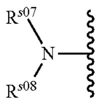

in the formula (S01-1), $R^{s04}$ is a hydrogen atom or a hydroxyl group, $R^{s05}$ and $R^{s06}$ are each independently an alkyl group having 1 or more and 3 or less carbon atoms.

In the formula (S01-2), $R^{s07}$ and $R^{s08}$ are each independently hydrogen atom or an alkyl group having 1 or more and 3 or less carbon atoms.)

Among the compounds represented by the formula (S01), specific examples of the compound wherein $R^{s03}$ is a group represented by the formula (S01-1) include N,N,2-trimethylpropionamide, N-ethyl,N,2-dimethylpropionamide, N,N-diethyl-2-methylpropionamide, N,N,2-trimethyl-2-hydroxypropionamide, N-ethyl-N,2-dimethyl-2-hydroxypropionamide, N,N-diethyl-2-hydroxy-2-methylpropionamide, and the like.

Among the compounds represented by the formula (S01), specific examples of the compound wherein $R^{s026}$ is a group represented by the formula (S01-2) include N,N,N',N'-tetramethylurea, N,N,N',N'-tetraethylurea, and the like.

Among the compounds represented by the formula (S01), N,N,2-trimethylpropionamide, and N,N,N',N'-tetramethylurea are particularly preferable.

Preferable examples of the compound having an amide structure, other than the compounds represented by the formula (S01), include N-methyl-2-pyrrolidone, N-ethyl-2-pyrrolidone, N,N-dimethylformamide, N,N-diethylformamide, N,N-dimethylacetamide, 1,3-dimethyl-2-imidazolidinone, and the like. The compounds having an amide structure may be used alone or in combination of two or more types thereof.

Note here that the metal oxide fine particles to be surface modified by the carboxylic acid compound represented by the formula (1) and/or carboxylate derived from the carboxylic acid compound represented by the formula (1) may be coated metal oxide fine particles containing the other coating material. The coated metal oxide fine particles may be commercially available products (coated metal oxide fine particles or a dispersion liquid containing coated metal oxide fine particles), or may be obtained using the other well-known methods.

As the other coating materials,

- hydrocarbons having carboxylic acid groups such as linear carboxylic acid having 4 or more and 20 or less carbon atoms (linear aliphatic carboxylic acid, preferably linear saturated aliphatic carboxylic acid, and the like), branched carboxylic acid (branched aliphatic carboxylic acid), cyclic carboxylic acid (alicyclic carboxylic acid, preferably alicyclic carboxylic acid which does not have an unsaturated double bond, and the like), are preferably employed. Examples thereof include linear carboxylic acid such as butyric acid, valeric acid, hexanoic acid, heptanoic acid, octanoic acid, nonanoic acid, decanoic acid, dodecanoic acid, tetradecanoic acid, stearic acid; branched carboxylic acid such as pivalic acid, 2,2-dimethylbutyric acid, 3,3-dimethylbutyric acid, 2,2-dimethylvaleric acid, 2,2-diethylbutyric acid, 3,3-diethylbutyric acid, 2-ethylhexanoic acid, 2-methylheptanoic acid, 4-methyloctanoic acid, neodecanoic acid; cyclic carboxylic acids such as naphthenic acid and cyclohexane dicarboxylic acid, and the like;
- carboxylic acid compounds having an aromatic structure selected from the group consisting of a fluorene structure, an anthracene structure, a dibenzothiophene structure, a carbazole structure, a stilbene structure, a biphenyl structure, a bisphenol structure, and a naphthalene structure;
- carboxylic acid compound having the above-mentioned aromatic structure further including a (meta)acryloyl structure;
- compounds listed in the below-mentioned silane compounds (i) to (iii); hydrolytically condensable silicon compounds including monovinyltrialkoxysilanes such as vinyltrimethoxysilane, vinyltriethoxysilane, and allyltrimethoxysilane; (meth)acryloxy alkyl monoalkyl dialkoxysilane such as 3-methacryloxypropyltrimethoxysilane, 3-methacryloxypropyltriethoxysilane, 3-methacryloxypropylmethyldimethoxysilane, and 3-methacryloxypropylmethyldiethoxysilane; (meth)acryloxyalkyl trialkoxysilane such as 3-acryloxypropyl trimethoxysilane; non-alicyclic epoxyfluorenylidene group-containing alkyltri (or di)alkoxysilane such as 3-glycidoxypropyltrimethoxysilane, 3-glycidoxypropyltriethoxysilane, 3-glycidoxypropylmethyldimethoxy silane; non-alicyclic epoxy-group containing alkylmonoalkyl dialkoxysilane such as 3-glycidoxypropylmethyldiethoxysilane;

alicyclic epoxy-group containing alkyltri (or di)alkoxysilane such as 2-(3,4-epoxycyclohexyl)ethyl trimethoxysilane, 2-(3,4-epoxycyclohexyl)ethyl triethoxysilane, 2-(3,4-epoxy cyclohexyl)methyl dimethoxysilane, and 2-(3,4-epoxy cyclohexyl)methyl diethoxysilane; alicyclic epoxy group-containing alkyl monoalkyl dialkoxysilane such as 2-(3,4-epoxy cyclohexyl)ethyl methyldiethoxysilane; oxetanyl group-containing alkyltrialkoxysilane such as [(3-ethyl-3-oxetanyl)methoxy]propyl trimethoxysilane, [(3-ethyl-3-oxetanyl)methoxy]propyl triethoxysilane; mercaptoalkyl trialkoxysilane such as 3-mercaptopropyl trimethoxysilane; mercaptoalkyl monoalkyl dialkoxysilane such as 3-mercaptopropyl methyl dimethoxysilane;

the other chain trialkoxysilanes such as n-octyltriethoxysilane, n-dodecyltrimethoxysilane, n-dodecyltriethoxysilane, n-hexadecyltrimethoxysilane, octadecyltrimethoxysilane, 2-[methoxy(polyethyleneoxy)propyl]-trimethoxysilane, methoxytri(ethyleneoxy)propyl trimethoxysilane, 1-hexenyltrimethoxysilane, and 1-octenyltrimethoxysilane, and the like. These may be used alone or in combination of two or more thereof.

When the surface-modified metal oxide fine particle according to the present invention includes the other coating materials, the mass ration of the surface modification (coating) amount of the carboxylic acid compound represented by the formula (1) and/or carboxylate derived from the carboxylic acid compound represented by the formula (1) and the other coating materials in the surface-modified metal oxide fine particle is the carboxylic acid compound represented by the formula (1) and/or carboxylate derived from the carboxylic acid compound represented by the formula (1)/the other coating material is, for example, 1/99 to 99/1, preferably 50/50 to 99/1, further preferably 70/30 to 97/3, and particularly preferably 80/20 to 95/5 from the viewpoint of improvement of the dispersibility.

The metal oxide fine particles which are surface-modified by the above-mentioned method are used for various applications in a state in which they are dispersed in a dispersion medium, or in a state in which they are separated from dispersion medium by a method such as the exsiccation, centrifugation, or the like.

<<Method for Producing Improved Metal Oxide Fine Particles>>

A method for producing improved metal oxide fine particles is a method including preparing metal oxide fine particles in a solution or a suspension containing a compound having an amide structure; and dispersing metal oxide fine particles in the presence of a dispersion medium containing a compound having an amide structure. Note here that metal oxide fine particles to be improved (raw material) may be coated metal oxide fine particles including the other coating materials other than the carboxylic acid compound represented by the formula (1) and/or carboxylate derived from the carboxylic acid compound represented by the formula (1). The coated metal oxide fine particle may be commercially available products (coated metal oxide fine particle or a dispersion liquid including the coated metal oxide fine particle) or obtained using well-known methods.

As described above, when the improved metal oxide fine particles produced by the above method are applied as particles to be subjected to surface modification in the method for producing surface-modified metal oxide fine particles, dispersion stability in the dispersion liquid of the surface-modified metal oxide fine particles is considered to be particularly preferable. Therefore, the method for producing improved metal oxide fine particles mentioned above is preferably as a method for producing metal oxide fine particles which are subject of surface modification in the above-described method for producing surface-modified metal oxide fine particle. Furthermore, in the improved metal oxide fine particles produced by the above method, even when they are not surface-modified, the dispersion stability to an organic solvent and the like tends to be enhanced.

A method for preparing metal oxide fine particles in a solution or a suspension including a compound having an amide structure, and a method for dispersing metal oxide fine particles in the presence of a dispersion medium including a compound having an amide structure are the same as described above.

<<Metal Oxide Fine Particle Dispersion Liquid>>

A metal oxide fine particle dispersion liquid includes metal oxide (A). The metal oxide (A) is in a state of fine particles. The metal oxide fine particle dispersion liquid includes the above-described surface-modified metal oxide fine particles as the metal oxide (A). The content of the above-described surface-modified metal oxide fine particles in the metal oxide (A) is not particularly limited within a range where the objects of the present invention are not impaired. The content of the surface-modified metal oxide fine particles is preferably 50% by mass or more, more preferably 70% by mass or more, further preferably 90% by mass or more, and particularly preferably 100% by mass relative to the mass of the metal oxide (A).

The metal oxide fine particle dispersion liquid may be a dispersion liquid in which the metal oxide (A) is dispersed in melted resin or the like, or a dispersion liquid in which the metal oxide (A) is dispersed, or a dispersion liquid in which the metal oxide (A) is dispersed various additive components are dissolved in a solvent. When such metal oxide fine particle dispersion liquids include the above-described surface-modified metal oxide fine particle as the metal oxide (A), the metal oxide fine particle dispersion liquid has excellent dispersion stability. Therefore, the metal oxide fine particle dispersion liquid is suitably used for various applications of use.

Applications of use of the metal oxide fine particle dispersion liquid is not particularly limited. Examples of the applications of use of the metal oxide fine particle dispersion liquid include a polishing liquid, a sealing composition, and a composition for forming a high refractive index film. When the metal oxide fine particle dispersion liquid is used for sealing, film formation, and the like, the metal oxide fine particle dispersion liquid preferably contains a base material component (B).

When the metal oxide fine particle dispersion liquid includes a base material component (B) and includes the metal oxide (A), the amount of the metal oxide (A) in the metal oxide fine particle dispersion liquid is appropriately defined in consideration of the use of application of the metal oxide fine particle dispersion liquid. When the metal oxide fine particle dispersion liquid includes the base material component (B), the amount of the metal oxide (A) is preferably 0.1 parts by mass or more and 200 parts by mass or less, more preferably 1 part by mass or more and 150 parts by mass or less, and particularly preferably 3 parts by mass or more and 100 parts by mass or less relative to 100 parts by mass of the base material component (B) in the metal oxide fine particle dispersion liquid. The upper limit of the amount of the metal oxide (A) may be 80 parts by mass or less, or 50 parts by mass or less, or 30 parts by mass or less relative to 100 parts by mass of the base material component (B). The lower limit of the amount of the metal oxide (A) may be 5 parts by mass or more, or 10 parts by mass or more, or 20 parts by mass or more relative to 100 parts by mass of the base material component (B).

<Base Material Component (B)>

The base material component (B) is a component which imparts a formability capable of producing an article having a desired shape as it is by a well-known method such as a melt processing method or a formability capable of producing an article having a desired shape by treatment such as exposure, heating, reaction with water or the like, to the metal oxide fine particle dispersion. The base material component (B) is not particularly limited as long as it is a material capable of giving desired formability to the metal oxide fine particle dispersion liquid. As the base material component (B), typically, a resin material including a high molecular compound, a thermosetting material hardened when a high molecular compound is generated by cross-linking by heating, or chemical modification such as intramolecular cyclization is generated by heating, a photopolymerizable compound capable of being hardened by exposure, and a hydrolytic condensable silane compound in which hydrolytic condensation occurs by water content in the composition or in the atmosphere are used. Examples of the hydrolytic condensable silane compound include an alkoxysilane compound such as tetramethoxy silane, tetraethoxy silane, methyl trimethoxy silane, ethyl trimethoxy silane, methyl triethoxy silane, ethyl triethoxy silane, phenyl trimethoxy silane, phenyl triethoxy silane, dimethyl dimethoxy silane, diethyl dimethoxy silane, dimethyl diethoxy silane, diethyl diethoxy silane, diphenyl dimethoxy silane, and diphenyl diethoxy silane. The hydrolytic condensable silane compound may be a partial hydrolytic condensate of these silane compounds.

Furthermore, from the viewpoint of easiness in forming an article having high refractive index, in particular, a film having high refractive index, the metal oxide fine particle dispersion liquid also preferably includes a compound represented by the following formula (b-01) as the base material component (B):

[Chem. 10]

(b-01)

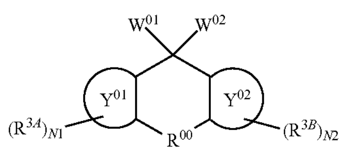

in the formula (b-01), $W^{01}$ and $W^{02}$ are each independently a group represented by the following formula (b-02):

[Chem. 11]

(b-02)

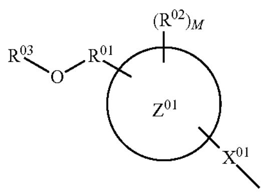

in the formula (b-02), a ring $Z^{01}$ represents an aromatic hydrocarbon ring; $X^{01}$ represents a single bond or a group represented by —S—; $R^{01}$ represents a single bond, an alkylene group having 1 or more and 4 or less carbon atoms, or an alkyleneoxy group having 1 or more and 4 or less carbon atoms, and when $R^{01}$ is an alkyleneoxy group, an oxygen atom in the alkyleneoxy group is bonded to the ring $Z^{01}$, and $R^{01}$ is a monovalent hydrocarbon group, a hydroxyl group, a group represented by $—OR^{4A}$, a group represented by $—SR^{4B}$, an acyl group, an alkoxycarbonyl group, a halogen atom, a nitro group, a cyano group, a mercapto group, a carboxy group, an amino group, carbamoyl group, a group represented by $—NHR^{4C}$, a group represented by $—N(R^{4D})_2$, a sulfo group, or a monovalent hydrocarbon group, a group represented by $—OR^{4A}$, a group represented by $—SR^4$B, an acyl group, an alkoxycarbonyl group, a halogen atom, a nitro group, a cyano group, a mercapto group, a carboxyl group, an amino group, a carbamoyl group, a group represented by $—NHR^{4C}$, a group represented by $—N(R^{4D})_2$, a mesyloxy group, or a group substituted with a sulfo group; $R^{4A}$ to $R^{4D}$ each independently represent a monovalent hydrocarbon group; M represents an integer of 0 or more; $R^{03}$ is a hydrogen atom, a vinyl group, a thiirane-2-ylmethyl group, a glycidyl group, or a (meta) acryloyl group;

both $W^{01}$ and $W^{02}$ do not have a hydrogen atom as $R^{03}$;

a ring $Y^{01}$ and a ring $Y^{02}$, which may be the same or different, represent an aromatic hydrocarbon ring; $R^{00}$ represents a single bond, an optionally substituted methylene group, an ethylene group that is optionally substituted and may contain a hetero atom between two carbon atoms, a group represented by —O—, a group represented by —NH—, or a group represented by —S—; $R^{3A}$ and $R^{3B}$ each independently represent a cyano group, a halogen atom, or a monovalent hydrocarbon group; and N1 and N2 each independently represent an integer of 0 to 4.)

When the compound represented by the above formula (b-01) is combined with a curing agent as necessary, they can be thermally cured or photo-cured.

In the formula (b-02), examples of the ring $Z^{01}$ include benzene rings and fused polycyclic aromatic hydrocarbon rings [for example, fused di- to tetracyclic aromatic hydrocarbon rings such as fused dicyclic hydrocarbon rings (for example, $C_{8-20}$ fused dicyclic hydrocarbon rings, preferably $C_{10-16}$ fused dicyclic hydrocarbon rings, such as naphthalene rings) and fused tricyclic aromatic hydrocarbon rings (for example, anthracene rings or phenanthrene rings)]. The ring $Z^{01}$ is preferably a benzene ring or a naphthalene ring, more preferably a naphthalene ring. Because $W^{01}$ and $W^{02}$ in the formula (b-01) are each independently a group represented by the formula (b-02), $W^{01}$ and $W^{02}$ each include the ring $Z^{01}$. The ring $Z^{01}$ included in $W^{01}$ and the ring $Z^{02}$ included in $W^{02}$ may be the same as or different from each other. For example, one of the rings may represent a benzene ring with the other ring representing a naphthalene ring or the like. Particularly preferably, both the rings represent a naphthalene ring.

Furthermore, the position of substitution of the ring $Z^{01}$ bonded through $X^{01}$ to a carbon atom to which both $W^{01}$ and $W^{02}$ are directly connected is not particularly limited. For example, when the ring $Z^{01}$ represents a naphthalene ring, the group corresponding to the ring $Z^{01}$ bonded to the carbon atom may be, for example, a 1-naphthyl group or a 2-naphthyl group.

In the formula (b-02), $X^{01}$ independently represents a single bond or a group represented by —S—, and typically a single bond.

In the formula (b-02), examples of $R^1$ include single bonds; alkylene groups having 1 or more and 4 or less carbon atoms such as a methylene group, an ethylene group, a trimethylene group, a propylene group, and a butane-1,2-diyl group; and alkyleneoxy groups having 1 or more and 4 or less carbon atoms such as a methyleneoxy group, an ethyleneoxy group, a propyleneoxy group. Single bonds; $C_{2-4}$ alkylene groups (particularly $C_{2-3}$ alkylene groups such as an ethylene group and a propylene group); $C_{2-4}$ alkyleneoxy groups (particularly $C_{2-3}$ alkylene groups such as ethyleneoxy and propyleneoxy groups) are preferable, and single bonds are more are preferable. Note here that when $R^{01}$ is an alkyleneoxy group, an oxygen atom in the alkyleneoxy group is bonded to the ring $Z^{01}$. Furthermore, since $W^{01}$ and $W^{02}$ in the formula (b-01) are each independently a group represented by the following formula (b-02), $W^{01}$ and $W^{02}$ each include $R^{01}$ as a divalent group. $R^{01}$ included in $W^{01}$ and $R^{01}$ included in $W^{02}$ may be the same as or different from each other.

In the formula (b-02), examples of $R^{02}$ include monovalent hydrocarbon groups such as alkyl groups (for example, $C_{1-12}$ alkyl groups, preferably $C_{1-8}$ alkyl groups, more preferably $C_{1-6}$ alkyl groups such as methyl, ethyl, propyl, isopropyl, and butyl groups), cycloalkyl groups (for example, $C_{5-10}$ cycloalkyl groups, preferably $C_{5-8}$ cycloalkyl groups, more preferably $C_{5-6}$ cycloalkyl groups such as cyclohexyl groups), aryl groups (for example, $C_{6-14}$ aryl groups, preferably $C_{6-10}$ aryl groups, more preferably $C_{6-8}$ aryl groups such as phenyl, tolyl, xylyl, and naphthyl groups), and aralkyl groups (for example, $C_{6-10}$ aryl-$C_{1-4}$ alkyl groups such as benzyl and phenethyl groups); hydroxyl groups; groups represented by $—OR^{4A}$ [wherein, in the formula, $R^{4A}$ represents a monovalent hydrocarbon group (for example, the above-exemplified monovalent hydrocarbon group)] such as alkoxy groups (for example, $C_{1-12}$ alkoxy groups, preferably $C_{1-8}$ alkoxy groups, more preferably $C_{1-6}$ alkoxy groups, such as methoxy, ethoxy, propoxy, and butoxy groups), cycloalkoxy groups ($C_{5-10}$ cycloalkoxy groups such as cyclohexyloxy groups), aryloxy groups ($C_{6-10}$ aryloxy groups such as phenoxy group), and aralkyloxy groups (for example, $C_{6-10}$ aryl-$C_{1-4}$ alkyloxy groups such as benzyloxy groups); groups represented by —$SR^4B$ [wherein, in the formula, $R^{4B}$ represents a monovalent hydrocarbon group (for example, the above-exemplified monovalent hydrocarbon group)] such as alkylthio groups (for example, $C_{1-12}$ alkylthio groups, preferably $C_{1-8}$ alkylthio groups, more preferably $C_{1-6}$ alkylthio groups such as methylthio, ethylthio, propylthio, and butylthio groups), cycloalkylthio groups (for example, $C_{5-10}$ cycloalkylthio groups such as cyclohexylthio groups), aryl thio groups ($C_{6-10}$ aryl thio groups such as phenylthio groups), and aralkylthio groups (for example, $C_{6-10}$ aryl-$C_{1-4}$ alkylthio groups such as benzylthio groups); acyl groups ($C_{1-6}$ acyl groups such as acetyl groups); alkoxycarbonyl groups (for example, $C_{1-4}$ alkoxycarbonyl groups such as methoxycarbonyl group); halogen atoms (a fluorine atom, a chlorine atom, a bromine atom, an iodine atom, and the like); nitro groups; cyano groups; mercapto groups; carboxyl groups; amino groups; carbamoyl groups; groups represented by —$NHR^{4C}$ [wherein, in the formula, $R^{4C}$ represents a monovalent hydrocarbon group (for example, the above-exemplified monovalent hydrocarbon group)] such as alkylamino groups ($C_{1-12}$ alkylamino groups, preferably $C_{1-8}$ alkylamino groups, more preferably $C_{1-6}$ alkylamino groups such as methylamino groups, ethylamino groups, propylamino groups, and butylamino groups), cycloalkylamino groups (for example, $C_{5-12}$ cycloalkylamino groups such as cyclohexylamino groups), arylamino groups ($C_{6\_12}$ aryl amino groups such as phenylamino groups), and aralkyl amino groups (for example, $C_{6-10}$ aryl-$C_{1-4}$ alkylamino groups such as benzylamino groups); groups represented by —$N(R^{4D})_2$ [wherein each $R^{4D}$ independently represents a monovalent hydrocarbon group (for example, the above-exemplified monovalent hydrocarbon group)] such as dialkylamino groups (di($C_{1-12}$ alkyl)amino groups, preferably di($C_{1-8}$ alkyl)amino groups, more preferably di($C_{1-6}$ alkyl) amino groups such as dimethylamino groups, diethylamino groups, dipropylamino groups, and dibutylamino groups), dicycloalkylamino groups (di($C_{5-10}$ cycloalkyl)amino groups such as dicyclohexylamino groups), diaryl amino groups (di($C_{6-10}$ aryl)amino groups such as diphenylamino groups), and diaralkyl amino groups (for example, di($C_{6-10}$ aryl $C_{1-4}$ alkyl)amino groups such as dibenzylamino groups); (meth)acryloyloxy groups; sulfo groups; and the above monovalent hydrocarbon groups, groups represented by —$OR^{4A}$, groups represented by —$SR^{4B}$, acyl groups, alkoxycarbonyl groups, groups represented by —$NHR^{4C}$, or groups obtained by substituting at least a part of hydrogen atoms bonded to carbon atoms contained in groups represented by —$N(R^{4D})_2$ with the above monovalent hydrocarbon group, a hydroxyl group, a group represented by —$OR^{4A}$, a group represented by —$SR^{4B}$, an acyl group, an alkoxycarbonyl group, a halogen atom, a nitro group, a cyano group, a mercapto group, a carboxyl group, an amino group, a carbamoyl group, a group represented by —$NHR^{4C}$, a group represented by —$N(R^{4D})_2$, a (meth) acryloyloxy group, a mesyloxy group, or a sulfo group [for example, alkoxyaryl groups (for example, $C_{1-4}$ alkoxy $C_{6\_10}$ aryl groups such as methoxyphenyl groups), alkoxycarbonylaryl groups (for example, $C_{1-4}$ alkoxycarbonyl $C_{6\_10}$ aryl groups such as methoxycarbonylphenyl groups and ethoxycarbonylphenyl groups)].

Among them, typical examples of $R^{02}$ include monovalent hydrocarbon groups, groups represented by —$OR^{4A}$, groups represented by —$SR^{4B}$, acyl groups, alkoxycarbonyl groups, halogen atoms, nitro group, cyano groups, groups represented by —$NHR^{4C}$, and groups represented by —$N(R^{4D})_2$.

Examples of preferred $R^{02}$ include monovalent hydrocarbon groups [for example, alkyl groups (for example, $C_{1-6}$ alkyl groups), cycloalkyl groups (for example, $C_{5-8}$ cycloalkyl groups), aryl groups (for example, $C_{6-10}$ aryl groups), and aralkyl groups (for example, $C_{6-8}$ aryl-$C_{1-2}$ alkyl groups)], and alkoxy groups (for example, $C_{1-4}$ alkoxy groups). In particular, preferably, $R^{02}$ represent a monovalent hydrocarbon group such as an alkyl group [for example, a $C_{1-4}$ alkyl group (particularly a methyl group)], an aryl group [for example, a $C_{6-10}$ aryl group (particularly a phenyl group)] (particularly an alkyl group).

Note here that when M is an integer of 2 or more, a plurality of $R^{02}$s may be different from or the same as each other. $R^{02}$ included in $W^{01}$ may be the same as or different from $R^{02}$ included in $W^{02}$.

In the formula (b-02), the number of $R^{02}$s, that is, M, may be selected according to the type of the ring $Z^{01}$ and may be, for example, 0 or more and 4 or less, preferably 0 or more and 3 or less, more preferably or more and 2 or less. Note here that M in $W^{01}$ may be the same as or different from M in $W^{02}$.

In the formula (b-02), $R^{03}$ represents a hydrogen atom, a vinyl group, a thiiran-2-ylmethyl group, a glycidyl group, or a (meta)acryloyl group. Note here that both $W^{01}$ and $W^{02}$ do not have a hydrogen atom as $R^{03}$. All of a vinyloxy group, a thiirane-2-ylmethyl group, and a glycidyl group are cation polymerizable functional group. Therefore, a compound represented by the formula (b-01), including a vinyl group, a thiirane-2-ylmethyl group, or a glycidyl group as $R^{03}$ is a cation polymerizable compound. On the other hand, a compound represented by the formula (b-01), including a (meta) acryloyl group as $R^{03}$ is a radical polymerizable compound.

$R^{03}$ in $W^{01}$ and $R^{03}$ in $W^{02}$ may be the same as or different from each other as long as both are not a hydrogen atom. It is preferable that both of $R^{03}$ in $W^{01}$ and $R^{03}$ in $W^{02}$ are a vinyl group, a thiirane-2-ylmethyl group, or a glycidyl group, and more preferable that both are the same group selected from the group consisting of a vinyl group, a thiirane-2-ylmethyl group, and a glycidyl group. Furthermore, it is also preferable that both of $R^{03}$ in $W^{01}$ and $R^{03}$ in $W^{02}$ are a (meta)acryloyl group.

$R^{03}$ is preferably a vinyl group, a glycidyl group, or a (meta)acryloyl group, because of easiness in synthesis or availability of the compound represented by the formula (b-01). Note here that because curable metal oxide fine particle dispersion liquid can be prepared while types of components is reduced, the compound represented by the formula (b-01) preferably has only a group selected from a vinyl group, a thiirane-2-ylmethyl group, and a glycidyl group as the reactive group, or has only a (meta)acryloyl group as the reactive group.

In the formula (b-01), examples of the ring $Y^{01}$ and the ring $Y^{02}$ include benzene rings and fused polycyclic aromatic hydrocarbon rings [for example, fused di- to tetracyclic aromatic hydrocarbon rings such as fused dicyclic hydrocarbon rings (for example, $C_{8-20}$ fused dicyclic hydrocarbon rings, preferably $C_{10-16}$ fused dicyclic hydrocarbon rings such as naphthalene rings, and fused tricyclic aromatic hydrocarbon rings (for example, anthracene rings and phenanthrene rings)]. The ring $Y^{01}$ and the ring $Y^{02}$ are preferably a benzene ring or a naphthalene ring, and more preferably a benzene ring. Note here that the ring $Y^{01}$ and the ring $Y^{02}$ may be the same as or different from each other. For example, one of the rings may represent a benzene ring with the other ring representing a naphthalene ring or the like.

In the formula (b-01), $R^{00}$ represents a single bond, an optionally substituted methylene group, an ethylene group that is optionally substituted and may contain a hetero atom between two carbon atoms, a group represented by —O—, a group represented by —NH—, or a group represented by —S—, and is typically a single bond. Here, examples of substituents include a cyano group, halogen atoms (such as fluorine, chlorine, and bromine atoms), monovalent hydrocarbon groups [for example, alkyl groups ($C_{1-6}$ alkyl groups such as methyl, ethyl, propyl, isopropyl, butyl, and tert-butyl groups), and aryl groups ($C_{6\_10}$ aryl groups such as phenyl groups)]. Examples of hetero atoms include an oxygen atom, a nitrogen atom, a sulfur atom, or a silicon atom.

In the formula (b-01), general examples of $R^{3A}$ and $R^{3B}$ include nonreactive substituents, for example, cyano groups, halogen atoms (for example, fluorine, chlorine, and bromine atoms), monovalent hydrocarbon groups [for example, alkyl groups and aryl groups ($C_{6-10}$ aryl groups such as phenyl groups)]. A cyano group or an alkyl group is preferred, and an alkyl group is particularly preferred. Examples of alkyl groups include $C_{1-6}$ alkyl groups (for example, $C_{1-4}$ alkyl groups, particularly methyl groups) such as methyl, ethyl, propyl, isopropyl, butyl, and tert-butyl groups. When N1 is an integer of 2 or more, $R^{3A}$s may be the same as or different from each other. When N2 is an integer of 2 or more, $R^{3B}$s may be the same as or different from each other. Further, $R^{3A}$ and $R^{3B}$ may be the same as or different from each other. The position of bonding of $R^{3A}$ and $R^{3B}$ to the ring $Y^{01}$ and the ring $Y^{02}$ (position of substitution) is not particularly limited. The number of substituents N1 and N2 is preferably 0 (zero) or 1, particularly preferably 0 (zero). Note here that N1 and N2 may be the same as or different from each other.

The compounds represented by the formula (b-01) maintain excellent optical properties and thermal properties and, at the same time, have high reactivity by virtue of the presence of cation polymerizable functional group. In particular, when the ring $Y^{01}$ and the ring $Y^{02}$ represent a benzene ring with $R^{00}$ representing a single bond, compounds represented by the formula (b-01) have a fluorene skeleton and thus possess further excellent optical properties and thermal properties. Further, the compounds represented by the formula (b-01) can provide cured products having a high hardness and are preferred as a base material component (B) in the metal oxide fine particle dispersion liquid.

Among the above compounds represented by the formula (b-01), particularly preferable specific examples include epoxy group-containing fluorene compounds such as 9,9-bis[4-[2-(glycidyloxy)ethoxy]phenyl]-9H-fluorene, 9,9-bis[4-[2-(glycidyloxy)ethyl]phenyl]-9H-fluorene, 9,9-bis[4-(glycidyloxy)-3-methylphenyl]-9H-fluorene, 9,9-bis[4-(glycidyloxy)-3,5-dimethylphenyl]-9H-fluorene, 9,9-bis(6-glycidyloxy naphthalene-1-yl)-9H-fluorene, and 9,9-bis(5-glycidyloxy naphthalene-2-yl)-9H-fluorene; as well as compounds represented by the following formulas.

[Chem. 12]

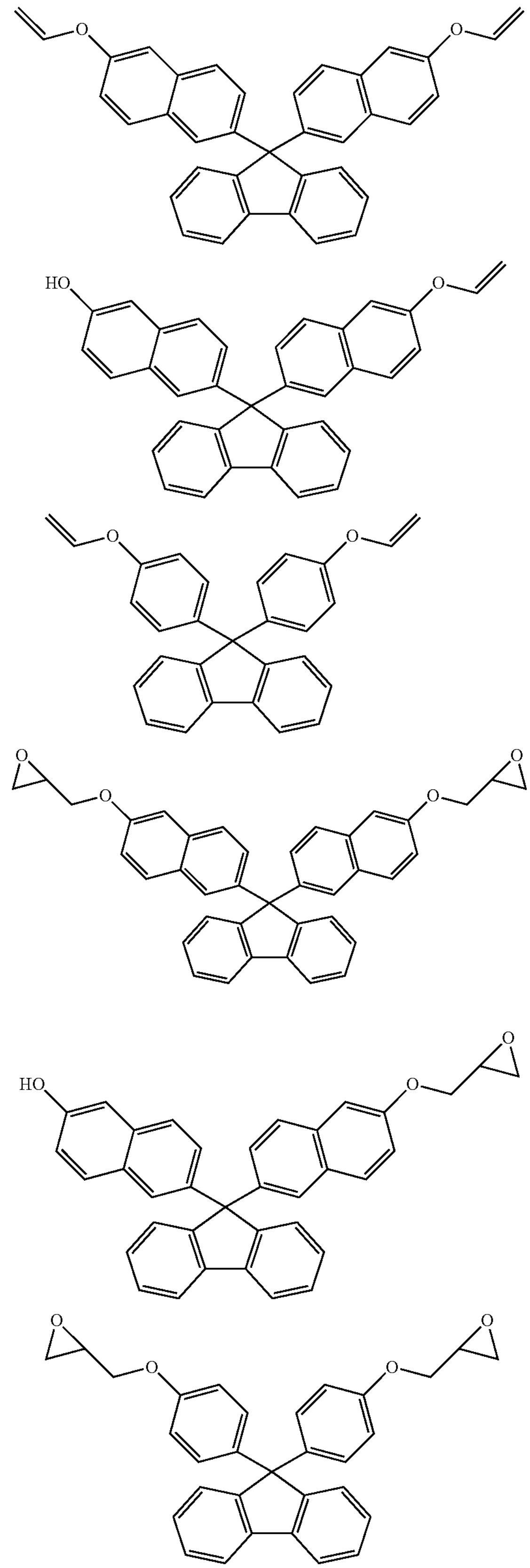

-continued
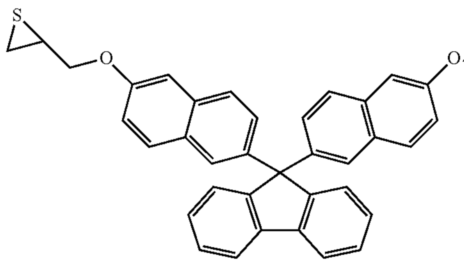
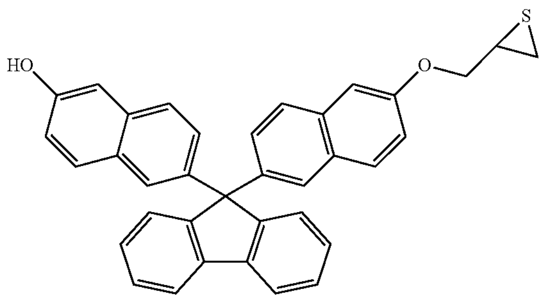
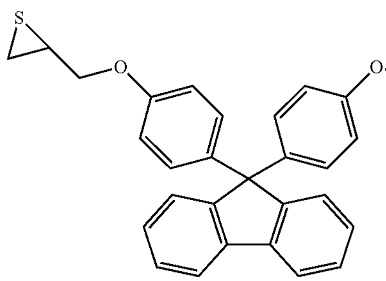
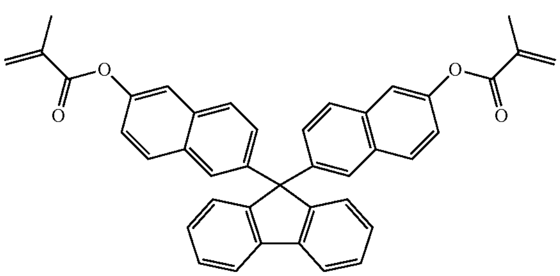
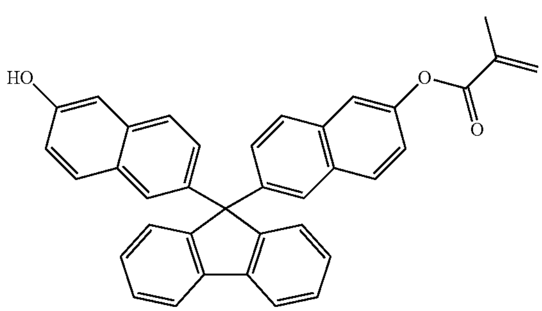
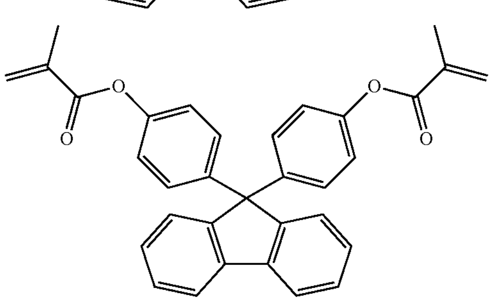
-continued
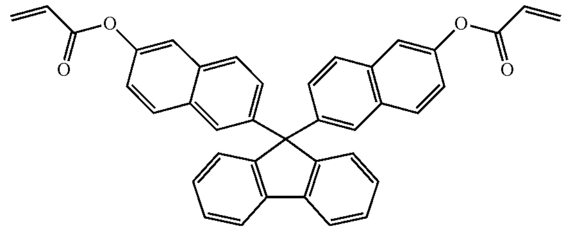
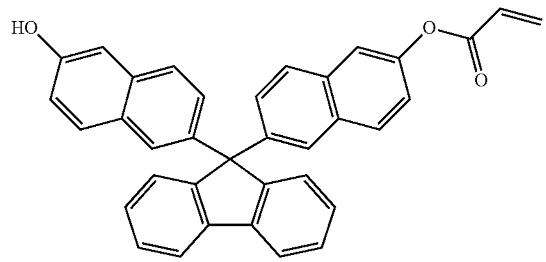
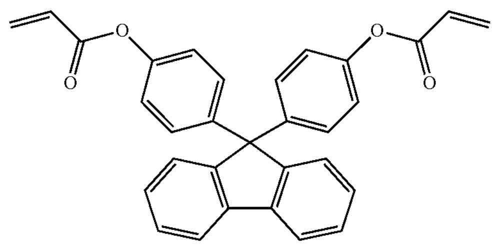
[Chem. 13]
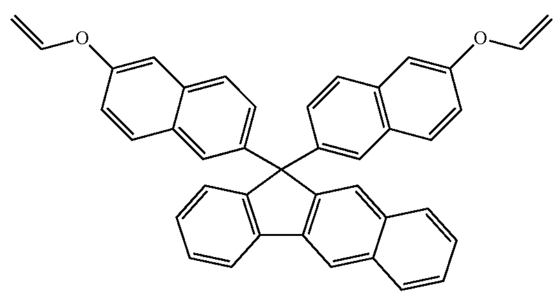
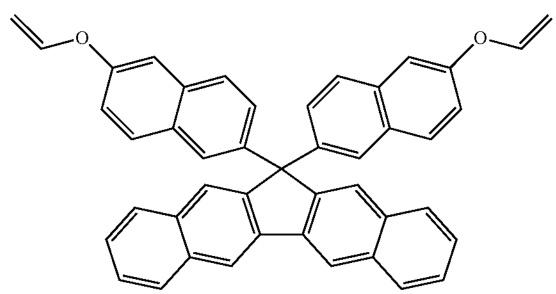
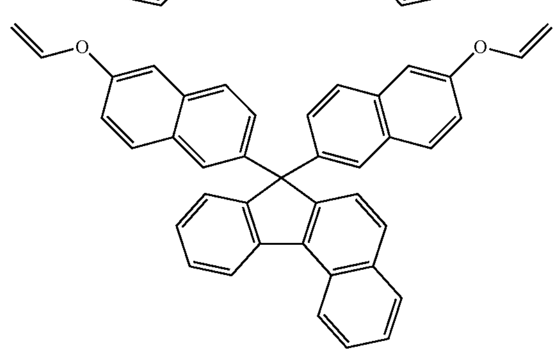

-continued
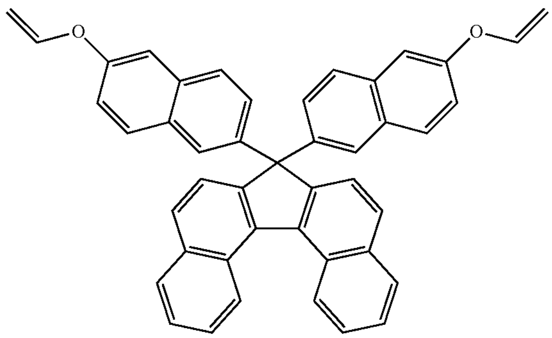
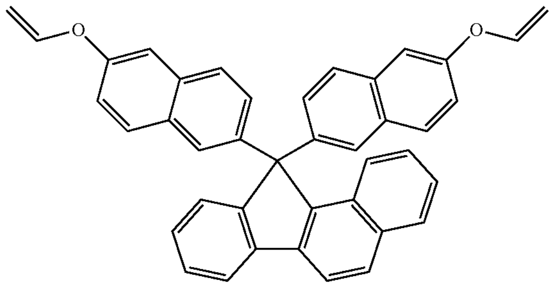
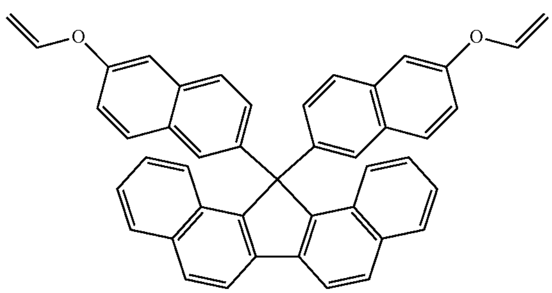
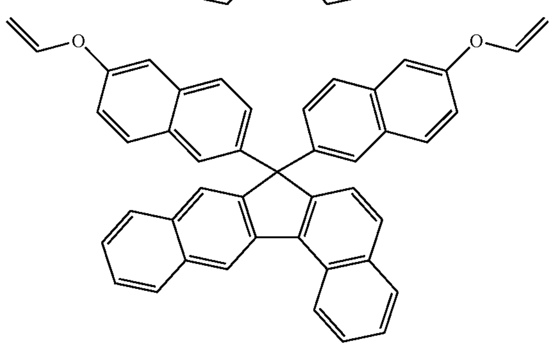
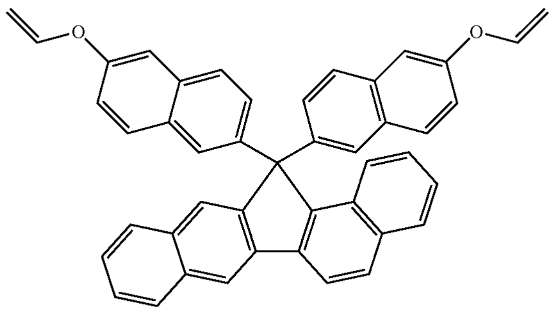
-continued
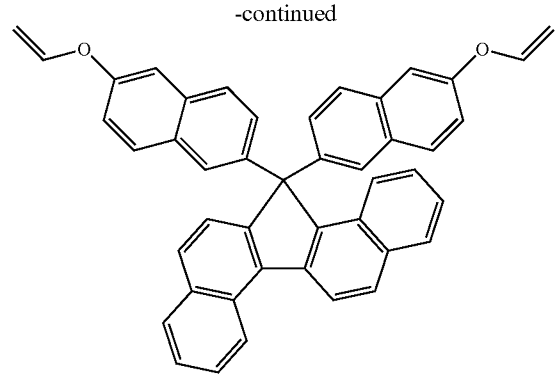
[Chem. 14]
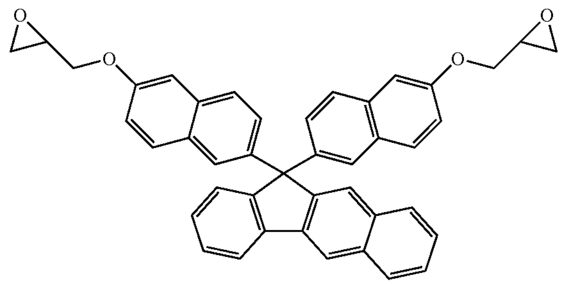
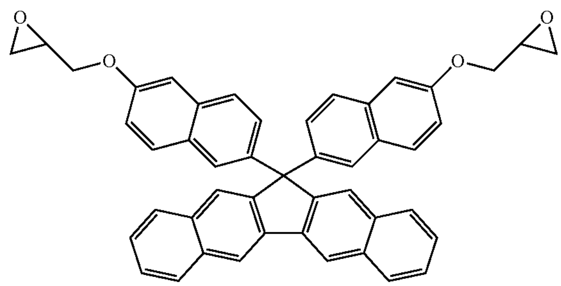
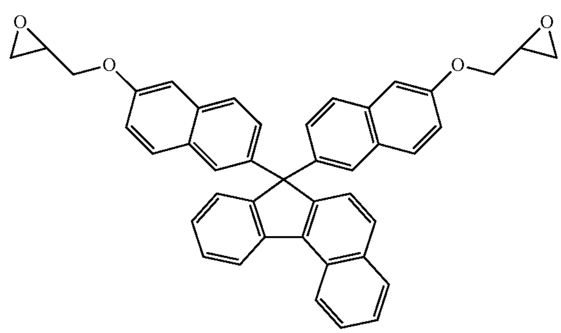
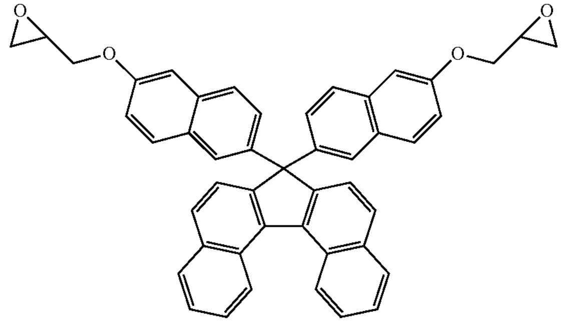

-continued
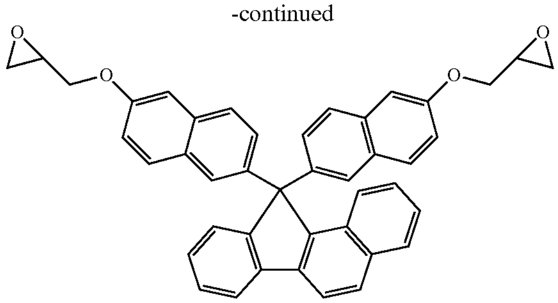
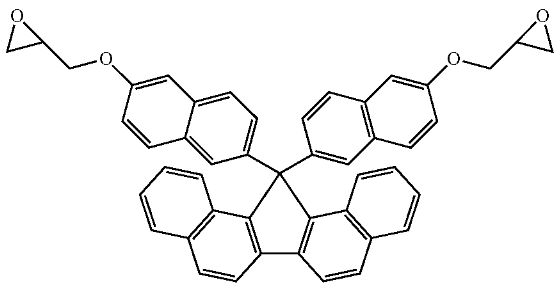
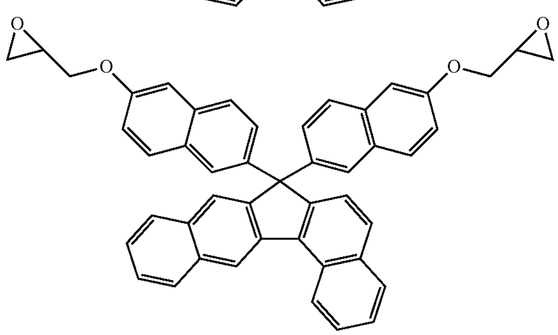
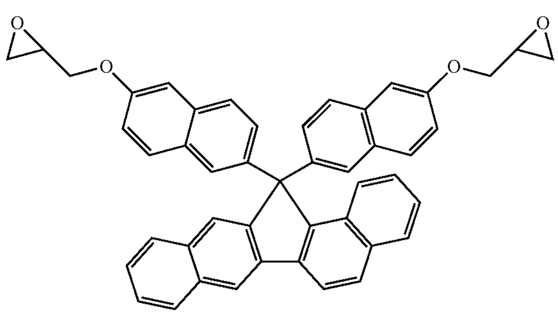
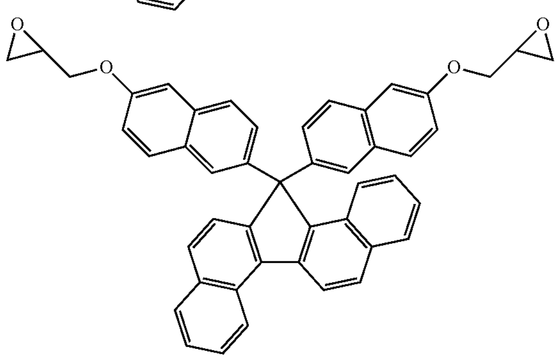
-continued
[Chem. 15]
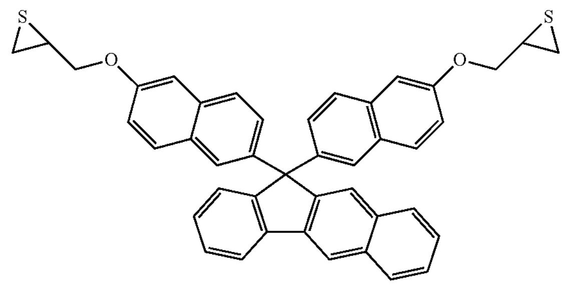
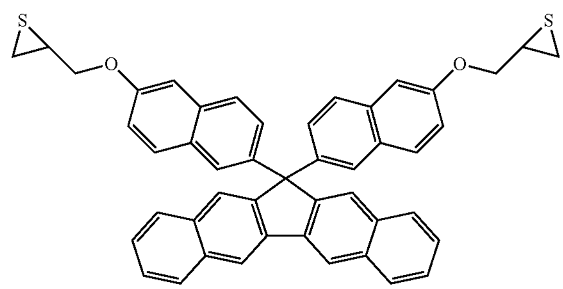
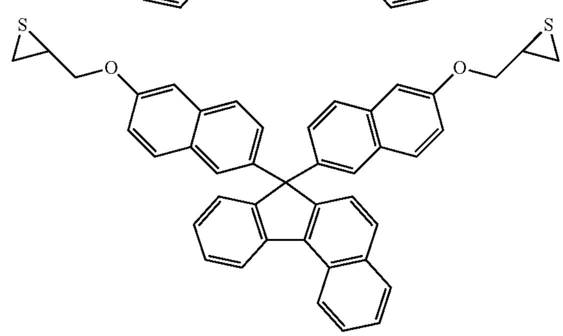
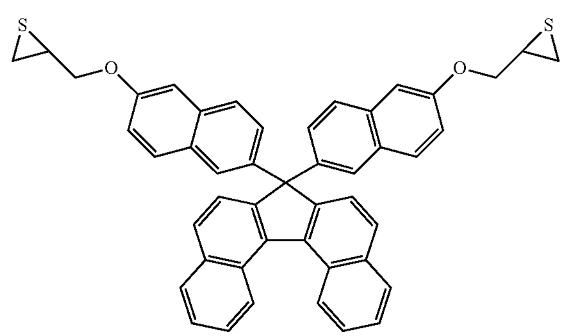
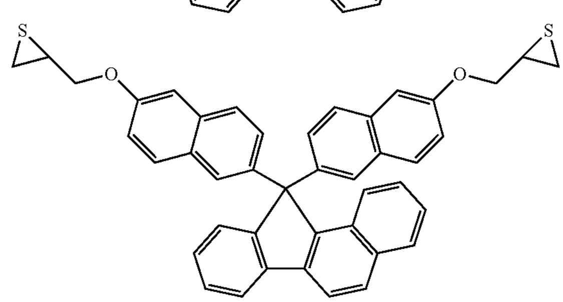

-continued
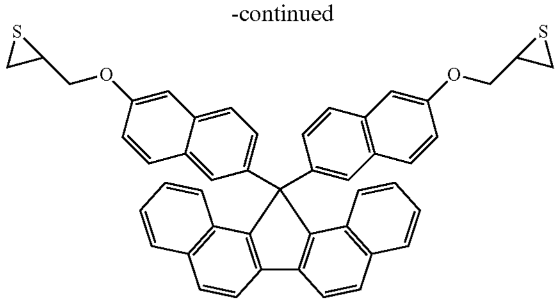
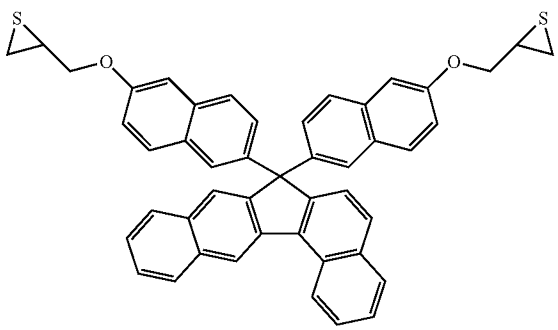
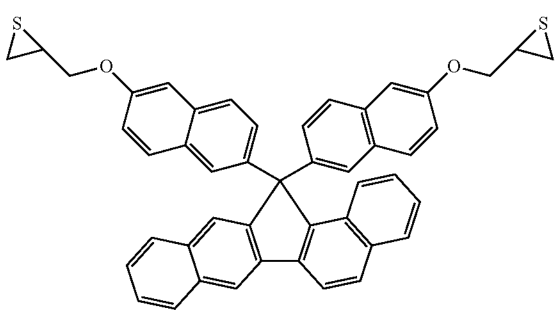
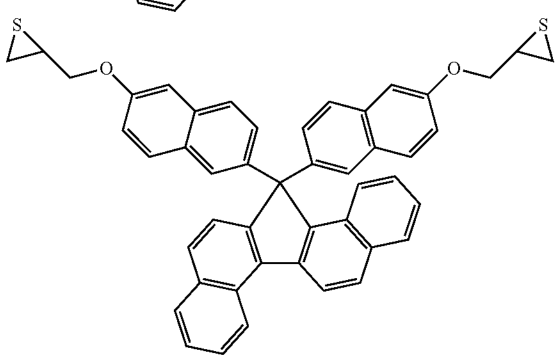
[Chem. 16]
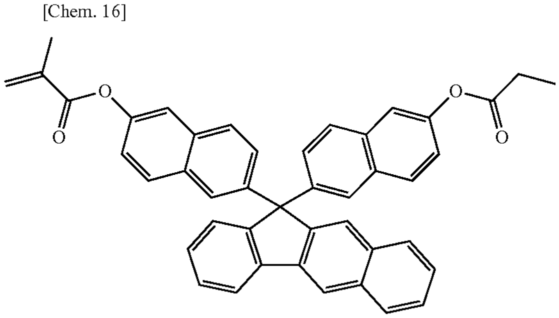
-continued
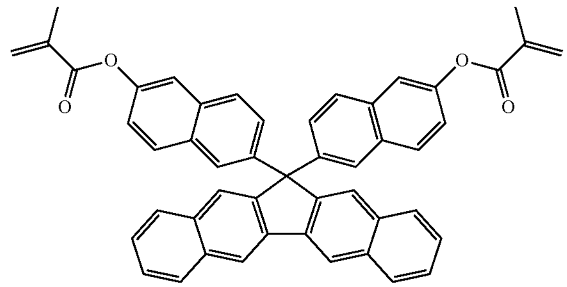
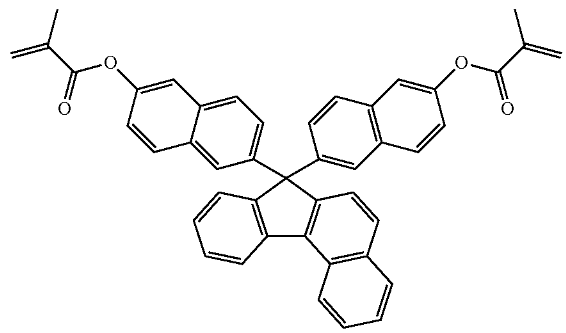
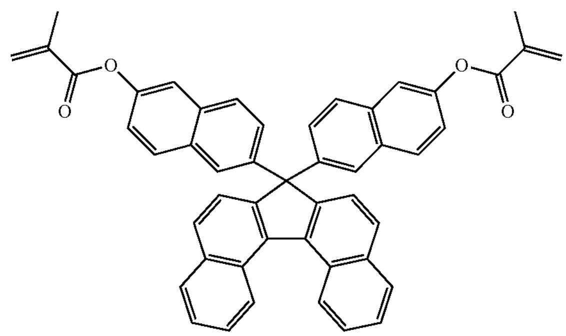
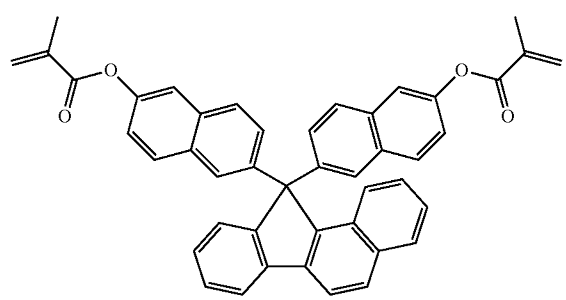
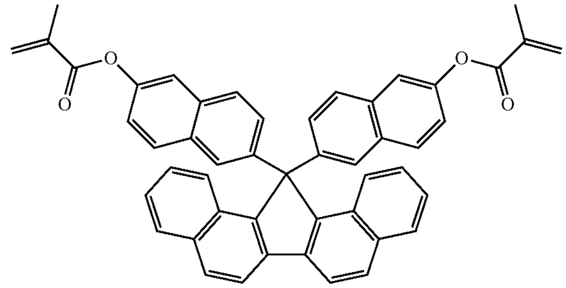

-continued
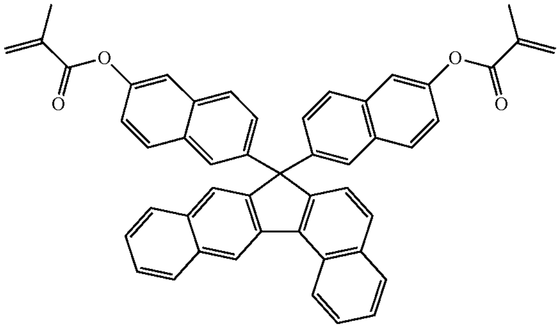
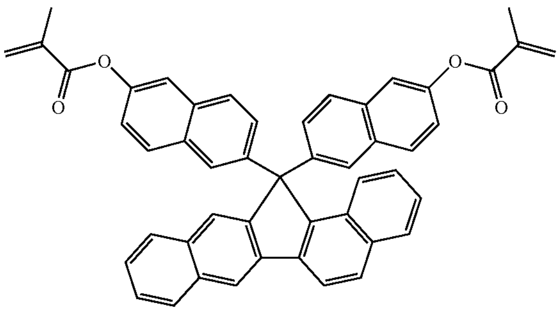
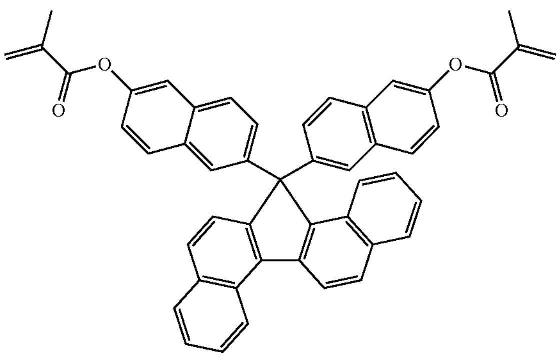
[Chem. 17]
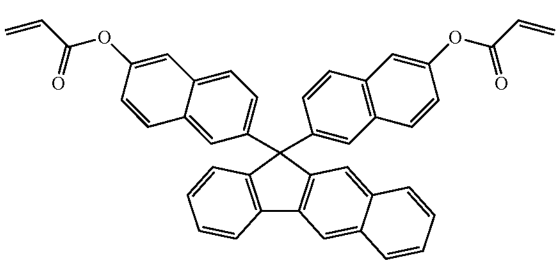
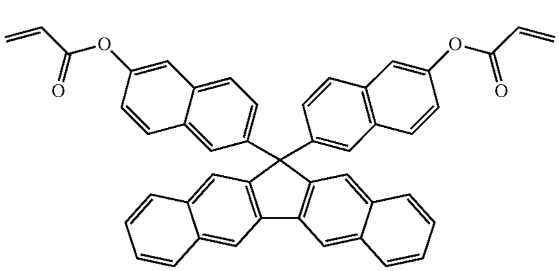
-continued
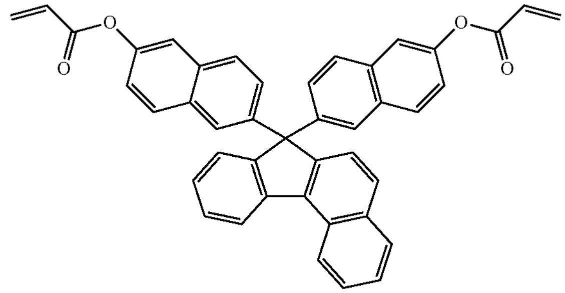
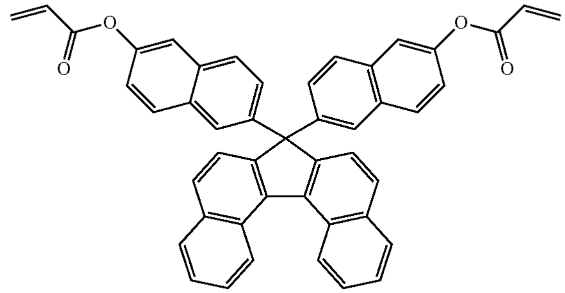
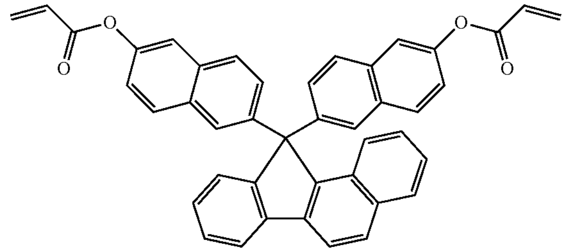
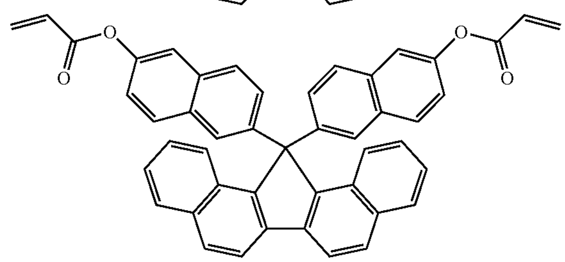
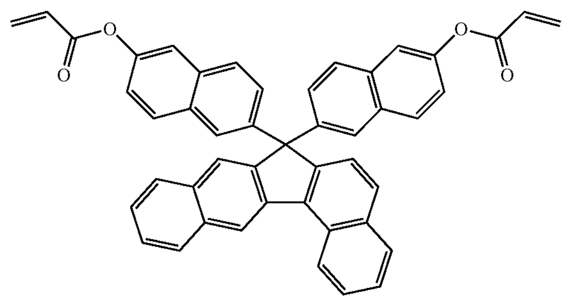
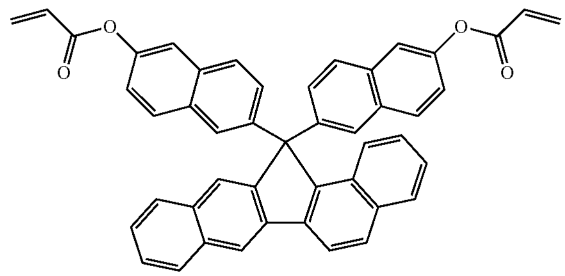

-continued
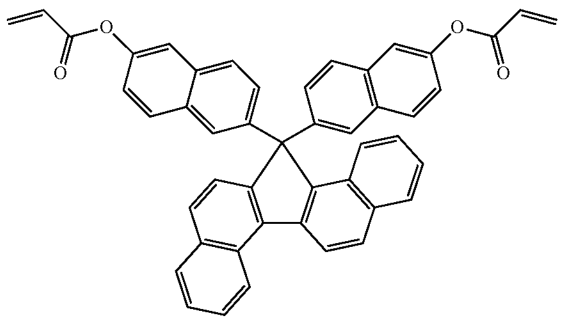
[Chem. 18]
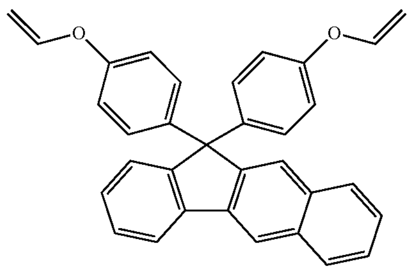
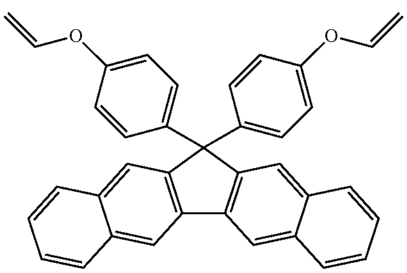
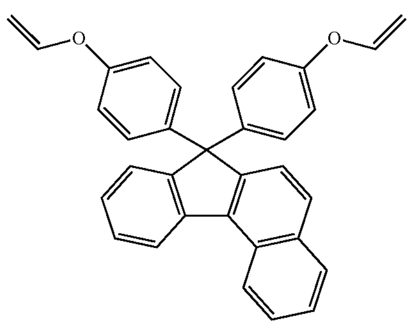
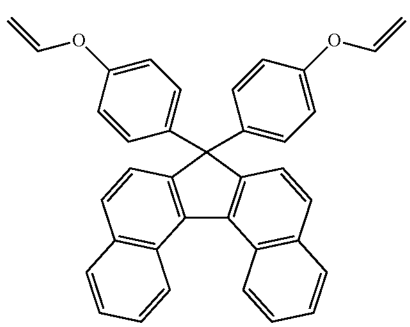
-continued
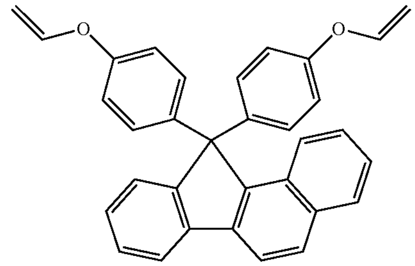
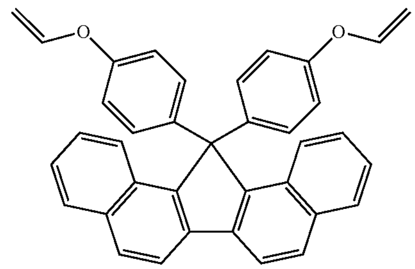
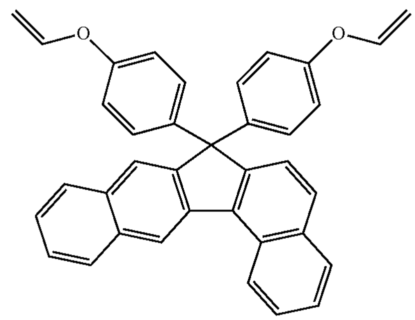
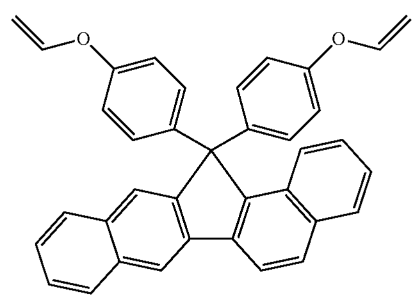
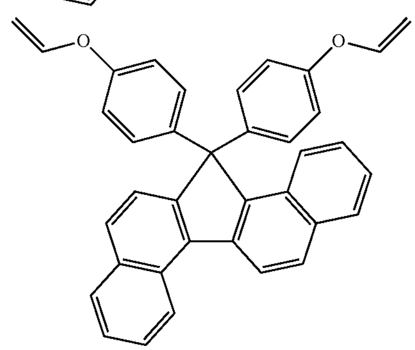

-continued
[Chem. 19]
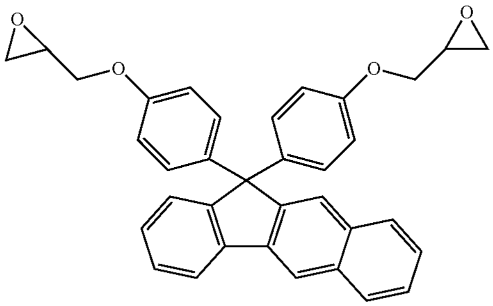
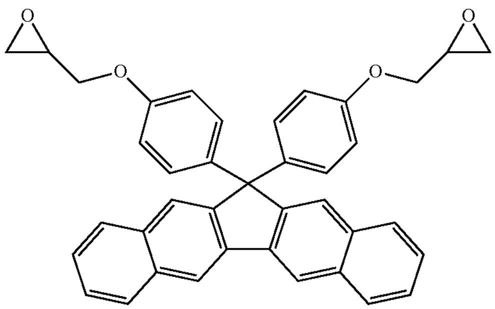
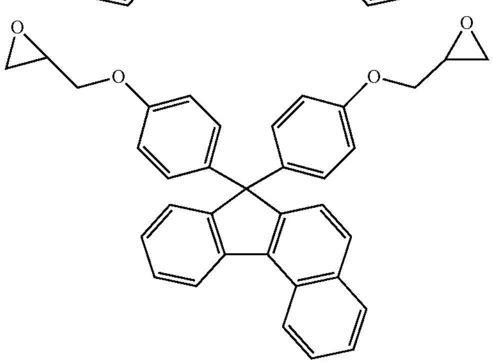
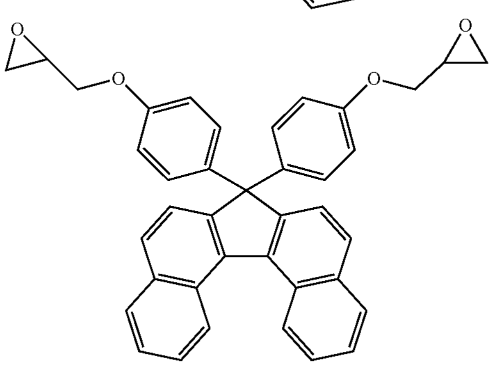
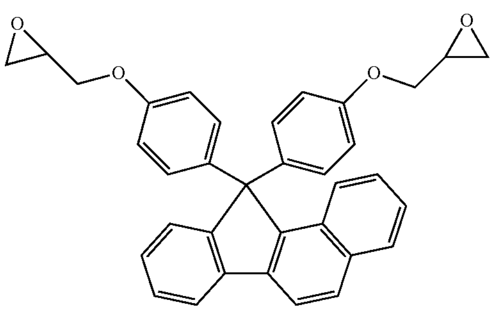
-continued
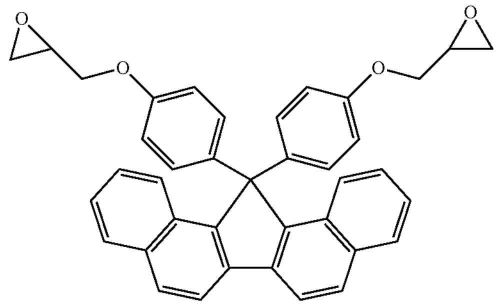
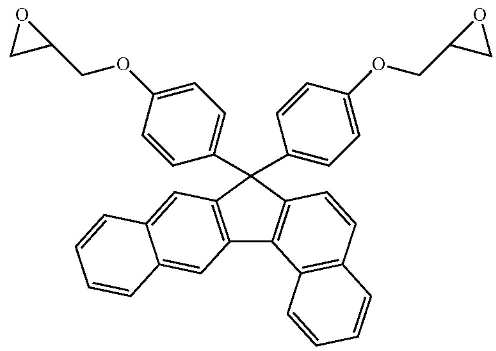
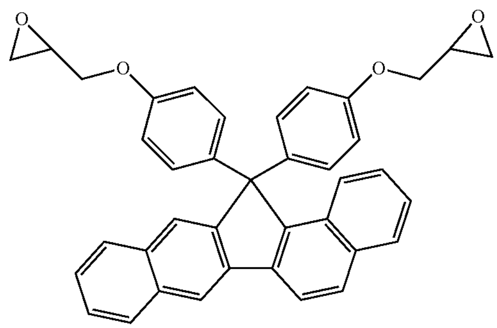
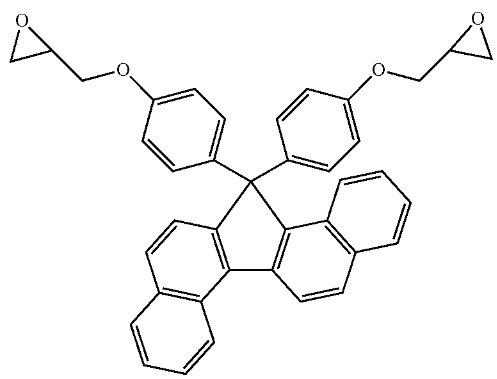
[Chem. 20]
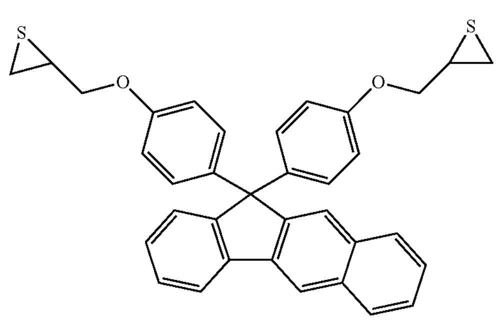

-continued
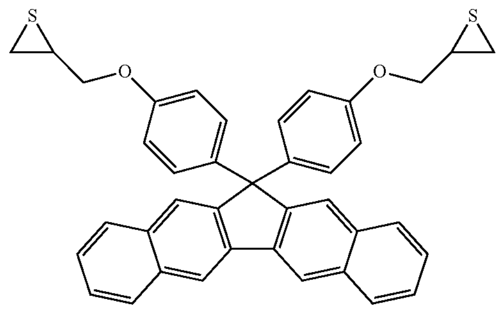
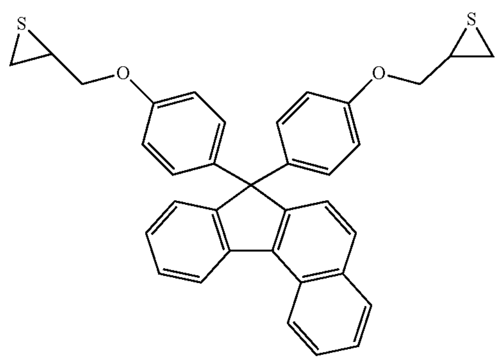
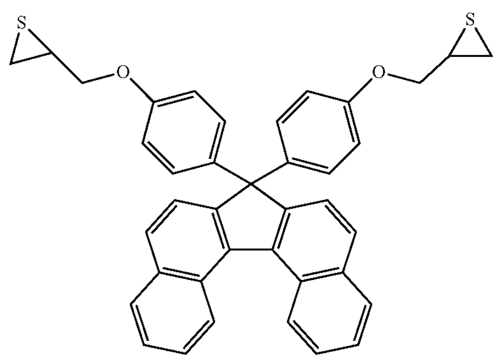
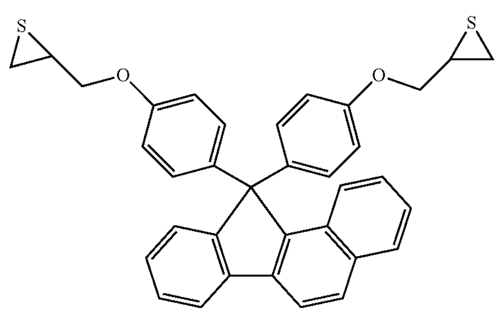
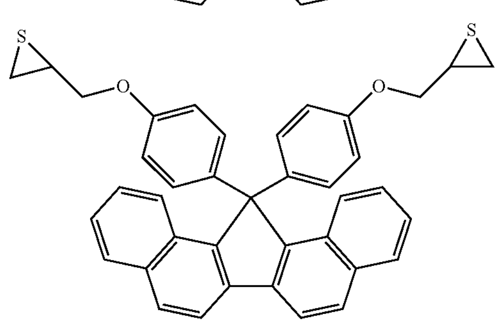
-continued
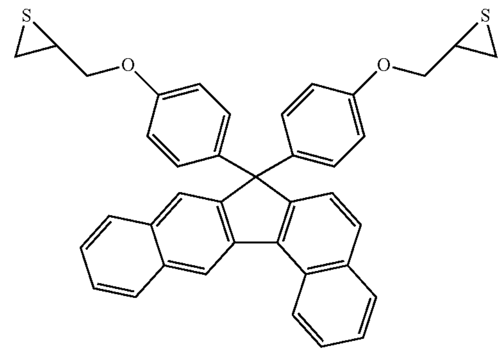
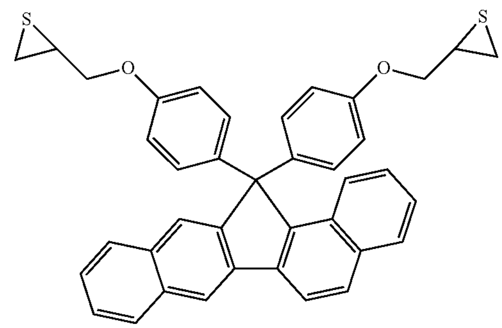
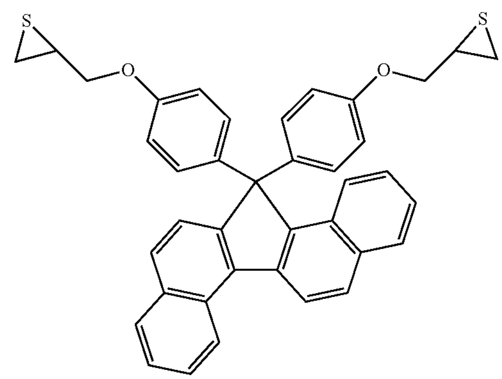
[Chem. 21]
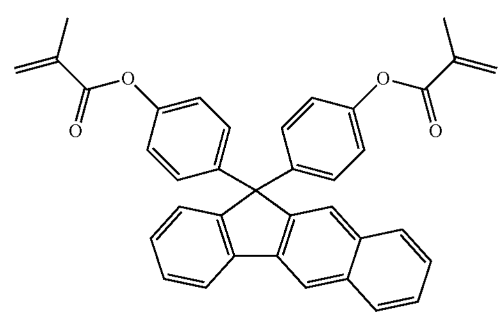
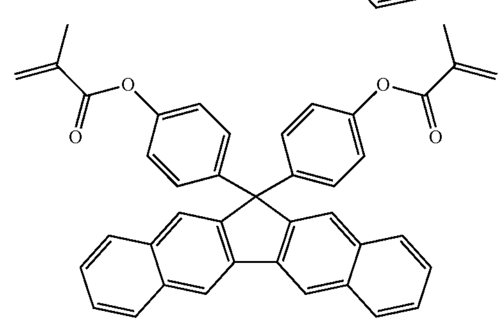

-continued
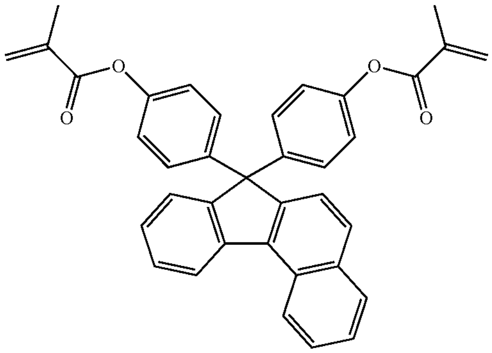
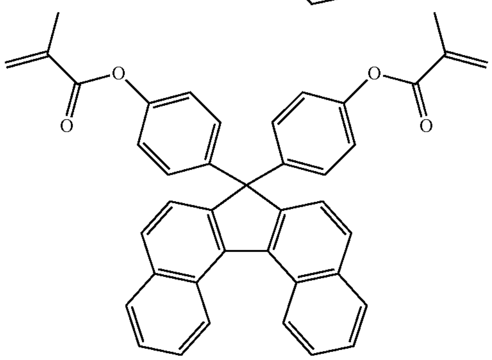
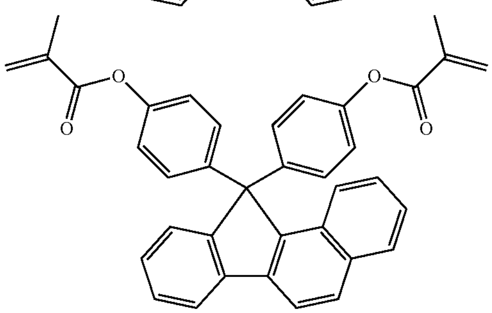
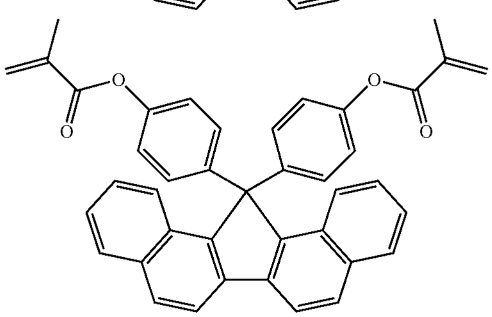
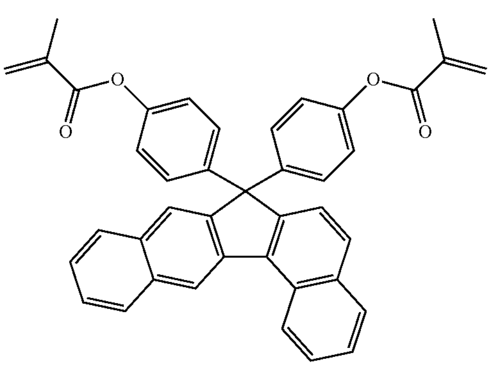
-continued
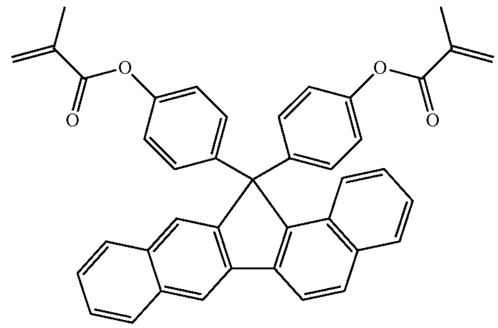
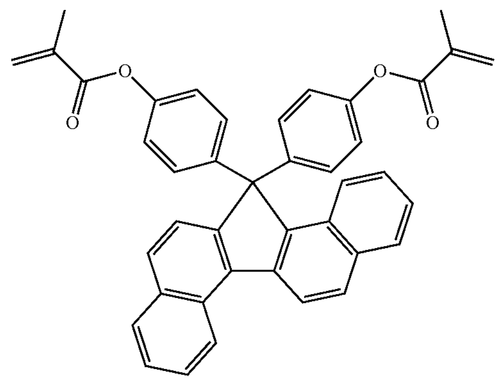
[Chem. 22]
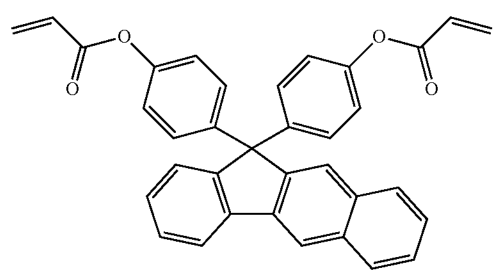
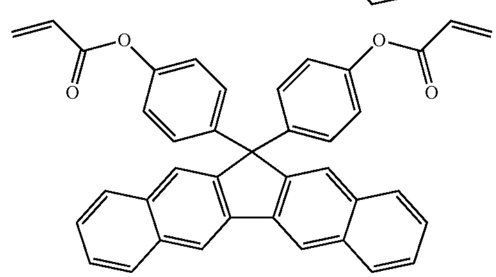
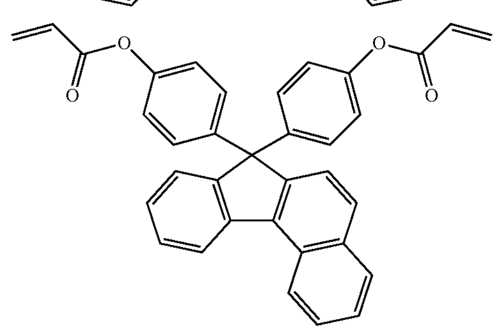

-continued
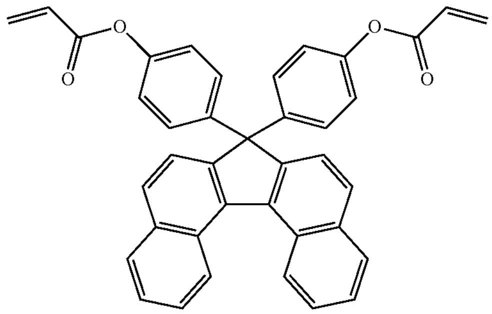
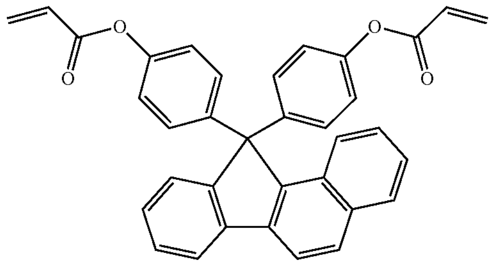
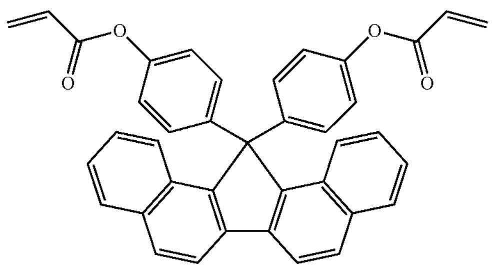
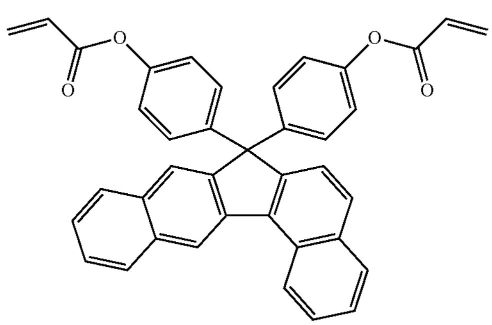
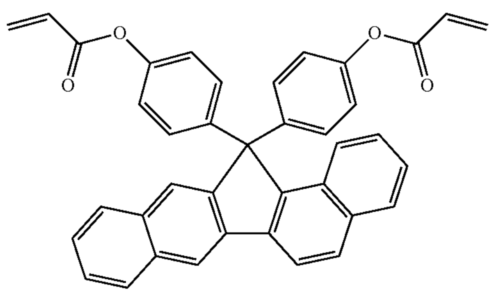
-continued
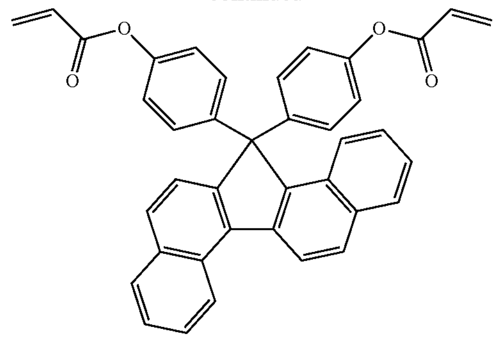
[Chem. 23]
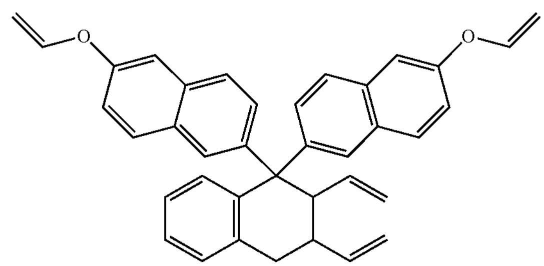
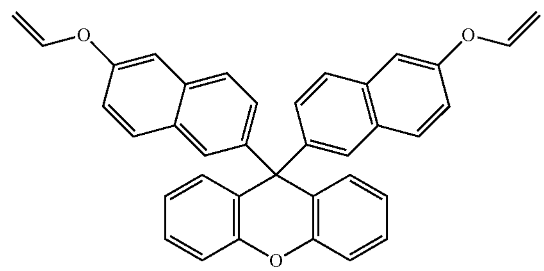
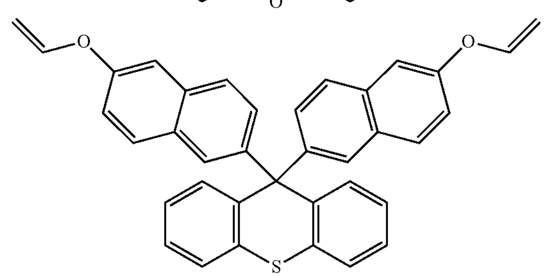
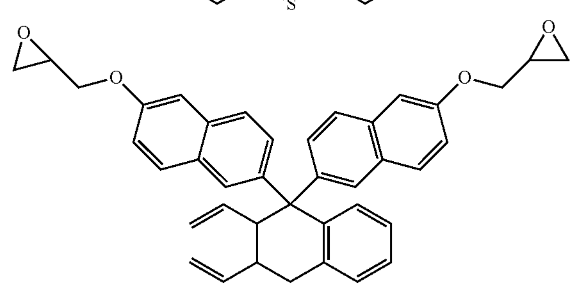
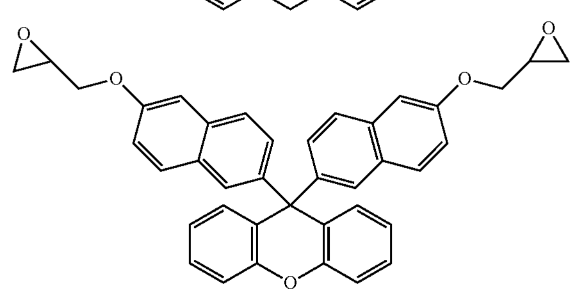

-continued
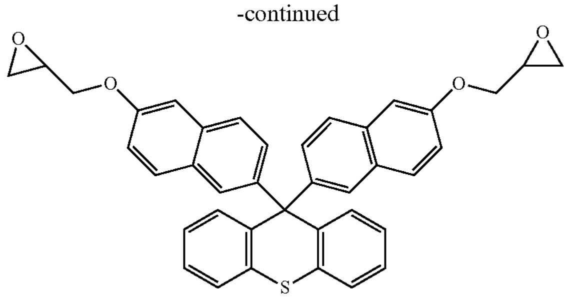
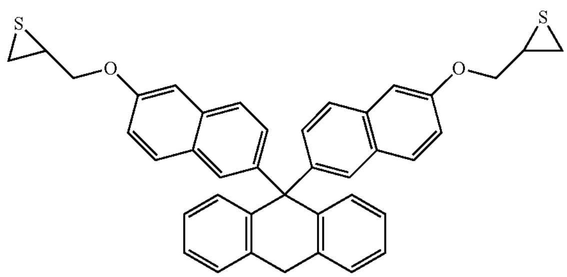
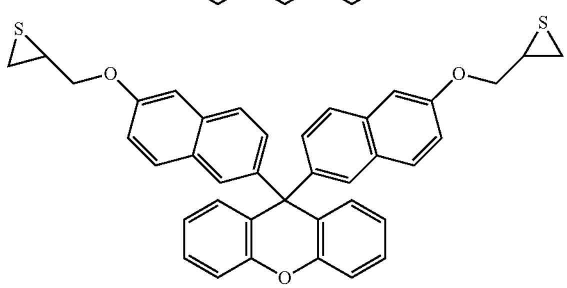
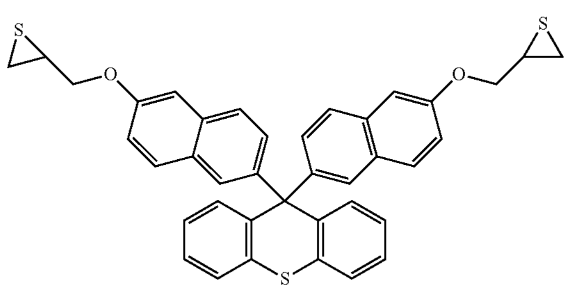
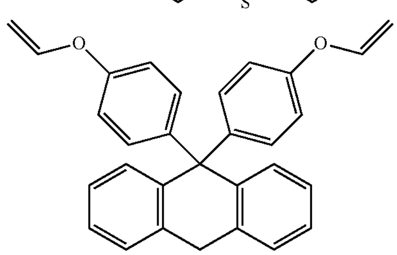
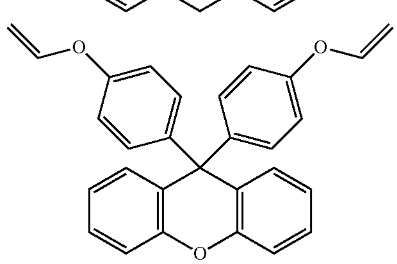
-continued
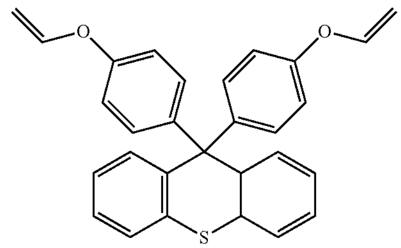
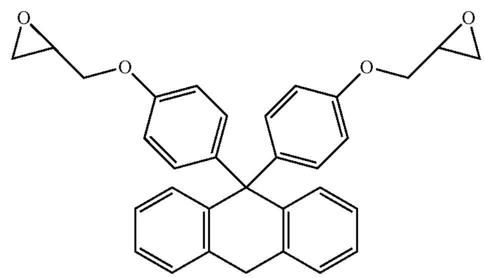
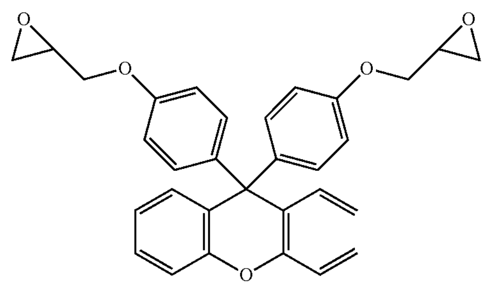
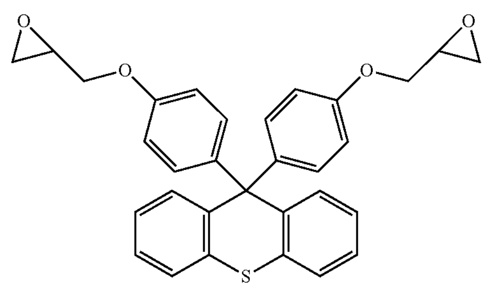
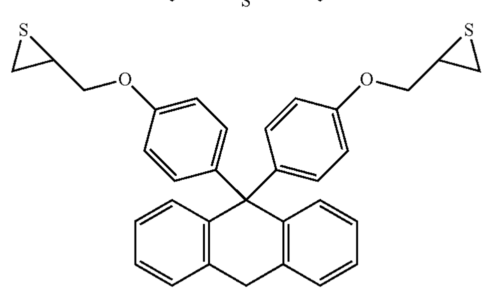
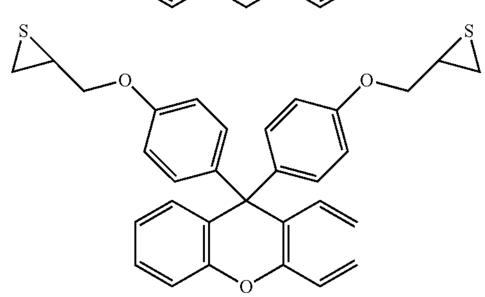

-continued
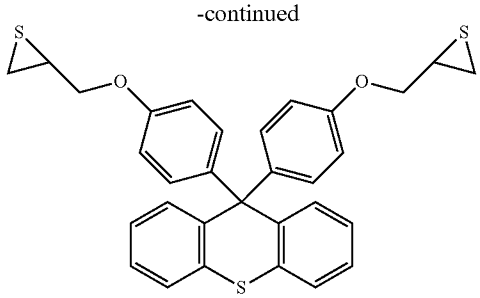
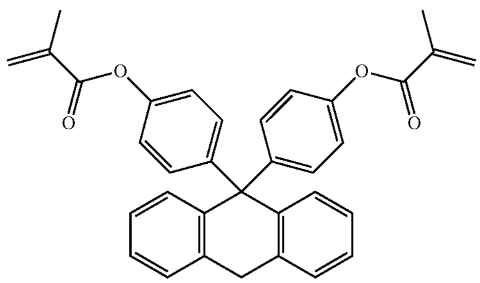
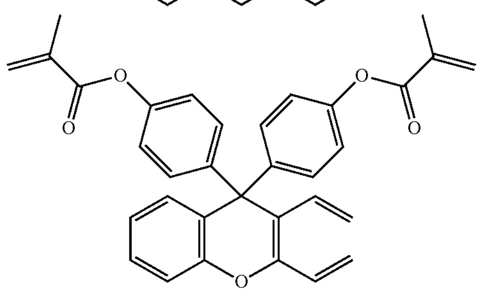
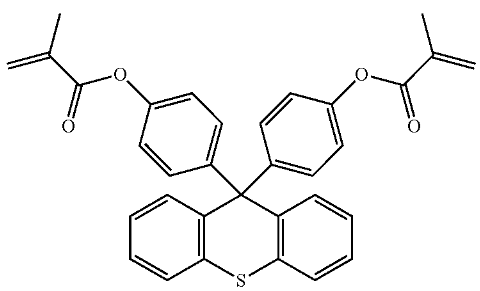
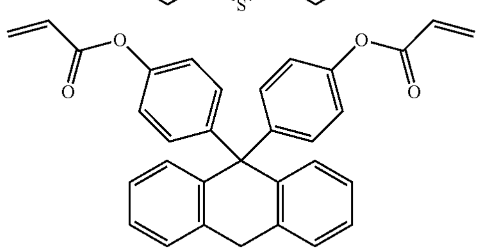
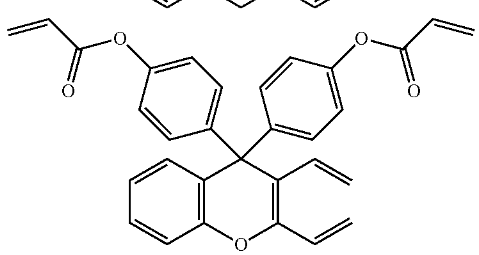
-continued
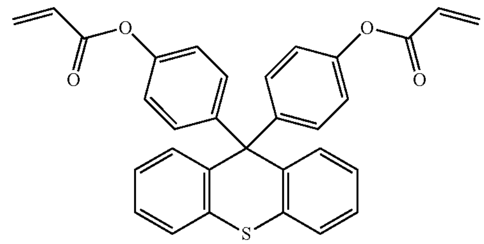
Among the above-described compounds represented by the formula (b-01), the following compounds are particularly preferable.
[Chem. 24]
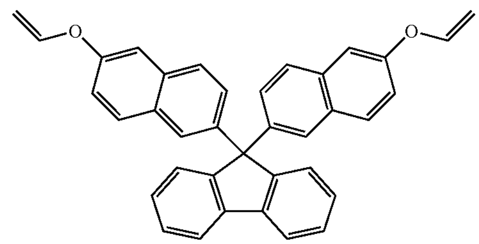
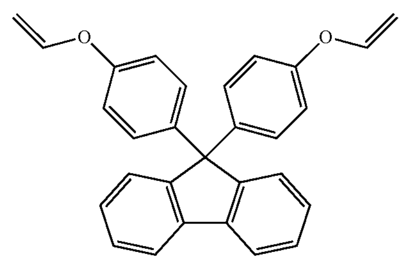
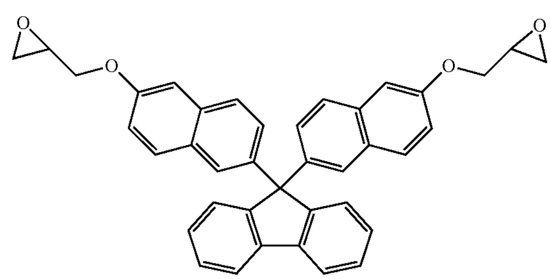
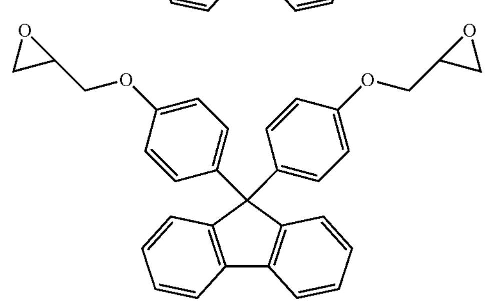

-continued

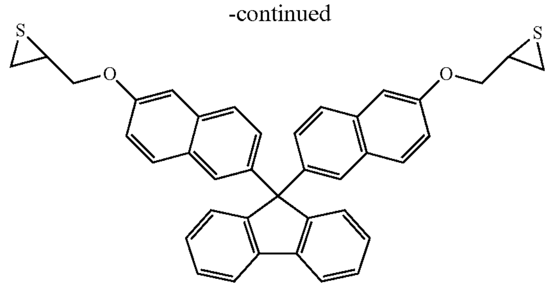

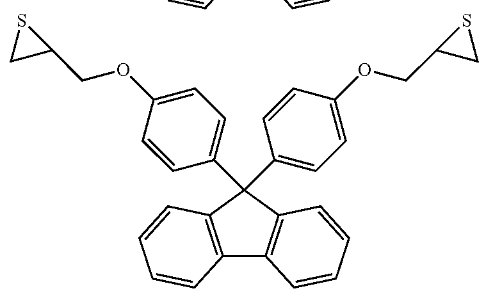

[Resin Material]

Examples of resin material as base material component (B) include polyacetal resin, polyamide resin, polycarbonate resin, polyester resin (polybutylene terephthalate, polyethylene terephthalate, polyethylene naphthalate, polyarylate, etc.), FR-AS resin, FR-ABS resin, AS resin, ABS resin, polyphenylene oxide resin, polyphenylene sulfide resin, polysulfone resin, polyether sulfone resin, polyetheretherketone resin, fluorinated resins, polyimide resin, polyamideimide resin, polyamidebismaleimide resin, polyetherimide resin, polybenzoxazole resin, polybenzothiazole resin, polybenzimidazole resin, silicone resin, BT resin, polymethylpentene, ultra high molecular weight polyethylene, FR-polypropylene, (meth)acrylic resin (for example, polymethylmethacrylate), polystyrene, and the like.

When a resin material is used as the base material component (B), a metal oxide fine particle dispersion liquid in which a predetermined amount of the metal oxide (A) including surface-modified metal oxide fine particles with respect to the resin material is formed into a film and the like by the conventionally known method, and thereby articles in various forms such as a film are produced. As the form of articles produced using metal oxide fine particle dispersion liquid, a film is preferable. Note here that the metal oxide fine particle dispersion liquid may be a melt or a solution.

Examples of the film formation methods include melting processing methods such as a T-die method (a casting method), an inflation method, and a pressing method, a casting method using a solution, an inkjet method, a spin coating method, and the like. In the casting method, the inkjet method, and the spin coating method, a solution including a resin material and a metal oxide (A) are applied or cast on the substrate to form a film, followed by removing the solvent from the film by heating or the like, as necessary to form a metal oxide-containing film. Thus, the metal oxide-containing film obtained by using the metal oxide fine particle dispersion liquid may be subjected to extension processing such as uniaxially stretching or biaxially stretching stretched as necessary.

When the above-mentioned resin material is used as the base material component (B), the metal oxide fine particle dispersion liquid may include additives such as an antioxidant, an ultraviolet absorber, a flame retardant, a mold release agent, a plasticizer, a filler other than the metal oxide (A), and reforming agents, as necessary. Furthermore, when the metal oxide fine particle dispersion liquid is a composition for casting, the metal oxide fine particle dispersion liquid may include a solvent. Types of the solvent are appropriately selected depending on the types of resin materials.

[Thermosetting Material]

As the thermosetting material, precursor materials of conventionally widely used various thermosetting resins are used. Specific examples of the thermosetting resin include a phenol resin, an epoxy resin, an oxetane resin, a melamine resin, a urea resin, an unsaturated polyester resin, an alkyd resin, a polyurethane resin, a polyimide resin, a polybenzoxazole resin, a polybenzimidazole resin, or the like.

Furthermore, resins which cause an aromatic ring formation reaction in molecules and/or a cross-linking reaction between molecules are also suitably used as the thermosetting material. Hereinafter, resins which cause an aromatic ring formation reaction in molecules and/or a cross-linking reaction between molecules by heating may also be called a precursor resin.

Among them, because a metal oxide-containing film having excellent heat resistance, chemical resistance, mechanical property, and the like, can be easily formed, an epoxy resin precursor and a precursor resin are particularly preferable. Hereinafter, as to the thermosetting material, a particularly suitable precursor material as the base material component (B) will be described.

(Epoxy Resin Precursor)

As an epoxy resin precursor, conventionally widely known various epoxy compounds can be used. In the metal oxide fine particle dispersion liquid, when a curing agent, a curing accelerator, and an epoxy resin precursor are used in combination, as necessary, the metal oxide fine particle dispersion liquid can be obtained as a thermosetting composition. Note here that in the metal oxide fine particle dispersion liquid, when a photosensitive curing agent, and an epoxy resin precursor are used in combination, photosensitive composition capable of thermally curing a metal oxide fine particle dispersion liquid can be formed. The molecular weight of an epoxy compound as the epoxy resin precursor is not particularly limited. Among the epoxy compounds, because a metal oxide-containing film having excellent heat resistance, chemical resistance, mechanical property, and the like, can be easily formed, a polyfunctional epoxy compound having two or more epoxy groups in a molecule is preferable. The epoxy resin precursor can be used alone or in combination of two or more types thereof.

The polyfunctional epoxy compound is not particularly limited as long as it is a di- or more functional epoxy compound. Examples of polyfunctional epoxy compound include difunctional epoxy resin such as bisphenol A type epoxy resin, bisphenol S type epoxy resin, bisphenol AD type epoxy resin, naphthalene type epoxy resin, tetrabromo bisphenol A type epoxy resin, and biphenyl type epoxy resin; glycidyl ester type epoxy resin such as dimer acid glycidyl ester and triglycidyl ester; glycidyl amine type epoxy resin such as tetraglycidyl aminodiphenylmethane, triglycidyl-p-aminophenol, tetraglycidyl metaxylylenediamine, and tetraglycidyl bisaminomethylcyclohexane; hydantoin type epoxy resin such as 1,3-diglycidyl-5-methyl-5-ethylhydantoin; hydroquinone-type epoxy resin; fluorine-type epoxy resin; heterocyclic epoxy resin such as triglycidyl isocyanurate; trifunctional epoxy resin such as phloroglucinol triglycidylether, trihydroxybiphenyl triglycidylether, trihydroxyphenylmethane triglycidylether, glycerin triglycidylether, 2-[4-(2,3-epoxypropoxy)phenyl-2-[4-[1,1-bis[4-(2,3- epoxypropxy)phenyl]ethyl]phenyl]propane, and 1,3-bis[4-[1-[4-(2,3-epoxypropoxy)phenyl]-1-[4-[1-[4-(2,3-epoxypropoxy)phenyl]-1-methylethyl]phenyl]ethyl]phenoxy]-2-propanol; and tetrafunctional epoxy resin such as tetrahydroxyphenylethane tetraglycidylether, tetraglycidyl benzophenone, bisresorcinol tetraglycidylether, and tetraglycidoxybiphenyl. These epoxy compounds may be halogenated or may be hydrogenated.

Examples of the commercially available polyfunctional epoxy compound include JER Coat 828, 1001, 801N, 806, 807, 152, 604, 630, 871, YX8000, YX8034, and YX4000 manufactured by Japan Epoxy Resin Co., Epiclon 830, EXA835LV, HP4032D, and HP820 manufactured by DIC Corporation, the EP4100 series, EP4000 series, and EPU series manufactured by ADEKA Corporation, the Celloxide series (2021, 2021P, 2083, 2085, 3000, and the like), the EPOLEAD series, and the EHPE series manufactured by Daicel Corporation, the YD series, YDF series, YDCN series, YDB series, and phenoxy resins (polyhydroxy polyethers synthesized from bisphenols and epichlorohydrin, and having epoxy groups at both terminals; YP series and the like) manufactured by NIPPON STEEL Chemical and Material Co., Ltd., the Denacol series manufactured by Nagase Chemtex Corporation, the EPO LIGHT series manufactured by Kyoeisha Chemical Co., Ltd., and the like, without limitation.

Furthermore, an alicyclic epoxy compound is also preferable as the polyfunctional epoxy compound from the viewpoint of providing a cured product having high hardness. Specific examples of the aliphatic epoxy compound having an alicyclic epoxy group include 2-(3,4-epoxycyclohexyl-5,5-spiro-3,4-epoxy)cyclohexane-meta-dioxane, bis(3,4-epoxycyclohexylmethyl)adipate, bis(3,4-epoxy-6-methylcyclohexylmethyl)adipate, 3,4-epoxy-6-methylcyclohexyl-3',4'-epoxy-6'-methylcyclohexane carboxylate, ε-caprolactone-modified 3,4-epoxycyclohexylmethyl-3',4'-epoxycyclohexane carboxylate, trimethylcaprolactone-modified 3,4-epoxycyclohexylmethyl-3',4'-epoxycyclohexane carboxylate, β-methyl-δ-valerolactone-modified 3,4-epoxycyclohexylmethyl-3',4'-epoxycyclohexane carboxylate, methylenebis(3,4-epoxycyclohexane), di(3,4-epoxycyclohexylmethyl)ether of ethylene glycol, ethylenebis(3,4-epoxycyclohexane carboxylate), dioctyl epoxycyclohexahydrophthalate, di-2-ethylhexyl epoxycyclohexahydrophthalate, and an epoxy resin having a tricyclodecene oxide group.

Furthermore, the compound represented by the following formula (a1-I) can be suitably used as the epoxy resin precursor.

[Chem. 25]

(a1-I)

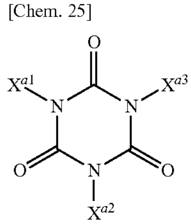

(In the formula (a1-I), $X^{a1}$, $X^{a2}$, and $X^{a3}$ are each independently a hydrogen atom, or an organic group which may include an epoxy group, the total number of the epoxy groups of $X^{a1}$, $X^{a2}$, and $X^{a3}$ is 2 or more.)

As the above the compound represented by the formula (a1-I), the compounds represented by the following formula (a1-II) are preferable.

[Chem. 26]

(a1-II)

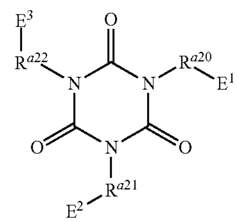

(In the formula (a1-II), $R^{a20}$ to $R^{a22}$ are groups including a combination of a linear, branched, or cyclic alkylene group, an arylene group, —O—, —C(═O)—, —NH— and combination thereof, they may be the same as or different from each other. $E^1$ to $E^3$ are at least one substituent or hydrogen atom selected from the group consisting of an epoxy group, an oxetanyl group, an ethylenically unsaturated group, an alkoxysilyl group, an isocyanate group, a block isocyanate group, a thiol group, a carboxy group, a hydroxyl group, and a succinic anhydride group, or a hydrogen atom. However, at least two of $E^1$ to $E^3$ are at least one selected from the group consisting of an epoxy group and an oxetanyl group.)

In the formula (a1-II), in groups represented by $R^{a20}$ and $E^1$, $R^{a21}$ and $E^2$, and $R^{a22}$ and $E^3$, for example, at least two groups are each preferably a group represented by the following formula (a1-IIa), and more preferably all the groups are a group represented by the following formula the following formula (a1-IIa). A plurality of groups represented by the formula (a1-IIa) bonded to one compound is preferably the same group.

$$\text{-L-Ca} \qquad \text{(a1-IIa)}$$

(In the formula (a1-IIa), L is a linear, branched, or cyclic alkylene group, an arylene group, —O—, —C(═O)—, —NH—, and a group including combination of these, Ca is an epoxy group. In the formula (a1-IIa), L and Ca may be bonded to each other to form a cyclic structure.)

In the formula (a1-IIa), the linear, branched, or cyclic alkylene group as L is preferably an alkylene group having 1 or more and 10 or less carbon atoms; and the arylene group as L is preferably an arylene group having 5 or more and 10 or less carbon atoms. In the formula (a1-IIa), L is preferably a linear alkylene group having 1 or more and 3 or less carbon atoms, a phenylene group, —O—, —C(═O)—, —NH— and a group including a combination thereof, at least one group of a linear alkylene group having 1 or more and 3 or less carbon atoms, such as a methylene group, and a phenylene group, or groups including a combination of these with at least one of —O—, —C(═O)— and NH—.

In the formula (a1-IIa), examples of a case where L and Ca are bonded to each other to form a cyclic structure include a case where a branched alkylene group and an epoxy group are bonded to each other to form a cyclic structure (a structure having an epoxy group having an alicyclic structure), and an organic group represented by the following formulas (a1-IIb) to (a1-IId).

-continued
[Chem. 27]
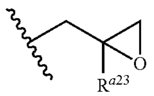
(a1-IIb)
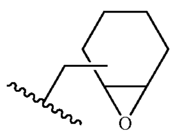
(a1-IIc)
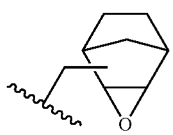
(a1-IId)
(In the formula (a1-IIb), $R^{a23}$ is a hydrogen atom or a methyl group.)
Hereinafter, examples of the compound represented by the formula (a1-II) include an oxiranyl group, or an epoxy compound having an alicyclic epoxy group, but they are not limited thereto.
[Chem. 28]
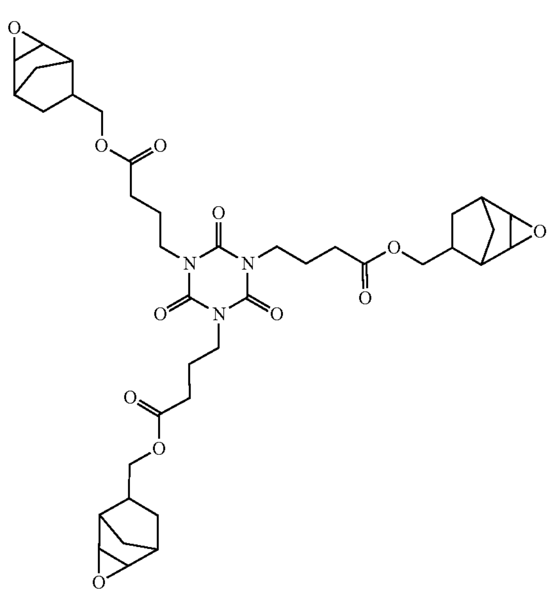
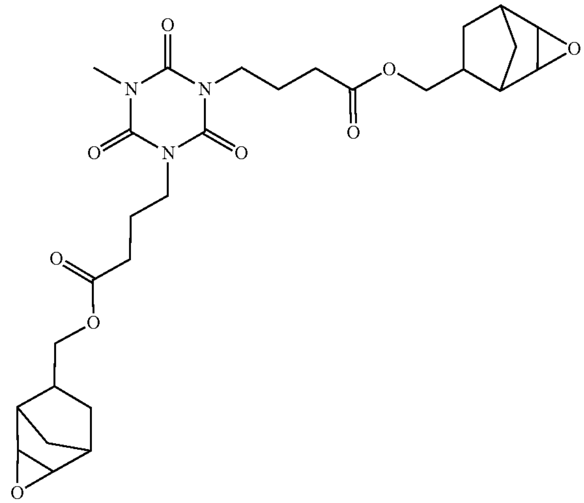
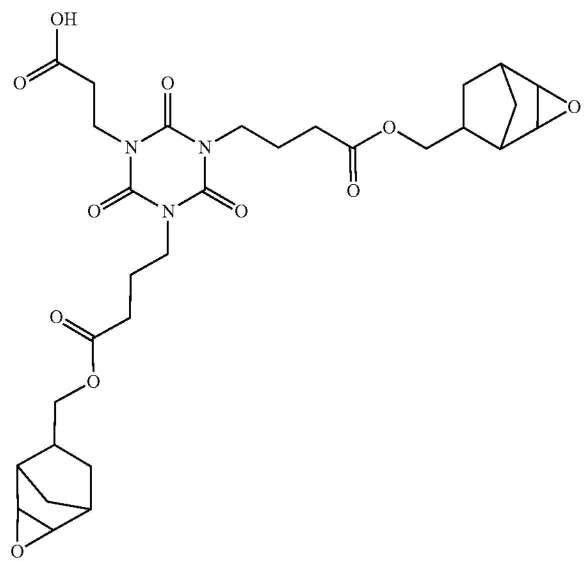
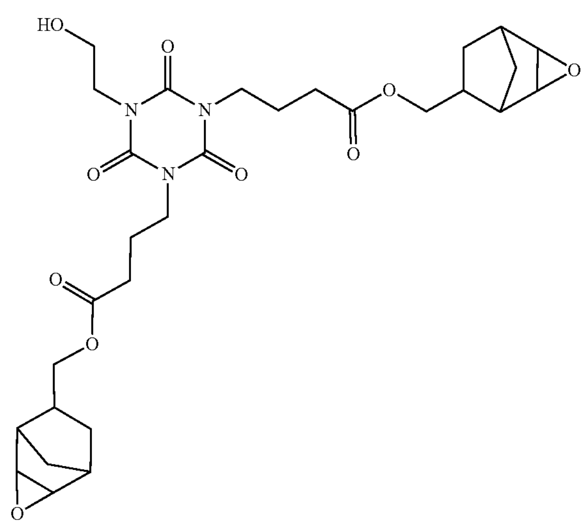

-continued
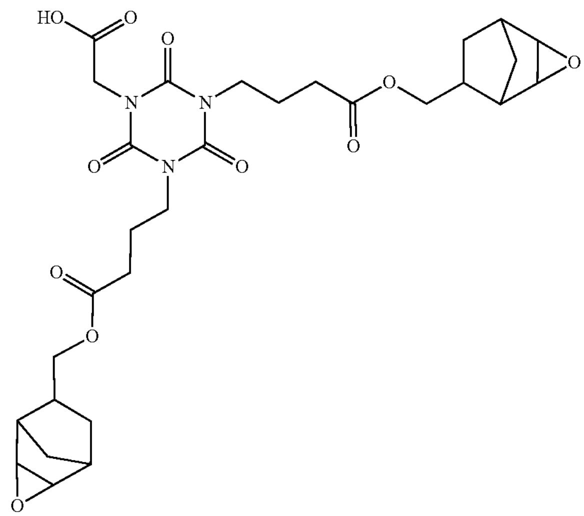
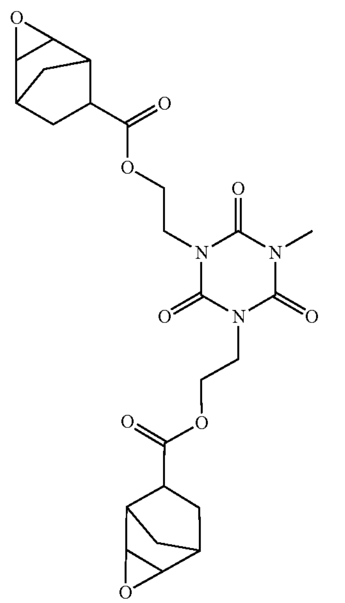
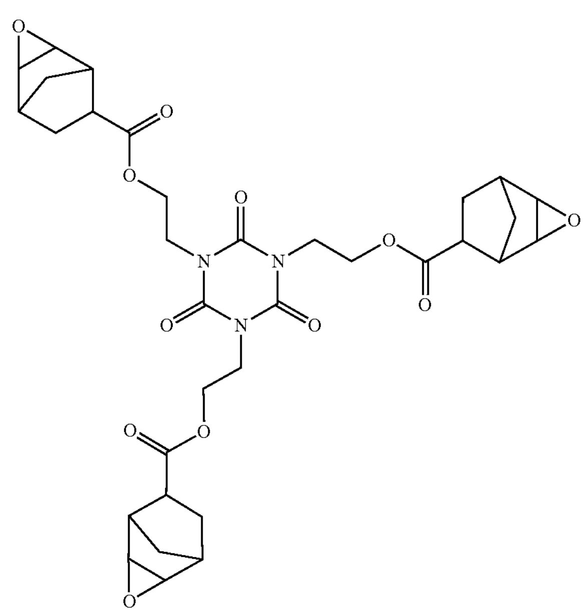 [SMILES: O=C(OCCn1c(=O)n(CCOC(=O)C2CC3CC2C2OC32)c(=O)n(CCOC(=O)C2CC3CC2C2OC32)c1=O)C1CC2CC1C1OC21]
-continued
[Chem. 29]
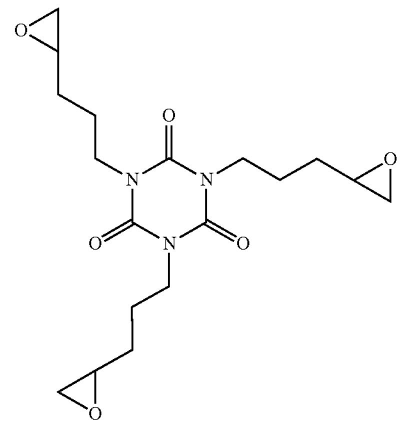
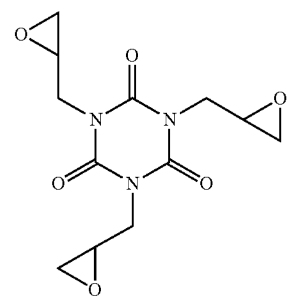
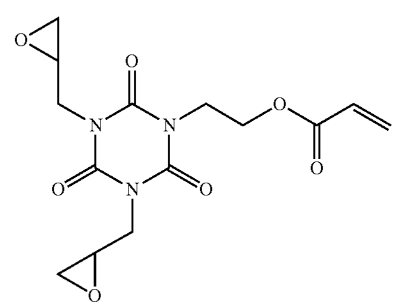
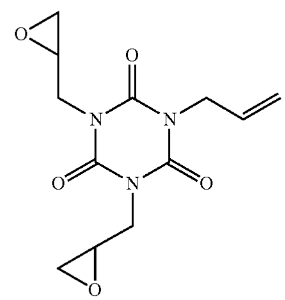
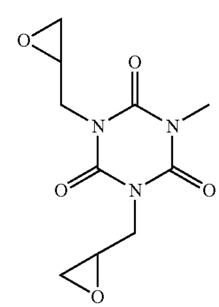

-continued
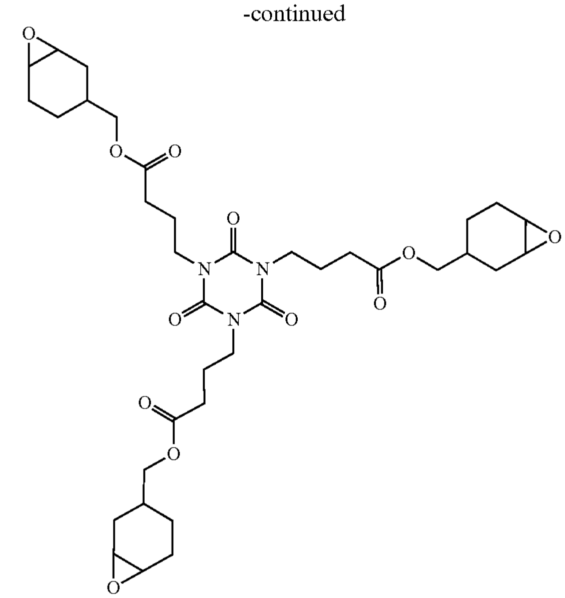
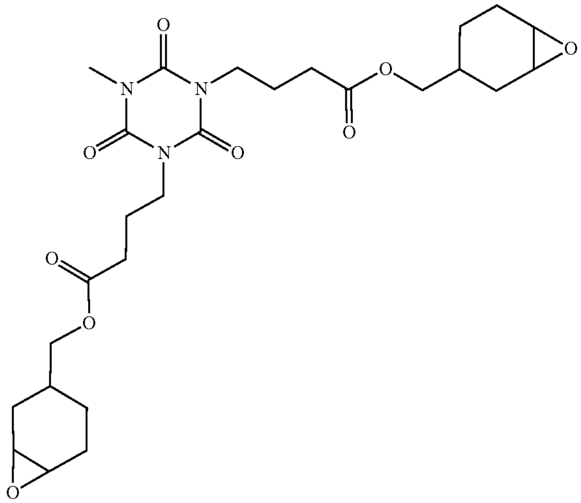
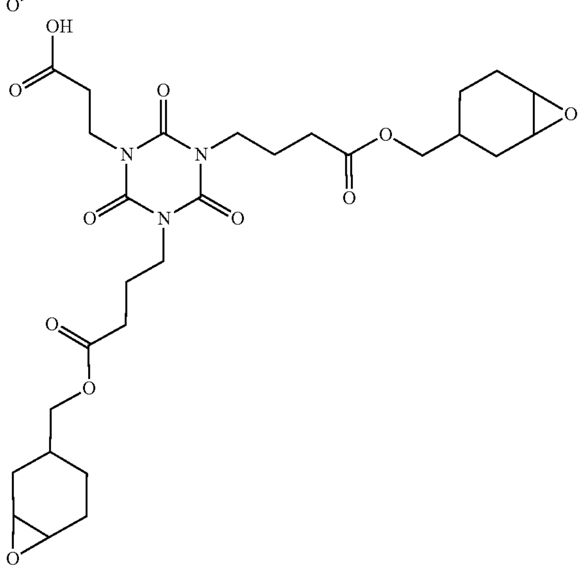
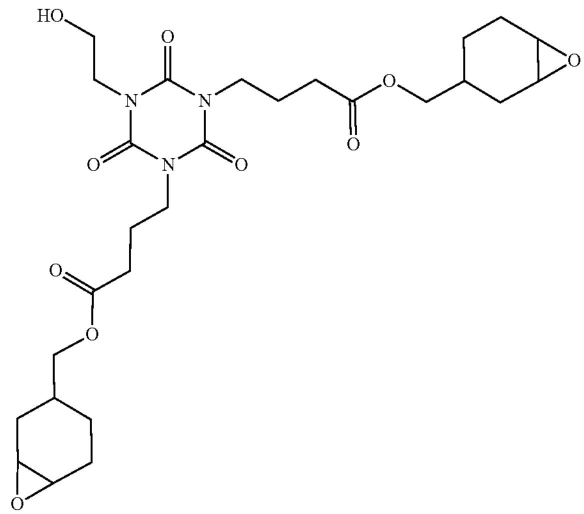
-continued
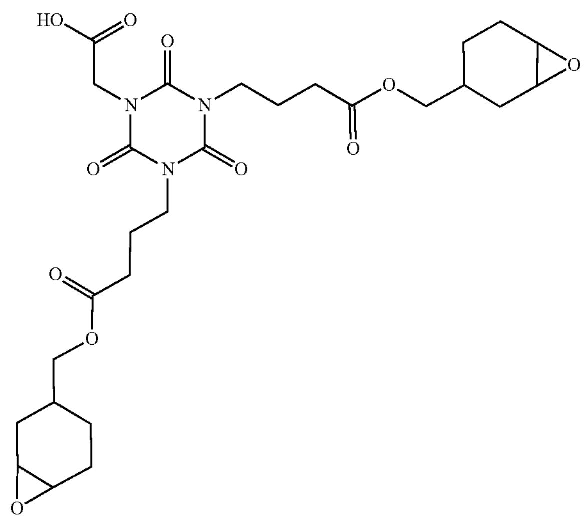
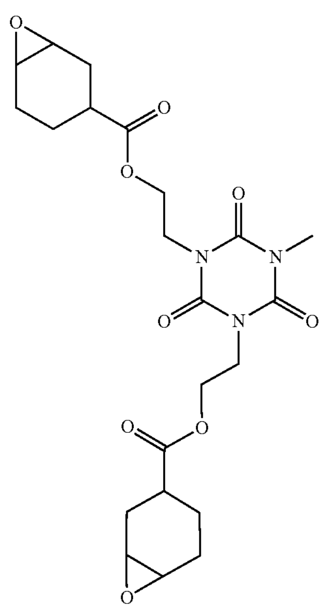

-continued

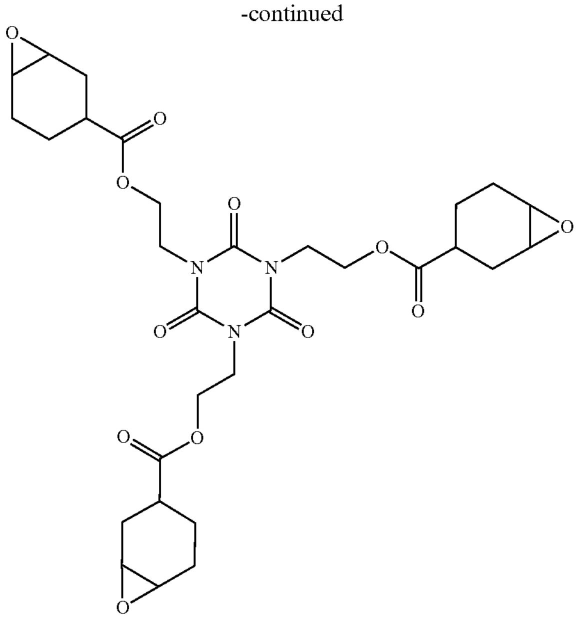

Furthermore, a siloxane compound having two or more glycidyl groups in the molecule (hereinafter, also simply referred to as "siloxane compound") can be suitably used as an epoxy resin precursor.

The siloxane compound is a compound including siloxane skeleton including a siloxane bond (Si—O—Si), and 2 or more glycidyl groups in the molecule. Examples of the siloxane skeleton in the siloxane compound include a cyclic siloxane skeleton and cage or ladder type polysilsesquioxane skeleton.

Among the siloxane compounds, compounds having a cyclic siloxane skeleton represented by the following formula (a1-III) (hereinafter, also referred to as "cyclic siloxane") are preferable.

[Chem. 30]

(a1-III)

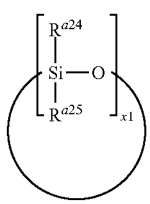

In the formula (a1-III), $R^{a24}$ and $R^{a25}$ represent a monovalent group containing an epoxy group or an alkyl group. However, of x1 $R^{a24}$s and x1 $R^{a25}$s in the compound represented by the formula (a1-III), at least two are a monovalent group containing an epoxy group. Furthermore, x1 in the formula (a1-III) represents an integer of 3 or more. Note here that $R^{a24}$ and $R^{a25}$ in the compound represented by the formula (a1-III) may be the same as or different from each other. Furthermore, a plurality of $R^{a24}$s may be the same as or different from each other. A plurality of $R^{a25}$s also may be the same as or different from each other. Examples of the above alkyl groups include linear or branched alkyl groups such as a methyl group, an ethyl group, a propyl group, and an isopropyl group, having 1 or more and 18 or less carbon atoms (preferably 1 or more and 6 or less carbon atoms, and particularly preferably 1 or more and 3 or less carbon atoms).

The x1 in the formula (a1-III) represents an integer of 3 or more. Among them, it is preferably an integer of 3 or more and 6 or less from the viewpoint that cross-linking reactivity is excellent in formation of a cured film.

The number of epoxy groups in the molecule possessed by the siloxane compound is 2 or more, preferably 2 or more and 6 or less in view of excellent crosslinking reactivity in the case of forming a cured film, and particularly preferably 2 or more and 4 or less.

The above-mentioned monovalent group containing the epoxy group is preferably an alicyclic epoxy group, and a glycidylether group represented by -D-O—$R^{a26}$ [wherein D represents an alkylene group, $R^{a26}$ represents a glycidyl group], more preferably an alicyclic epoxy group, and further preferably an alicyclic epoxy group represented by the following formula (a1-IIIa) or the following formula (a1-IIIb). Examples of the above-mentioned D (an alkylene group) include linear or branched alkylene group having 1 or more and 18 or less carbon atoms, such as a methylene group, a methyl methylene group, a dimethyl methylene group, a dimethylene group, and a trimethylene group.

[Chem. 31]

(a1-IIIa)

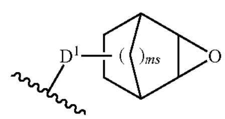

(a1-IIIb)

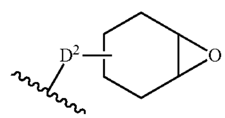

(In the above formulas (a1-IIIa) and (a1-IIIb), $D^1$ and $D^2$ each independently represent an alkylene group, ms represents an integer of 0 or more and 2 or less.)

The metal oxide fine particle dispersion liquid as an epoxy resin precursor may contain, in addition to the siloxane compound represented by the formula (a1-III), compounds including a siloxane skeleton, such as an alicyclic epoxy group-containing cyclic siloxane, an alicyclic epoxy group-containing silicone resin mentioned in Japanese Unexamined Patent Application, Publication No. 2008-248169, and an organopolysilsesquioxane resin having at least two epoxy functional groups in a molecule mentioned in Japanese Unexamined Patent Application, Publication No. 2008-19422.

More specific examples of the siloxane compound include cyclic siloxane having two or more glycidyl groups in the molecule represented by the following formula. It is possible to use, as the siloxane compound, commercially available products, for example, trade name "X-40-2670", "X-40-2701", "X-40-2728", "X-40-2738", and "X-40-2740" (which are manufactured by Shin-Etsu Chemical Co., Ltd.).

[Chem. 32]
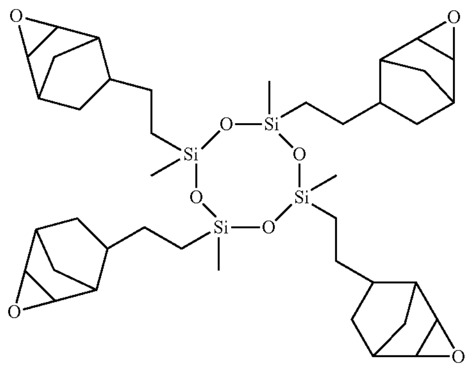
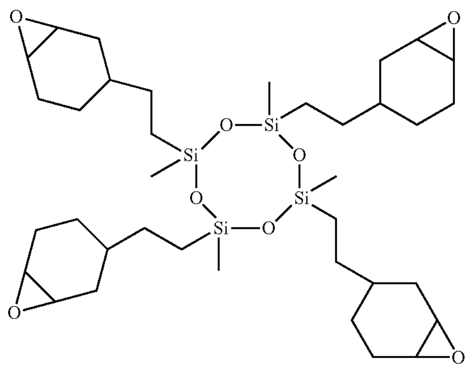
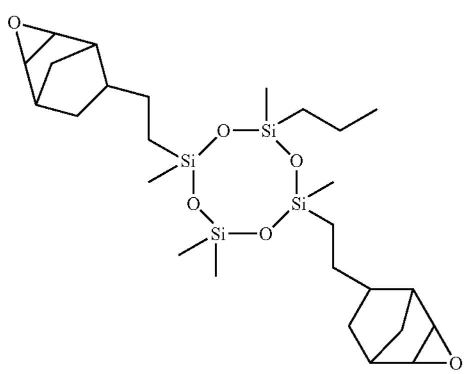
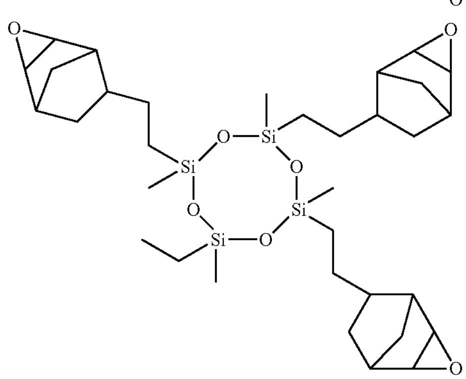
-continued
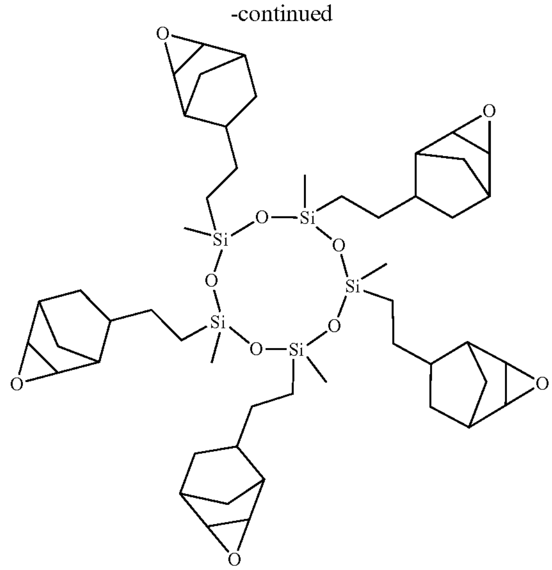
[Chem. 33]
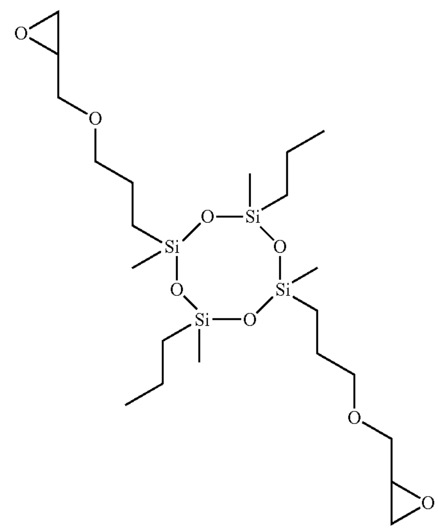
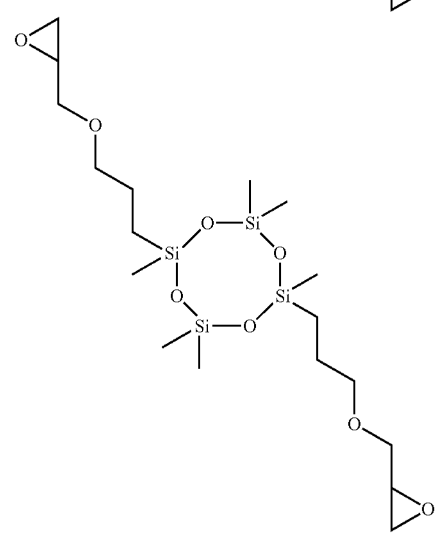

-continued
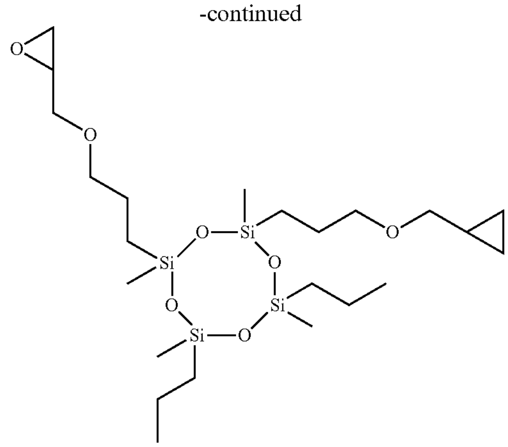
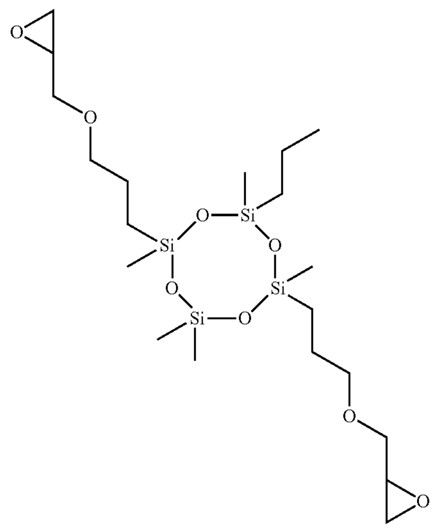
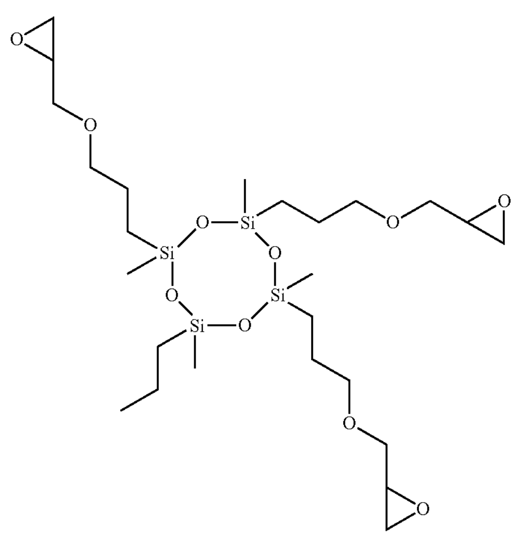
-continued
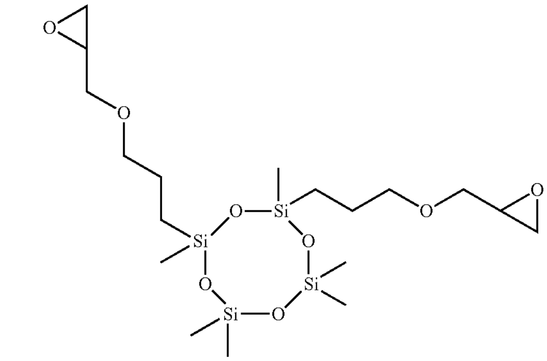
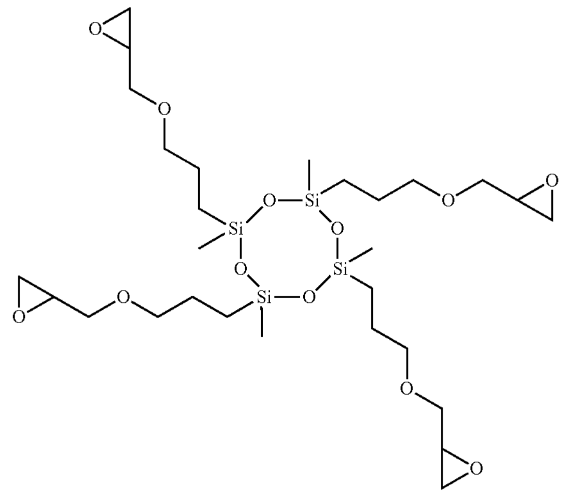
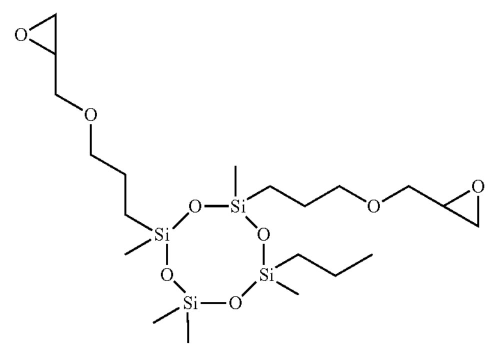
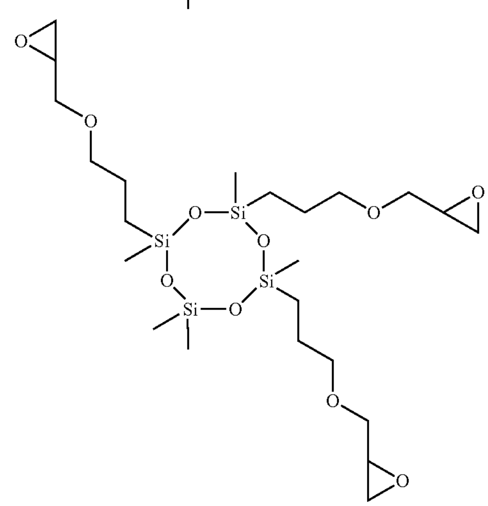

-continued

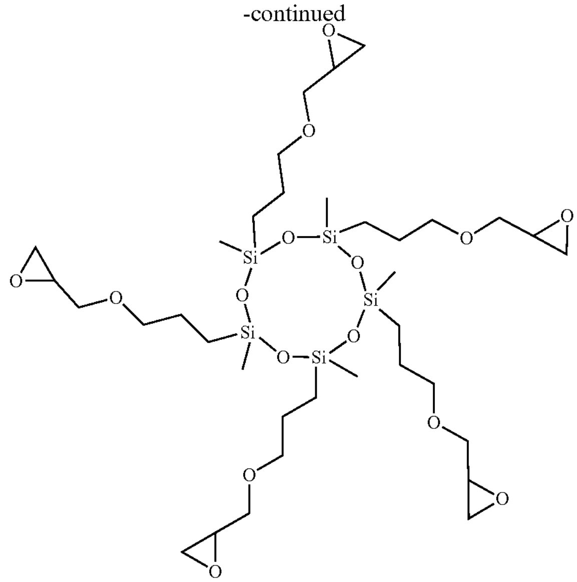

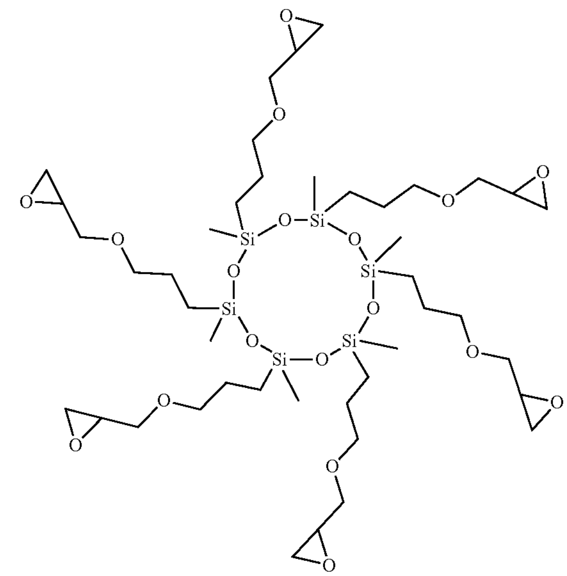 [SMILES: C[Si]1(CCCOCC2CO2)O[Si](C)(CCCOCC2CO2)O[Si](C)(CCCOCC2CO2)O[Si](C)(CCCOCC2CO2)O[Si](C)(CCCOCC2CO2)O[Si](C)(CCCOCC2CO2)O1]

[Epoxy Group-Containing Resin]

When an epoxy group-containing resin is used as a base material component (B), epoxy groups of the epoxy group-containing resin are crosslinked to each other by heating the metal oxide fine particle dispersion liquid in the presence of a curing agent and a curing accelerator as necessary. As a result, a cured product having excellent heat resistance or mechanical property can be obtained. The epoxy group-containing resin is not particularly limited as long as it is a resin constituted by molecules having an epoxy group.

The epoxy group-containing resin may be a polymer obtained by polymerizing a monomer having an epoxy group or a monomer mixture including a monomer having an epoxy group. The epoxy group-containing resin may be one in which an epoxy group is introduced into a polymer having a functional group having reactivity, for example, a hydroxyl group, a carboxy group, an amino group, and the like, using a compound having an epoxy group, for example, epichlorohydrin. Because of easiness of availability, preparation, adjustment of an amount of an epoxy group in the polymer, as the polymer having an epoxy group, a polymer obtained by polymerizing a monomer having an epoxy group or a monomer mixture including a monomer having an epoxy group is preferable.

Preferable examples of the epoxy group-containing resin include novolak type epoxy resins such as phenolnovolak type epoxy resin, brominated phenolnovolak type epoxy resin, orthocresolnovolak type epoxy resin, bisphenol A novolak type epoxy resin, and bisphenol AD novolak type epoxy resin; cycloaliphatic epoxy resins such as epoxidized dicyclopentadiene type phenol resin; aromatic epoxy resins such as epoxidized naphthalene type phenol resin.

Furthermore, among the epoxy group-containing resins, because of easiness of preparation, or easiness of adjustment of properties of the metal oxide-containing film, a homopolymer of a (meth)acrylic acid ester having an epoxy group, or a copolymer of a (meth)acrylic acid ester having an epoxy group and other monomers are preferable.

The (meth)acrylic acid ester having an epoxy group may be either a chain aliphatic (meth)acrylic acid ester having an epoxy group, or the below-mentioned (meth)acrylic acid ester having an alicyclic epoxy group. The (meth)acrylic acid ester having an epoxy group may have an aromatic group. The (meth)acrylic acid ester having an epoxy group is preferably an aliphatic (meth)acrylic acid ester having a chain aliphatic epoxy group or an aliphatic (meth)acrylic acid ester having an alicyclic epoxy group, and more preferably an aliphatic (meth)acrylic acid ester having an alicyclic epoxy group. In view of patterning property, an aliphatic (meth)acrylic acid ester including polycyclic structure in ring structure of an alicyclic epoxy group is further preferable.

Examples of the (meth)acrylic acid ester, which has an aromatic group and an epoxy group, include 4-glycidyloxyphenyl (meth)acrylate, 3-glycidyloxyphenyl (meth)acrylate, 2-glycidyloxyphenyl (meth)acrylate, 4-glycidyloxyphenylmethyl (meth)acrylate, 3-glycidyloxyphenylmethyl (meth) acrylate, and 2-glycidyloxyphenylmethyl (meth)acrylate.

Examples of the aliphatic (meth)acrylic acid ester having a chain aliphatic epoxy group include (meth)acrylic acid esters in which a chain aliphatic epoxy group is combined with an oxy group (—O—) in an ester group (—O—CO—), such as epoxyalkyl (meth)acrylate and epoxyalkyloxyalkyl (meth)acrylate. Such a chain aliphatic epoxy group possessed by the (meth)acrylic acid ester may have one or plural oxy group(s) (—O—) in a chain. The number of carbon atoms of the chain aliphatic epoxy group is not particularly limited, and is preferably 3 or more and 20 or less, more preferably 3 or more and 15 or less, and particularly preferably 3 or more and 10 or less.

Specific examples of the aliphatic (meth)acrylic acid ester having a chain aliphatic epoxy group include epoxyalkyl (meth)acrylates such as glycidyl (meth)acrylate, 2-methyl glycidyl (meth)acrylate, 3,4-epoxybutyl (meth)acrylate, and 6,7-epoxyheptyl (meth)acrylate; and epoxyalkyloxyalkyl (meth)acrylates such as 2-glycidyloxyethyl (meth)acrylate, 3-glycidyloxy-n-propyl (meth)acrylate, 4-glycidyloxy-n-butyl (meth)acrylate, 5-glycidyloxy-n-hexyl (meth)acrylate, and 6-glycidyloxy-n-hexyl (meth)acrylate.

Specific examples of the aliphatic (meth)acrylic acid ester having an alicyclic epoxy group include compounds represented by the following formulas (a05-1) to (a05-15). Of these compounds, compounds represented by the following formulas (a05-1) to (a05-5) are preferable, and compounds represented by the following formulas (a05-1) to (a05-2) are more preferable. Furthermore, as to each of these compounds, a bonding site on which an oxygen atom of an ester group is positioned to an alicyclic ring is not necessarily limited to the position shown herein, and may partially include a position isomer.

[Chem. 34]
(a05-1)
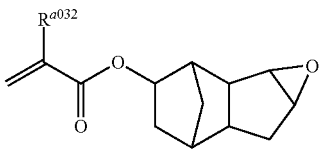
(a05-2)
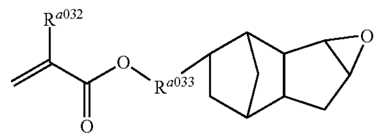
(a05-3)
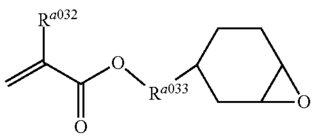
(a05-4)
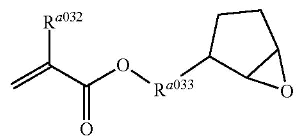
(a05-5)
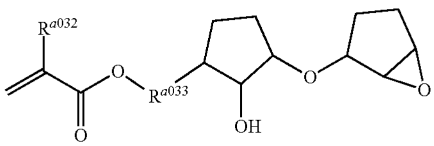
[Chem. 35]
(a05-6)
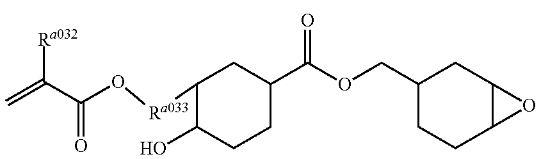
(a05-7)
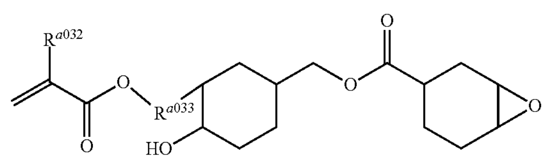
(a05-8)
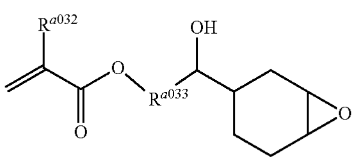
(a05-9)
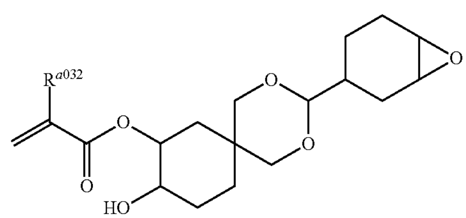
(a05-10)
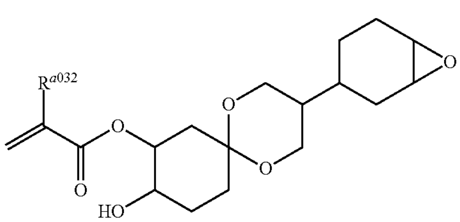
[Chem. 36]
(a05-11)
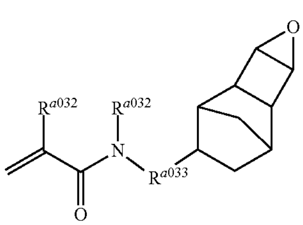
(a05-12)
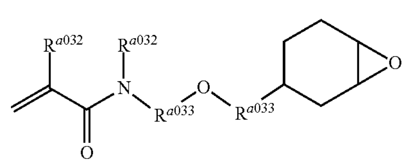

-continued (a05-13)

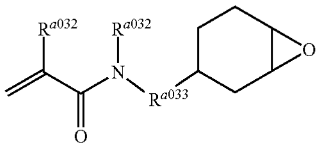

(a05-14)

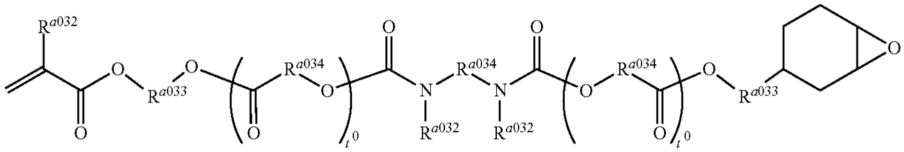

(a05-15)

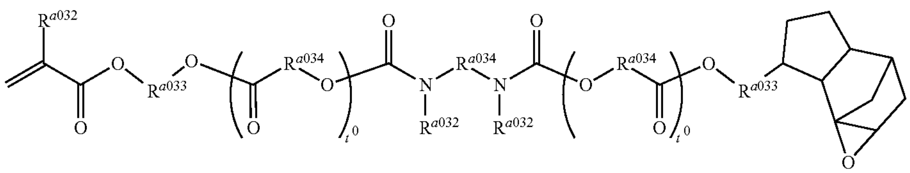

In the above formulas, $R^{a032}$ is a hydrogen atom or a methyl group; $R^{a033}$ is a divalent aliphatic saturated hydrocarbon group having 1 or more and 6 or less carbon atoms; $R^{a034}$ is a divalent hydrocarbon group having 1 or more and 10 or less carbon atoms; and $t^0$ represents an integer of 0 or more and 10 or less. $R^{a033}$ is a linear or branched alkylene group and is preferably, for example, a methylene group, an ethylene group, a propylene group, a tetramethylene group, an ethylethylene group, a pentamethylene group, or a hexamethylene group. $R^{a034}$ is preferably, for example, a methylene group, an ethylene group, a propylene group, a tetramethylene group, an ethylethylene group, a pentamethylene group, a hexamethylene group, a phenylene group, or a cyclohexylene group.

It is possible to use, as the polymer having an epoxy group, both of a homopolymer of a (meth)acrylic acid ester having an epoxy group, and a copolymer of a (meth)acrylic acid ester having an epoxy group with the other monomer. The content of a unit derived from the (meth)acrylic acid ester having an epoxy group in the polymer having an epoxy group is for example 1% by mass or more and 100% by mass or less, preferably 10% by mass or more and 90% by mass or less, more preferably 30% by mass or more and 80% by mass or less, particularly preferably 50% by mass or more and 75% by mass or less.

When the polymer having an epoxy group is a copolymer of the (meth)acrylic acid ester having an epoxy group with the other monomer, examples of the other monomer include an unsaturated carboxylic acid, a (meth)acrylic acid ester having no epoxy group, (meth)acrylamides, an allyl compound, vinyl ethers, vinyl esters, styrenes, and the like. These compounds can be used alone, or two or more thereof can be used in combination. In view of storage stability of a metal oxide fine particle dispersion liquid, and chemical resistance of an article such as a film formed using the metal oxide fine particle dispersion liquid forming composition against alkali, it is preferred that the copolymer of the (meth)acrylic acid ester having an epoxy group with the other monomer does not include a unit derived from an unsaturated carboxylic acid.

Examples of the unsaturated carboxylic acid include (meth)acrylic acid; (meth)acrylic acid amide; crotonic acid; maleic acid, fumaric acid, citraconic acid, mesaconic acid, itaconic acid, and anhydrides of these dicarboxylic acids.

Examples of the (meth)acrylic acid ester having no epoxy group include linear or branched alkyl (meth)acrylates such as methyl (meth)acrylate, ethyl (meth)acrylate, propyl (meth)acrylate, amyl (meth)acrylate, and tert-octyl (meth) acrylate; chloroethyl (meth)acrylate, 2,2-dimethylhydroxypropyl (meth)acrylate, 2-hydroxyethyl (meth)acrylate, trimethylolpropane mono(meth)acrylate, benzyl (meth)acrylate, furfuryl (meth)acrylate; and a (meth)acrylic acid ester having a group with an alicyclic skeleton. Of (meth)acrylic acid esters having no epoxy group, a (meth)acrylic acid ester having a group with an alicyclic skeleton is preferable.

In a (meth)acrylic acid ester having a group with an alicyclic skeleton, an alicyclic group composing the alicyclic skeleton may be either monocyclic or polycyclic. Examples of the monocyclic alicyclic group include a cyclopentyl group, a cyclohexyl group, and the like. Examples of the polycyclic alicyclic group include a norbornyl group, an isobornyl group, a tricyclononyl group, a tricyclodecyl group, a tetracyclododecyl group, and the like.

Examples of the (meth)acrylic acid ester having a group with an alicyclic skeleton include compounds represented by the following formulas (a06-1) to (a06-8). Of these compounds, compounds represented by the following formulas (a06-3) to (a06-8) are preferable, and compounds represented by the following formulas (a06-3) or (a06-4) are more preferable.

[Chem. 37]

(a06-1)

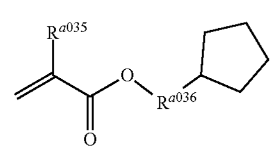

(a06-2)

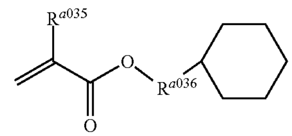

-continued (a06-3)

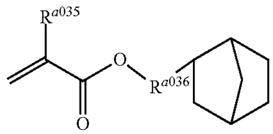

(a06-4)

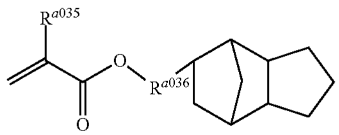

[Chem. 38]

(a06-5)

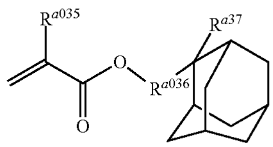

(a06-6)

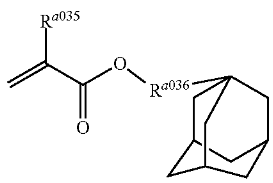

(a06-7)

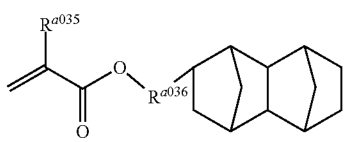

(a06-8)

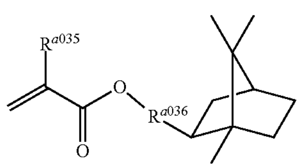

In the above formulas, $R^{a035}$ represents a hydrogen atom or a methyl group; $R^{a036}$ represents a single bond or a divalent aliphatic saturated hydrocarbon group having 1 or more and 6 or less carbon atoms; and $R^{a037}$ represents a hydrogen atom or an alkyl group having 1 or more and 5 or less carbon atoms. $R^{a036}$ is preferably a single bond, or a linear or branched alkylene group, for example, a methylene group, an ethylene group, a propylene group, a tetramethylene group, an ethylethylene group, a pentamethylene group, or a hexamethylene group. $R^{a037}$ is preferably a methyl group or an ethyl group.

Examples of (meth)acrylamides include (meth)acrylamide, N-alkyl(meth)acrylamide, N-aryl(meth)acrylamide, N,N-dialkyl(meth)acrylamide, N,N-aryl(meth)acrylamide, N-methyl-N-phenyl(meth)acrylamide, N-hydroxyethyl-N-methyl(meth)acrylamide, and the like.

Examples of the allyl compound include allyl esters such as allyl acetate, allyl caproate, allyl caprylate, allyl laurate, allyl palmitate, allyl stearate, allyl benzoate, allyl acetoacetate, and allyl lactate; allyloxyethanol, and the like.

Examples of vinyl ethers include alkyl vinyl ethers such as hexyl vinyl ether, octyl vinyl ether, decyl vinyl ether, ethylhexyl vinyl ether, methoxyethyl vinyl ether, ethoxyethyl vinyl ether, chloroethyl vinyl ether, 1-methyl-2,2-dimethylpropyl vinyl ether, 2-ethylbutyl vinyl ether, hydroxyethyl vinyl ether, diethylene glycol vinyl ether, dimethylaminoethyl vinyl ether, diethylaminoethyl vinyl ether, butylaminoethyl vinyl ether, benzyl vinyl ether, and tetrahydrofurfuryl vinyl ether; vinylaryl ethers such as vinyl phenyl ether, vinyl tolyl ether, vinyl chlorophenyl ether, vinyl-2,4-dichlorophenyl ether, vinyl naphthyl ether, and vinyl anthranyl ether; and the like.

Examples of vinyl esters include vinyl butyrate, vinyl isobutyrate, vinyl trimethyl acetate, vinyl diethyl acetate, vinyl valerate, vinyl caproate, vinyl chloroacetate, vinyl dichloroacetate, vinyl methoxyacetate, vinyl butoxyacetate, vinyl phenylacetate, vinyl acetoacetate, vinyl lactate, vinyl-β-phenyl butyrate, vinyl benzoate, vinyl salicylate, vinyl chlorobenzoate, vinyl tetrachlorobenzoate, vinyl naphthoate, and the like.

Examples of styrenes include styrene; alkylstyrenes such as methylstyrene, dimethylstyrene, trimethylstyrene, ethylstyrene, diethylstyrene, isopropylstyrene, butylstyrene, hexylstyrene, cyclohexylstyrene, decylstyrene, benzylstyrene, chloromethylstyrene, trifluoromethylstyrene, ethoxymethylstyrene, and acetoxymethylstyrene; alkoxystyrenes such as methoxystyrene, 4-methoxy-3-methylstyrene, and dimethoxystyrene; halostyrenes such as chlorostyrene, dichlorostyrene, trichlorostyrene, tetrachlorostyrene, pentachlorostyrene, bromostyrene, dibromostyrene, iodostyrene, fluorostyrene, trifluorostyrene, 2-bromo-4-trifluoromethylstyrene, and 4-fluoro-3-trifluoromethylstyrene; and the like.

The molecular weight of the epoxy group-containing resins is not particularly limited as long as the object of the present invention is not impaired, and is preferably 3,000 or more and 30,000 or less, and more preferably 5,000 or more and 15,000 or less, in terms of a polystyrene-equivalent weight average molecular weight.

[Resin for Forming Cured Film by Baking]

As described above, a resin for forming a cured film by baking is also preferable as a precursor resin as a base material component (B). Examples of the resin for forming a cured film by baking can include a silicon-containing resin. Preferable examples of the silicon-containing resin include one or more resins selected from a siloxane resin and a polysilane. A metal oxide-containing film including a silicon-containing resin is obtained by applying these metal oxide fine particle dispersion liquids including a silicon-containing resin. The metal oxide fine particle dispersion liquid that is a silicon-containing resin composition will be described later in detail.

When the above-mentioned thermosetting material or resin for forming a cured film by baking is used as the base material component (B), a metal oxide fine particle dispersion liquid may include, as necessary, additives such as a curing agent, a curing accelerator, a dehydration-condensation agent, an antioxidant, an ultraviolet absorber, a flame retardant, a mold release agent, a plasticizer, a filler, and a reinforcement material. Furthermore, in order to facilitate film formation, the metal oxide fine particle dispersion liquid preferably includes a solvent. Types of the solvents are appropriately selected depending upon types of the thermosetting materials.

As the metal oxide fine particle dispersion liquid, a photosensitive composition known as a so-called photoresist composition is also preferable in addition to the above-described non-thermosetting composition including a non-thermosetting resin as the base material component (B) and thermosensitive composition including a thermosetting material as the base material component (B). Because articles such as a film including satisfactorily dispersed metal oxide (A), and metal oxide (A) having excellent heat resistance or chemical resistance is easily formed, the metal oxide fine particle dispersion liquid is energy-sensitive composition having preferably thermal sensitivity and/or photosensitivity.

A metal oxide fine particle dispersion liquid as the energy-sensitive composition is obtained by adding a desired amount of the above-described metal oxide (A) to conventionally known various energy-sensitive compositions. The conventionally known energy-sensitive compositions include various thermosetting or photocurable compounds, alkali-soluble resins, resins that improve solubility in alkali upon exposure, and the like, as the base material component (B). The photosensitive metal oxide fine particle dispersion liquid may be a negative photosensitive composition insolubilized in a developing solution by exposure, or a positive photosensitive composition solubilized in a developing solution by exposure. Hereinafter, suitable energy-sensitive compositions and silicon-containing resin compositions as a suitable example of a composition including a resin for forming a cured film by baking are described.

(1) Energy-Sensitive Composition of First Aspect

An energy-sensitive composition of a first aspect is a negative photosensitive composition containing an alkali-soluble resin, a photopolymerizable compound, and a photopolymerization initiator, as well as, a metal oxide (A), and an organic solvent. In the energy-sensitive composition of the first aspect, the alkali-soluble resin and the photopolymerizable compound correspond to the base material component (B).

The energy-sensitive composition of the first aspect may include a (meth)acrylic resin obtained by polymerizing (meth)acrylic acid, (meth)acrylic ester, and the like, as the alkali-soluble resins as mentioned later. For example, when metal oxide fine particle which has been subjected to coating treatment as described in Patent Document 1 is blended in a composition including a (meth)acrylic resin, metal oxide fine particles may not satisfactorily dispersed However, the above-described surface-modified metal oxide fine particles in which at least a part of the surface is coated with the carboxylic acid compound represented by the formula (1) and/or carboxylate derived from the carboxylic acid compound tend to be stably dispersed in a composition including a (meth)acrylic resin even in a composition including (meth) acrylic resin.

The alkali-soluble resins in the energy-sensitive composition of the first aspect are not particularly limited, and conventionally known alkali-soluble resins can be used. The alkali-soluble resins may have an ethylenic unsaturated group, or may not have an ethylenic unsaturated group. Note here that in the present specification the alkali-soluble resin is a resin that is dissolved in a film thickness of 0.01 μm or more when a resin solution (solvent: propylene glycol monomethyl ether acetate) having a resin concentration of 20% by mass is formed into a 1-μm resin film on a substrate, and immersed in 2.38% by mass aqueous solution of tetramethylammonium hydroxide (TMAH) for one minute.

As the alkali-soluble resin having ethylenic unsaturated group, for example, resins obtainable by causing a further reaction of a reaction product of an epoxy compound and unsaturated carboxylic acid with a polybasic acid anhydride are usable.

Among them, the resin represented by the following formula (a-1) is preferred. The resin represented by the formula (a-1) is preferred since the resin itself has high photo-curability.

[Chem. 39]

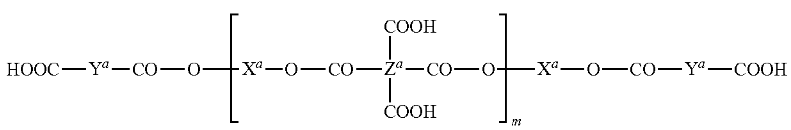

(a-1)

In the above formula (a-1), $X^a$ indicates a group represented by the following formula (a-2).

[Chem. 40]

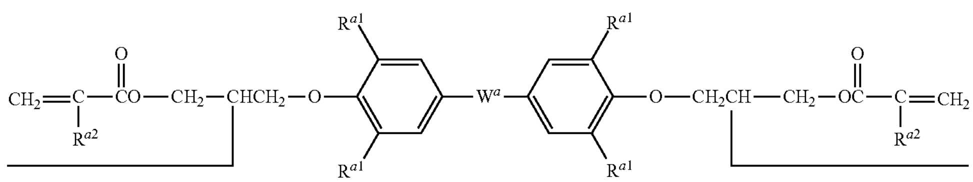

(a-2)

In the formula (a-2), $R^{a1}$ each independently indicates a hydrogen atom, a hydrocarbon group having 1 or more and 6 or less carbon atoms, or a halogen atom; $R^{a2}$ each independently indicates a hydrogen atom or a methyl group; and $W^a$ indicates a single bond or a group represented by the following formula (a-3).

[Chem. 41]

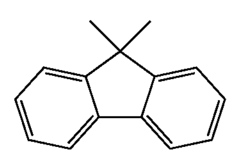

(a-3)

Also, in the formula (a-1), $Y^a$ indicates a residue obtainable by removing an acid anhydride group (—CO—O—

CO—) from dicarboxylic anhydride. Examples of the dicarboxylic anhydride include maleic anhydride, succinic anhydride, itaconic anhydride, phthalic anhydride, tetrahydrophthalic anhydride, hexahydrophthalic anhydride, methylendomethylenetetrahydrophthalic anhydride, chlorendic anhydride, methyltetrahydrophthalic anhydride, anhydrous glutaric acid, and the like.

In the formula (a-1), $Z^a$ indicates a residue obtainable by removing two acid anhydride groups from tetracarboxylic acid dianhydride. Examples of the tetracarboxylic acid dianhydride include pyromellitic dianhydride, benzophenonetetracarboxylic dianhydride, biphenyltetracarboxylic dianhydride, biphenylethertetracarboxylic dianhydride, and the like. In the formula (a-1), m is an integer of 0 or more and 20 or less.

As the alkali-soluble resin having ethylenic unsaturated group, polyester(meth)acrylate obtainable by causing a reaction of a polyester prepolymer obtained by fusion of polyvalent alcohols with monobasic acid or polybasic acid with (meth)acrylic acid; polyurethane(meth)acrylate obtainable by causing a reaction of polyol with a compound having 2 isocyanate groups and then performing a reaction with (meth)acrylic acid; an epoxy(meth)acrylate resin obtainable by causing a reaction of an epoxy resin such as a bisphenol A-type epoxy resin, a bisphenol F-type epoxy resin, a bisphenol S-type epoxy resin, a phenol or cresol novolak-type epoxy resin, a resol-type epoxy resin, a triphenolmethane-type epoxy resin, polycarboxylic acid polyglycidyl ester, polyol polyglycidyl ester, an aliphatic or alicyclic epoxy resin, an amine epoxy resin, and a dihydroxybenzene-type epoxy resin with (meth)acrylic acid may be used. The term "(meth)acrylic acid" as used herein means both acrylic acid and methacrylic acid. Likewise, the term "(meth) acrylate" means both acrylate and methacrylate.

On the other hand, as the alkali-soluble resin which does not have an ethylene unsaturated group, it is possible to use a resin obtained by copolymerizing unsaturated carboxylic acid and other unsaturated compounds with each other. Preferable examples of the other unsaturated compounds include at least one selected from an epoxy group-containing unsaturated compound, and an alicyclic group-containing unsaturated compound.

Examples of the unsaturated carboxylic acid include monocarboxylic acid such as (meth)acrylic acid and crotonic acid; dicarboxylic acid such as maleic acid, fumaric acid, citraconic acid, mesaconic acid, and itaconic acid; anhydrides of these dicarboxylic acids; and the like. Among these, (meth)acrylic acid and maleic anhydride are preferred from the viewpoints of copolymerization reactivity, alkali solubility of the obtained resin, easy availability, and the like. These unsaturated carboxylic acids may be used alone or in combination of two or more kinds thereof.

As the epoxy group-containing unsaturated compound, an epoxy group-containing unsaturated compound having no alicyclic group and an epoxy group-containing unsaturated compound having alicyclic group may be exemplified. As the epoxy group-containing unsaturated compound having alicyclic group, compounds represented by aforementioned formulas (a05-1) to (a05-15) may be exemplified. As the epoxy group-containing unsaturated compound having alicyclic group, compounds represented by aforementioned formulas (a05-1) to (a05-15) may be exemplified. Examples of epoxy group-containing unsaturated compound having no alicyclic group include epoxyalkyl (meth)acrylates such as glycidyl (meth)acrylate, 2-methylglycidyl (meth)acrylate, 3,4-epoxybutyl (meth)acrylate, and 6,7-epoxyheptyl (meth) acrylate; epoxyalkyloxyalkyl (meth)acrylates such as 2-glycidyloxyethyl (meth)acrylate, 3-glycidyloxy-n-propyl (meth)acrylate, 4-glycidyloxy-n-butyl (meth)acrylate, 5-glycidyloxy-n-pentyl(meth)acrylate, and 6-glycidyloxy-n-hexyl(meth)acrylate; epoxyalkyl α-alkylacrylate such as glycidyl α-ethylacrylate, glycidyl α-n-propylacrylate, glycidyl α-n-butylacrylate, 6,7-epoxyheptyl α-ethylacrylate; and glycidyl ethers such as o-vinylbenzyl glycidyl ether, m-vinylbenzyl glycidyl ether, and p-vinylbenzyl glycidyl ether, and the like. Among these, glycidyl (meth)acrylate, 2-methylglicidyl (meth)acrylate, 6,7-epoxyheptyl (meth) acrylate, o-vinylbenzyl glycidyl ether, m-vinylbenzyl glycidyl ether, and p-vinylbenzyl glycidyl are preferable from the viewpoint of reactivity in copolymerization, strength of cured resin, or the like. These epoxy group-containing unsaturated compounds can be used alone or in combination of two or more types thereof.

As the alicyclic group-containing unsaturated compound, an unsaturated compound may be used without particular limitation insofar as the unsaturated compound has an alicyclic group. The alicyclic group may be monocyclic or polycyclic. Examples of monocyclic alicyclic group include a cyclopentyl group, a cyclohexyl group, and the like. Examples of the polycyclic alicyclic group include an adamantyl group, a norbornyl group, an isobornyl group, a tricyclononyl group, a tricyclodecyl group, a tetracyclododecyl group, and the like. Specifically, as the alicyclic group-containing unsaturated compound, compounds represented by aforementioned formulas (a06-1) to (a06-8) may be exemplified.

It is also preferable that compounds other than the above are further polymerized to the unsaturated carboxylic acid. Examples of such other compounds include (meth)acrylic acid esters, (meth)acrylamides, aryl compounds, vinyl ethers, vinyl esters, styrenes, maleimides, and the like. These compounds can be used alone or in combination of two or more types thereof.

As to the other compounds, suitable examples of (meth) acrylamides, allyl compounds, vinyl ethers, vinyl esters, and styrenes are the same as those described in the suitable examples of (meth)acrylamides, allyl compounds, vinyl ethers, vinyl esters, and styrenes, which are described as to the copolymer of (meth)acrylic ester having an epoxy group and other monomers.

Examples of the (meth)acrylic acid ester as the other compound include linear or branched alkyl (meth)acrylates such as methyl (meth)acrylate, ethyl (meth)acrylate, propyl (meth)acrylate, amyl (meth)acrylate, and tert-octyl (meth) acrylate; and chloroethyl (meth)acrylate, 2,2-dimethylhydroxypropyl (meth)acrylate, 2-hydroxyethyl (meth)acrylate, trimethylolpropane mono(meth)acrylate, benzyl (meth) acrylate, and furfuryl (meth)acrylate.

Examples of maleimides as the other compounds include maleimides N-substituted with an alkyl group having 1 or more and 10 or less carbon atoms such as N-methylmaleimide, N-ethylmaleimide, N-n-propylmaleimide, N-isopropylmaleimide, N-n-butylmaleimide, N-n-pentylmaleimide, and N-n-hexylmaleimide; maleimides N-substituted with an alicyclic group having 3 or more and 20 or less carbon atoms such as N-cyclopentylmaleimide, N-cyclohexylmaleimide, and N-cycloheptylmaleimide; maleimides N-substituted with an aryl group having 6 or more and 20 or less carbon atoms such as N-pheylmaleimide, N-α-naphtylmaleimide, and N-β-naphthylmaleimide; and N-aralkyl maleimide N-substituted with an aralkyl group having 7 or more and 20 or less carbon atoms such as N-benzylmaleimide, and N-phenethylmaleimide.

Furthermore, a copolymer including at least a constituent unit having a polymerizable site to the below-mentioned photopolymerizable compound, together with a constituent unit derived from the unsaturated carboxylic acid, or a copolymer including at least a constituent unit derived from the unsaturated carboxylic acid, a constituent unit derived from an epoxy group-containing unsaturated compound, and a constituent unit having a polymerizable site to the below-mentioned photopolymerizable compound can be suitably used as the alkali-soluble resin. Use of these alkali-soluble resins allows a metal oxide-containing film having excellent mechanical strength and adhesion to a substrate to be formed.

The copolymer including a constituent unit having a polymerizable site to the photopolymerizable compound mentioned above may further include one or more constituent units derived from the above-mentioned (meth)acrylic acid esters, (meth)acrylamides, aryl compounds, vinyl ethers, vinyl esters, styrenes, maleimides, and the like.

It is preferable that the constituent unit having a polymerizable site to the photopolymerizable compound has an ethylene unsaturated group as the polymerizable site to the photopolymerizable compound. A copolymer having such a constituent unit can be prepared by reacting at least a part of a carboxy group included in a homopolymer of the unsaturated carboxylic acid and an epoxy group-containing unsaturated compound with each other. Furthermore, a copolymer having the constituent unit having a polymerizable site to the photopolymerizable compound can be prepared also by reacting at least a part of an epoxy group included in a copolymer including a constituent unit derived from unsaturated carboxylic acid and a constituent unit derived from an epoxy group-containing unsaturated compound, with the unsaturated carboxylic acid.

The proportion of the above-mentioned constituent unit derived from unsaturated carboxylic acid in the alkali-soluble resin is preferably 3% by mass or more and 25% by mass or less, and more preferably 5% by mass or more and 25% by mass or less. Furthermore, the proportion of the constituent unit derived from the above-mentioned epoxy group-containing unsaturated compound is preferably 30% by mass or more and 95% by mass or less, and more preferably 50% by mass or more and 90% by mass or less. Furthermore, the above-mentioned proportion of the constituent unit derived from the alicyclic group-containing unsaturated compound is preferably 1% by mass or more and 30% by mass or less, more preferably 3% by mass or more and 25% by mass or less, and further preferably 5% by mass or more and 20% by mass or less. When the proportion is in the above-mentioned range, it is possible to make the alkali solubility of the obtained resin appropriate, and enhance the adhesion property of the cured product of an energy-sensitive composition of the first aspect to a substrate and the strength of the energy-sensitive composition of the first aspect after it is cured.

A mass average molecular weight of the alkali-soluble resin is preferably 1000 or more and 40000 or less, and more preferably 2000 or more and 30000 or less. When the mass average molecular weight is in the above-mentioned range, it is possible to obtain satisfactory developing property and sufficient heat resistance and film strength.

The content of the alkali-soluble resin (A1) is preferably 5% by mass or more and 80% by mass or less, and more preferably 15% by mass or more and 50% by mass or less with respect to the solid content of the photosensitive composition of the first aspect. When the content is in the above-mentioned range, a balance of developing property tends to be easily achieved.

The photopolymerizable compound to be contained in the energy-sensitive composition of the first aspect includes a monofunctional monomer and a multifunctional monomer. Examples of the monofunctional monomer include (meth)acryl amide, methylol(meth)acrylamide, methoxymethyl (meth)acrylamide, ethoxymethyl(meth)acrylamide, propoxymethyl(meth)acrylamide, butoxymethoxymethyl (meth)acrylamide, N-methylol(meth)acrylamide, N-hydroxymethyl(meth)acrylamide, (meth)acrylic acid, fumaric acid, maleic acid, maleic anhydride, itaconic acid, itaconic anhydride, citraconic acid, citraconic anhydride, crotonic acid, 2-acrylamide-2-methylpropanesulfonic acid, tert-butylacrylamidesulfonic acid, methyl (meth)acrylate, ethyl (meth)acrylate, butyl (meth)acrylate, 2-ethylhexyl (meth) acrylate, cyclohexyl (meth)acrylate, 2-hydroxyethyl (meth) acrylate, 2-hydroxypropyl (meth)acrylate, 2-hydroxybutyl (meth)acrylate, 2-phenoxy-2-hydroxypropyl (meth)acrylate, 2-(meth)acryloyloxy-2-hydroxypropyl phthalate, glycerin mono(meth)acrylate, tetrahydrofurfuryl (meth)acrylate, dimethylamino (meth)acrylate, glycidyl (meth)acrylate, 2,2,2-trifluoroethyl (meth)acrylate, 2,2,3,3-tetrafluoropropyl (meth)acrylate, half (meth)acrylate of a phthalic acid derivative, and the like. These monofunctional monomers may be used alone or in combination of two or more kinds thereof.

Meanwhile, examples of the multifunctional monomer include ethylene glycol di(meth)acrylate, diethylene glycol di(meth)acrylate, tetraethylene glycol di(meth)acrylate, propylene glycol di(meth)acrylate, polypropylene glycol di(meth)acrylate, butylene glycol di(meth)acrylate, neopentyl glycol di(meth)acrylate, 1,6-hexane glycol di(meth)acrylate, trimethylolpropane tri(meth)acrylate, glycerin di(meth)acrylate, pentaerythritol triacrylate, pentaerythritol tetraacrylate, dipentaerythritol pentaacrylate, dipentaerythritol hexaacrylate, pentaerythritol di(meth)acrylate, pentaerythritol tri (meth)acrylate, pentaerythritol tetra(meth)acrylate, dipentaerythritol penta(meth)acrylate, dipentaerythritol hexa (meth)acrylate, 2,2-bis(4-(meth)acryloxydiethoxyphenyl) propane, 2,2-bis(4-(meth)acryloxypolyethoxyphenyl) propane, 2-hydroxy-3-(meth)acryloyloxypropyl (meth) acrylate, ethylene glycol diglycidyl ether di(meth)acrylate, diethylene glycol diglycidyl ether di(meth)acrylate, phthalic acid diglycidyl ester di(meth)acrylate, glycerin triacrylate, glycerin polyglycidyl ether poly(meth)acrylate, urethane (meth)acrylate (i.e. tolylene diisocyanate), a reaction product of trimethylhexamethylene diisocyanate, hexamethylene diisocyanate, and 2-hydroxyethyl (meth)acrylate, methylene bis(meth)acrylamide, (meth)acrylamide methylene ether, a multifunctional monomer such as a fused product of a polyvalent alcohol and N-methylol(meth)acrylamide, triacryl formal, and the like. These multifunctional monomers may be used alone or in combination of two or more kinds thereof.

A content of the photopolymerizable compound is preferably 1% by mass or more and 30% by mass or less, more preferably 5% by mass or more and 20% by mass or less, relative to the solid content of the energy-sensitive composition of the first aspect. With the above-specified range, there is a tendency that sensitivity, developability, and resolution are well-balanced.

As the photopolymerization initiator in the energy-sensitive composition of the first aspect, conventionally known photopolymerization initiators are usable without particular limitation.

Specific examples of the photopolymerization initiator include 1-hydroxy-cyclohexylphenylketone, 2-hydroxy-2-methyl-1-phenylpropan-1-one, 1-[4-(2-hydroxyethoxy)phenyl]-2-hydroxy-2-methyl-1-propan-1-one, 1-(4-isopropylphenyl)-2-hydroxy-2-methylpropan-1-one, 1-(4-dodecylphenyl)-2-hydroxy-2-methylpropan-1-one, 2,2-dimethoxy-1,2-diphenylethan-1-one, bis(4-dimethylaminophenyl)ketone, 2-methyl-1-[4-(methylthio)phenyl]-2-morpholinopropan-1-one, 2-benzyl-2-dimethylamino-1-(4-morpholinophenyl)-butan-1-one, ethanone,1-[9-ethyl-6-(2-methylbenzoyl)-9H-carbozol-3-yl],1-(0-acetyloxime), (9-ethyl-6-nitro-9H-carbazole-3-yl)[4-(2-methoxy-1-methylethoxy)-2-methylphenyl]methanone 0-acetyloxime ester, 2-(benzoyloxyimino)-1-[4-(phenylthio)phenyl]-1-octanone, 2,4,6-trimethylbenzoyldiphenylphosphineoxide, 4-benzoyl-4'-methyldimethylsulfide, 4-dimethylaminobenzoic acid, methyl 4-dimethylaminobenzoate, ethyl 4-dimethylaminobenzoate, butyl 4-dimethylaminobenzoate, 4-dimethylamino-2-ethylhexylbenzoic acid, 4-dimethylamino-2-isoamylbenzoic acid, benzyl-β-methoxyethylacetal, benzyldimethylketal, 1-phenyl-1,2-propanedione-2-(0-ethoxycarbonyl)oxime, methyl o-benzoylbenzoate, 2,4-diethylthioxanthone, 2-chlorothioxanthone, 2,4-dimethylthioxanthone, 1-chloro-4-propoxythioxanthone, thioxanthene, 2-chlorothioxanthene, 2,4-diethylthioxanthene, 2-methylthioxanthene, 2-isopropylthioxanthene, 2-ethylanthraquinone, octamethylanthraquinone, 1,2-benzanthraquinone, 2,3-diphenylanthraquinone, azobisisobutyronitrile, benzoyl peroxide, cumene hydroperoxide, 2-mercaptobenzimidazole, 2-mercaptobenzoxazole, 2-mercaptobenzothiazole, 2-(o-chlorophenyl)4,5-di(m-methoxyphenyl)imidazolyl dimers, benzophenone, 2-chlorobenzophenone, p,p'-bisdiethylaminobenzophenone, 4,4'-bisdiethylaminobenzophenone, 4,4'-dichlorobenzophenone, 3,3-dimethyl-4-methoxybenzophenone, benzyl, benzoin, benzoin methyl ether, benzoin ethyl ether, benzoin isopropyl ether, benzoin-n-butyl ether, benzoin isobutyl ether, benzoin butyl ether, acetophenone, 2,2-diethoxyacetophenone, p-dimethylacetophenone, p-dimethylaminopropiophenone, dichloroacetophenone, trichloroacetophenone, p-tert-butylacetophenone, p-dimethylaminoacetophenone, p-tert-butyltrichloroacetophenone, p-tert-butyldichloroacetophenone, α,α-dichloro-4-phenoxyacetophenone, thioxanthone, 2-methylthioxanthone, 2-isopropylthioxanthone, dibenzosuberone, pentyl-4-dimethylamino benzoate, 9-phenylacridine, 1,7-bis-(9-acridinyl)heptane, 1,5-bis-(9-acridinyl)pentane, 1,3-bis-(9-acridinyl)propane, p-methoxytriazine, 2,4,6-tris(trichloromethyl)-s-triazine, 2-methyl-4,6-bis(trichloromethyl)-s-triazine, 2-[2-(5-methylfuran-2-yl)ethenyl]-4,6-bis(trichloromethyl)-s-triazine, 2-[2-(furan-2-yl)ethenyl-4,6-bis(trichloromethyl)-s-triazine, 2-[2-(4-diethylamino-2-methylphenyl)ethenyl]-4,6-bis(trichloromethyl)-s-triazine, 2-[2-(3,4-dimethoxyphenyl)ethenyl]-4,6-bis(trichloromethyl)-s-triazine, 2-(4-methoxyphenyl)-4,6-bis(trichloromethyl)-s-triazine, 2-(4-ethoxystyryl)-4,6-bis(trichloromethyl)-s-triazine, 2-(4-n-butoxyphenyl)-4,6-bis(trichloromethyl)-s-triazine, 2,4-bis-trichloromethyl-6-(3-bromo-4-methoxy)phenyl-s-triazine, 2,4-bis-trichloromethyl-6-(2-bromo-4-methoxy)phenyl-s-triazine, 2,4-bis-trichloromethyl-6-(3-bromo-4-methoxy)styrylphenyl-s-triazine, 2,4-bis-trichloromethyl-6-(2-bromo-4-methoxy)styrylphenyl-s-triazine, and the like. These photopolymerization initiators may be used alone or in combination of two or more kinds thereof.

Among these, it is particularly preferable to use the oxime-based photopolymerization initiator from the viewpoint of sensitivity. Particularly preferable examples of the oxime-based photopolymerization initiators include O-acetyl-1-[6-(2-methyl benzoyl)-9-ethyl-9H-carbazole-3-yl]ethanone oxime ester, ethanone, 1-[9-ethyl-6-(pyrrole-2-yl carbonyl)-9H-carbazole-3-yl],1-(O-acetyloxime ester), and 1,2-octanedione,1-[4-(phenylthio)-, 2-(O-benzoyloxime ester)].

It is also preferred to use, as the photopolymerization initiator, an oxime ester compound represented by the following formula (c1):

[Chem. 42]

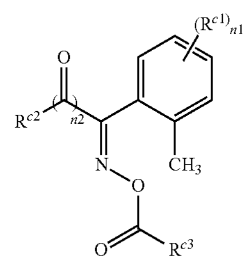

(c1)

(wherein $R^{c1}$ is a group selected from the group consisting of a monovalent organic group, an amino group, halogen, a nitro group, and a cyano group, n1 is an integer of 0 or more and 4 or less;

n2 is 0, or 1;

$R^{c2}$ is an optionally substituted phenyl group or an optionally substituted carbazolyl group, and $R^{c3}$ is a hydrogen atom, or an alkyl group having 1 or more and 6 or less carbon atoms).

In the formula (c1), $R^{c1}$ is not particularly limited as long as the object of the present invention is not inhibited, and is appropriately selected from various organic groups. When $R^{c1}$ is an organic group, suitable examples include an alkyl group, an alkoxy group, an cycloalkyl group, an cycloalkoxy group, a saturated aliphatic acyl group, a saturated aliphatic acyloxy group, an alkoxycarbonyl group, a phenyl group which may have a substituent, a phenoxy group which may have a substituent, a benzoyl group which may have a substituent, a phenoxycarbonyl group which may have a substituent, a benzoyloxy group which may have a substituent, a phenylalkyl group which may have a substituent, a naphthyl group which may have a substituent, a naphthoxy group which may have a substituent, a naphthoyl group which may have a substituent, a naphthoxycarbonyl group which may have a substituent, a naphthoyloxy group which may have a substituent, a naphthylalkyl group which may have a substituent, a heterocyclyl group which may have a substituent, an amino group, an amino group substituted with one or two organic groups, a morpholin-1-yl group, a piperazin-1-yl group, a halogen, a nitro group, a cyano group, and the like. When n1 is an integer of 2 or more and 4 or less, $R^{c1}$ may be the same or different. The number of carbon atoms of the substituent does not include the number of carbon atoms of the substituent possessed by the substituent.

When $R^{c1}$ is an alkyl group, the number of carbon atoms of the alkyl group is preferably 1 or more and 20 or less, and more preferably 1 or more and 6 or less. When Rd is an alkyl group, the alkyl group may be either one of a linear or branched alkyl group. When $R^{c1}$ is an alkyl group, specific examples include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, an isodecyl group, and the like. When $R^{c1}$ is an alkyl group, the alkyl group may contain an ether bond (—O—) in the carbon chain. Examples of the alkyl group having an ether bond in the carbon chain include a methoxyethyl group, an ethoxyethyl group, a methoxyethoxyethyl group, an ethoxyethoxyethyl group, a propyloxyethoxyethyl group, a methoxypropyl group, and the like.

When $R^{c1}$ is an alkoxy group, the number of carbon atoms of the alkoxy group is preferably 1 or more and 20 or less, and more preferably 1 or more and 6 or less. When $R^{c1}$ is an alkoxy group, the alkoxy group may be either one of a linear or branched alkoxy group. When $R^{c1}$ is an alkoxy group, specific examples include a methoxy group, an ethoxy group, an n-propyloxy group, an isopropyloxy group, an n-butyloxy group, an isobutyloxy group, a sec-butyloxy group, a tert-butyloxy group, an n-pentyloxy group, an isopentyloxy group, a sec-pentyloxy group, a tert-pentyloxy group, an n-hexyloxy group, an n-heptyloxy group, an n-octyloxy group, an isooctyloxy group, a sec-octyloxy group, a tert-octyloxy group, an n-nonyloxy group, an isononyloxy group, an n-decyloxy group, an isodecyloxy group, and the like. When $R^{c1}$ is an alkoxy group, the alkoxy group may include an ether bond (—O—) in the carbon chain. Examples of the alkoxy group having an ether bond in the carbon chain include a methoxyethoxy group, an ethoxyethoxy group, a methoxyethoxyethoxy group, an ethoxyethoxyethoxy group, a propyloxyethoxyethoxy group, a methoxypropyloxy group, and the like.

When $R^{c1}$ is a cycloalkyl group or a cycloalkoxy group, the number of carbon atoms of the cycloalkyl group or cycloalkoxy group is preferably 3 or more and 10 or less, and more preferably 3 or more and 6 or less. When $R^{c1}$ is a cycloalkyl group, specific examples include a cyclopropyl group, a cyclobutyl group, a cyclopentyl group, a cyclohexyl group, a cycloheptyl group, a cyclooctyl group, and the like. When $R^{c1}$ is a cycloalkoxy group, specific examples include a cyclopropyloxy group, a cyclobutyloxy group, a cyclopentyloxy group, a cyclohexyloxy group, a cycloheptyloxy group, a cyclooctyloxy group, and the like.

When $R^{c1}$ is a saturated aliphatic acyl group or a saturated aliphatic acyloxy group, the number of carbon atoms of the saturated aliphatic acyl group or saturated aliphatic acyloxy group is preferably 2 or more and 20 or less, and more preferably 2 or more and 7 or less. When $R^{c1}$ is a saturated aliphatic acyl group, specific examples include an acetyl group, a propanoyl group, an n-butanoyl group, a 2-methylpropanoyl group, an n-pentanoyl group, a 2,2-dimethylpropanoyl group, an n-hexanoyl group, an n-heptanoyl group, an n-octanoyl group, an n-nonanoyl group, an n-decanoyl group, an n-undecanoyl group, an n-dodecanoyl group, an n-tridecanoyl group, an n-tetradecanoyl group, an n-pentadecanoyl group, n-hexadecanoyl group, and the like. When $R^{c1}$ is a saturated aliphatic acyloxy group, specific examples include an acetyloxy group, a propanoyloxy group, an n-butanoyloxy group, a 2-methylpropanoyloxy group, an n-pentanoyloxy group, a 2,2-dimethylpropanoyloxy group, an n-hexanoyloxy group, an n-heptanoyloxy group, an n-octanoyloxy group, an n-nonanoyloxy group, an n-decanoyloxy group, an n-undecanoyloxy group, an n-dodecanoyloxy group, an n-tridecanoyloxy group, an n-tetradecanoyloxy group, an n-pentadecanoyloxy group, an n-hexadecanoyloxy group, and the like.

When $R^{c1}$ is an alkoxycarbonyl group, the number of carbon atoms of the alkoxycarbonyl group is preferably 2 or more and 20 or less, and more preferably 2 or more and 7 or less. When $R^{c1}$ is an alkoxycarbonyl group, specific examples include a methoxycarbonyl group, an ethoxycarbonyl group, an n-propyloxycarbonyl group, an isopropyloxycarbonyl group, an n-butyloxycarbonyl group, an isobutyloxycarbonyl group, a sec-butyloxycarbonyl group, a tert-butyloxycarbonyl group, an n-pentyloxycarbonyl group, an isopentyloxycarbonyl group, a sec-pentyloxycarbonyl group, a tert-pentyloxycarbonyl group, an n-hexyloxycarbonyl group, an n-heptyloxycarbonyl group, an n-octyloxycarbonyl group, an isooctyloxycarbonyl group, a sec-octyloxycarbonyl group, a tert-octyloxycarbonyl group, an n-nonyloxycarbonyl group, an isononyloxycarbonyl group, an n-decyloxycarbonyl group, an isodecyloxycarbonyl group, and the like.

When $R^{c1}$ is a phenylalkyl group, the number of carbon atoms of the phenylalkyl group is preferably 7 or more and 20 or less, and more preferably 7 or more and 10 or less. When $R^{c1}$ is a naphthylalkyl group, the number of carbon atoms of the naphthylalkyl group is preferably 11 or more and 20 or less, and more preferably 11 or more and 14 or less. When $R^{c1}$ is a phenylalkyl group, specific examples include a benzyl group, a 2-phenylethyl group, a 3-phenylpropyl group, and a 4-phenylbutyl group. When $R^{c1}$ is a naphthylalkyl group, specific examples include an α-naphthylmethyl group, a β-naphthylmethyl group, a 2-(α-naphthyl)ethyl group, and a 2-(β-naphthyl)ethyl group. When $R^{c1}$ is a phenylalkyl group or naphthylalkyl group, $R^{c1}$ may further have a substituent on a phenyl group or a naphthyl group.

When $R^{c1}$ is a heterocyclyl group, the heterocyclyl group is a 5- or 6-membered monocycle containing one or more N, S, and O, or a heterocyclyl group in which monocycles are fused with each other, or a monocycle is fused with a benzene ring. When the heterocyclyl group is a fused ring, the number of rings in the fused ring is 3 or less. Examples of the heterocycle constituting the heterocyclyl group include furan, thiophene, pyrrole, oxazole, isoxazole, triazole, thiadiazole, isothiazole, imidazole, pyrazole, triazole, pyridine, pyrazine, pyrimidine, pyridazine, benzofuran, benzothiophene, indole, isoindole, indolizine, benzimidazole, benzotriazole, benzoxazole, benzothiazole, carbazole, purine, quinoline, isoquinoline, quinazoline, phthalazine, cinnoline, quinoxaline, and the like. When $R^{c1}$ is a heterocyclyl group, the heterocyclyl group may have a substituent.

When $R^{c1}$ is an amino group substituted with one or two organic groups, suitable examples of the organic group include an alkyl group having 1 or more and 20 or less carbon atoms, a cycloalkyl group having 3 or more and 10 or less carbon atoms, a saturated aliphatic acyl group having 2 or more and 20 or less carbon atoms, a phenyl group which may have a substituent, a benzoyl group which may have a substituent, a phenylalkyl group having 7 or more and 20 or less carbon atoms which may have a substituent, a naphthyl group which may have a substituent, a naphthoyl group which may have a substituent, a naphthylalkyl group having 11 or more and 20 or less carbon atoms which may have a substituent, a heterocyclyl group, and the like. Specific examples of suitable organic group are the same as those in $R^{c1}$. Specific examples of the amino group substituted with one or two organic group include a methylamino group, an ethylamino group, a diethylamino group, an n-propylamino group, a di-n-propylamino group, an isopropylamino group, an n-butylamino group, a di-n-butylamino group, an n-pentylamino group, an n-hexylamino group, an n-heptylamino group, an n-octylamino group, an n-nonylamino group, an n-decylamino group, a phenylamino group, a naphthylamino group, an acetylamino group, an propanoylamino group, an n-butanoylamino group, an n-pentanoylamino group, an n-hexanoylamino group, an n-heptanoylamino group, an n-octanoylamino group, an n-decanoylamino group, a benzoylamino group, an α-naphthoylamino group, a β-naphthoylamino group, and the like.

When an phenyl group, an naphthyl group, and a heterocyclyl group included in $R^{c1}$ further have a substituent, examples of the substituent include an alkyl group having 1 or more and 6 or less carbon atoms, an alkoxy group having 1 or more and 6 or less carbon atoms, a saturated aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkylamino group which has an alkyl group having 1 or more and 6 or less carbon atoms, a dialkylamino group which has two alkyl groups having 1 or more and 6 or less carbon atoms, a morpholin-1-yl group, an piperazin-1-yl group, halogen, a nitro group, a cyano group, and the like. When a phenyl group, a naphthyl group, and a heterocyclyl group included in $R^{c1}$ further have a substituent, the number of substituents is not particularly limited as long as the object of the present invention is not inhibited, and is preferably 1 or more and 4 or less. When a phenyl group, a naphthyl group, and a heterocyclyl group included in $R^{c1}$ have plural substituents, plural substituents may be the same as or different each other.

Among $R^{c1}$, a group selected from the group consisting of an alkyl group having 1 or more and 6 or less carbon atoms, an alkoxy group having 1 or more and 6 or less carbon atoms, and a saturated aliphatic acyl group having 2 or more and 7 or less carbon atoms is preferred, an alkyl group having 1 or more and 6 or less carbon atoms is more preferred, and a methyl group is particularly preferable from the viewpoint of chemical stability and easiness of synthesis of an oxime ester compound with less steric hindrance.

When the position of a bond of a phenyl group and a main skeleton of an oxime ester compound is regarded as the 1-position and the position of a methyl group is regarded as the 2-position with respect to the phenyl group to which $R^{c1}$ is bonded, the position at which $R^{c1}$ is bonded to a phenyl group is preferably the 4-position or the 5-position, more preferably the 5-position. n1 is preferably an integer of 0 or more and 3 or less, more preferably an integer of 0 or more and 2 or less, and particularly preferably 0 or 1.

$R^{c2}$ is a phenyl group which may have a substituent, or a carbazolyl group which may have a substituent. When $R^{c2}$ is a carbazolyl group which may have a substituent, the nitrogen atom on the carbazolyl group may be substituted with an alkyl group having 1 or more and 6 or less carbon atoms.

For $R^{c2}$, there is no particular limitation for substituents on the phenyl group or the carbazolyl group as long as they do not interfere with the object of the present invention. Examples of suitable substituents which the phenyl group or carbazolyl group may have on the carbon atom include an alkyl group having 1 or more and 20 or less carbon atoms, an alkoxy group having 1 or more and 20 or less carbon atoms, a cycloalkyl group having 3 or more and 10 or less carbon atoms, a cycloalkoxy group having 3 or more and 10 or less carbon atoms, a saturated aliphatic acyl group having 2 or more and 20 or less carbon atoms, an alkoxycarbonyl group having 2 or more and 20 or less carbon atoms, a saturated aliphatic acyloxy group having 2 or more and 20 or less carbon atoms, an optionally substituted phenyl group, an optionally substituted phenoxy group, an optionally substituted phenylthio group, an optionally substituted benzoyl group, an optionally substituted phenoxycarbonyl group, an optionally substituted benzoyloxy group, an optionally substituted phenylalkyl group having 7 or more and 20 or less carbon atoms, an optionally substituted naphthyl group, an optionally substituted naphthoxy group, an optionally substituted naphthoyl group, an optionally substituted naphthoxycarbonyl group, an optionally substituted naphthoyloxy group, an optionally substituted naphthylalkyl group having 11 or more and 20 or less carbon atoms, an optionally substituted heterocyclyl group, an optionally substituted heterocyclylcarbonyl group, an amino group, an amino group substituted with 1 or 2 organic groups, a morpholine-1-yl group, a piperazine-1-yl group, halogen, a nitro group, a cyano group and the like.

In a case where $R^{c2}$ is a carbazolyl group, examples of suitable substituent which the carbazolyl group may have on the nitrogen atom include an alkyl group having 1 or more and 20 or less carbon atoms, a cycloalkyl group having 3 or more and 10 or less carbon atoms, a saturated aliphatic acyl group having 2 or more and 20 or less carbon atoms, an alkoxycarbonyl group having 2 or more and 20 or less carbon atoms, an optionally substituted phenyl group, an optionally substituted benzoyl group, an optionally substituted phenoxycarbonyl group, an optionally substituted phenylalkyl group having 7 or more and 20 or less carbon atoms, an optionally substituted naphthyl group, an optionally substituted naphthoyl group, an optionally substituted naphthoxycarbonyl group, an optionally substituted naphthylalkyl group having 11 or more and 20 or less carbon atoms, an optionally substituted heterocyclyl group, an optionally substituted heterocyclylcarbonyl group and the like. Among these substituents, an alkyl group having 1 or more and 20 or less carbon atoms is preferred, and an alkyl group having 1 or more and 6 or less carbon atoms is more preferred, and in particular an ethyl group is preferred.

As specific examples of optional substituents which the phenyl group or the carbazolyl group may have, an alkyl group, an alkoxy group, a cycloalkyl group, a cycloalkoxy group, a saturated aliphatic acyl group, an alkoxycarbonyl group, a saturated aliphatic acyloxy group, an optionally substituted phenylalkyl group, an optionally substituted naphthylalkyl group, an optionally substituted heterocyclyl group and an amino group substituted with 1 or 2 organic groups are same as those of $R^{c1}$.

In a case where the phenyl group, the naphthyl group and the heterocyclyl group included in the substituent on the phenyl group or the carbazolyl group in $R^{c2}$ further have a substituent, examples of the substituent include an alkyl group having 1 or more and 6 or less carbon atoms; an alkoxy group having 1 or more and 6 or less carbon atoms; a saturated aliphatic acyl group having 2 or more and 7 or less carbon atoms; an alkoxycarbonyl group having 2 or more and 7 or less carbon atoms; a saturated aliphatic acyloxy group having 2 or more and 7 or less carbon atoms; a phenyl group; a naphthyl group; a benzoyl group; a naphthoyl group; a benzoyl group substituted with a group selected from the group consisting of an alkyl group having 1 or more and 6 or less carbon atoms, a morpholine-1-yl group, a piperazine-1-yl group and a phenyl group; a monoalkylamino group having an alkyl group having 1 or more and 6 or less carbon atoms; a dialkylamino group having alkyl groups having 1 or more and 6 or less carbon atoms;

a morpholine-1-yl group; a piperazine-1-yl group; halogen; a nitro group; and a cyano group. In a case where the phenyl group, the naphthyl group and the heterocyclyl group included in the substituent on the phenyl group or the carbazolyl group further have a substituent, the number of the substituent is not limited as long as objects of the present invention are not inhibited, but 1 or more and 4 or less is preferred. In a case where the phenyl group, the naphthyl group and the heterocyclyl group have multiple substituents, the substituents may be different from or the same as each other.

Among $R^{c2}$, a group represented by the following formula (c2) or (c3) is preferable, a group represented by the following formula (c2) is more preferable, and a group represented by the following formula (c2) in which A is S is particularly preferable, since a photopolymerization initiator with excellent sensitivity is easily obtained.

[Chem. 43]

(c2)

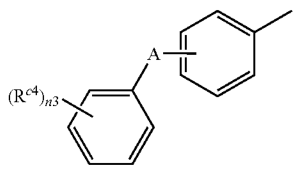

($R^{c4}$ is a group selected from the group consisting of a monovalent organic group, an amino group, halogen, a nitro group and a cyano group; A is S or O; and n3 is an integer of 0 or more and 4 or less)

[Chem. 44]

(c3)

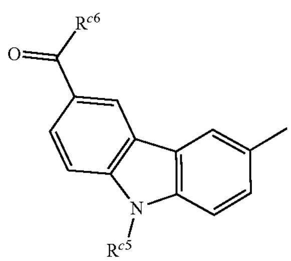

($R^{c5}$ and $R^{c6}$ each are a monovalent organic group.)

When $R^{c4}$ in formula (c2) is an organic group, $R^{c4}$ can be selected from various kinds of organic groups as long as objects of the present invention are not inhibited. Preferred examples when $R^{c4}$ is an organic group in formula (c2) include alkyl groups having 1 or more and 6 or less carbon atoms; alkoxy groups having 1 or more and 6 or less carbon atoms; saturated aliphatic acyl groups having 2 or more and 7 or less carbon atoms; alkoxycarbonyl groups having 2 or more and 7 or less carbon atoms; saturated aliphatic acyloxy groups having 2 or more and 7 or less carbon atoms; a phenyl group; a naphthyl group; a benzoyl group; a naphthoyl group; benzoyl groups substituted with a group selected from the group consisting of an alkyl group having 1 or more and 6 or less carbon atoms, a morpholine-1-yl group, a piperazine-1-yl group and a phenyl group; monoalkylamino groups having an alkyl group having 1 or more and 6 or less carbon atoms; dialkylamino groups having alkyl groups having 1 or more and 6 or less carbon atoms; a morpholine-1-yl group; a piperazine-1-yl group; halogen; a nitro group; and a cyano group.

Among $R^{c4}$, a benzoyl group; a naphthoyl group; a benzoyl groups substituted with a group selected from the group consisting of an alkyl group having 1 or more and 6 or less carbon atoms, a morpholine-1-yl group, a piperazine-1-yl group, and a phenyl group; and a nitro group are preferred, and a benzoyl group; a naphthoyl group; a 2-methylphenyl carbonyl group; a 4-(piperazine-1-yl) phenyl carbonyl group; and a 4-(phenyl) phenyl carbonyl group are more preferred.

In formula (c2), n3 is preferably an integer of 0 or more and 3 or less, more preferably an integer of 0 or more and 2 or less, and particularly preferably 0 or 1. When n3 is 1, the position at which $R^{c4}$ bonds is preferably the para-position to the bonding through which the phenyl group (to which $R^{b4}$ bonds) bonds to an oxygen atom or a sulfur atom.

$R^{c5}$ in the formula (c3) can be selected from various organic groups as long as they do not interfere with the object of the present invention. Suitable examples of $R^{c5}$ include an alkyl group having 1 or more and 20 or less carbon atoms, a cycloalkyl group having 3 or more and 10 or less carbon atoms, a saturated aliphatic acyl group having 2 or more and 20 or less carbon atoms, an alkoxycarbonyl group having 2 or more and 20 or less carbon atoms, an optionally substituted phenyl group, an optionally substituted benzoyl group, an optionally substituted phenoxycarbonyl group, an optionally substituted phenylalkyl group having 7 or more and 20 or less carbon atoms, an optionally substituted naphthyl group, an optionally substituted naphthoyl group, an optionally substituted naphthoxycarbonyl group, an optionally substituted naphthylalkyl group having 11 or more and 20 or less carbon atoms, an optionally substituted heterocyclyl group, an optionally substituted heterocyclylcarbonyl group, and the like.

Among $R^{c5}$, an alkyl group having 1 or more and 20 or less carbon atoms is preferred, an alkyl group having 1 or more and 6 or less carbon atoms is more preferred, and an ethyl group is particularly preferred.

There is no particular limitation for $R^{c6}$ in the formula (c3) as long as they do not interfere with the object of the present invention, and it can be selected from various organic groups. Specific examples of the suitable group for $R^{c6}$ include an alkyl group having 1 or more and 20 or less carbon atoms, an optionally substituted phenyl group, an optionally substituted naphthyl group and an optionally substituted heterocyclyl group. Among these groups, $R^{c6}$ is more preferably an optionally substituted phenyl group, and in particular preferably a 2-methylphenyl group.

When a phenyl group, a naphthyl group, and a heterocyclyl group included in $R^{c4}$, $R^{c5}$, or $R^{c6}$ further has a substituent, examples of the substituent include an alkyl group having 1 or more and 6 or less carbon atoms, an alkoxy group having 1 or more and 6 or less carbon atoms, a saturated aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkylamino group having an alkyl group which has 1 or more and 6 or less carbon atoms, a dialkylamino group having an alkyl group which has 1 or more and 6 or less carbon atoms, a morpholin-1-yl group, a piperazin-1-yl group, halogen, a nitro group, and a cyano group. When the phenyl group, naphthyl group, and heterocyclyl group included in $R^{c4}$, $R^{c5}$, or $R^{c6}$ further has a substituent, the number of substituents is not particularly limited as long as it does not interfere with the object of the present invention, but is preferably 1 or more and 4 or less. When the phenyl group, naphthyl group, and heterocyclyl group included in $R^{c4}$, $R^{c5}$, or $R^{c6}$ further has plural substituents, plural substituents may be the same or different.

$R^{c3}$ in the formula (c1) is a hydrogen atom, or an alkyl group having 1 or more and 6 or less carbon atoms. $R^{c3}$ is preferably a methyl group or an ethyl group, and more preferably a methyl group.

Among the oxime ester compounds represented by the formula (c1), the particularly suitable compounds include the following PI-1 to PI-42.

[Chem. 45]

PI-1

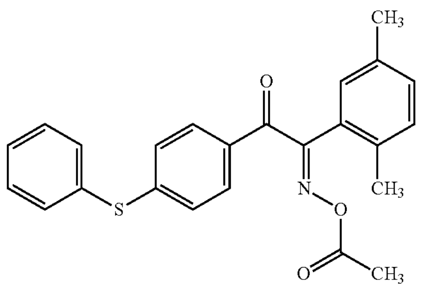

PI-2

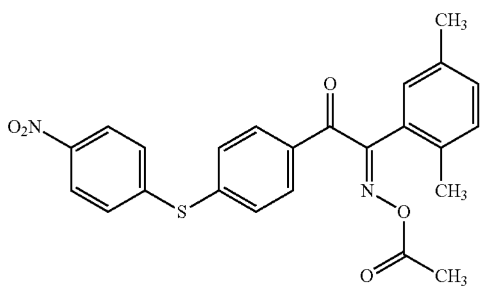

PI-3

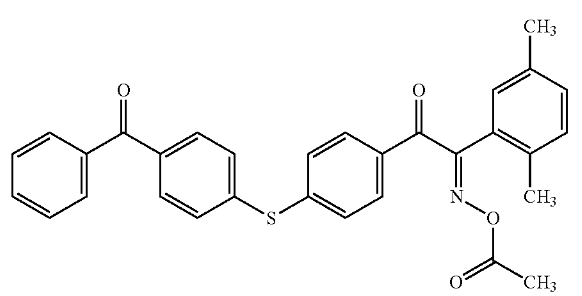

PI-4

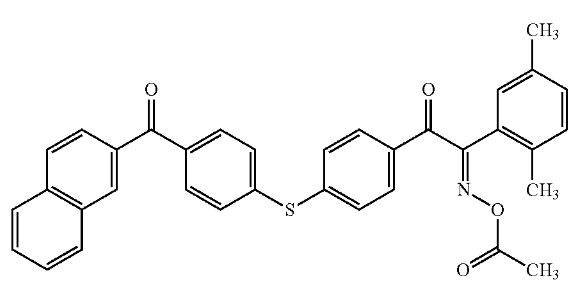

-continued

PI-5

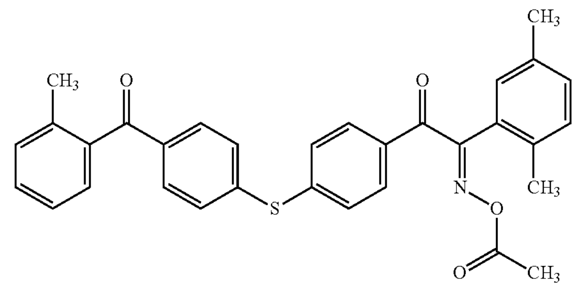

PI-6

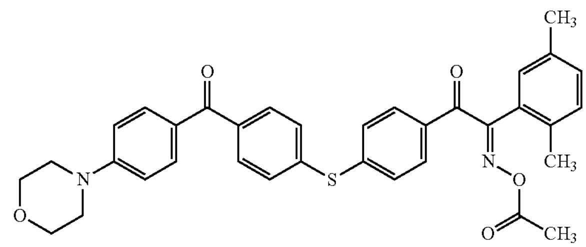

PI-7

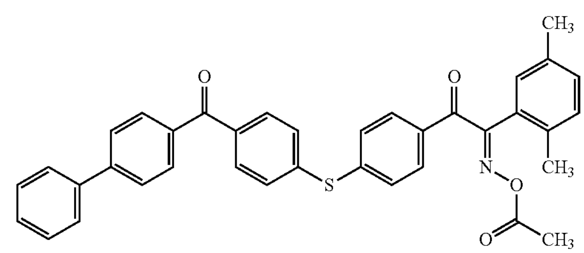

[Chem. 46]

PI-8

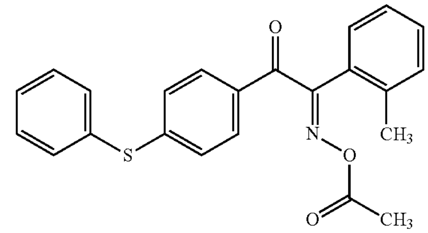

PI-9

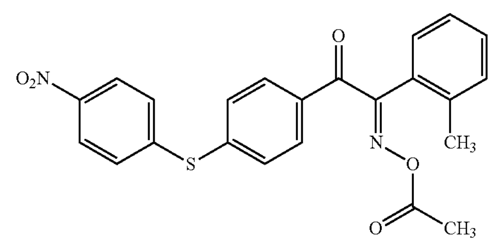

PI-10

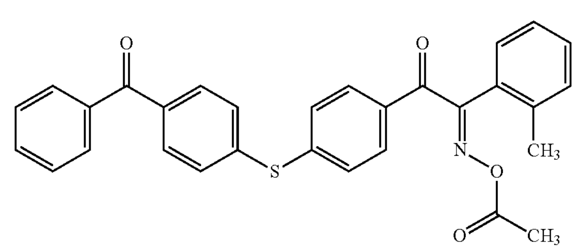

-continued
PI-11
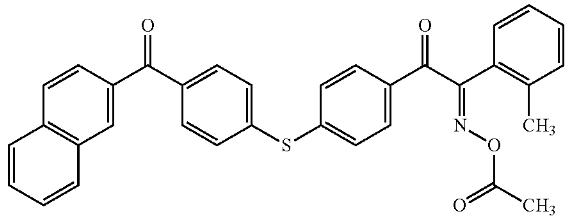
PI-12
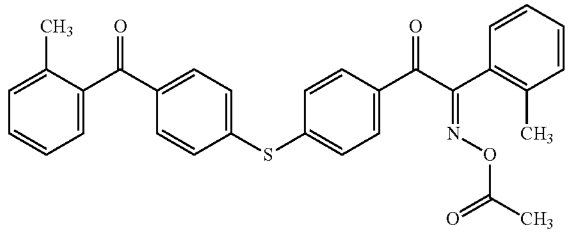
PI-13
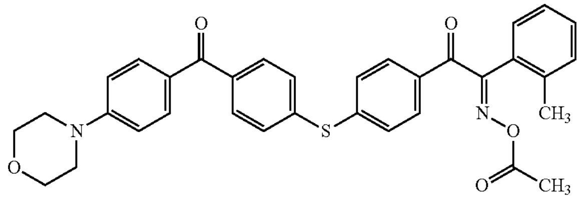
PI-14
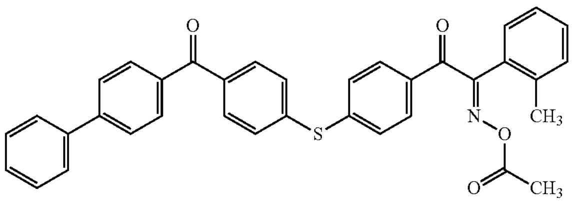
[Chem. 47]
PI-15
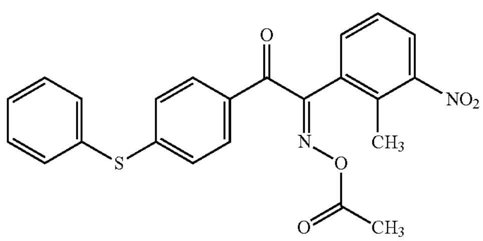
PI-16
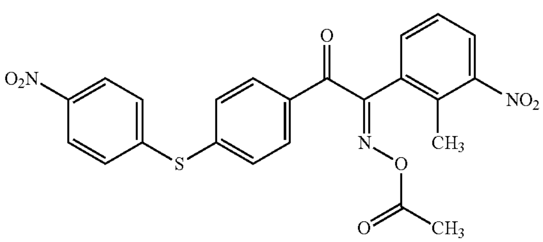
-continued
PI-17
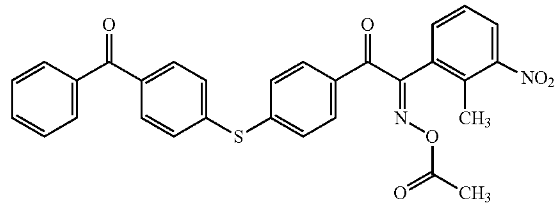
PI-18
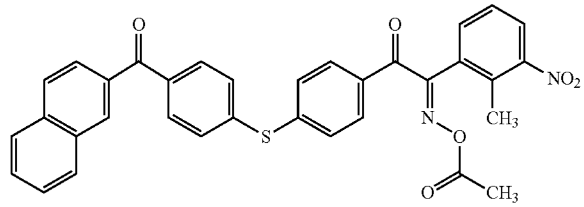
PI-19
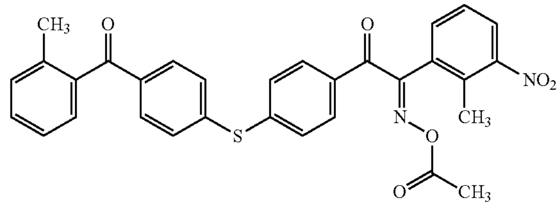
PI-20
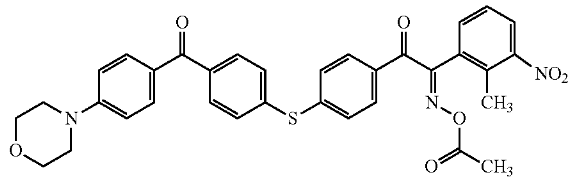
PI-21
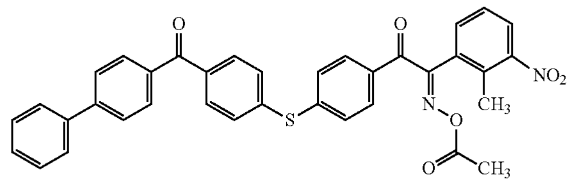
[Chem. 48]
PI-22
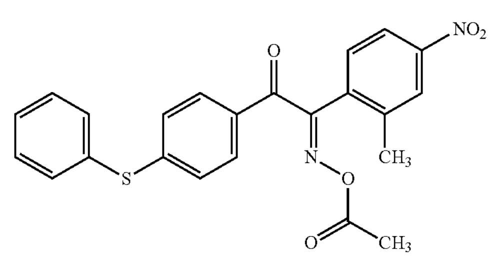

-continued
PI-23
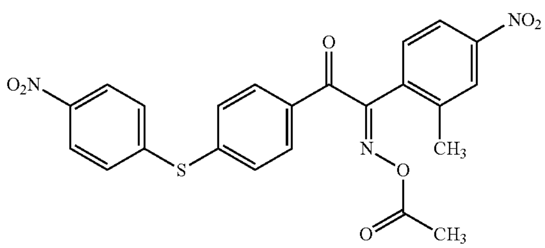
PI-24
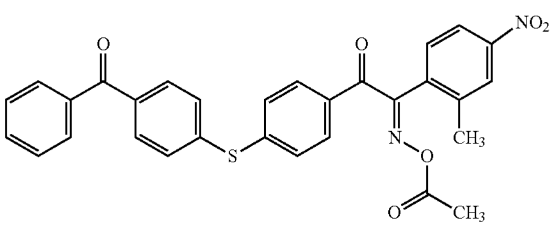
PI-25
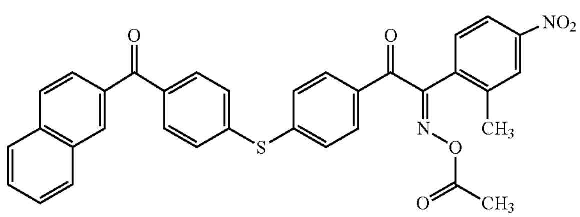
PI-26
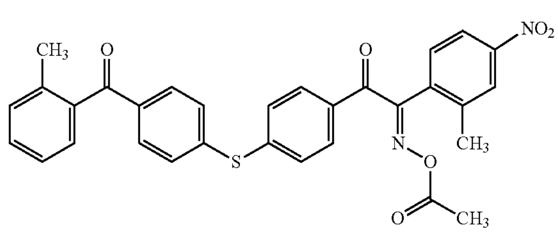
PI-27
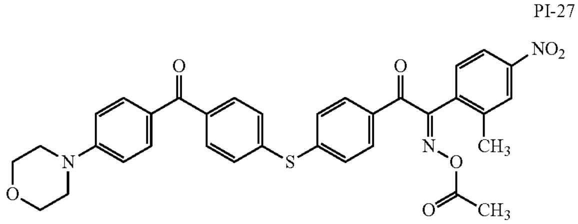
PI-28
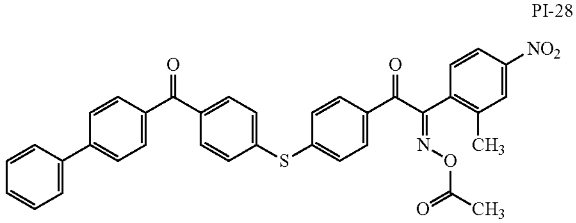
-continued
[Chem. 49]
PI-29
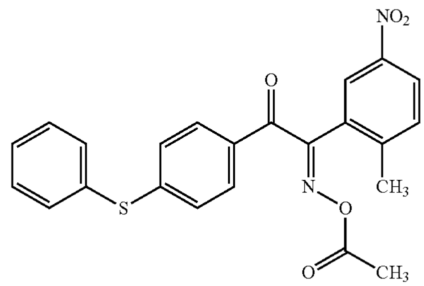
PI-30
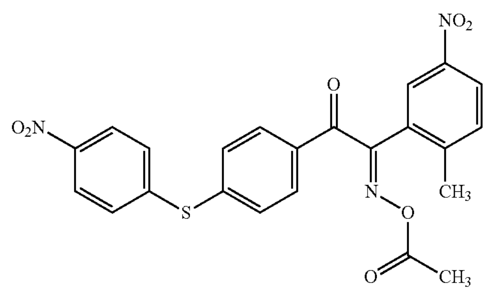
PI-31
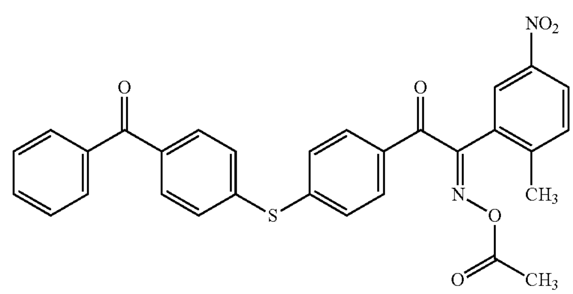
PI-32
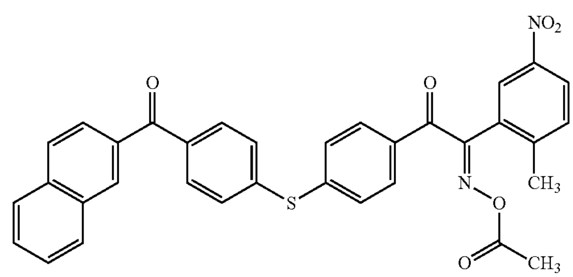
PI-33
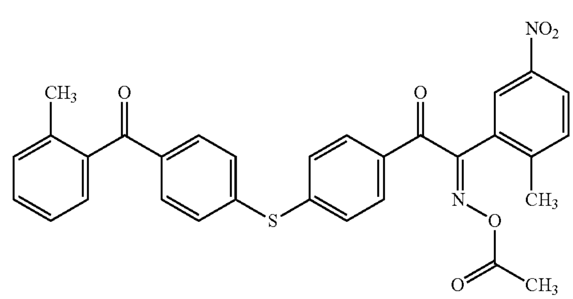

-continued

PI-34

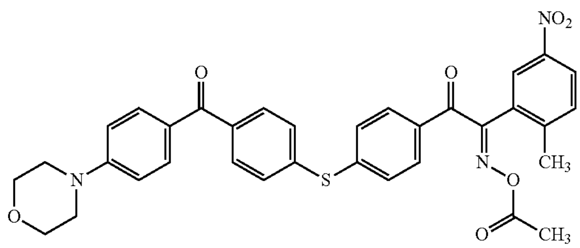

PI-35

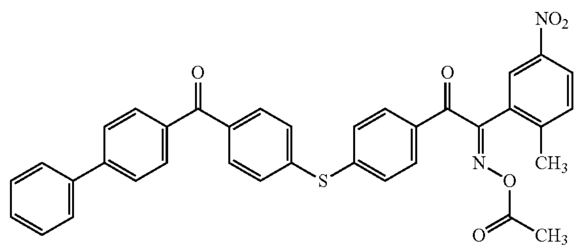

[Chem. 50]

PI-36

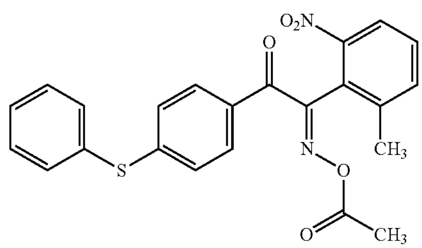

PI-37

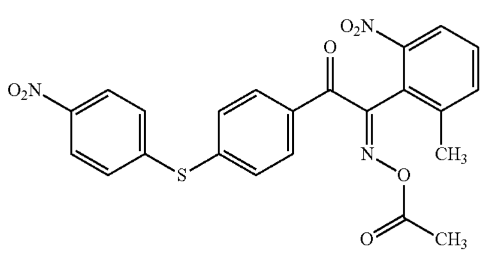

PI-38

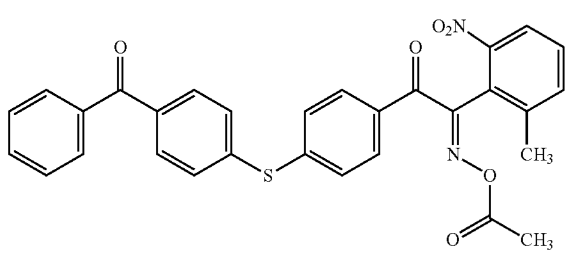

PI-39

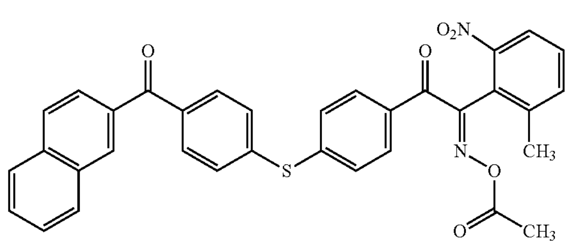

-continued

PI-40

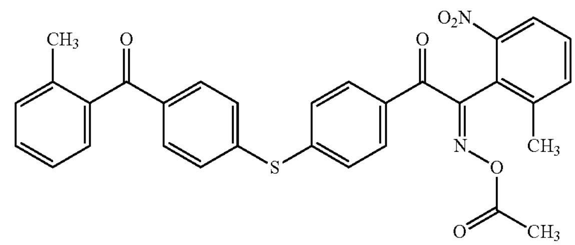

PI-41

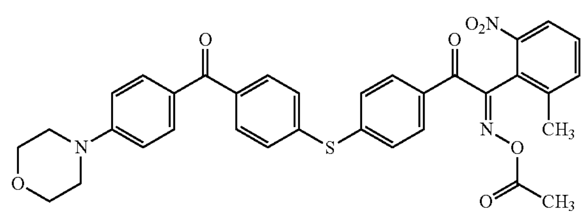

PI-42

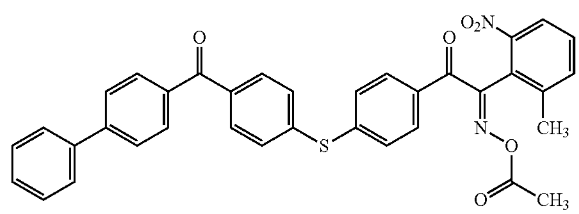

Also preferable as a photopolymerization initiator is an oxime ester compound represented by the following formula (c4).

[Chem. 51]

(c4)

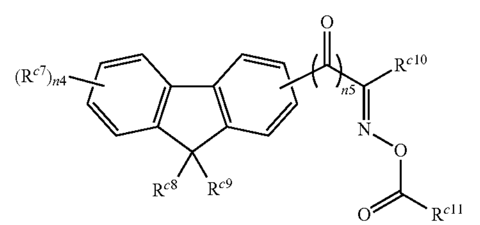

($R^{c7}$ is a hydrogen atom, a nitro group, or a monovalent organic group, $R^{c8}$ and $R^{c9}$ each represent an optionally substituted chain alkyl group, an optionally substituted cyclic organic group, or a hydrogen atom, $R^{c8}$ and $R^{c9}$ may be bonded to one another to form a ring, $R^{c10}$ is a monovalent organic group, $R^{c11}$ is a hydrogen atom, an optionally substituted alkyl group having 1 or more and 11 or less carbon atoms, or an optionally substituted aryl group, n4 is an integer of 0 or more and 4 or less, and n5 is 0 or 1.)

An oxime compound for producing an oxime ester compound of the formula (c4) is suitably a compound represented by the following formula (c5).

[Chem. 52]

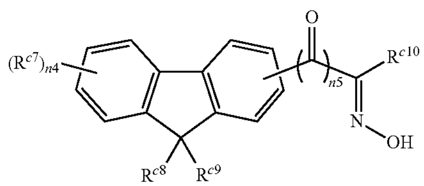

(c5)

($R^{c7}$, $R^{c8}$, $R^{c9}$, $R^{c10}$, n4, and n5 are the same as defined in the formula (c4).)

In the formulas (c4) and (c5), $R^{c7}$ is a hydrogen atom, a nitro group, or a monovalent organic group. $R^{c7}$ is bonded to a 6-membered aromatic ring which is different from the 6-membered aromatic ring bonded to a group represented as —$(CO)_{n5}$— on a fluorene ring in the formula (c4). In the formula (c4), the bond position of $R^{c7}$ to a fluorene ring is not particularly limited. When a compound represented by the formula (c4) has 1 or more $R^{c7}$(s), one of the one or more $R^{c7}$(s) is preferably bonded at the 2-position in the fluorene ring since the synthesis of the compound represented by the formula (c4) becomes easy. When plural $R^{c7}$s exist, the plural $R^{c7}$s may be the same or different.

When $R^{c7}$ is an organic group, $R^{c7}$ is not particularly limited as long as it does not interfere with the object of the present invention, and is appropriately selected from various organic groups. When $R^{c7}$ is an organic group, suitable examples include an alkyl group, an alkoxy group, a cycloalkyl group, a cycloalkoxy group, a saturated aliphatic acyl group, a saturated aliphatic acyloxy group, an alkoxycarbonyl group, an optionally substituted phenyl group, an optionally substituted phenoxy group, an optionally substituted benzoyl group, an optionally substituted phenoxycarbonyl group, an optionally substituted benzoyloxy group, an optionally substituted phenylalkyl group, an optionally substituted naphthyl group, an optionally substituted naphthoxy group, an optionally substituted naphthoyl group, an optionally substituted naphthoxycarbonyl group, an optionally substituted naphthoyloxy group, an optionally substituted naphthylalkyl group, an optionally substituted heterocyclyl group, an optionally substituted heterocyclylcarbonyl group, an amino group substituted with one or two organic groups, a morpholin-1-yl group, and a piperazin-1-yl group.

When $R^{c7}$ is an alkyl group, the number of carbon atoms of the alkyl group is preferably 1 or more and 20 or less, and more preferably 1 or more and 6 or less. When $R^{c7}$ is an alkyl group, the alkyl group may be either one of a linear or branched alkyl group. When $R^{c7}$ is an alkyl group, specific examples include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, an isodecyl group, and the like. When $R^{c7}$ is an alkyl group, the alkyl group may contain an ether bond (—O—) in the carbon chain. Examples of the alkyl group having an ether bond in the carbon chain include a methoxyethyl group, an ethoxyethyl group, a methoxyethoxyethyl group, an ethoxyethoxyethyl group, a propyloxyethoxyethyl group, a methoxypropyl group, and the like.

When $R^{c7}$ is an alkoxy group, the number of carbon atoms of the alkoxy group is preferably 1 or more and 20 or less, and more preferably 1 or more and 6 or less. When $R^{c7}$ is an alkoxy group, the alkoxy group may be a linear or branched group. When $R^{c7}$ is an alkoxy group, specific examples thereof include a methoxy group, an ethoxy group, an n-propyloxy group, an isopropyloxy group, an n-butyloxy group, an isobutyloxy group, a sec-butyloxy group, a tert-butyloxy group, an n-pentyloxy group, an isopentyloxy group, a sec-pentyloxy group, a tert-pentyloxy group, an n-hexyloxy group, an n-heptyloxy group, an n-octyloxy group, an isooctyloxy group, a sec-octyloxy group, a tert-octyloxy group, an n-nonyloxy group, an isononyloxy group, an n-decyloxy group, an isodecyloxy group, and the like. When $R^{c7}$ is an alkoxy group, the alkoxy group may contain an ether bond (—O—) in the carbon chain. Examples of the alkoxy group having an ether bond in the carbon chain include a methoxyethoxy group, an ethoxyethoxy group, a methoxyethoxyethoxy group, an ethoxyethoxyethoxy group, a propyloxyethoxyethoxy group, a methoxypropyloxy group, and the like.

When $R^{c7}$ is a cycloalkyl group or a cycloalkoxy group, the number of carbon atoms of the cycloalkyl group or cycloalkoxy group is preferably 3 or more and 10 or less, and more preferably 3 or more and 6 or less. When $R^{c7}$ is a cycloalkyl group, specific examples thereof include a cyclopropyl group, a cyclobutyl group, a cyclopentyl group, a cyclohexyl group, a cycloheptyl group, a cyclooctyl group, and the like. When $R^{c7}$ is a cycloalkoxy group, specific examples thereof include a cyclopropyloxy group, a cyclobutyloxy group, a cyclopentyloxy group, a cyclohexyloxy group, a cycloheptyloxy group, a cyclooctyloxy group, and the like.

When $R^{c7}$ is a saturated aliphatic acyl group or a saturated aliphatic acyloxy group, the number of carbon atoms of the saturated aliphatic acyl group or saturated aliphatic acyloxy group is preferably 2 or more and 21 or less, and more preferably 2 or more and 7 or less. When $R^{c7}$ is a saturated aliphatic acyl group, specific examples thereof include an acetyl group, a propanoyl group, an n-butanoyl group, a 2-methylpropanoyl group, an n-pentanoyl group, a 2,2-dimethylpropanoyl group, an n-hexanoyl group, an n-heptanoyl group, an n-octanoyl group, an n-nonanoyl group, an n-decanoyl group, an n-undecanoyl group, an n-dodecanoyl group, an n-tridecanoyl group, an n-tetradecanoyl group, an n-pentadecanoyl group, an n-hexadecanoyl group, and the like. When $R^{c7}$ is a saturated aliphatic acyloxy group, specific examples thereof include an acetyloxy group, a propanoyloxy group, an n-butanoyloxy group, a 2-methylpropanoyloxy group, an n-pentanoyloxy group, a 2,2-dimethylpropanoyloxy group, an n-hexanoyloxy group, an n-heptanoyloxy group, an n-octanoyloxy group, an n-nonanoyloxy group, an n-decanoyloxy group, an n-undecanoyloxy group, an n-dodecanoyloxy group, an n-tridecanoyloxy group, an n-tetradecanoyloxy group, an n-pentadecanoyloxy group, an n-hexadecanoyloxy group, and the like.

When $R^{c7}$ is an alkoxycarbonyl group, the number of carbon atoms of the alkoxycarbonyl group is preferably 2 or more and 20 or less, and preferably 2 or more and 7 or less. When $R^{c7}$ is an alkoxycarbonyl group, specific examples thereof include a methoxycarbonyl group, an ethoxycarbonyl group, an n-propyloxycarbonyl group, an isopropyloxycarbonyl group, an n-butyloxycarbonyl group, an isobutyloxycarbonyl group, a sec-butyloxycarbonyl group, a tert-butyloxycarbonyl group, an n-pentyloxycarbonyl group, an isopentyloxycarbonyl group, a sec-pentyloxycarbonyl group, a tert-pentyloxycarbonyl group, an n-hexyloxycarbonyl group, an n-heptyloxycarbonyl group, an n-octyloxycarbonyl group, an isooctyloxycarbonyl group, a sec-octyloxycarbonyl group, a tert-octyloxycarbonyl group, an n-nonyloxycarbonyl group, an isononyloxycarbonyl group, an n-decyloxycarbonyl group, an isodecyloxycarbonyl group, and the like.

When $R^{c7}$ is a phenylalkyl group, the number of carbon atoms of the phenylalkyl group is preferably 7 or more and 20 or less, and more preferably 7 or more and 10 or less. When $R^{c7}$ is a naphthylalkyl group, the number of carbon atoms of the naphthylalkyl group is preferably 11 or more and 20 or less, and more preferably 11 or more and 14 or less. When $R^{c7}$ is a phenylalkyl group, specific examples thereof include a benzyl group, a 2-phenylethyl group, a 3-phenylpropyl group, and a 4-phenylbutyl group. When $R^{c7}$ is a naphthylalkyl group, specific examples thereof include an α-naphthylmethyl group, a β-naphthylmethyl group, a 2-(α-naphthyl)ethyl group, and a 2-(β-naphthyl)ethyl group. When $R^{c7}$ is a phenylalkyl group or a naphthylalkyl group, $R^{c7}$ may further have a substituent on a phenyl group or a naphthyl group.

When $R^{c7}$ is a heterocyclyl group, the heterocyclyl group is a 5- or 6-membered monocycle containing one or more N, S, and O, or a heterocyclyl group in which these monocycles are fused each other, or the monocycle is fused with a benzene ring. When the heterocyclyl group is a fused ring, the number of fused rings is 3 or less. The heterocyclyl group may be any one of an aromatic group (heteroaryl group) and a non-aromatic group. Examples of the heterocycle constituting the heterocyclyl group include furan, thiophene, pyrrole, oxazole, isoxazole, thiazole, thiadiazole, isothiazole, imidazole, pyrazole, triazole, pyridine, pyrazine, pyrimidine, pyridazine, benzofuran, benzothiophene, indole, isoindole, indolizine, benzimidazole, benzotriazole, benzoxazole, benzothiazole, carbazole, purine, quinoline, isoquinoline, quinazoline, phthalazine, cinnoline, quinoxaline, piperidine, piperazine, morpholine, piperidine, tetrahydropyran, tetrahydrofuran, and the like. When $R^{c7}$ is a heterocyclyl group, the heterocyclyl group may further have a substituent.

When $R^{c7}$ is a heterocyclylcarbonyl group, a heterocyclyl group included in the heterocyclylcarbonyl group is the same as that in the case where $R^{c7}$ is a heterocyclyl group.

When $R^{c7}$ is an amino group substituted with one or two organic group(s), suitable examples of the organic group(s) include an alkyl group having 1 or more and 20 or less carbon atoms, a cycloalkyl group having 3 or more and 10 or less carbon atoms, a saturated aliphatic acyl group having 2 or more and 21 or less carbon atoms, an optionally substituted phenyl group, an optionally substituted benzoyl group, an optionally substituted phenylalkyl group having 7 or more and 20 or less carbon atoms, an optionally substituted naphthyl group, an optionally substituted naphthoyl group, an optionally substituted naphthylalkyl group having 11 or more 20 or less carbon atoms, a heterocyclyl group, and the like. The specific examples of these suitable organic groups are the same as those of $R^{c7}$. Specific examples of the amino group substituted with one or two organic groups include a methylamino group, an ethylamino group, a diethylamino group, an n-propylamino group, a di-n-propylamino group, an isopropylamino group, an n-butylamino group, a di-n-butylamino group, an n-pentylamino group, an n-hexylamino group, an n-heptylamino group, an n-octylamino group, an n-nonylamino group, an n-decylamino group, a phenylamino group, a naphthylamino group, an acetylamino group, a propanoylamino group, an n-butanoylamino group, an n-pentanoylamino group, an n-hexanoylamino group, an n-heptanoylamino group, an n-octanoylamino group, an n-decanoylamino group, an benzoylamino group, an α-naphthoylamino group, a β-naphthoylamino group, and the like.

When the phenyl group, the naphthyl group, and the heterocyclyl group included in $R^{c7}$ further have a substituent, examples thereof include an alkyl group having 1 or more and 6 or less carbon atoms, an alkoxy group having 1 or more and 6 or less carbon atoms, a saturated aliphatic acyl group having 2 or more and 7 or less carbon atoms, an alkoxycarbonyl group having 2 or more and 7 or less carbon atoms, a saturated aliphatic acyloxy group having 2 or more and 7 or less carbon atoms, a monoalkylamino group having an alkyl group which has 1 or more and 6 or less carbon atoms, a dialkylamino group having an alkyl group which has 1 or more and 6 or less carbon atoms, a morpholin-1-yl group, a piperazin-1-yl group, halogen, a nitro group, a cyano group, and the like. When a phenyl group, a naphthyl group, and a heterocyclyl group included in $R^{c7}$ further have substituents, the number of substituents is not particularly limited as long as it does not interfere with the object of the present invention, but is preferably 1 or more 4 or less. When a phenyl group, a naphthyl group, and a heterocyclyl group included in $R^{c7}$ have plural substituents, the plural substituents may be the same or different.

Among the above-described groups, $R^{c7}$ is preferably a nitro group or a group represented as $R^{c12}$—CO— since the sensitivity tends to be enhanced. $R^{c12}$ is not particularly limited as long as it does not interfere with the object of the present invention, and can be selected from various organic groups. Examples of the group suitable as $R^{c12}$ include an alkyl group having 1 or more and 20 or less carbon atoms, an optionally substituted phenyl group, an optionally substituted naphthyl group, and an optionally substituted heterocyclyl group. Among these groups, $R^{c12}$ is particularly preferably a 2-methylphenyl group, a thiophen-2-yl group, and an α-naphthyl group. Moreover, it is preferred that $R^{c7}$ is a hydrogen atom since the transparency tends to be satisfactory. Note here that when $R^{c7}$ is a hydrogen atom and $R^{c10}$ is a group represented by the formula (c4a) or (cob) mentioned later, the transparency tends to be even more satisfactory.

In the formula (c4), $R^{c8}$ and $R^{c9}$ each represent an optionally substituted chain alkyl group, an optionally substituted cyclic organic group, or a hydrogen atom. $R^{c8}$ and $R^{c9}$ may be bonded to one another to form a ring. Among these groups, preferably, $R^{c8}$ and $R^{c9}$ are optionally substituted chain alkyl groups. When $R^{c8}$ and $R^{c9}$ are optionally substituted chain alkyl groups, a chain alkyl group may be either a linear alkyl group or a branched alkyl group.

When $R^{c8}$ and $R^{c9}$ are chain alkyl groups having no substituent, the number of carbon atoms of the chain alkyl group is preferably 1 or more and 20 or less, more preferably 1 or more and 10 or less, and particularly preferably 1 or more and 6 or less. When $R^{c8}$ and $R^{c9}$ are chain alkyl groups, specific examples thereof include a methyl group, an ethyl group, an n-propyl group, an isopropyl group, an n-butyl group, an isobutyl group, a sec-butyl group, a tert-butyl group, an n-pentyl group, an isopentyl group, a sec-pentyl group, a tert-pentyl group, an n-hexyl group, an n-heptyl group, an n-octyl group, an isooctyl group, a sec-octyl group, a tert-octyl group, an n-nonyl group, an isononyl group, an n-decyl group, an isodecyl group, and the like. When $R^{c8}$ and $R^{c9}$ are alkyl groups, the alkyl group may have an ether bond (—O—) in a carbon chain. Examples of the alkyl group having an ether bond in a carbon chain include a methoxyethyl group, an ethoxyethyl group, a methoxyethoxyethyl group, an ethoxyethoxyethyl group, a propyloxyethoxyethyl group, and a methoxypropyl group, and the like.

When $R^{c8}$ and $R^{c9}$ are chain alkyl groups having a substituent, the number of carbon atoms of the chain alkyl group is preferably 1 or more and 20 or less, more preferably 1 or more and 10 or less, and particularly preferably 1 or more and 6 or less. In this case, the number of carbon atoms of the substituent is not included in the number of carbon atoms of the chain alkyl group. The chain alkyl group having a substituent is preferably a linear-chain group. The substituent, which the alkyl group may have, is not particularly limited as long as it does not interfere with the object of the present invention. Suitable examples of the substituent include a cyano group, a halogen atom, a cyclic organic group, and an alkoxycarbonyl group. Examples of the halogen atom include a fluorine atom, a chlorine atom, a bromine atom, and an iodine atom. Among these, a fluorine atom, a chlorine atom, and a bromine atom are preferable. Examples of the cyclic organic group include a cycloalkyl group, an aromatic hydrocarbon group, and a heterocyclyl group. Specific examples of the cycloalkyl group are the same as suitable examples in a case where $R^{c7}$ is a cycloalkyl group. Specific examples of the aromatic hydrocarbon group include a phenyl group, a naphthyl group, a biphenylyl group, an anthryl group, a phenanthryl group, and the like. Specific examples of the heterocyclyl group are the same as suitable examples in a case where $R^{c7}$ is a heterocyclyl group. When $R^{c7}$ is an alkoxycarbonyl group, an alkoxy group included in the alkoxycarbonyl group may be either a linear or branched group, and preferably a linear chain. The number of carbon atoms of an alkoxy group included in the alkoxycarbonyl group is preferably 1 or more and 10 or less, and more preferably 1 or more and 6 or less.

When the chain alkyl group has a substituent, the number of substituents is not particularly limited. The number of substituents preferably varies depending on the number of carbon atoms of the chain alkyl group. The number of substituents is typically 1 or more and 20 or less, preferably 1 or more and 10 or less, and more preferably 1 or more and 6 or less.

When $R^{c8}$ and $R^{c9}$ are cyclic organic groups, the cyclic organic group may be either an alicyclic group or an aromatic group. Examples of the cyclic organic group include an aliphatic cyclic hydrocarbon group, an aromatic hydrocarbon group, and a heterocyclyl group. When $R^{c8}$ and $R^{c9}$ are cyclic organic groups, the substituent, which the cyclic organic group may have, is the same as in a case where $R^{c8}$ and $R^{c9}$ are chain alkyl groups.

When $R^{c8}$ and $R^{c9}$ are aromatic hydrocarbon groups, the aromatic hydrocarbon group is preferably a phenyl group, or a group formed by bonding plural benzene rings through a carbon-carbon bond, or a group formed by fusion of plural benzene rings. When the aromatic hydrocarbon group is a phenyl group, or a group formed by bonding or fusing plural benzene rings, the number of rings of a benzene ring included in the aromatic hydrocarbon group is not particularly limited, and is preferably 3 or less, more preferably 2 or less, and particularly preferably 1. Preferred specific examples of the aromatic hydrocarbon group include a phenyl group, a naphthyl group, a biphenylyl group, an anthryl group, a phenanthryl group, and the like.

When $R^{c8}$ and $R^{c9}$ are aliphatic cyclic hydrocarbon groups, the aliphatic cyclic hydrocarbon group may be either a monocyclic or polycyclic group. The number of carbon atoms of the aliphatic cyclic hydrocarbon group is not particularly limited, and is preferably 3 or more 20 or less, and more preferably 3 or more and 10 or less. Examples of the monocyclic cyclic hydrocarbon group include cyclopropyl group, a cyclobutyl group, a cyclopentyl group, a cyclohexyl group, a cycloheptyl group, a cyclooctyl group, a norbornyl group, an isobornyl group, a tricyclononyl group, a tricyclodecyl group, a tetracyclododecyl group, an adamantyl group, and the like.

When $R^{c8}$ and $R^{c9}$ are heterocyclyl groups, the heterocyclyl group is a 5-membered or 6-membered monocycle containing one or more N, S, and O, or a heterocyclyl group in which these monocycles are fused, or the monocycle and a benzene ring are fused. When the heterocyclyl group is a fused ring, the number of rings is 3 or less. The heterocyclyl group may be either an aromatic group (heteroaryl group) or a non-aromatic group. Examples of the heterocycle constituting the heterocyclic group include furan, thiophene, pyrrole, oxazole, isoxazole, triazole, thiadiazole, isothiazole, imidazole, pyrazole, triazole, pyridine, pyrazine, pyrimidine, pyridazine, benzofuran, benzothiophene, indole, isoindole, indolizine, benzimidazole, benzotriazole, benzoxazole, benzothiazole, carbazole, purine, quinoline, isoquinoline, quinazoline, phthalazine, cinnoline, quinoxaline, piperidine, piperazine, morpholine, piperidine, tetrahydropyran, tetrahydrofuran, and the like.

$R^{c8}$ and $R^{c9}$ may be bonded to one another to form a ring. The group composed of the ring formed by $R^{c8}$ and $R^{c9}$ is preferably a cycloalkylidene group. When $R^{c8}$ and $R^{c9}$ are bonded to form a cycloalkylidene group, the ring constituting the cycloalkylidene group is preferably a 5- to 6-membered ring, and more preferably a 5-membered ring.

When the group formed by bonding $R^{c8}$ and $R^{c9}$ is a cycloalkylidene group, the cycloalkylidene group may be fused with one or more other rings. Examples of the ring which may be fused with the cycloalkylidene group include a benzene ring, a naphthalene ring, a cyclobutane ring, a cyclopentane ring, a cyclohexane ring, a cycloheptane ring, a cyclooctane ring, a furan ring, a thiophene ring, a pyrrole ring, a pyridine ring, a pyrazine ring, a pyrimidine ring, and the like.

Examples of suitable group among $R^{c8}$ and $R^{c9}$ descried above include a group represented by the formula: $-A^1-A^2$. In the formula, $A^1$ is a linear chain alkylene group, and $A^2$ is an alkoxy group, a cyano group, a halogen atom, a halogenated alkyl group, a cyclic organic group, or an alkoxycarbonyl group.

The number of carbon atoms of the linear alkylene group for $A^1$ is preferably 1 or more and 10 or less, and more preferably 1 or more and 6 or less. When $A^2$ is an alkoxy group, the alkoxy group may be any one of linear and branched alkoxy groups, and preferably a linear chain. The number of carbon atoms of the alkoxy group is preferably 1 or more and 10 or less, and more preferably 1 or more and 6 or less. When $A^2$ is a halogen atom, a fluorine atom, a chlorine atom, a bromine atom, or an iodine atom is preferable, and a fluorine atom, a chlorine atom, or a bromine atom is more preferable. When $A^2$ is a halogenated alkyl group, a halogen atom included in the halogenated alkyl group is preferably a fluorine atom, a chlorine atom, a bromine atom, or an iodine atom, and more preferably is a fluorine atom, a chlorine atom, or a bromine atom. The halogenated alkyl group may be linear or branched, and a linear chain is preferable. When $A^2$ is a cyclic organic group, examples of the cyclic organic group are the same as the cyclic organic group possessed by $R^{c8}$ and $R^{c9}$ as the substituent. When $A^2$ is an alkoxycarbonyl group, examples of the alkoxycarbonyl group are the same as the alkoxycarbonyl group possessed by $R^{c8}$ and $R^{c9}$ as the substituent.

Suitable specific examples of $R^{c8}$ and $R^{c9}$ include alkyl groups such as an ethyl group, an n-propyl group, an n-butyl group, an n-hexyl group, an n-heptyl group, and an n-octyl group; alkoxyalkyl groups such as a 2-methoxyethyl group, a 3-methoxy-n-propyl group, a 4-methoxy-n-butyl group, a 5-methoxy-n-pentyl group, a 6-methoxy-n-hexyl group, a 7-methoxy-n-heptyl group, an 8-methoxy-n-octyl group, a 2-ethoxyethyl group, a 3-ethoxy-n-propyl group, a 4-ethoxy-n-butyl group, a 5-ethoxy-n-pentyl group, a 6-ethoxy-n-hexyl group, a 7-ethoxy-n-heptyl group, and an 8-ethoxy-n-octyl group; cyanoalkyl groups such as a 2-cyanoethyl group, a 3-cyano-n-propyl group, a 4-cyano-n-butyl group, a 5-cyano-n-pentyl group, a 6-cyano-n-hexyl group, a 7-cyano-n-heptyl group, and an 8-cyano-n-octyl group; phenylalkyl groups such as a 2-phenylethyl group, a 3-phenyl-n-propyl group, a 4-phenyl-n-butyl group, a 5-phenyl-n-pentyl group, a 6-phenyl-n-hexyl group, a 7-phenyl-n-heptyl group, and an 8-phenyl-n-octyl group; cycloalkylalkyl groups such as a 2-cyclohexylethyl group, a 3-cyclohexyl-n-propyl group, a 4-cyclohexyl-n-butyl group, a 5-cyclohexyl-n-pentyl group, a 6-cyclohexyl-n-hexyl group, a 7-cyclohexyl-n-heptyl group, an 8-cyclohexyl-n-octyl group, a 2-cyclopentylethyl group, a 3-cyclopentyl-n-propyl group, a 4-cyclopentyl-n-butyl group, a 5-cyclopentyl-n-pentyl group, a 6-cyclopentyl-n-hexyl group, a 7-cyclopentyl-n-heptyl group, and an 8-cyclopentyl-n-octyl group; alkoxycarbonylalkyl groups such as a 2-methoxycarbonylethyl group, a 3-methoxycarbonyl-n-propyl group, a 4-methoxycarbonyl-n-butyl group, a 5-methoxycarbonyl-n-pentyl group, a 6-methoxycarbonyl-n-hexyl group, a 7-methoxycarbonyl-n-heptyl group, an 8-methoxycarbonyl-n-octyl group, a 2-ethoxycarbonylethyl group, a 3-ethoxycarbonyl-n-propyl group, a 4-ethoxycarbonyl-n-butyl group, a 5-ethoxycarbonyl-n-pentyl group, a 6-ethoxycarbonyl-n-hexyl group, a 7-ethoxycarbonyl-n-heptyl group, and an 8-ethoxycarbonyl-n-octyl group; and halogenated alkyl groups such as a 2-chloroethyl group, a 3-chloro-n-propyl group, a 4-chloro-n-butyl group, a 5-chloro-n-pentyl group, a 6-chloro-n-hexyl group, a 7-chloro-n-heptyl group, an 8-chloro-n-octyl group, a 2-bromoethyl group, a 3-bromo-n-propyl group, a 4-bromo-n-butyl group, a 5-bromo-n-pentyl group, a 6-bromo-n-hexyl group, a 7-bromo-n-heptyl group, an 8-bromo-n-octyl group, a 3,3,3-trifluoropropyl group, and a 3,3,4,4,5,5,5-heptafluoro-n-pentyl group.

Among groups mentioned above, groups suitable as $R^{c8}$ and $R^{c9}$ are an ethyl group, an n-propyl group, an n-butyl group, an n-pentyl group, a 2-methoxyethyl group, a 2-cyanoethyl group, a 2-phenylethyl group, a 2-cyclohexylethyl group, a 2-methoxycarbonylethyl group, a 2-chloroethyl group, a 2-bromoethyl group, a 3,3,3-trifluoropropyl group, and a 3,3,4,4,5,5,5-heptafluoro-n-pentyl group.

In the same manner as $R^{c7}$, examples of suitable organic group for $R^{c10}$ include an alkyl group, an alkoxy group, a cycloalkyl group, a cycloalkoxy group, a saturated aliphatic acyl group, an alkoxycarbonyl group, a saturated aliphatic acyloxy group, a phenyl group which may have a substituent, a phenoxy group which may have a substituent, a benzoyl group which may have a substituent, a phenoxycarbonyl group which may have a substituent, a benzoyloxy group which may have a substituent, a phenylalkyl group which may have a substituent, a naphthyl group which may have a substituent, a naphthoxy group which may have a substituent, a naphthoyl group which may have a substituent, a naphthoxycarbonyl group which may have a substituent, a naphthoyloxy group which may have a substituent, a naphthylalkyl group which may have a substituent, a heterocyclyl group which may have a substituent, a heterocyclylcarbonyl group which may have a substituent, an amino group substituted with one or two organic groups, a morpholin-1-yl group, a piperazin-1-yl group, and the like. Specific examples of these groups are the same as those described for $R^{c7}$. $R^{c10}$ is also preferably a cycloalkylalkyl group, a phenoxyalkyl group which may have a substituent on an aromatic ring, and a phenylthioalkyl group which may have a substituent on an aromatic ring. The substituent which may be possessed by a phenoxyalkyl group and phenylthioalkyl group is the same as the substituent which may be possessed by a phenyl group included in $R^{c7}$.

Among organic groups, $R^{c10}$ is preferably an alkyl group, a cycloalkyl group, a phenyl group which may have a substituent or cycloalkylalkyl group, or a phenylthioalkyl group which may have a substituent on an aromatic ring. The alkyl group is preferably an alkyl group having 1 or more and 20 or less carbon atoms, more preferably, an alkyl group having 1 or more and 8 or less carbon atoms, particularly preferably, an alkyl group having 1 or more and 4 or less carbon atoms, and most preferably a methyl group. Among phenyl groups which may have a substituent, a methylphenyl group is preferable and a 2-methylphenyl group is more preferable. The number of carbon atoms of the cycloalkyl group included in the cycloalkylalkyl group is preferably 5 or more and 10 or less, more preferably 5 or more and 8 or less, and particularly preferably 5 or 6. The number of carbon atoms of the alkylene group included in the cycloalkylalkyl group is preferably 1 or more and 8 or less, more preferably 1 or more and 4 or less, and particularly preferably 2. Among cycloalkylalkyl groups, a cyclopentylethyl group is preferable. The number of carbon atoms of the alkylene group which may have a substituent on an aromatic ring included in the phenylthioalkyl group, is preferably 1 or more and 8 or less, more preferably 1 or more and 4 or less, and particularly preferably 2. Among the phenylthioalkyl group which may have a substituent on an aromatic ring, a 2-(4-chlorophenylthio)ethyl group is preferable.

$R^{c10}$ is also preferably a group represented by $-A^3-CO—O-A^4$. $A^3$ is a divalent organic group, preferably a divalent hydrocarbon group, and more preferably an alkylene group. $A^4$ is a monovalent organic group, and preferably a monovalent hydrocarbon group.

When $A^3$ is an alkylene group, alkylene group may be linear or branched, and preferably a linear chain. When $A^3$ is an alkylene group, the number of carbon atoms of the alkylene group is preferably 1 or more and 10 or less, more preferably 1 or more and 6 or less, and particularly preferably 1 or more and 4 or less.

Suitable examples of $A^4$ include an alkyl group having 1 or more and 10 or less carbon atoms, an aralkyl group having 7 or more and 20 or less carbon atoms, and an aromatic hydrocarbon group having 6 or more and 20 or less carbon atoms. Suitable specific examples of $A^4$ include a methyl group, an ethyl group, an n-propyl group, an isopropyl group, an n-butyl group, an isobutyl group, a sec-butyl group, an tert-butyl group, an n-pentyl group, an n-hexyl group, a phenyl group, a naphthyl group, a benzyl group, a phenethyl group, an α-naphthylmethyl group, a β-naphthylmethyl group, and the like.

Suitable specific examples of the group represented by $-A^3-CO—O-A^4$ include a 2-methoxycarbonylethyl group, a 2-ethoxycarbonylethyl group, a 2-n-propyloxycarbonylethyl group, a 2-n-butyloxycarbonylethyl group, a 2-n-pentyloxycarbonylethyl group, a 2-n-hexyloxycarbonylethyl group, a 2-benzyloxycarbonylethyl group, a 2-phenoxycarbonylethyl group, a 3-methoxycarbonyl-n-propyl group, a 3-ethoxycarbonyl-n-propyl group, a 3-n-propyloxycarbonyl-n-propyl group, a 3-n-butyloxycarbonyl-n-propyl group, a 3-n-pentyloxycarbonyl-n-propyl group, a 3-n-hexyloxycarbonyl-n-propyl group, a 3-benzyloxycarbonyl-n-propyl group, a 3-phenoxycarbonyl-n-propyl group, and the like.

While $R^{c10}$ has been described above, $R^{c10}$ is preferably a group represented by the following formula (c4a) or (c4b):

[Chem. 53]

(c4a)

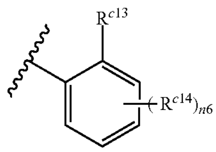

(c4b)

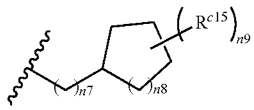

(In the formulas (c4a) and (c4b), $R^{c13}$ and $R^{c14}$ each are an organic group, n6 is an integer of 0 or more and 4 or less; when $R^{c13}$ and $R^{c14}$ exist at adjacent positions on a benzene ring, $R^{c13}$ and $R^{c14}$ may be bonded to one another to form a ring; n7 is an integer of 1 or more and 8 or less; n8 is an integer of 1 or more and 5 or less; n9 is an integer of 0 or more and (n8+3); and $R^{c15}$ is an organic group.)

Examples of the organic group for $R^{c13}$ and $R^{c14}$ in the formula (c4a) are the same as those in $R^{c7}$. $R^{c13}$ is preferably an alkyl group or a phenyl group. When $R^{c13}$ is an alkyl group, the number of carbon atoms thereof is preferably 1 or more and 10 or less, more preferably 1 or more and 5 or less, preferably 1 or more and 3 or less, and most preferably 1. Namely, $R^{c13}$ is most preferably a methyl group. When $R^{c13}$ and $R^{c14}$ are bonded to form a ring, the ring may be either one of an aromatic ring or an aliphatic ring. Suitable examples of the group represented by the formula (c4a) in which $R^{c13}$ and $R^{c14}$ form a ring include a naphthalen-1-yl group, a 1,2,3,4-tetrahydronaphthalen-5-yl group, and the like. In the above formula (c4a), n6 is an integer of 0 or more and 4 or less, preferably 0 or 1, and more preferably 0.

In the above formula (c4b), $R^{c15}$ is an organic group. Examples of the organic group include the same group as the organic group described for $R^{c7}$. Among the organic groups, an alkyl group is preferable. The alkyl group may be any one of linear and branched alkyl groups. The number of carbon atoms of the alkyl group is preferably 1 or more and 10 or less, more preferably, 1 or more and 5 or less, and particularly preferably 1 or more and 3 or less. Preferable examples of $R^{c15}$ include a methyl group, an ethyl group, a propyl group, an isopropyl group, a butyl group, and the like. Among these, a methyl group is more preferable.

In the above formula (c4b), n8 is an integer of 1 or more and 5 or less, preferably 1 or more and 3 or less, and more preferably 1 or 2. In the formula (c4b), n9 is 0 or more and (n8+3) or less, preferably an integer of 0 or more and 3 or less, more preferably an integer of 0 or more and 2 or less, and particularly preferably 0. In the formula (c4b), n7 is an integer of 1 or more and 8 or less, preferably an integer of 1 or more and 5 or less, more preferably an integer of 1 or more and 3 or less, and particularly preferably 1 or 2.

In the formula (c4), $R^{c11}$ is a hydrogen atom, an alkyl group having 1 or more and 11 or less carbon atoms which may have a substituent, or an aryl group which may have a substituent. When $R^{c11}$ is an alkyl group, preferable examples of optional substituents include a phenyl group, a naphthyl group, or the like. When $R^{c7}$ is an aryl group, preferable examples of optional substituents include an alkyl group having 1 or more and 5 or less carbon atoms, an alkoxy group, a halogen atom, or the like.

In the formula (c4), preferable examples of $R^{c11}$ include a hydrogen atom, a methyl group, an ethyl group, an n-propyl group, an isopropyl group, an n-butyl group, a phenyl group, a benzyl group, a methylphenyl group, a naphthyl group, and the like. Among these, a methyl group or a phenyl group is more preferable.

The compound represented by the formula (c4) is produced by a method including the step of converting an oxime group (>C=N—OH) contained in a compound represented by the formula (c5) into an oxime ester group represented by >C=N—O—COR$^{c11}$. $R^{c11}$ is the same as $R^{c11}$ in the formula (c4).

Conversion of the oxime group (>C=N—OH) into the oxime ester group represented by >C=N—O—COR$^{c11}$ is performed by reacting a compound represented by the formula (c5) with an acylating agent. Examples of the acylating agent, which imparts an acyl group represented by —COR$^{c11}$, include an acid anhydride represented by $(R^{c11}CO)_2O$, and an acid halide represented by $R^{c11}$COHal (Hal is a halogen atom).

Suitable specific examples of the compound represented by the formula (c4) include the following compounds PI-43 to PI-83.

[Chem. 54]

PI-43

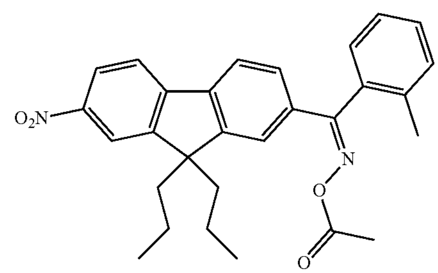

PI-44

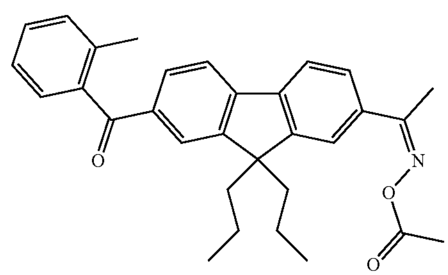

PI-45

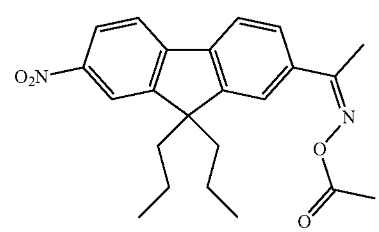

-continued
PI-46
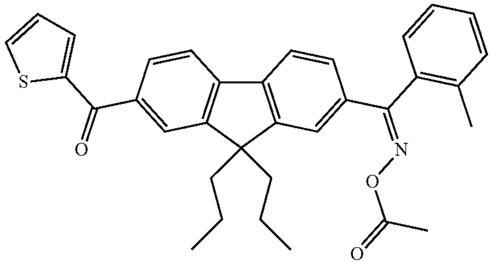
PI-47
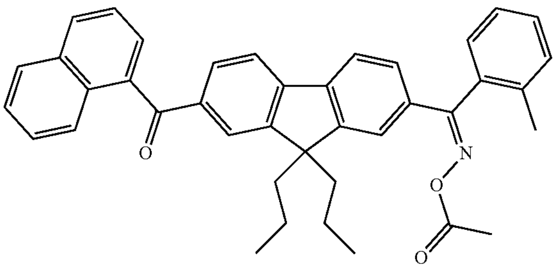
PI-48
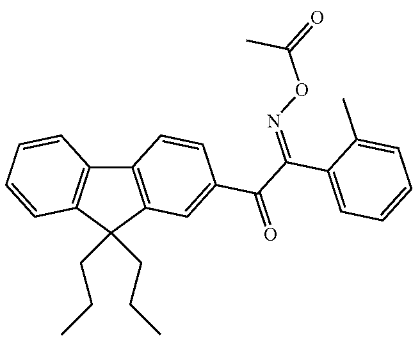
PI-49
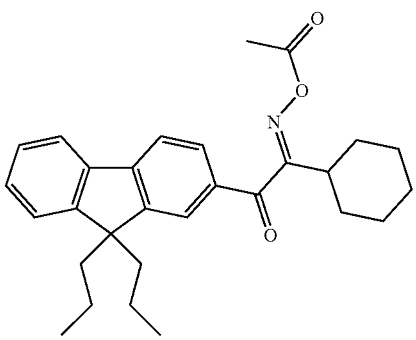
PI-50
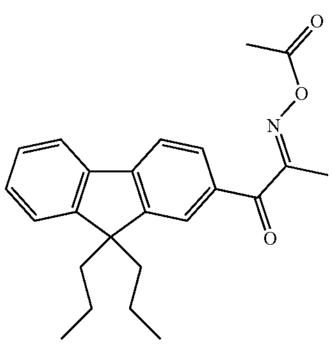
-continued
PI-51
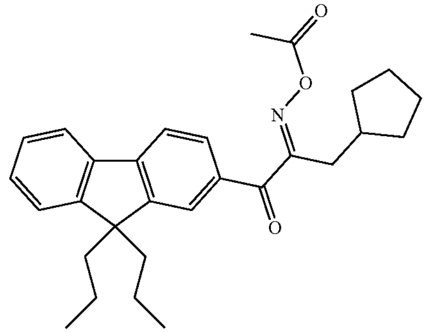
PI-52
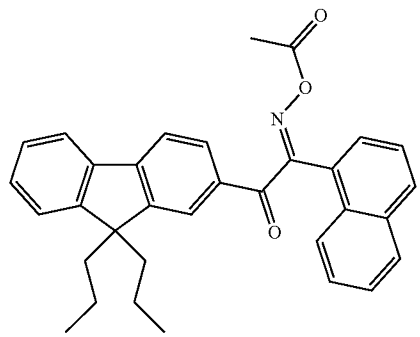
PI-53
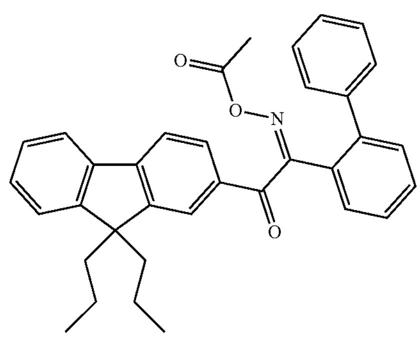
PI-54
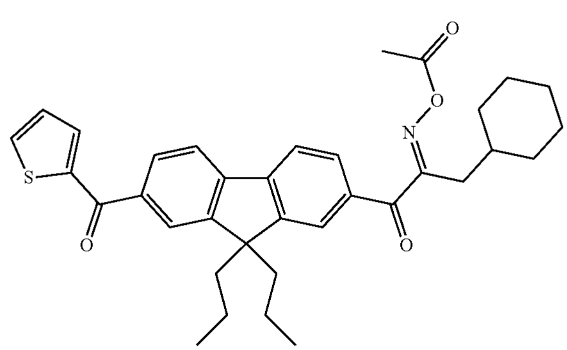

-continued
PI-55
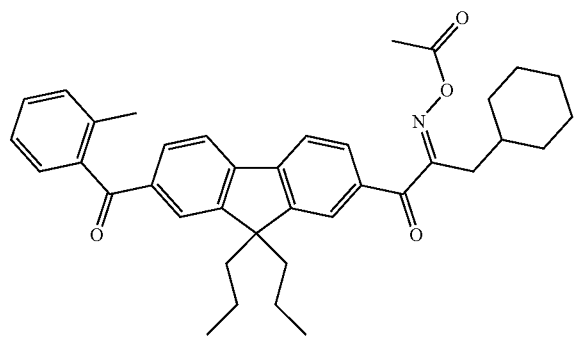
PI-56
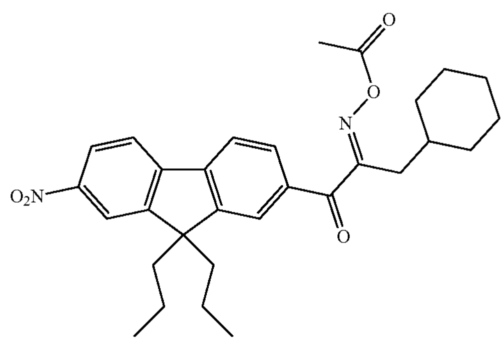
PI-57
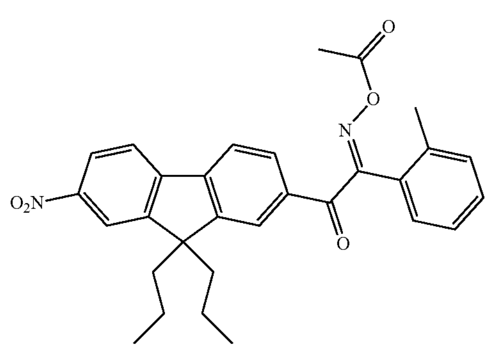
PI-58
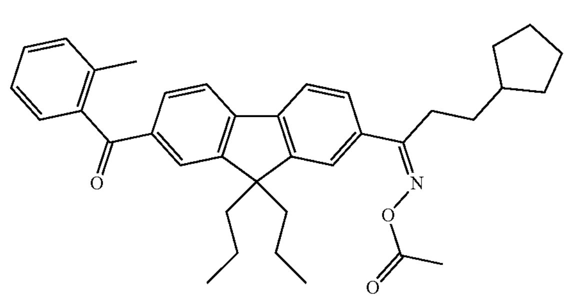
-continued
PI-59
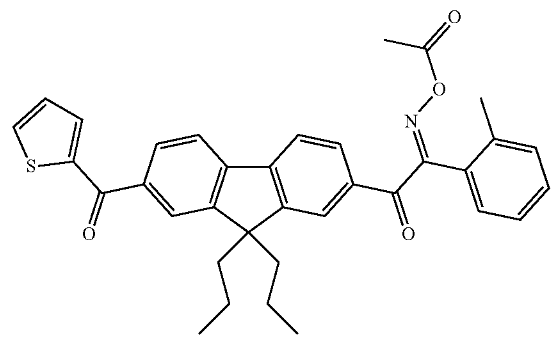
PI-60
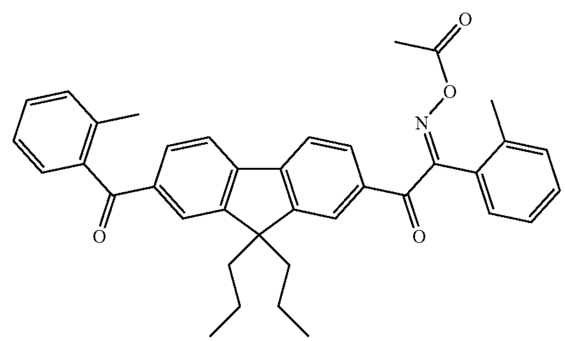
PI-61
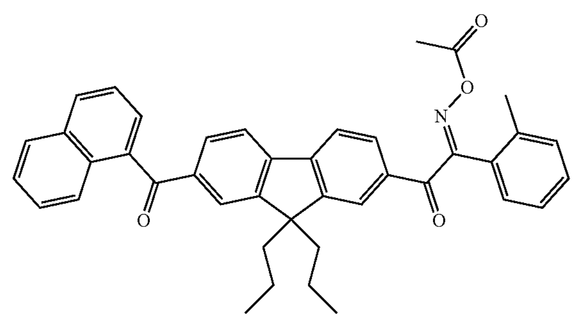
PI-62
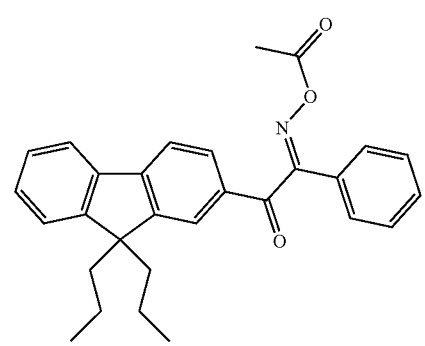

-continued
PI-63
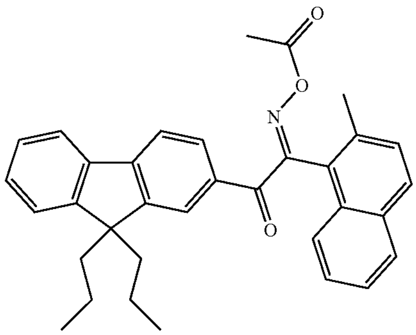
PI-64
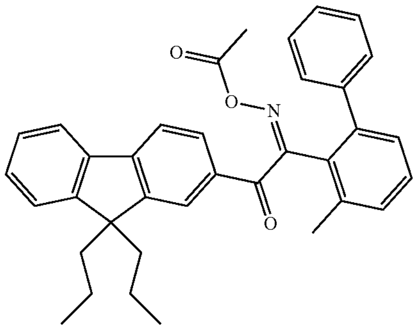
[Chem. 55]
PI-65
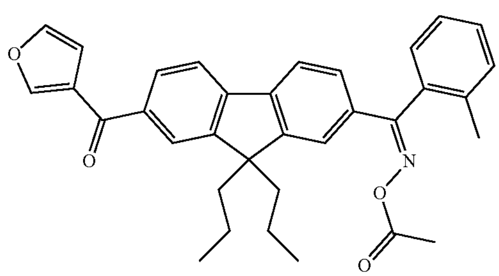
PI-66
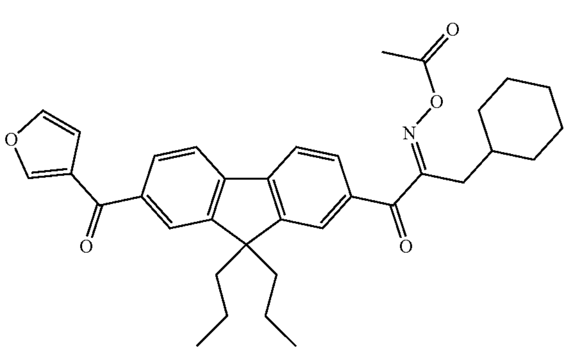
-continued
PI-67
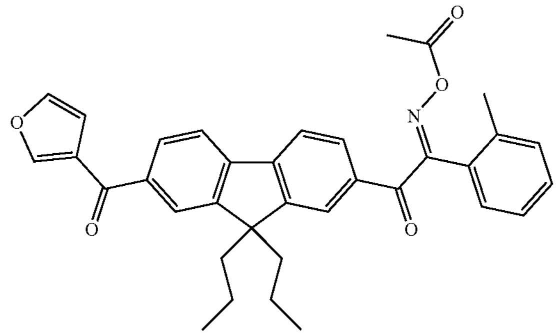
PI-68
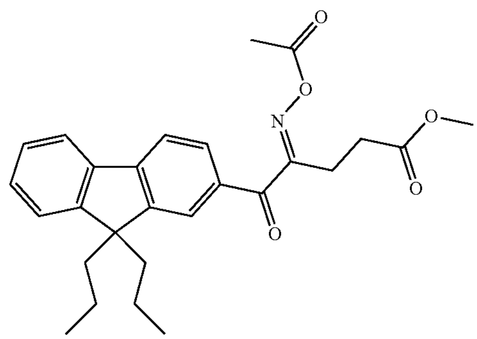
PI-69
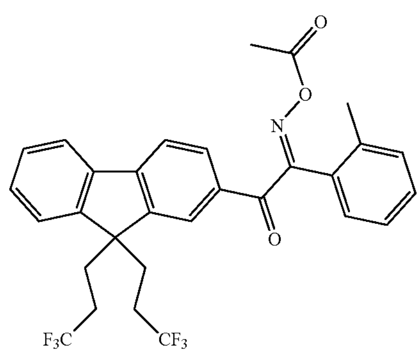
PI-70
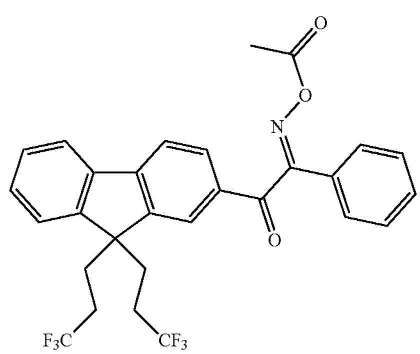

-continued
PI-71
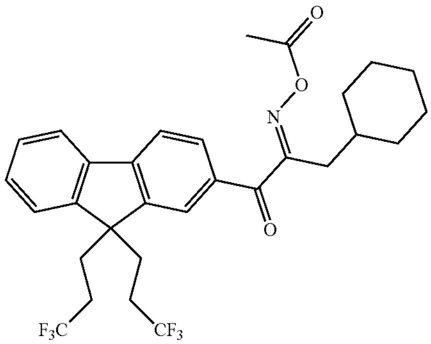
PI-72
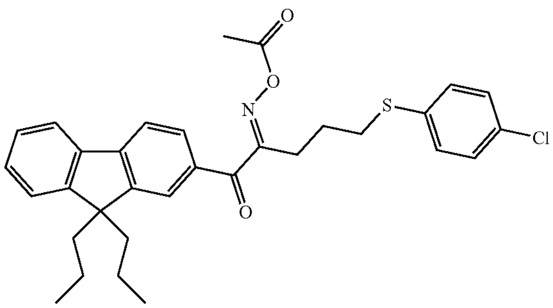
PI-73
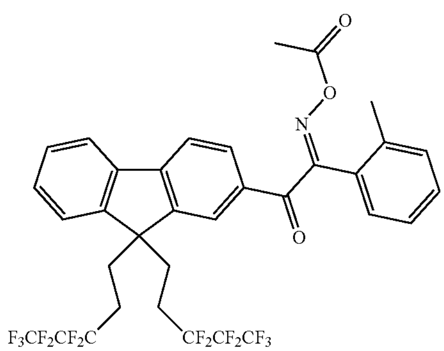
PI-74
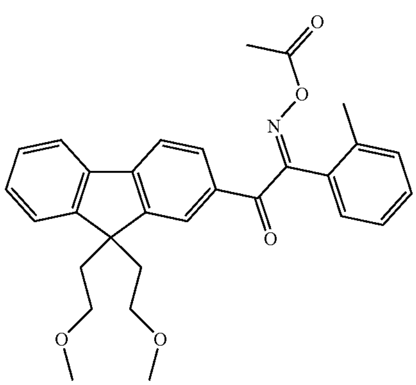
-continued
PI-75
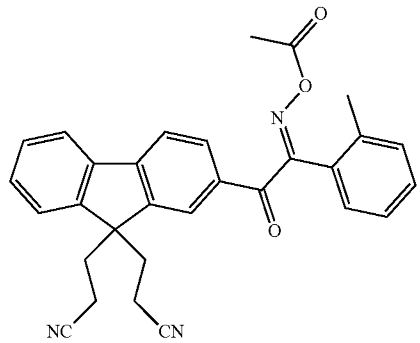
PI-76
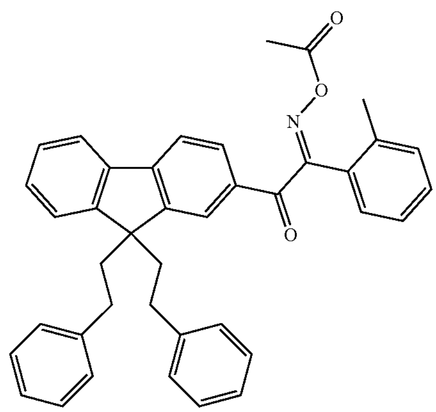
PI-77
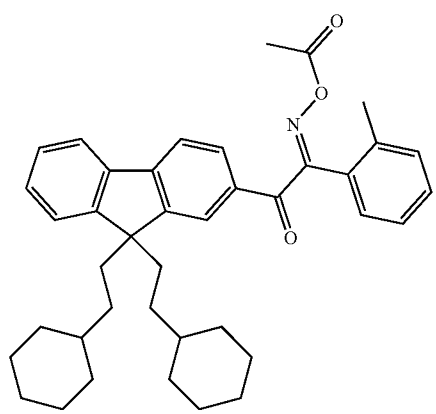
PI-78
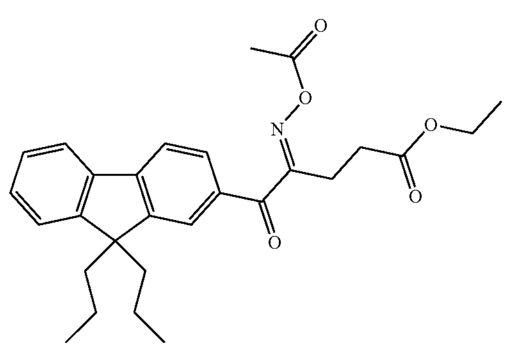

-continued

PI-79

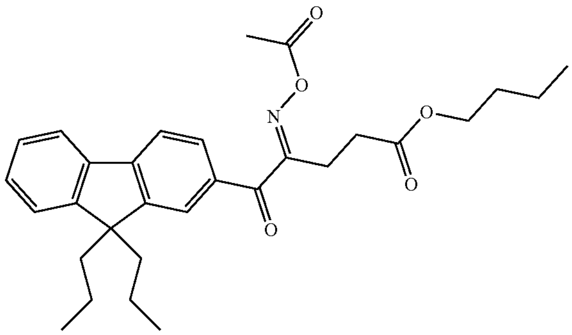

PI-80

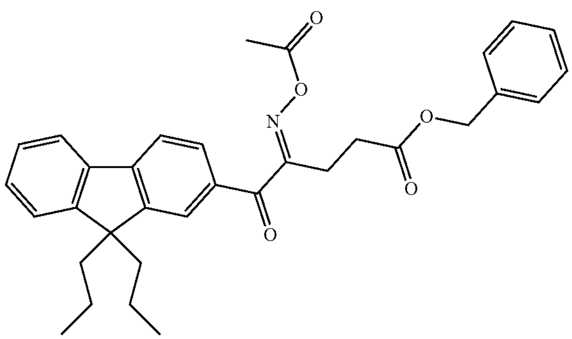

PI-81

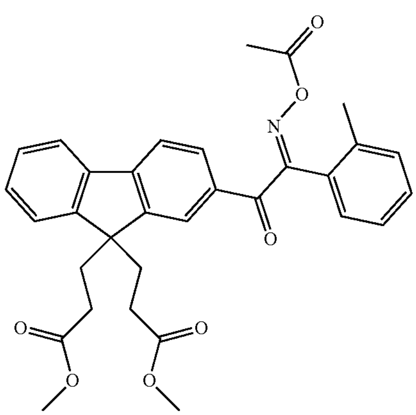

PI-82

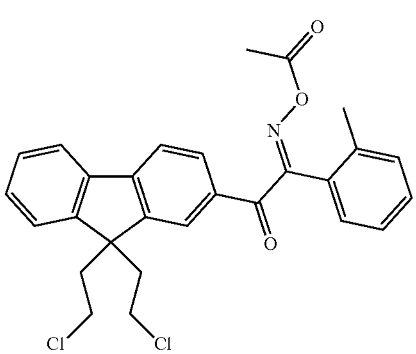

-continued

PI-83

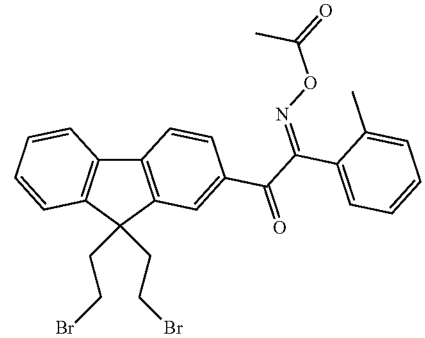

The content of the photopolymerization initiator is preferably 0.5 parts by mass or more and 20 parts by mass or less relative to 100 parts by mass of the solid content of the energy-sensitive composition of the first aspect. When the content is in the above-mentioned range, sufficient heat resistance and chemical resistance can be obtained, coating film forming capability can be enhanced, and curing failure can be suppressed.

The energy-sensitive composition of the first aspect as the metal oxide fine particle dispersion liquid contains a metal oxide (A) as mentioned above. Therefore, use of the energy-sensitive composition of the first aspect enables a pattern containing the metal oxide (A) to be formed.

The energy-sensitive composition of the first aspect may further contain a coloring agent. The coloring agent is not particularly limited, but it is preferable to use, for example, compounds which are classified into pigment in Color Index (C.I.; published by The Society of Dyers and Colorist), and specifically those having the following color index (C.I.) numbers.

Suitable examples include C.I. pigment yellow 1 (hereinafter, "C.I. pigment yellow" is the same, and only the numbers are listed), 3, 11, 12, 13, 14, 15, 16, 17, 20, 24, 31, 53, 55, 60, 61, 65, 71, 73, 74, 81, 83, 86, 93, 95, 97, 98, 99, 100, 101, 104, 106, 108, 109, 110, 113, 114, 116, 117, 119, 120, 125, 126, 127, 128, 129, 137, 138, 139, 147, 148, 150, 151, 152, 153, 154, 155, 156, 166, 167, 168, 175, 180, and 185;

C.I. pigment orange 1 (hereinafter, "C.I. pigment orange" is the same, and only the numbers are listed), 5, 13, 14, 16, 17, 24, 34, 36, 38, 40, 43, 46, 49, 51, 55, 59, 61, 63, 64, 71, and 73;

C.I. pigment violet 1 (hereinafter, "C.I. pigment violet" is the same, and only the numbers are listed), 19, 23, 29, 30, 32, 36, 37, 38, 39, 40, and 50;

C.I. pigment red 1 (hereinafter, "C.I. pigment red" is the same, and only the numbers are listed), 2, 3, 4, 5, 6, 7, 8, 9, 10, 11, 12, 14, 15, 16, 17, 18, 19, 21, 22, 23, 30, 31, 32, 37, 38, 40, 41, 42, 48:1, 48:2, 48:3, 48:4, 49:1, 49:2, 50:1, 52:1, 53:1, 57, 57:1, 57:2, 58:2, 58:4, 60:1, 63:1, 63:2, 64:1, 81:1, 83, 88, 90:1, 97, 101, 102, 104, 105, 106, 108, 112, 113, 114, 122, 123, 144, 146, 149, 150, 151, 155, 166, 168, 170, 171, 172, 174, 175, 176, 177, 178, 179, 180, 185, 187, 188, 190, 192, 193, 194, 202, 206, 207, 208, 209, 215, 216, 217, 220, 223, 224, 226, 227, 228, 240, 242, 243, 245, 254, 255, 264, and 265;

C.I. pigment blue 1 (hereinafter, "C.I. pigment blue" is the same, and only the numbers are listed), 2, 15, 15:3, 15:4, 15:6, 16, 22, 60, 64, and 66;

C.I. pigment green 7, C.I. pigment green 36, and C.I. pigment green 37;

C.I. pigment brown 23, C.I. pigment brown 25, C.I. pigment brown 26, and C.I. pigment brown 28; and C.I. pigment black 1 and C.I. pigment black 7.

When the coloring agent is a light shielding agent, it is preferable to use a black pigment as the light shielding agent. Examples of the black pigment include various types of pigments irrespective of whether it is an organic substance or an inorganic substance, such as carbon black, titanium black, and a metal oxide, a composite oxide, a metal sulfide, a metal sulfate, and a metal carbonate of copper, iron, manganese, cobalt, chromium, nickel, zinc, calcium, silver, or the like. Among these, it is preferable to use a carbon black having high light shielding property.

As the carbon black, known carbon black such as channel black, furnace black, thermal black, and lamp black are usable. It is preferable to use a channel black having excellent light shielding property. Also, a resin-coated carbon black may be used. The resin-coated carbon black has lower conductivity than that of carbon black without resin coating.

Furthermore, in order to adjust the color tone of the carbon black, the above-mentioned organic pigment may be appropriately added as an auxiliary pigment.

Furthermore, in order to homogeneously disperse a coloring agent in a photosensitive composition, a dispersing agent may be further used. As such a dispersing agent, polyethylene imine, urethane resin, and acrylic resin high molecular dispersing agents are preferably used. In particular, when carbon black is used for the coloring agent, an acrylic resin dispersing agent is preferably used as the dispersing agent.

Furthermore, the inorganic pigment and the organic pigment may each be used alone or be used in combination. When the inorganic pigment and the organic pigment are used in combination, the organic pigment is preferably used in the range of 10 parts by mass or more and 80 parts by mass or less, and more preferably in the range of 20 parts by mass or more and 40 parts by mass or less relative to 100 parts by mass of the total amount of the inorganic pigment and the organic pigment.

The content of the coloring agent may be appropriately determined depending on the use of applications of the energy-sensitive composition of the first aspect, and, for example, the content is preferably 5 parts by mass or more and 70 parts by mass or less, and more preferably 25 parts by mass or more and 60 parts by mass or less relative to 100 parts by mass of the solid content of the energy-sensitive composition of the first aspect.

Note here that the coloring agent is preferably added to a photosensitive composition after it is dispersed using a dispersing agent at an appropriate concentration to form a dispersion liquid.

Examples of the organic solvent in the energy-sensitive composition of the first aspect include (poly)alkyleneglycol monoalkylethers such as ethyleneglycol monomethylether, ethyleneglycol monoethylether, ethyleneglycol n-propylether, ethyleneglycol mono-n-butylether, diethyleneglycol monomethylether, diethyleneglycol monoethylether, diethyleneglycol mono-n-propylether, diethyleneglycol mono-n-butylether, triethyleneglycol monomethylether, triethyleneglycol monoethylether, propyleneglycol monomethylether, propyleneglycol monoethylether, propyleneglycol mono-n-propylether, propyleneglycol mono-n-butylether, dipropyleneglycol monomethylether, dipropyleneglycol monoethylether, dipropyleneglycol mono-n-propylether, dipropyleneglycol mono-n-butylether, tripropyleneglycol monomethylether, and tripropyleneglycol monoethylether; (poly)alkyleneglycol monoalkylether acetates such as ethyleneglycol monomethylether acetate, ethyleneglycol monoethylether acetate, diethyleneglycol monomethylether acetate, diethyleneglycol monoethylether acetate, propyleneglycol monomethylether acetate, and propyleneglycol monoethylether acetate; other ethers such as diethyleneglycol dimethylether, diethyleneglycol methylethylether, diethyleneglycol diethylether, and tetrahydrofuran; ketones such as methylethylketone, cyclohexanone, 2-heptanone, and 3-heptanone; lactic acid alkyl esters such as methyl 2-hydroxypropionate, and ethyl 2-hydroxyprpionate; other esters such as ethyl 2-hydroxy-2-methylpropionate, methyl 3-methoxypropionate, ethyl 3-methoxypropionate, methyl 3-ethoxypropionate, ethyl 3-ethoxypropionate, ethyl ethoxyacetate, ethyl hydroxyacetate, methyl 2-hydroxy-3-methylbutanoate, 3-methyl-3-methoxybutyl acetate, 3-methyl-3-methoxybutyl propionate, ethyl acetate, n-propyl acetate, isopropyl acetate, n-butyl acetate, isobutyl acetate, n-pentyl formate, isopentyl acetate, n-butyl propionate, ethyl butanoate, n-propyl butanoate, isopropyl butanoate, n-butyl butanoate, methyl pyruvate, ethyl pyruvate, n-propyl pyruvate, methyl acetoacetate, ethyl acetoacetate, and ethyl 2-oxobutanoate; aromatic hydrocarbons such as toluene and xylene, and amides such as N-methylpyrrolidone, N,N-dimethylformamide, N,N-dimethylacetamide, and the solvents represented by the above-described formula (S01). These organic solvents can be used alone, or by combining two or more types.

Among the organic solvents, propyleneglycol monomethylether, ethyleneglycol monomethylether acetate, propyleneglycol monomethylether acetate, propyleneglycol monoethylether acetate, diethyleneglycol dimethylether, diethyleneglycol methylethylether, cyclohexanone, 3-methoxybutyl acetate, N-methylpyrrolidone, N,N-dimethylformamide, N,N-dimethylacetamide, and amides as solvents represented by the above-described formula (S01) are preferable, due to high solubility for the alkali-soluble resin, the photopolymerizable compound, and the photopolymerization initiator.

The content of the organic solvent is preferably an amount such that the solid content concentration of the energy-sensitive composition of the first aspect is 1% by mass or more and 50% by mass or less, and more preferably 5% by mass or more and 30% by mass or less.

(2) Energy-Sensitive Composition of Second Aspect

The energy-sensitive composition of the second aspect is a positive type photosensitive composition. When the energy-sensitive composition of the second aspect is a chemically amplified positive-type photosensitive composition, the positive-type photosensitive composition contains metal oxide (A), an acid generator capable of producing an acid when irradiated with an active ray or radiation (hereinafter also referred to as the photo acid generator), and a resin whose solubility in alkali increases under the action of acid as a base material component (B) (hereinafter also referred to as the photosensitive resin). The positive-type photosensitive resin composition may include a component such as an alkali soluble resin, an acid diffusion suppressing agent and an organic solvent, as necessary. Examples of the other energy-sensitive compositions of the second aspect include positive photosensitive compositions including a quinone diazide group-containing compound, alkali-soluble resin such as novolak phenol resin, and the like (for example, the below-mentioned novolak resin (C1)).

Below, described are essential or optional components in the energy-sensitive composition of the second aspect, and a method for producing the photosensitive resin composition.

The photo acid generator is a compound capable of producing an acid when irradiated with an active ray or radiation, and is not particularly limited as long as it is a compound which directly or indirectly produces an acid under the action of light, and includes a photo acid generator, and the like, described in WO2014/157675.

Furthermore, naphthalic acid derivatives represented by the following formula (c-5) are also preferable as the photo acid generator.

[Chem. 56]

(c-5)

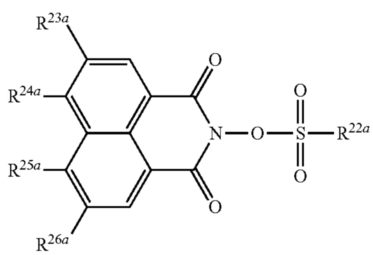

(In the formula (c-5), $R^{22a}$ is a monovalent organic group, $R^{23a}$, $R^{24a}$, $R^{25a}$, and $R^{26a}$ are each independently a hydrogen atom or a monovalent organic group, and each of $R^{23a}$ and $R^{24a}$, $R^{24a}$ and $R^{25a}$, or $R^{25a}$ and $R^{26a}$, may be independently bonded to each other to form a ring.)

The organic group as $R^{22a}$ is not particularly limited within a range in which the objects of the present invention are not impaired. The organic group may be a hydrocarbon group, and may include a heteroatom such as O, N, S, P, and a halogen atom, and the like. Furthermore, a structure of the organic group may be linear or branched or cyclic, and may be a combination thereof.

Examples of suitable organic group as $R^{22a}$ include an aliphatic hydrocarbon groups having 1 or more and 18 or less carbon atoms which may be substituted with a halogen atom and/or an alkylthio group, an aryl group having 6 or more and 20 or less carbon atoms which may have a substituent, an aralkyl group having 7 or more and 20 or less carbon atoms which may have a substituent, an alkylaryl group having 7 or more and 20 or less carbon atoms which may have a substituent, a campher-10-yl group, and a group represented by the following formula (c-5a).

$$—R^{27a}—(O)_a—R^{28a}—(O)_b—Y^1—R^{29a} \quad \text{(c-5a)}$$

(In the formula (c-5a), $Y^1$ is a single bond or an alkanediyl group having 1 or more and 4 or less carbon atoms. $R^{27a}$ and $R^{28a}$ are each respectively an alkanediyl group having 2 or more and 6 or less carbon atoms which may be substituted with a halogen atom, or an arylene group having 6 or more and 20 or less carbon atoms which may be substituted with a halogen atom. $R^{29a}$ is an alkyl group having 1 or more and 18 or less carbon atoms which may be substituted with a halogen atom, an alicyclic hydrocarbon group having 3 or more and 12 or less carbon atoms which may be substituted with a halogen atom, or an aralkyl group having 7 or more and 20 or less carbon atoms which may be substituted with a halogen atom. a and b are each respectively 0 or 1, and at least one of a and b is 1.)

When an organic group as $R^{22a}$ has a halogen atom as a substituent, examples of halogen atom include a chlorine atom, a bromine atom, an iodine atom, and a fluorine atom.

When an organic group as $R^{22a}$ is an alkyl group having 1 or more and 18 or less carbon atoms substituted with alkylthio group, the number of carbon atoms of an alkylthio group is preferably 1 or more and 18 or less. Examples of an alkylthio group having 1 or more and 18 or less carbon atoms include a methylthio group, a ethylthio group, an n-propylthio group, an isopropylthio group, an n-butylthio group, a sec-butylthio group, a tert-butylthio group, an isobutylthio group, an n-pentylthio group, an isopentylthio group, a tert-pentylthio group, an n-hexylthio group, an n-heptylthio group, an isoheptylthio group, a tert-heptylthio group, an n-octylthio group, an isooctylthio group, a tert-octylthio group, a 2-ethylhexylthio group, an n-nonylthio group, an n-decylthio group, an undecylthio group, an n-dodecylthio group, an n-tridecylthio group, an n-tetradecylthio group, an n-pentadecylthio group, an hexadecylthio group, an n-heptadecylthio group, and an n-octadecylthio group.

When the organic group as $R^{22a}$ is an aliphatic hydrocarbon group having 1 or more and 18 or less carbon atoms which may be substituted with a halogen atom, and/or an alkylthio group, the aliphatic hydrocarbon group may include an unsaturated double bond. Furthermore, a structure of the aliphatic hydrocarbon group is not particularly limited, and may be linear or branched or cyclic, and these structures may be combined.

When the organic group as $R^{22a}$ is an alkenyl group, suitable examples include an allyl group and a 2-methyl-2-propenyl group.

When the organic group as $R^{22a}$ is an alkyl group, suitable examples include a methyl group, an ethyl group, an n-propyl group, an isopropyl group, an n-butyl group, a sec-butyl group, a tert-butyl group, an isobutyl group, an n-pentyl group, an isopentyl group, a tert-pentyl group, an n-hexyl group, an n-hexane-2-yl group, an n-hexane-3-yl group, an n-heptyl group, an n-heptane-2-yl group, an n-heptane-3-yl group, an isoheptyl group, a tert-heptyl group, an n-octyl group, an isooctyl group, a tert-octyl group, a 2-ethylhexyl group, an n-nonyl group, an isononyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group.

When the organic group as $R^{22a}$ is an alicyclic hydrocarbon group, examples of the alicyclic hydrocarbon composing a main skeleton of the alicyclic hydrocarbon groups include cyclopropane, cyclobutane, cyclopentane, cyclohexane, cycloheptane, cyclooctane, cyclodecane, bicycle [2.1.1]hexane, bicycle[2.2.1]heptane, bicycle[3.2.1]octane, bicycle[2.2.2]octane, and adamantane. As an alicyclic hydrocarbon group, a group in which one hydrogen atom is removed from these alicyclic hydrocarbons is preferable.

When the organic group as $R^{22a}$ is an aliphatic hydrocarbon group substituted with a halogen atom, suitable examples include a trifluoromethyl group, a pentafluoroethyl group, a 2-chloroethyl group, a 2-bromoethyl group, a heptafluoro-n-propyl group, a 3-bromopropyl group, a nonafluoro-n-butyl group, a tridecafluoro-n-hexyl group, a heptadecafluoro-n-octyl group, a 2,2,2-trifluoroethyl group, a 1,1-difluoroethyl group, a 1,1-difluoro-n-propyl group, a 1,1,2,2-tetrafluoro-n-propyl group, a 3,3,3-trifluoro-n-propyl group, a 2,2,3,3,3-pentafluoro-n-propyl group, a 2-norbornyl-1,1-difluoroethyl group, a 2-norborynyltetrafluoroethyl group, and a 3-adamantyl-1,1,2,2-tetrafluoropropyl group.

When the organic group as $R^{22a}$ is an aliphatic hydrocarbon group substituted with an alkylthio group, suitable examples include 2-methylthioethyl group, 4-methylthio-n-butyl group, and 2-n-butylthioethyl group.

When the organic group as $R^{22a}$ is an aliphatic hydrocarbon group substituted with a halogen atom and an alkylthio group, suitable examples include 3-methylthio-1,1,2,2-tetrafluoro-n-propyl group.

When the organic group as $R^{22a}$ is an aryl group, suitable examples include a phenyl group, a naphthyl group, and biphenylyl group.

When the organic group as $R^{22a}$ is an aryl group substituted with a halogen atom, suitable examples include a pentafluorophenyl group, a chlorophenyl group, dichlorophenyl group, and trichlorophenyl group.

When the organic group as $R^{22a}$ is an aryl group substituted with an alkylthio group, suitable examples include a 4-methylthiophenyl group, a 4-n-butylthiophenyl group, a 4-n-octylthiophenyl group, and 4-n-dodecylthiophenyl group.

When the organic group as $R^{22a}$ is an aryl group substituted with a halogen atom and an alkylthio group, suitable example includes a 1,2,5,6-tetrafluoro-4-methylthiophenyl group, a 1,2,5,6-tetrafluoro-4-n-butylthiophenyl group, and a 1,2,5,6-tetrafluoro-4-n-decylthiophenyl group.

When the organic group as $R^{22a}$ is an aralkyl group, suitable examples include a benzyl group, a phenethyl group, a 2-phenylpropane-2-yl group, a diphenylmethyl group, and a triphenyl methyl group.

When the organic group as $R^{22a}$ is an aralkyl group substituted with a halogen atom, suitable examples include a pentafluorophenylmethyl group, a phenyldifluoromethyl group, a 2-phenyltetrafluoroethyl group, and a 2-(pentafluorophenyl)ethyl group.

When the organic group as $R^{22a}$ is an aralkyl group substituted with an alkylthio group, suitable examples include a p-methylthiobenzyl group.

When the organic group as $R^{22a}$ is an aralkyl group substituted with a halogen atom and an alkylthio group, suitable examples include a 2-(2,3,5,6-tetrafluoro-4-methylthiophenyl)ethyl group.

When the organic group as $R^{22a}$ is an alkylaryl group, suitable examples include a 2-methylphenyl group, a 3-methylphenyl group, a 4-methylphenyl group, a 3-isopropylphenyl group, a 4-isopropylphenyl group, a 4-n-butylphenyl group, a 4-isobutylphenyl group, a 4-tert-butylphenyl group, a 4-n-hexylphenyl group, a 4-cyclohexylphenyl group, a 4-n-octylphenyl group, a 4-(2-ethyl-n-hexyl)phenyl group, a 2,3-dimethylphenyl group, a 2,4-dimethylphenyl group, a 2,5-dimethylphenyl group, a 2,6-dimethylphenyl group, a 3,4-dimethylphenyl group, a 3,5-dimethylphenyl group, a 2,4-di-tert-butylphenyl group, a 2,5-di-tert-butylphenyl group, a 2,6-di-tert-butylphenyl group, a 2,4-di-tert-pentylphenyl group, a 2,5-di-tert-pentylphenyl group, a 2,5-di-tert-octylphenyl group, a 2-cyclohexylphenyl group, 3-cyclohexylphenyl group, 4-cyclohexylphenyl group, a 2,4,5-trimethylphenyl group, a 2,4,6-trimethylphenyl group, and 2,4,6-triisopropylphenyl group.

A group represented by the formula (c-5a) is a group containing an ether group. In the formula (c-5a), examples of an alkanediyl group having 1 or more and 4 or less carbon atoms represented by $Y^1$ include a methylene group, an ethane-1,2-diyl group, an ethane-1,1-diyl group, a propane-1,3-diyl group, a propane-1,2-diyl group, a butane-1,4-diyl group, a butane-1,3-diyl group, a butane-2,3-diyl group, and a butane-1,2-diyl group. In the formula (c-5a), examples of an alkanediyl group having 2 or more and 6 or less carbon atoms represented by $R^{27a}$ or $R^{28a}$ include an ethane-1,2-diyl group, a propane-1,3-diyl group, a propane-1,2-diyl group, a butane-1,4-diyl group, a butane-1,3-diyl group, a butane-2,3-diyl group, a butane-1,2-diyl group, a pentane-1,5-diyl group, a pentane-1,3-diyl group, a pentane-1,4-diyl group, a pentane-2,3-diyl group, a hexane-1,6-diyl group, a hexane-1,2-diyl group, a hexane-1,3-diyl group, a hexane-1,4-diyl group, a hexane-2,5-diyl group, a hexane-2,4-diyl group, and a hexane-3,4-diyl group.

In the formula (c-5a), when $R^{27a}$ or $R^{28a}$ is an alkanediyl group having 2 or more and 6 or less carbon atoms substituted with halogen atom(s), examples of the halogen atom include a chlorine atom, a bromine atom, an iodine atom, and a fluorine atom. Examples of alkanediyl group substituted with halogen atom(s) include a tetrafluoroethane-1,2-diyl group, a 1,1-difluoroethane-1,2-diyl group, a 1-fluoroethane-1,2-diyl group, a 1,2-difluoroethane-1,2-diyl group, a hexafluoropropane-1,3-diyl group, a 1,1,2,2-tetrafluoropropane-1,3-diyl group, and a 1,1,2,2-tetrafluoropentane-1,5-diyl group.

In the formula (c-5a), examples of an arylene group as $R^{27a}$ or $R^{28a}$ include a 1,2-phenylene group, a 1,3-phenylene group, a 1,4-phenylene group, a 2,5-dimethyl-1,4-phenylene group, a biphenyl-4,4'-diyl group, a diphenylmethane-4,4'-diyl group, a 2,2-diphenyl propane-4,4'-diyl group, a naphthalene-1,2-diyl group, a naphthalene-1,3-diyl group, a naphthalene-1,4-diyl group, a naphthalene-1,5-diyl group, a naphthalene-1,6-diyl group, a naphthalene-1,7-diyl group, a naphthalene-1,8-diyl group, a naphthalene-2,3-diyl group, a naphthalene-2,6-diyl group, an naphthalene-2,7-diyl group.

In the formula (c-5a), when $R^{27a}$ or $R^{28a}$ is an arylene group substituted with halogen atom(s), examples of the halogen atom include a chlorine atom, a bromine atom, an iodine atom, and a fluorine atom. Examples of an arylene group substituted with halogen atom(s) include 2,3,5,6-tetrafluoro-1,4-phenylene group.

In the formula (c-5a), examples of an optionally branched alkyl group having 1 or more and 18 or less carbon atoms represented by $R^{29a}$ include a methyl group, an ethyl group, an n-propyl group, an isopropyl group, an n-butyl group, a sec-butyl group, a tert-butyl group, an isobutyl group, an n-pentyl group, a isopentyl group, a tert-pentyl group, an n-hexyl group, an n-hexane-2-yl group, an n-hexane-3yl group, an n-heptyl group, an n-heptane-2-yl group, an n-heptane-3yl group, an isoheptyl group, a tert-heptyl group, an n-octyl group, an isooctyl group, a tert-octyl group, a 2-ethylhexyl group, an n-nonyl group, an isononyl group, an n-decyl group, an n-undecyl group, an n-dodecyl group, an n-tridecyl group, an n-tetradecyl group, an n-pentadecyl group, an n-hexadecyl group, an n-heptadecyl group, and an n-octadecyl group.

In the formula (c-5a), when $R^{29a}$ is an alkyl group having 1 or more and 18 or less carbon atoms substituted with halogen atom(s), examples of the halogen atom include a chlorine atom, a bromine atom, an iodine atom, and a fluorine atom. Examples of an alkyl group substituted with a halogen atom include a trifluoromethyl group, a pentafluoroethyl group, a heptafluoro-n-propyl group, a nonafluoro-n-butyl group, a tridecafluoro-n-hexyl group, a heptadecafluoro-n-octyl group, a 2,2,2-trifluoroethyl group, a 1,1-difluoro-n-propyl group, a 1,1,2,2-tetrafluoro-n-propyl group, a 3,3,3-trifluoro-n-propyl group, a 2,2,3,3,3-pentafluoro-n-propyl group, and a 1,1,2,2-tetrafluorotetradecyl group.

In the formula (c-5a), when $R^{29a}$ is an alicyclic hydrocarbon group having 3 or more and 12 or less carbon atoms, examples of the alicyclic hydrocarbon composing a main skeleton of the alicyclic hydrocarbon groups include cyclopropane, cyclobutane, cyclopentane, cyclohexane, cycloheptane, cyclooctane, cyclodecane, bicycle[2.1.1]hexane, bicycle[2.2.1]heptane, bicycle[3.2.1]octane, bicycle[2.2.2]octane, and adamantane. As an alicyclic hydrocarbon group, a group in which one hydrogen atom is removed from these alicyclic hydrocarbons is preferable.

In the formula (c-5a), when $R^{29a}$ is an aryl group, a halogenated aryl group, an aralkyl group, and a halogenated aralkyl group, preferable examples of these groups are the same as the case where $R^{22a}$ are these groups.

The suitable group among the groups represented by the formula (c-5a) is a group among the groups represented by $R^{27}$a in which a carbon atom bonded to a sulfur atom is substituted with a fluorine atom. The number of carbon atoms of such a suitable group is preferably 2 or more and 18 or less.

$R^{22a}$ is preferably a perfluoroalkyl group having 1 or more and 8 or less carbon atoms. Furthermore, since highly minute resist patterns are easily formed, a camphor-10-yl group is also preferable as $R^{22a}$.

In the formula (c-5), $R^{23a}$ to $R^{26a}$ are a hydrogen atom or a monovalent organic group. Furthermore, $R^{23a}$ and $R^{24a}$, $R^{24a}$ and $R^{25a}$, or $R^{25a}$ and $R^{26a}$ may be bonded to each other respectively to form a ring. For example, $R^{25a}$ and $R^{26a}$ may be bonded to each other to form a five-membered ring together with a naphthalene ring, thereby forming an acenaphthene skeleton.

Preferable examples of the monovalent organic group include an alkoxy group having 4 or more and 18 or less carbon atoms which may be substituted with an alicyclic hydrocarbon group, a heterocyclic group (heterocyclyl group), or a halogen atom, and which may be branched; a heterocyclyl oxy group; an alkylthio group having 4 or more and 18 or less carbon atoms which may be substituted with an alicyclic hydrocarbon group, a heterocyclic group (heterocyclyl group), or a halogen atom and which may be branched; and a heterocyclylthio group. Furthermore, a group in which the methylene group at any position that is not adjacent to an oxygen atom of the alkoxy group is substituted with —CO— is also preferable. A group in which the alkoxy group is interrupted by an —O—CO— bond, or an —O—CO—NH-bond is also preferable. Note here that the left ends of the —O—CO— bond and the —O—CO—NH— bond are sides near the naphthalic acid mother nucleus in an alkoxy group. In addition, an alkylthio group having 4 or more and 18 or less carbon atoms, which may be substituted with an alicyclic hydrocarbon group, a heterocyclic group, or a halogen atom, and which may be branched, is also preferable as $R^{23a}$ to $R^{26a}$. A group in which the methylene group at any position that is not adjacent to a sulfur atom of the alkylthio group is substituted with —CO— is also preferable. A group in which the alkylthio group is interrupted by an —O—CO— bond, or an —O—CO—NH— bond is also preferable. Note here that the left ends of the —O—CO— bond and —O—CO—NH— bond are sides near the naphthalic acid mother nucleus in an alkylthio group.

As $R^{23a}$ to $R^{26a}$, it is preferable that $R^{23a}$ is an organic group, $R^{24a}$ to $R^{26a}$ are a hydrogen atom, $R^{24a}$ is an organic group, and $R^{23a}$, $R^{25a}$, and $R^{26a}$ are a hydrogen atom. Furthermore, all of $R^{23a}$ to $R^{26a}$ may be a hydrogen atom.

Examples of an unsubstituted alkoxy group as $R^{23a}$ to $R^{26a}$ includes an n-butyloxy group, a sec-butyloxy group, a tert-butyloxy group, an isobutyloxy group, an n-pentyloxy group, an isopentyloxy group, a tert-pentyloxy group, an n-hexyloxy group, an n-heptyloxy group, an isoheptyloxy group, a tert-heptyloxy group, an n-octyloxy group, an isooctyloxy group, a tert-octyloxy group, a 2-ethylhexyloxy group, an n-nonyloxy group, an n-decyloxy group, an n-undecyloxy group, an n-dodecyloxy group, an n-tridecyloxy group, an n-tetradecyloxy group, an n-pentadecyloxy group, an n-hexadecyloxy group, an n-heptadecyloxy group, and an n-octadecyloxy group.

Examples of an unsubstituted alkylthio group as $R^{23a}$ to $R^{26a}$ includes an n-butylthio group, a sec-butylthio group, a tert-butylthio group, an isobutylthio group, an n-pentylthio group, an isopentylthio group, a tert-pentylthio group, an n-hexylthio group, an n-heptylthio group, an isoheptylthio group, a tert-heptylthio group, an n-octylthio group, an isooctylthio group, a tert-octylthio group, a 2-ethylhexylthio group, an n-nonylthio group, an n-decylthio group, an n-undecylthio group, an n-dodecylthio group, an n-tridecylthio group, an n-tetradecylthio group, an n-pentadecylthio group, an n-hexadecylthio group, an n-heptadecylthio group, and an n-ocatdecylthio group.

When $R^{23a}$ to $R^{26a}$ are an alkoxy group or an alkylthio group substituted with an alicyclic hydrocarbon group, examples of the alicyclic hydrocarbon composing a main skeleton of the alicyclic hydrocarbon group include cyclopropane, cyclobutane, cyclopentane, cyclohexane, cycloheptane, cyclooctane, cyclodecane, bicycle[2.1.1]hexane, bicycle[2.2.1]heptane, bicycle[3.2.1]octane, bicycle[2.2.2]octane, and adamantine. As an alicyclic hydrocarbon group, a group in which one hydrogen atom is removed from these alicyclic hydrocarbons is preferable.

When $R^{23a}$ to $R^{26a}$ are an alkoxy group or an alkylthio group substituted with a heterocyclic group, or when $R^{23a}$ to $R^{26a}$ are a heterocyclyloxy group, examples of heterocycle composing a main skeleton of the heterocyclic group or the heterocyclyloxy group include pyrrole, thiophene, furan, pyrane, thiopyrane, imidazole, pyrazole, triazole, isothiazole, oxazole, isoxazole, pyridine, pyrazine, pyrimidine, pyridazine, pyrrolidine, pyrazolidine, imidazolidine, isoxazolidine, isothiazolidine, piperidine, piperazine, morpholine, thiomorpholine, chroman, thiochroman, isochroman, isothiochroman, indoline, isoindoline, pyrindine, indolizine, indole, indazole, purine, quinolizine, isoquinoline, quinoline, naphthyridine, phthalazine, quinoxaline, quinazoline, cinnoline, pteridine, acridine, perimidine, phenanthroline, carbazole, carboline, phenazine, anthyridine, thiadiazole, oxadiazole, triazine, triazole, tetrazole, benzimidazole, benzoxazole, benzothiazole, benzothiadiazole, benzofuran, naphthoimidazole, benzotriazole, and tetraazaindene. Saturated heterocycles to which rings including conjugated bond(s) selected from these heterocycles are hydrogenated is also preferable. A group in which one hydrogen atom is removed from above-mentioned heterocycle is preferable as a heterocyclic group substituting the alkoxy group or the alkylthio group or a heterocyclic group included in the heterocyclyloxy group.

Examples of an alkoxy group containing an alicyclic hydrocarbon group as $R^{23a}$ to $R^{26a}$ include a cyclopentyloxy group, a methylcyclopnetyloxy group, a cyclohexyloxy group, a fluorocyclohexyloxy group, a chlorocyclohexyloxy group, a cyclohexylmethyloxy group, a methylcyclohexyloxy group, a norbornyloxy group, an ethylcyclohexyloxy group, a cyclohexylethyloxy group, a dimethylcyclohexyloxy group, a methylcyclohexylmethyloxy group, a norbornylmethyloxy group, a trimethylcyclohexyloxy group, a 1-cyclohexylbutyloxy group, an adamantyloxy group, a menthyloxy group, an n-butylcyclohexyloxy group, a tert-butylcyclohexyloxy group, a bornyloxy group, an isobornyloxy group, a decahydronaphthyloxy group, a dicyclopentadienoxy group, a 1-cyclohexylpentyloxy group, a methyladamantyloxy group, an adamantymethyloxy group, a 4-pentylcyclohexyloxy group, a cyclohexylcyclohexyloxy group, an adamantylethyloxy group, and a dimethyladamantyloxy group.

Examples of a heterocyclyloxy group as $R^{23a}$ to $R^{26a}$ include a tetrahydrofuranyloxy group, a furfuryloxy group, a tetrahydrofurfuryloxy group, a tetrahydropyranyloxy group, a butyrolactonyl oxy group, and an indolyloxy group.

Examples of an alkylthio group containing an alicyclic hydrocarbon group as $R^{23a}$ to $R^{26a}$ include a cyclopentylthio group, a cyclohexylthio group, a cyclohexylmethylthio group, a norbornylthio group, and an isobornylthio group.

Examples of a heterocyclylthio group as $R^{23a}$ to $R^{26a}$ include a furfurylthio group, and a tetrahydrofuranylthio group.

When $R^{23a}$ to $R^{26a}$ are a group in which a methylene group is substituted with —CO— at any position except for a position adjacent to oxygen atom of an alkoxy group, examples include 2-ketobutyl-1-oxy group, 2-ketopentyl-1-oxy group, 2-ketohexyl-1-oxy group, 2-ketoheptyl-1-oxy group, 2-ketooctyl-1-oxy group, 3-ketobutyl-1-oxy group, 4-ketopentyl-1-oxy group, 5-ketohexyl-1-oxy group, 6-ketoheptyl-1-oxy group, 7-ketooctyl-1-oxy group, 3-methyl-2-ketopentane-4-oxy group, 2-ketopentane-4-oxy group, 2-methyl-2-ketopentane-4-oxy group, 3-ketoheptane-5-oxy group, and 2-adamantanone-5-oxy group.

When $R^{23a}$ to $R^{26a}$ are a group in which a methylene group is substituted with —CO— at any position except for a position adjacent to sulfur atom of an alkylthio group, examples include 2-ketobutyl-1-thio group, 2-ketopentyl-1-thio group, 2-ketohexyl-1-thio group, 2-ketoheptyl-1-thio group, 2-ketooctyl-1-thio group, 3-ketobutyl-1-thio group, 4-ketopentyl-1-thio group, 5-ketohexyl-1-thio group, 6-ketoheptyl-1-thio group, 7-ketooctyl-1-thio group, 3-methyl-2-ketopentane-4-thio group, 2-ketopentane-4-thio group, 2-methyl-2-ketopentane-4-thio group, and 3-ketoheptane-5-thio group.

Suitable examples of the naphthalic acid derivatives represented by the formula (c-5) include a compound described in Japanese Unexamined Patent Application Publication No. 2017-37300, and the like.

These photo acid generators may be used alone, or two or more kinds may be used in combination. Furthermore, the content of the photo acid generator is preferably adjusted to 0.1% by mass or more and 10% by mass or less, and more preferably 0.5% by mass or more and 3% by mass or less, relative to the total mass of the photosensitive composition of second aspect. When the use amount of the photo acid generator is adjusted to the range described above, a photosensitive composition that is a uniform solution having satisfactory sensitivity and exhibiting excellent storage stability can be readily prepared.

The resin whose alkali solubility increases by the action of an acid is not particularly limited, and an arbitrary resin whose alkali solubility increases by the action of an acid may be used. Of these, at least one resin selected from the group consisting of novolak resin (B1), polyhydroxystyrene resin (B2) and acrylic resin (B3) is preferably contained.

[Acrylic Resin (B3)]

As an acrylic resin (B3), it is possible to use a resin including a constituent unit which enhances solubility of the acrylic resin (B3) in alkali under the action of acid.

Examples of the acrylic resin (B3) include radical polymerizable compounds such as (meth)acrylic acid derivatives having an ether bond and an ester bond, and specific examples thereof include 2-methoxyethyl (meth)acrylate, 2-ethoxyethyl (meth)acrylate, methoxytriethylene glycol (meth)acrylate, 3-methoxybutyl (meth)acrylate, ethylcarbitol (meth)acrylate, phenoxypolyethylene glycol (meth)acrylate, methoxypolyethylene glycol (meth)acrylate, methoxypolypropylene glycol (meth)acrylate, tetrahydrofurfuryl (meth)acrylate, tetrahydro-2H-pyran-2-yl(meth)acrylate, and the like. Also, the polymerizable compound having an ether bond is preferably, 2-methoxyethyl (meth)acrylate, 2-ethoxyethyl (meth)acrylate, or methoxytriethylene glycol (meth)acrylate. These polymerizable compounds may be used alone, or in combinations of two or more thereof.

The polystyrene equivalent mass average molecular weight of the photosensitive resin is preferably 5,000 or more and 600,000 or less, more preferably 20,000 or more and 400,000 or less, and still more preferably 30,000 or more and 300,000 or less. By thus adjusting the mass average molecular weight, the metal oxide-containing film can maintain sufficient strength without deteriorating peel properties with a substrate surface.

The content of the resin is preferably 5% by mass or more and 60% by mass or less with respect to the total mass of the energy-sensitive composition of the second aspect.

When the energy-sensitive composition of the second aspect is a positive photosensitive composition including a quinone diazide group-containing compound and an alkali-soluble resin such as a novolak phenol resin, the composition preferably includes a novolak resin (C1) and a photosensitizer. Examples of the photosensitizer include a quinone diazide esterized product described in Japanese Unexamined Patent Application, Publication No. 2014-199312.

[Novolak Resin (C1)]

The novolak resin may be obtained by addition fusion between, for example, aromatic compounds having a phenolic hydroxyl group (hereinafter, merely referred to as "phenols") and aldehydes in the presence of an acid catalyst.

Examples of the phenols include phenol, o-cresol, m-cresol, p-cresol, o-ethylphenol, m-ethylphenol, p-ethylphenol, o-butylphenol, m-butylphenol, p-butylphenol, 2,3-xylenol, 2,4-xylenol, 2,5-xylenol, 2,6-xylenol, 3,4-xylenol, 3,5-xylenol, 2,3,5-trimethyl phenol, 3,4,5-trimethyl phenol, p-phenylphenol, resorcinol, hydroquinone, hydroquinone monomethyl ether, pyrogallol, phloroglycinol, hydroxydiphenyl, bisphenol A, gallic acid, gallic acid ester, α-naphthol, β-naphthol, and the like. Examples of the aldehydes include formaldehyde, furfural, benzaldehyde, nitrobenzaldehyde, acetaldehyde, and the like. The catalyst used in the addition fusion reaction, which is not specifically limited, is exemplified by hydrochloric acid, nitric acid, sulfuric acid, formic acid, oxalic acid, acetic acid, etc., in regards to acid catalyst.

The flexibility of the novolak resins can be enhanced still more when o-cresol is used, a hydrogen atom of a hydroxide group in the resins is substituted with other substituents, or bulky aldehydes are used.

The mass average molecular weight of novolak resin (C1) is not particularly limited as long as the object of the present invention is not impaired, but the mass average molecular weight is preferably 1,000 or more and 50,000 or less.

The content of the organic solvent is not particularly limited as long as the object of the present invention is not impaired, and for example, the content may be appropriately adjusted so that the solid content concentration of the positive photosensitive resin composition becomes a range from 2% by mass or more and 55% by mass or less. When the photosensitive composition is used for a thick-film application in which a photosensitive resin layer obtainable by a spin-coating method or the like has a film thickness of 10 μm or greater, it is preferable to use the organic solvent to the extent that the solid content concentration of the photosensitive resin composition is 30% by mass or more and 55% by mass or less.

(4) Energy-Sensitive Composition of Fourth Aspect

A photosensitive composition of the fourth aspect is a negative photosensitive composition containing an epoxy group-containing polycarboxylic acid resin, a photo acid generator, and an organic solvent, together with a metal oxide (A).

As the epoxy group-containing polycarboxylic acid resin in the photosensitive composition of the fourth aspect, for example, it is possible to use a resin obtained by reacting an epoxy compound having two or more epoxy groups per molecule with a monocarboxylic acid having one or more alcoholic hydroxyl groups per molecule, and further reacting the reaction product thereof with a polybasic acid anhydride.

Examples of the epoxy compound having two or more epoxy groups per molecule include one that is the same as an epoxy compound described above as the epoxy resin precursor, and the epoxy group-containing resin described above.

As the monocarboxylic acid having one or more alcoholic hydroxyl groups per molecule, for example, hydroxymonocarboxylic acids such as dimethylolpropionic acid, dimethylol acetate, dimethylol butyrate, dimethylol valerate, dimethylol caproic acetate, hydroxypivalic acid and the like may be mentioned. Among these, monocarboxylic acids having 1 or more and 5 or less alcoholic hydroxyl groups per molecule are preferable.

As the polybasic acid anhydride, for example, succinic anhydride, maleic anhydride, phthalic anhydride, tetrahydro phthalic anhydride, hexahydro phthalic anhydride, methylendomethylene tetrahydro phthalic anhydride, trimellitic anhydride, pyromellitic anhydride and the like may be mentioned.

The reaction of the above described epoxy compound and the above described monocarboxylic acid is preferably of 0.1 mol or more and 0.7 mol or less of the monocarboxylic acid with respect to 1 equivalent of epoxy of the epoxy compound, more preferably 0.2 mol or more and 0.5 mol or less. In this reaction, it is preferable to use an organic solvent which dose not react with the epoxy compound or the polybasic acid anhydride, and which does not have hydroxyl groups or carboxyl groups. Further, a catalyst for promoting the reaction (for example, triphenylphosphine, benzyldimethylamine, trialkylammonium chloride, triphenyl stibine and the like) may be used. In the case of using a catalyst, particularly after the reaction is finished, deactivating the catalyst using an organic peroxide or the like stably maintains the satisfactory shelf life which is preferable. The use amount of the reaction catalyst is preferably 0.1% by mass or more and 10% by mass or less with respect to the reaction mixture, and the reaction temperature is preferably 60° C. or more and 150° C. or less. In this way, it is possible to obtain a reactant from the above described epoxy compound and the above described monocarboxylic acid.

In the reaction between this reactant and a polybasic acid anhydride, the polybasic acid anhydride is preferably reacted in such an amount that the acid value of the finally obtained epoxy group-containing polycarboxylic acid resin is 50 mgKOH/g or more and 150 mgKOH/g or less. The reaction temperature is preferably 60° C. or more and 150° C. or less. In this way, it is possible to obtain an epoxy group-containing polycarboxylic acid resin.

These epoxy group-containing polycarboxylic acid resins may be used alone or in combinations of two or more kinds thereof.

The content of the epoxy group-containing polycarboxylic acid resin is preferably 30% by mass or more and 80% by mass or less with respect to the solid content of the energy-sensitive composition of the fourth aspect, and more preferably 40% by mass or more and 70% by mass or less. The content in the above-defined range can enhance a coating film forming capability.

Examples of photoacid generators in the energy-sensitive composition of the fourth aspect include photo acid generators exemplified in the photosensitive composition of the second aspect. The content of the photoacid generator is preferably 0.5% by mass or more and 30% by mass or less, more preferably 1% by mass or more and 20% by mass or less, relative to the solid content of the energy-sensitive composition of the fourth aspect. When the content in the above-defined range, curability of the photosensitive composition becomes good.

The energy-sensitive composition of the fourth aspect may further includes an improving component for adjusting the moisture resistance, heat resistance, adhesiveness and the like. These improving components themselves may be cured by heat or ultraviolet radiation, or may react with a residual hydroxyl group or carboxyl group or the like of an epoxy group-containing polycarboxylic acid resin by heat or ultraviolet radiation. Specific examples thereof include an epoxy compound having one or more epoxy groups per molecule, a melamine derivative (for example, hexamethoxy melamine, hexabutoxylated melamine, fused hexamethoxy melamine and the like), bisphenol A-type compounds (for example, tetramethylol bisphenol A and the like), oxazoline compounds and the like.

The content of the improving components is preferably 50% by mass or less with respect to the solid content of the composition of the fourth aspect, more preferably 30% by mass or less.

The energy-sensitive composition of the fourth aspect may further contain a coloring agent similar to the energy-sensitive composition of the first aspect.

Examples of the energy-sensitive composition of the fourth aspect include the organic solvents listed as examples in the photosensitive composition of the first aspect. The content of the organic solvent is an amount such that the solid content concentration of the energy-sensitive composition of the fourth aspect is preferably 1% by mass or more and 50% by mass or less, and preferably 5% by mass or more and 30% by mass or less.

(5) Energy-Sensitive Composition of Fifth Aspect

An energy-sensitive composition of the fifth aspect is a curable composition including a metal oxide (A), a curable compound represented by the formula (b-01) as described above as a base material component (B), and a curing agent. The curable compound is the compound represented by the formula (b-01), and has a fused polycyclic skeleton including an aromatic ring as a main skeleton, and polymerizable group. When the energy-sensitive composition contains a compound including an aromatic ring, such as a compound represented by the formula (b-01), the metal oxide (A) may not be satisfactorily dispersed in the energy-sensitive composition. When dispersion failure such as aggregation of the metal oxide (A) occurs in the energy-sensitive composition, cracks may occur in the cured product. However, the abovementioned problem of crack is not likely to occur when the energy-sensitive composition includes the metal oxide (A) including, as the curable compound, the above-described surface-modified metal oxide fine particles together with the compound represented by the formula (b-01).

Hereinafter, essential or optional components other than the curable compound represented by the formula (b-01) possessed by the curable composition as the energy-sensitive composition of the fifth aspect are described.

The curable compound may include a cationic polymerizable compound other than the above-described compound represented by the formula (b-01). The amount of the compound represented by the formula (a1) in the curable compound is preferably 50% by mass or more, more preferably 70% by mass or more, and more preferably 80% by mass or more, further more preferably 90% by mass or more, and particularly preferably 100% by mass.

The curable compound may include a cationic polymerizable compound other than the compound represented by the formula (b-01). Examples thereof include a vinyl ether compound including a vinyloxy group, an epoxy compound including an epoxy group, an episulfide compound including an episulfide group, and a radical polymerizable compound including a radical polymerizable unsaturated double bond. Furthermore, for the purpose of adjusting the refractive index of a cured product, and the like, both $W^{01}$ and $W^{02}$ of the above-mentioned compound represented by the formula (b-01) may combine a compound having a hydrogen atom as $R^{03}$. Rings $Z^{01}$, $X^{01}$, $R^{01}$, $R^{02}$, M in the formula (b-02) of the compound are the same as those in the compound represented by the formula (b-01). Hereinafter, the vinyl ether compound, the epoxy compound, the episulphide compound, and the radical polymerizable compound will be described.

(Vinyl Ether Compound)

The vinyl ether compound usable together with the compound represented by the formula (b-01) is not particularly limited as long as it has a vinyloxy group and is a cationic polymerizable compound. The vinyl ether compound to be used in combination with the compound represented by the formula (b-01) may have an aromatic group or not. In view of transparency of a cured product, a vinyl ether compound to be used in combination with the compound represented by the formula (b-01) is preferably an aliphatic vinyl ether compound that does not include an aromatic group. In view of satisfactory pyrolysis resistance of the cured product, the vinyl ether compound to be used in combination with the compound represented by the formula (b-01) is preferably a compound having a vinyloxy group bonded to an aromatic group.

Suitable specific examples of the vinyl ether compound usable together with the compound represented by the formula (b-01) include aliphatic vinyl ether compounds such as ethyl vinyl ether, isobutyl vinyl ether, hydroxybutyl vinyl ether, butanediol divinyl ether, cyclohexyl vinyl ether, N-butyl vinyl ether, tert-butyl vinyl ether, triethylene glycol divinyl ether octadecyl vinyl ether, cyclohexane dimethanol divinyl ether, diethylene glycol divinyl ether, and cyclohexane dimethanol monovinyl ether vinyl phenyl ether; aromatic monovinyl ether compounds such as, 4-vinyloxytoluene, 3-vinyloxytoluene, 2-vinyloxytoluene, 1-vinyloxy-4-chlorobenzene, 1-vinyloxy-3-chlorobenzene, 1-vinyloxy-2-chlorobenzene, 1-vinyloxy-2,3-dimethylbenzene, 1-vinyloxy-2,4-dimethylbenzene, 1-vinyloxy-2,5-dimethylbenzene, 1-vinyloxy-2,6-dimethylbenzene, 1-vinyloxy-3,4-dimethylbenzene, 1-vinyloxy-3,5-dimethylbenzene, 1-vinyloxynaphthalene, 2-vinyloxynaphthalene, 2-vinyloxyfluorene, 3-vinyloxyfluorene, 4-vinyloxy-1,1'-biphenyl, 3-vinyloxy-1,1'-biphenyl, 2-vinyloxy-1,1'-biphenyl, 6-vinyloxytetralin, and 5-vinyloxytetralin; and aromatic divinyl ether compounds such as 1,4-divinyloxybenzene, 1,3-divinyloxybenzene, 1,2-divinyloxybenzene, 1,4-divinyloxynaphthalene, 1,3-divinyloxynaphthalene, 1,2-divinyloxynaphthalene, 1,5-divinyloxynaphthalene, 1,6-divinyloxynaphthalene, 1,7-divinyloxynaphthalene, 1,8-divinyloxynaphthalene, 2,3-divinyloxynaphthalene, 2,6-divinyloxynaphthalene, 2,7-divinyloxynaphthalene, 1,2-divinyloxyfluorene, 3,4-divinyloxyfluorene, 2,7-divinyloxyfluorene, 4,4'-divinyloxybiphenyl, 3,3'-divinyloxybiphenyl, 2,2'-divinyloxybiphenyl, 3,4'-divinyloxybiphenyl, 2,3'-divinyloxybiphenyl, 2,4'-divinyloxybiphenyl, and bisphenol A divinyl ether. These vinyl ether compounds can be used in combination of two or more types thereof.

(Epoxy Compound)

Examples of the epoxy compound usable together with the compound represented by the formula (b-01) include epoxy compounds the same as the epoxy resin precursor as the thermosetting material described for the base material component (B).

(Episulfide Compound)

There is no specific limitation on the type of the episulfide compound as long as it does not interfere with the object of the present invention. Examples of preferred episulfide compound include compounds in which the oxygen atom in the epoxy group of the epoxy compound is substituted with a sulfur atom.

(Radical Polymerizable Compound)

It is possible to use, as a radical polymerizable compound, a compound having an ethylenically unsaturated group. Examples of the compound having an ethylenically unsaturated group include a monofunctional compound and a polyfunctional compound.

Examples of the monofunctional compound include (meth)acrylamide, methylol (meth)acrylamide, methoxymethyl (meth)acrylamide, ethoxymethyl (meth)acrylamide, propoxymethyl (meth)acrylamide, butoxymethoxymethyl (meth)acrylamide, N-methylol (meth)acrylamide, N-hydroxymethyl (meth)acrylamide, (meth)acrylic acid, fumaric acid, maleic acid, maleic anhydride, itaconic acid, itaconic anhydride, citraconic acid, citraconic anhydride, crotonic acid, 2-acrylamide-2-methylpropanesulfonic acid, tert-butylacrylamidesulfonic acid, methyl (meth)acrylate, ethyl (meth)acrylate, butyl (meth)acrylate, 2-ethylhexyl (meth)acrylate, cyclohexyl (meth)acrylate, 2-hydroxyethyl (meth)acrylate, 2-hydroxypropyl (meth)acrylate, 2-hydroxybutyl (meth)acrylate, 2-phenoxy-2-hydroxypropyl (meth)acrylate, 2-(meth)acryloyloxy-2-hydroxypropyl phthalate, glycerin mono(meth)acrylate, tetrahydrofurfuryl (meth)acrylate, dimethylaminoethyl (meth)acrylate, glycidyl (meth)acrylate, 2,2,2-trifluoroethyl (meth)acrylate, 2,2,3,3-tetrafluoropropyl (meth)acrylate, a half (meth)acrylate of phthalic acid derivatives, and the like. These monofunctional compounds may be used alone, or in combination of two or more types thereof.

Meanwhile, examples of the polyfunctional compound include ethylene glycol di(meth)acrylate, diethylene glycol di(meth)acrylate, tetraethylene glycol di(meth)acrylate, propylene glycol di(meth)acrylate, polypropylene glycol di(meth)acrylate, butylene glycol di(meth)acrylate, neopentyl glycol di(meth)acrylate, 1,6-hexane glycol di(meth)acrylate, trimethylolpropane tri(meth)acrylate, glycerin di(meth)acrylate, pentaerythritol triacrylate, pentaerythritol tetraacrylate, dipentaerythritol pentaacrylate, dipentaerythritol hexaacrylate, pentaerythritol di(meth)acrylate, pentaerythritol tri(meth)acrylate, pentaerythritol tetra(meth)acrylate, dipentaerythritol penta(meth)acrylate, dipentaerythritol hexa(meth)acrylate, 2,2-bis(4-(meth)acryloxydiethoxyphenyl) propane, 2,2-bis(4-(meth)acryloxypolyethoxyphenyl) propane, 2-hydroxy-3-(meth)acryloyloxypropyl (meth) acrylate, ethylene glycol diglycidyl ether di(meth)acrylate, diethylene glycol diglycidyl ether di(meth)acrylate, phthalic acid diglycidyl ester di(meth)acrylate, glycerin triacrylate, glycerin polyglycidyl ether poly(meth)acrylate, urethane (meth)acrylate (i.e., tolylene diisocyanate, trimethylhexamethylene diisocyanate, or a reaction product of hexamethylene diisocyanate and 2-hydroxyethyl (meth)acrylate), methylenebis(meth)acrylamide, (meth)acrylamide methylene ether, a polyfunctional compound such as a fused product of polyhydric alcohol and N-methylol(meth)acrylamide, triacryl formal, and the like. These polyfunctional compounds may be used alone, or in combination of two or more types thereof.

Of these compounds having an ethylenically unsaturated group, trifunctional or higher polyfunctional compound is preferable, a tetrafunctional or higher polyfunctional compound is more preferable, and a pentafunctional or higher polyfunctional compound is still more preferable, in view of the fact that they tend to increase the adhesion of the cured product to the base material, and the strength of the curable composition after curing.

There is no particular limitation on the content of curable compound in the energy-sensitive composition of the fifth aspect as long as the object of the present invention is not impaired. The content of the curable compound in the energy-sensitive composition of the fifth aspect is preferably 3% by mass or more and 95% by mass or less, more preferably 5% by mass or more and 90% by mass or less, still more preferably 10% by mass or more and 85% by mass or less, and particularly preferably 20% by mass or more and 80% by mass or less, relative to the mass of the entire components excluding the solvent.

There is no particular limitation on the content of metal oxide (A) in the energy-sensitive composition of the fifth aspect as long as the object of the present invention is not impaired. In view of the achievement of higher refractive index and satisfactory bending property of a cured product, the mass ratio of the curable compound to the metal oxide (A) is typically preferably 1:99 to 95:5, more preferably 5:95 to 90:10, further preferably 10:90 to 85:15, and particularly preferably 30:70 to 80:20. Furthermore, the mass is preferably, for example, 5% by mass or more and 95% by mass or less, more preferably 10% by mass or more and 93% by mass or less, more preferably 15% by mass or more and 90% by mass or less, and particularly preferably 20% by mass or more and 80% by mass or less, relative to the mass of the curable composition excluding a solvent.

(Curing Agent)

A curable composition includes a curing agent from the viewpoint of promoting curing. The curing agent may be used alone or as a mixture of a plurality types thereof. The curing agent is preferably a cationic polymerization initiator or an anionic polymerization initiator, and more preferably a cationic polymerization initiator, from the viewpoint that the curable composition is a cationic curing type or an anionic curing type.

Onium Salt (B01)

Examples of the cationic polymerization initiators include a gallium-containing onium salt having an anion moiety and represented by the following formula (bi) and a boron-containing onium salt having an anion moiety and represented by the following formula (bii). The gallium-containing onium salt having an anion moiety and represented by the following formula (bi) and the boron-containing onium salt having an anion moiety and represented by the following formula (bii) are also referred to as "onium salt (B01)" as a generic term. From the viewpoint of curability, the cationic polymerization initiator including both gallium-containing onium salt having an anionic moiety and represented by the following formula (ai) and boron-containing onium salt having an anionic moiety and represented by the following formula (aii) is also preferable.

[Chem. 57]

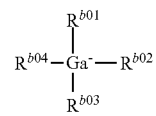

(bi)

(In the formula (b2), $R^{b01}$, $R^{b02}$, $R^{b03}$ and $R^{b04}$ are each independently an optionally substituted hydrocarbon group, or an optionally substituted heterocyclic group, and at least one of $R^{b01}$, $R^{b02}$, $R^{b03}$ and $R^{b04}$ is an optionally substituted aromatic hydrocarbon group)

[Chem. 58]

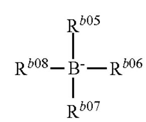

(bii)

(In the formula (bii), $R^{b05}$, $R^{b06}$, $R^{b07}$, and $R^{b08}$ are each independently an optionally substituted hydrocarbon group, or an optionally substituted heterocyclic group, and at least one of $R^{b05}$, $R^{b06}$, $R^{b07}$, and $R^{b08}$ is an optionally substituted aromatic hydrocarbon group.)

In the gallium-containing onium salt having an anion moiety and represented by the formula (bi) and the boron-containing onium salt having an anion moiety and represented by the formula (bii), the counter cation (cation moiety) to the anion represented by the formula (bi) and the formula (bii) is not particularly limited as long as the curable composition is satisfactorily cured. Examples of the cation moiety includes, the following formula (biv):

$$(R^{b09})_{T+1}—R^{b010+} \quad \text{(biv)}$$

(in the formula (biv), $R^{b09}$ is a monovalent organic group. $R^{b010}$ is a Group 15 to 17 (IUPAC notation) element having an atomic value T. Tis an integer of 1 or more and 3 or less. A plurality of $R^{b09}$ may be the same or different from each other, and a plurality of $R^{b09}$ may be combined with each other to form a ring together with)$R^{b010}$).

The number of carbon atoms in a hydrocarbon group or heterocyclic group as $R^{b01}$ to $R^{b04}$ in the formula (bi) is not particularly limited, and is preferably 1 or more and 50 or less, more preferably 1 or more and 30 or less, and particularly preferably 1 or more and 20 or less. Specific examples of the hydrocarbon group as $R^{b01}$ to $R^{b04}$ include a linear or branched alkyl group, a linear or branched alkenyl group, a linear or branched alkynyl group, an aromatic hydrocarbon group, an alicyclic hydrocarbon group, an aralkyl group, and the like. As described above, at least one of $R^{b01}$ to $R^{b04}$ is an optionally substituted aromatic group, more preferably three or more of $R^{b01}$ to $R^{b04}$ are an optionally substituted aromatic group, and particularly preferably all of $R^{b01}$ to $R^{b04}$ are an optionally substituted aromatic group.

Substituents which may be possessed by a hydrocarbon group or a heterocyclic group as $R^{b01}$ to $R^{b04}$ include a halogenated alkyl group having 1 or more and 18 or less carbon atoms, a halogenated aliphatic cyclic group having 3 or more and 18 or less carbon atoms, a nitro group, a hydroxyl group, a cyano group, an alkoxy group having 1 or more and 18 or less carbon atoms, an aryloxy group having 6 or more and 14 or less carbon atoms, an aliphatic acyl group having 2 or more and 19 or less carbon atoms, an aromatic acyl group having 7 or more and 15 or less carbon atoms, an aliphatic acyloxy group having 2 or more and 19 or less carbon atoms, an aromatic acyloxy group having 7 or more and 15 or less carbon atoms, an alkylthio group having 1 or more and 18 or less carbon atoms, an arylthio group having 6 or more and 14 or less carbon atoms, an amino group in which one or two hydrogen atoms bonded to the nitrogen atom are optionally substituted with a hydrocarbon group(s) having 1 or more and 18 or less carbon atoms, and a halogen atom. When a hydrocarbon group as $R^{b01}$ to $R^{b04}$ is an aromatic hydrocarbon group, the aromatic hydrocarbon group is optionally substituted with one or more substituents selected from the group consisting of an alkyl group having 1 or more and 18 or less carbon atoms, an alkenyl group having 2 or more and 18 or less carbon atoms, and an alkynyl group having 2 or more and 18 or less carbon atoms.

When a hydrocarbon group as $R^{b01}$ to $R^{b04}$ has a substituent, the number of substituents is not particularly limited, and may be one or plural, two or more. When the number of substituents is plural, the plurality of substituents each may be the same or different.

When $R^{b01}$ to $R^{b04}$ are an alkyl group, suitable specific examples thereof include linear alkyl groups such as a methyl group, an ethyl group, an n-propyl group, an n-butyl group, an n-pentyl group, an n-hexyl group, an n-octyl group, an n-nonyl group, an n-decyl group, an n-undecyl group, an n-dodecyl group, an n-tridecyl group, an n-tetradecyl group, an n-pentadecyl group, an n-hexadecyl group, an n-heptadecyl group, an n-octadecyl group, an n-nonadecyl group and an n-icosyl group; and branched alkyl groups such as an isopropyl group, an isobutyl group, a sec-butyl group, a tert-butyl group, an isopentyl group, a neopentyl group, a tert-pentyl group, an isohexyl group, a 2-ethylhexyl group and a 1,1,3,3-tetramethylbutyl group.

When $R^{b01}$ to $R^{b04}$ are an alkenyl group or an alkynyl group, suitable examples thereof include alkenyl groups and alkynyl groups corresponding to the suitable groups as an alkyl group.

When $R^{b01}$ to $R^{b04}$ are an aromatic hydrocarbon group, suitable examples thereof include a phenyl group, an α-naphthyl group, a β-naphthyl group, a biphenyl-4-yl group, a biphenyl-3-yl group, a biphenyl-2-yl group, an anthryl group, and a phenanthryl group, and the like.

When $R^{b01}$ to $R^{b04}$ are an alicyclic hydrocarbon group, suitable examples thereof include cycloalkyl groups such as a cyclopropyl group, a cyclobutyl group, a cyclopentyl group, a cyclohexyl group, a cyclopentyl group, a cyclooctyl group, a cyclononyl group, and a cyclodecyl group; and cross-linking aliphatic cyclic hydrocarbon groups such as a norbornyl group, an adamantyl group, a tricyclodecyl group, and a pinanyl group.

When $R^{b01}$ to $R^{b04}$ are an aralkyl group, suitable examples thereof include a benzyl group, a phenethyl group, an α-naphtylmethyl group, a β-naphtylmethyl group, an α-naphtylethyl group, and a β-naphtylethyl group, and the like.

When $R^{b01}$ to $R^{b04}$ are a heterocyclic group, suitable examples thereof include a thienyl group, a furanyl group, a selenophenyl group, a pyranyl group, a pyrrolyl group, an oxazolyl group, a thiazolyl group, a pyridyl group, a pyrimidyl group, a pyrazinyl group, an indolyl group, a benzofuranyl group, a benzothienyl group, a quinolyl group, an isoquinolyl group, a quinoxalinyl group, a quinazolinyl group, a carbazolyl group, an acridinyl group, a phenothiazinyl group, a phenazinyl group, a xanthenyl group, a thianthrenyl group, a phenoxazinyl group, a phenoxathiinyl group, a chromanyl group, an isochromanyl group, a dibenzothienyl group, a xanthonyl group, a thioxanthonyl group, and a dibenzofuranyl group, and the like.

When a substituent optionally bonded to a hydrocarbon group or heterocyclic group as $R^{b01}$ to $R^{b04}$ is a halogenated alkyl group, preferred examples of the halogenated alkyl group include linear halogenated alkyl groups such as a trifluoromethyl group, a trichloromethyl group, a pentafluoroethyl group, a 2,2,2-trichloroethyl group, a 2,2,2-trifluoroethyl group, a 1,1-difluoroethyl group, a heptafluoro-n-propyl group, a 1,1-difluoro-n-propyl group, a 3,3,3-trifluoro-n-propyl group, a nonafluoro-n-butyl group, a 3,3,4,4,4-pentafluoro-n-butyl group, a perfluoro-n-pentyl group, and a perfluoro-n-octyl group; and branched halogenated alkyl groups such as a hexafluoroisopropyl group, a hexachloroisopropyl group, a hexafluoroisobutyl group, and a nonafluoro-tert-butyl group.

When a substituent which a hydrocarbon group or heterocyclic group as $R^{b01}$ to $R^{b04}$ may have is a halogenated aliphatic cyclic group, preferred examples of the halogenated aliphatic cyclic group include a pentafluorocyclopropyl group, a nonafluorocyclobutyl group, a perfluorocyclopentyl group, a perfluorocyclohexyl group, and a perfluoroadamantyl group, and the like.

When a substituent which a hydrocarbon group or heterocyclic group as $R^{b01}$ to $R^{b04}$ may have is an alkoxy group, preferred examples of the alkoxy group include linear alkoxy groups such as a methoxy group, an ethoxy group, an n-propyloxy group, an n-butyloxy group, an n-pentyloxy group, an n-hexyloxy group, an n-octyloxy group, an n-nonyloxy group, an n-decyloxy group, an n-undecyloxy group, an n-dodecyloxy group, an n-tridecyloxy group, an n-tetradecyloxy group, an n-pentadecyloxy group, an n-hexadecyloxy group, an n-heptadecyloxy group, and an n-octadecyloxy group; and branched alkoxy groups such as an isopropyloxy group, an isobutyloxy group, a sec-butyloxy group, a tert-butyloxy group, an isopentyloxy group, a neopentyloxy group, a tert-pentyloxy group, an isohexyloxy group, a 2-ethylhexyloxy group, and a 1,1,3,3-tetramethylbutyloxy group.

When a substituent which a hydrocarbon group or heterocyclic group as $R^{b01}$ to $R^{b04}$ may have is an aryloxy group, preferred examples of the aryloxy group include a phenoxy group, an α-naphthyloxy group, a β-naphthyloxy group, a biphenyl-4-yloxy group, a biphenyl-3-yloxy group, a biphenyl-2-yloxy group, an anthryloxy group, and a phenanthryloxy group, and the like.

When a substituent which a hydrocarbon group or heterocyclic group as $R^{b01}$ to $R^{b04}$ may have is an aliphatic acyl group, preferred examples of the aliphatic acyl group include an acetyl group, a propanoyl group, a butanoyl group, a pentanoyl group, a hexanoyl group, a heptanoyl group, and an octanoyl group, and the like.

When a substituent which a hydrocarbon group or heterocyclic group as $R^{b01}$ to $R^{b04}$ may have is an aromatic acyl group, preferred examples of the aromatic acyl group include a benzoyl group, an α-naphthoyl group, a β-naphthoyl group, a biphenyl-4-ylcarbonyl group, a biphenyl-3-ylcarbonyl group, a biphenyl-2-ylcarbonyl group, an anthrylcarbonyl group, and a phenanthrylcarbonyl group, and the like.

When a substituent which a hydrocarbon group or heterocyclic group as $R^{b01}$ to $R^{b04}$ may have is an aliphatic acyloxy group, preferred examples of the aliphatic acyloxy group include an acetyloxy group, a propanoyloxy group, a butanoyloxy group, a pentanoyloxy group, a hexanoyloxy group, a heptanoyloxy group, and an octanoyloxy group, and the like.

When a substituent which a hydrocarbon group or heterocyclic group as $R^{b01}$ to $R^{b04}$ may have is an aromatic acyloxy group, preferred examples of the aromatic acyloxy group include a benzoyloxy group, an α-naphthoyloxy group, a β-naphthoyloxy group, a biphenyl-4-ylcarbonyloxy group, a biphenyl-3-ylcarbonyloxy group, a biphenyl-2-ylcarbonyloxy group, an anthrylcarbonyloxy group, and a phenanthrylcarbonyloxy group, and the like.

When a substituent which a hydrocarbon group or heterocyclic group as $R^{b01}$ to $R^{b04}$ may have is an alkylthio group or an arylthio group, preferred examples of the alkylthio group or arylthio group include groups in which the oxygen atom in suitable groups as the above-described alkoxy group or aryloxy group is substituted with sulfur atom.

When a substituent which a hydrocarbon group or heterocyclic group as $R^{b01}$ to $R^{b04}$ may have is an amino group optionally substituted with a hydrocarbon group, suitable examples of the amino group optionally substituted with a hydrocarbon group include an amino group, a methylamino group, an ethylamino group, an n-propylamino group, a dimethylamino group, a diethylamino group, a methylethylamino group, a di-n-propylamino group, and a piperidino group, and the like.

When a substituent which a hydrocarbon group or a heterocyclic group as $R^{b01}$ to $R^{b04}$ may have is a halogen atom, suitable examples of the halogen atom include a fluorine atom, a chlorine atom, a bromine atom, and an iodine atom, and the like.

Among the substituents which a hydrocarbon group or a heterocyclic group as $R^{b01}$ to $R^{b04}$ may have as described above, in view of a high activity as an cationic polymerization initiator of a gallium-containing onium salt having an anion moiety and represented by the formula (bi), a halogenated alkyl group having 1 or more and 8 or less carbon atoms, a halogen atom, a nitro group, and a cyano group are preferable, and a fluorinated alkyl group having 1 or more and 8 or less carbon atoms is more preferable.

Examples of the $R^{b05}$ to $R^{b08}$ in the formula (bii) include the same as those described for $R^{b01}$ to $R^{b04}$ in the formula (bi).

$R^{b09}$ as a cation moiety in the formula (biv) is an organic group bonded to $R^{b010}$. When a plurality of $R^{b09}$ is present, the plurality of $R^{b09}$ may be the same as or different from each other. Examples of $R^{b09}$ include an optionally substituted aromatic hydrocarbon group having 6 or more and 14 or less carbon atoms, an optionally substituted alkyl group having 1 or more and 18 or less carbon atoms, an optionally substituted alkenyl group having 2 or more and 18 or less carbon atoms, and an optionally substituted alkynyl group having 2 or more and 18 or less carbon atoms. In the case of a photosensitive curing agent including the cation represented by the formula (biv) as a cation moiety, $R^{b09}$ is preferably an aromatic hydrocarbon group having 6 or more and 14 or less carbon atoms, alkyl group having 1 or more and 18 or less carbon atoms, alkenyl group having 2 or more and 18 or less carbon atoms, and an alkynyl group having 2 or more and 18 or less carbon atoms. Examples of the substituents which an aromatic hydrocarbon group, an aralkyl group, an alkyl group, an alkenyl group, and an alkynyl group may have, as $R^{b09}$ include an alkyl group having 1 or more and 18 or less carbon atoms, an alkenyl group having 2 or more and 18 or less carbon atoms, an alkynyl group having 2 or more and 18 or less carbon atoms, an aryl group having 6 or more and 14 or less carbon atoms, a nitro group, a hydroxyl group, a cyano group, an alkoxy group having 1 or more and 18 or less carbon atoms, an aryloxy group having 6 or more and 14 or less carbon atoms, an aliphatic acyl group having 2 or more and 19 or less carbon atoms, an aromatic acyl group having 7 or more and 15 or less carbon atoms, an aliphatic acyloxy group having 2 or more and 19 or less carbon atoms, an aromatic acyloxy group having 7 or more and 15 or less carbon atoms, an alkylthio group having 1 or more and 18 or less carbon atoms, an arylthio group having 6 or more and 14 or less carbon atoms, an amino group in which one or two hydrogen atoms bonded to the nitrogen atom are optionally substituted with a hydrocarbon group having 1 or more and 18 or less carbon atoms, and a halogen atom. Suitable examples of these substituents are the same as the suitable examples of substituents which a hydrocarbon group or a heterocyclic group as $R^{b01}$ to $R^{b04}$ in the formula (bi) may have.

When a plurality of $R^{b09}$ exists in the formula (biv), the plurality of $R^{b09}$ may form a ring together with $R^{b010}$. A ring formed from a plurality of $R^{b09}$ and $R^{b010}$ may comprise a bond selected from the group consisting of —O—, —S—, —SO—, $—SO_2—$, —NH—, —CO—, —COO— and —CONH— in the ring structure.

$R^{b010}$ in the formula (biv) is a Group 15 to 17 (IUPAC notation) element having an atomic value T. Tis an integer of 1 or more and 3 or less. Note here that the Group 15 to 17 (IUPAC notation) element as $R^{b010}$ is an element that can be present stably under the conditions in which a curable composition is formed, under the storage conditions, and under the conditions in which a metal oxide-containing film is formed. $R^{b010}$ is bonded to the organic group $R^{b09}$ to form an onium ion [$R^{b010+}$]. Among the Group 15 to 17 (IUPAC notation) elements, preferable elements as $R^{b010}$ is O (oxygen), N (nitrogen), P (phosphorus), S (sulfur) or I (iodine). Corresponding onium ions are an oxonium ion, an ammonium ion, a phosphonium ion, a sulfonium ion, and an iodonium ion. Among these, an ammonium ion, a phosphonium ion, a sulfonium ion and an iodonium ion are preferable due to stability and easy handleability, and a sulfonium ion and an iodonium ion are more preferable in view of excellent cationic polymerization properties and cross-linking reaction properties.

Specific examples of the oxonium ion include oxoniums such as trimethyloxonium, diethylmethyloxonium, triethyloxonium, and tetramethylene methyloxonium; pyryliniums such as 4-methylpyrylinium, 2,4,6-trimethylpyrylinium, 2,6-di-tert-butylpyrylinium, and 2,6-diphenylpyrylinium; chromeniums such as 2,4-dimethylchromenium, and 1,3-dimethylisochromenium, and isochromenium.

Specific examples of the ammonium ion include tetraalkylammoniums such as tetramethylammonium, ethyltrimethylammonium, diethyldimethylammonium, triethylmethylammonium and tetraethylammonium; pyrrolidiniums such as N,N-dimethylpyrrolidinium, N-ethyl-N-methylpyrrolidinium and N,N-diethylpyrrolidinium; imidazoliniums such as N,N'-dimethylimidazolinium, N,N'-diethylimidazolinium, N-ethyl-N'-methylimidazolinium, 1,3,4-trimethylimidazolinium and 1,2,3,4-tetramethylimidazolinium; tetrahydropyrimidiniums such as N,N'-dimethyltetrahydropyrimidinium; morpholiniums such as N,N'-dimethylmorpholinium; piperidiniums such as N,N'-diethylpiperidinium; pyridiniums such as N-methylpyridinium, N-benzylpyridinium and N-phenacylpyridinium; imidazoliums such as N,N'-dimethylimidazolium; quinoliums such as N-methylquinolium, N-benzylquinolium and N-phenacylquinolium; isoquinoliums such as N-methylisoquinolium; thiazoniums such as benzylbenzothiazonium and phenacylbenzothiazonium; and acridiums such as benzylacridium and phenacylacridium.

Specific examples of the phosphonium ion include tetraarylphosphoniums such as tetraphenylphosphonium, tetra-p-tolylphosphonium, tetrakis(2-methoxyphenyl)phosphonium, tetrakis(3-methoxyphenyl)phosphonium, and tetrakis(4-methoxyphenyl)phosphonium; triarylphosphoniums such as triphenylbenzylphosphonium, triphenylphenacylphosphonium, triphenylmethylphosphonium and triphenylbutylphosphonium; tetraalkylphosphoniums such as triethylbenzylphosphonium, tributylbenzylphosphonium, tetraethylphosphonium, tetrabutylphosphonium, tetrahexylphosphonium, triethylphenacylphosphonium, and tributylphenacylphosphonium, and the like.

Specific examples of the sulfonium ion include triarylsulfoniums such as triphenylsulfonium, tri-p-tolylsulfonium, tri-o-tolylsulfonium, tris(4-methoxyphenyl)sulfonium, 1-naphthyldiphenylsulfonium, 2-naphthyldiphenylsulfonium, tris(4-fluorophenyl)sulfonium, tri-1-naphthylsulfonium, tri-2-naphthylsulfonium, tris(4-hydroxyphenyl)sulfonium, 4-(phenylthio)phenyldiphenylsulfonium, 4-(p-tolylthio)phenyldi-p-tolylsulfonium, 4-(4-methoxyphenylthio)phenylbis(4-methoxyphenyl)sulfonium, 4-(phenylthio)phenylbis(4-fluorophenyl)sulfonium, 4-(phenylthio)phenylbis(4-methoxyphenyl)sulfonium, 4-(phenylthio)phenyldi-p-tolylsulfonium, [4-(4-biphenylylthio)phenyl]-4-biphenylylphenylsulfonium, [4-(2-thioxanthonylthio)phenyl]diphenylsulfonium, bis[4-(diphenylsulfonio)phenyl]sulfide, bis[4-{bis[4-(2-hydroxyethoxy)phenyl]sulfonio}phenyl]sulfide, bis{4-[bis(4-fluorophenyl)sulfonio]phenyl}sulfide, bis{4-[bis(4-methylphenyl)sulfonio]phenyl}sulfide, bis{4-[bis(4-methoxyphenyl)sulfonio]phenyl}sulfide, 4-(4-benzoyl-2-chlorophenylthio)phenylbis(4-fluorophenyl)sulfonium, 4-(4-benzoyl-2-chlorophenylthio)phenyldiphenylsulfonium, 4-(4-benzoylphenylthio)phenylbis(4-fluorophenyl)sulfonium, 4-(4-benzoylphenylthio)phenyldiphenylsulfonium, 7-isopropyl-9-oxo-10-thia-9,10-dihydroanthracen-2-yldi-p-tolylsulfonium, 7-isopropyl-9-oxo-10-thia-9,10-dihydroanthracen-2-yldiphenylsulfonium, 2-[(di-p-tolyl)sulfonio]thioxanthone, 2-[(diphenyl)sulfonio]thioxanthone, 4-(9-oxo-9H-thioxanthen-2-yl)thiophenyl-9-oxo-9H-thioxanthen-2-ylphenylsulfonium, 4-[4-(4-tert-butylbenzoyl)phenylthio]phenyldi-p-tolylsulfonium, 4-[4-(4-tert-butylbenzoyl)phenylthio]phenyldiphenylsulfonium, 4-[4-(benzoylphenylthio)]phenyldi-p-tolylsulfonium, 4-[4-(benzoylphenylthio)]phenyldiphenylsulfonium, 5-(4-methoxyphenyl)thianthrenium, 5-phenylthianthrenium, 5-tolylthianthrenium, 5-(4-ethoxyphenyl)thianthrenium, and 5-(2,4,6-trimethylphenyl)thianthrenium; diarylsulfoniums such as diphenylphenacylsulfonium, diphenyl4-nitrophenacylsulfonium, diphenylbenzylsulfonium, and diphenylmethylsulfonium; monoarylsulfoniums such as phenylmethylbenzylsulfonium, 4-hydroxyphenylmethylbenzylsulfonium, 4-methoxyphenylmethylbenzylsulfonium, 4-acetocarbonyloxyphenylmethylbenzylsulfonium, 4-hydroxyphenyl(2-naphtylmethyl)methylsulfonium, 2-naphtylmethylbenzylsulfonium, 2-naphtylmethyl(1-ethoxycarbonyl)ethylsulfonium, phenylmethylphenacylsulfonium, 4-hydroxyphenylmethylphenacylsulfonium, 4-methoxyphenylmethylphenacylsulfonium, 4-acetocarbonyloxyphenylmethylphenacylsulfonium, 2-naphtylmethylphenacylsulfonium, 2-naphtyloctadecylphenacylsulfonium, and 9-anthracenylmethylphenacylsulfonium; trialkylsulfoniums such as dimethylphenacylsulfonium, phenacyltetrahydrothiophenium, dimethylbenzylsulfonium, benzyltetrahydrothiophenium, and octadecylmethylphenacylsulfonium, and the like.

It is also preferred that the onium salt (B01) includes a sulfonium salt comprising the anion moiety, an anion represented by the above formula (bi) or the above formula (bii), and the cation moiety, a sulfonium ion represented by the formula (c1) described below.

Specific examples of the iodonium ion include iodonium ions such as diphenyliodonium, di-p-tolyliodonium, bis(4-dodecylphenyl)iodonium, bis(4-methoxyphenyl)iodonium, (4-octyloxyphenyl)phenyliodonium, bis(4-decyloxy)phenyliodonium, 4-(2-hydroxytetradecyloxy)phenylphenyliodonium, 4-isopropylphenyl(p-tolyl)iodonium, and 4-isobutylphenyl(p-tolyl)iodonium.

Suitable specific examples of the anion represented by the formula (b0i) described above include tetrakis(4-nonafluorobiphenyl)gallium anion, tetrakis(1-heptafluoronaphthyl)gallium anion, tetrakis(pentafluorophenyl)gallium anion, tetrakis(3,4,5-trifluorophenyl)gallium anion, tetrakis(2-nonaphenylbiphenyl)gallium anion, tetrakis(2-heptafluoronaphthyl)gallium anion, tetrakis(7-nonafluoroanthryl)gallium anion, tetrakis(4'-(methoxy)octafluorobiphenyl)gallium anion, tetrakis(2,4,6-tris(trifluoromethyl)phenyl)gallium anion, tetrakis(3,5-bis(trifluoromethyl)phenyl)gallium anion, tetrakis(2,3-bis(pentafluoroethyl)naphthyl)gallium anion, tetrakis(2-isopropoxy-hexafluoronaphthyl)gallium anion, tetrakis(9,10-bis(heptafluoropropyl)heptafluoroanthryl)gallium anion, tetrakis(9-nonafluorophenanthryl)gallium anion, tetrakis(4-[tri(isopropyl)silyl]-tetrafluorophenyl)gallium anion, tetrakis(9,10-bis(p-tolyl)-heptafluorophenanthryl)gallium anion, tetrakis(4-[dimethyl(t-butyl)silyl]-tetrafluorophenyl)gallium anion, monophenyltris(pentafluorophenyl)gallium anion, and monoperfluorobutyltris(pentafluorophenyl)gallium anion, and the like, and more preferably the following anions.

[Chem. 59]

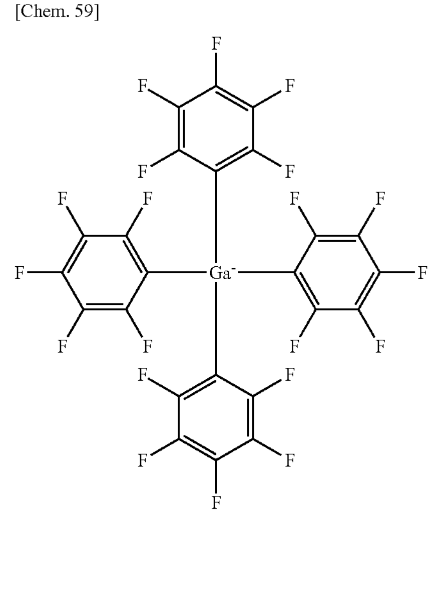

-continued

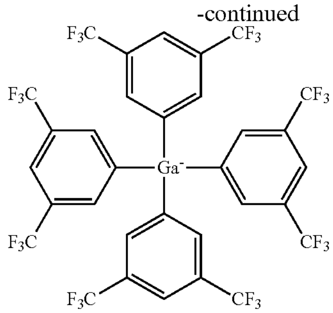

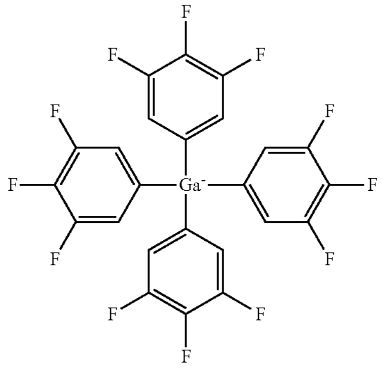

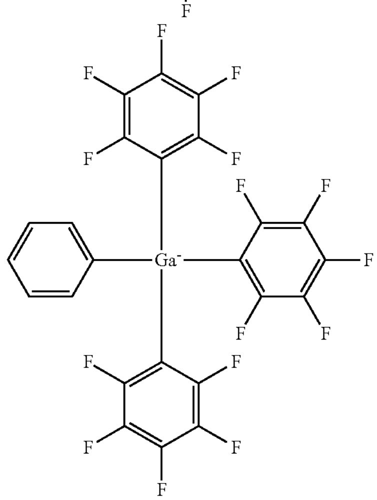

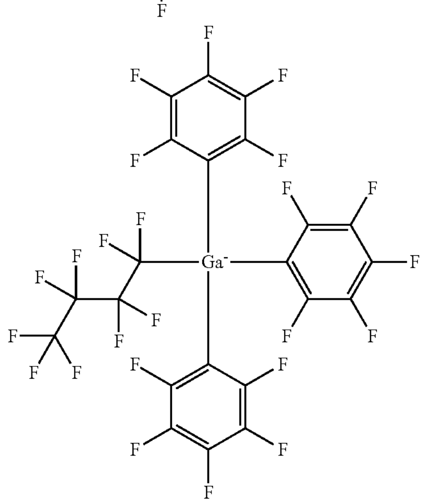

Furthermore, specific examples of the anion moiety represented by the formula (bii) described above include tetrakis(4-nonafluorobiphenyl)boron anion, tetrakis(1-heptafluoronaphthyl)boron anion, tetrakis(pentafluorophenyl)boron anion, tetrakis(3,4,5-trifluorophenyl)boron anion, tetrakis(2-nonaphenylbiphenyl)boron anion, tetrakis(2-heptafluoronaphthyl)boron anion, tetrakis(7-nonafluoroanthryl)boron anion, tetrakis(4'-(methoxy)octafluorobiphenyl)boron anion, tetrakis(2,4,6-tris(trifluoromethyl)phenyl)boron anion, tetrakis(3,5-bis(trifluoromethyl)phenyl)boron anion, tetrakis(2,3-bis(pentafluoroethyl)naphthyl)boron anion, tetrakis(2-isopropoxy-hexafluoronaphthyl)boron anion, tetrakis(9,10-bis(heptafluoropropyl)heptafluoroanthryl)boron anion, tetrakis(9-nonafluorophenanthryl)boron anion, tetrakis(4-[tri(isopropyl)silyl]-tetrafluorophenyl)boron anion, tetrakis(9,10-bis(p-tolyl)-heptafluorophenanthryl)boron anion, tetrakis(4-[dimethyl(t-butyl)silyl]-tetrafluorophenyl) boron anion, monophenyltris(pentafluorophenyl)boron anion, and monoperfluorobutyltris(pentafluorophenyl)boron anion, and the like, and more preferably the following anions.

[Chem. 60]

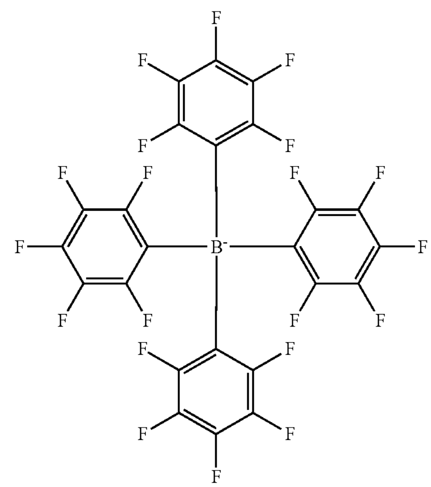

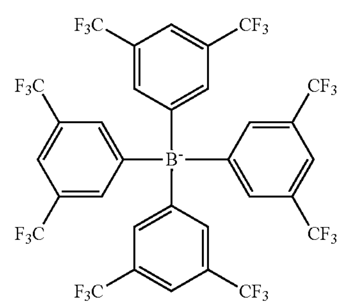

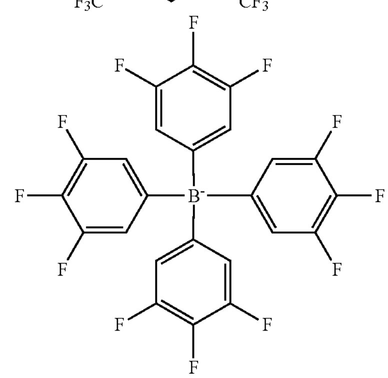

-continued

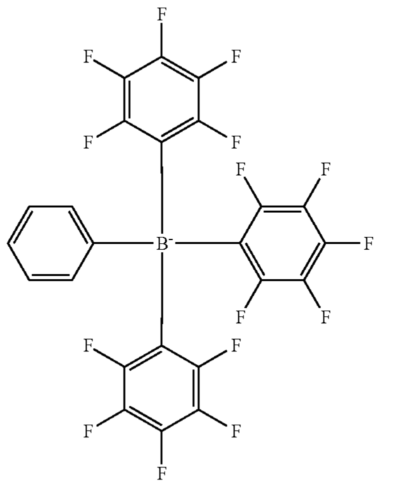

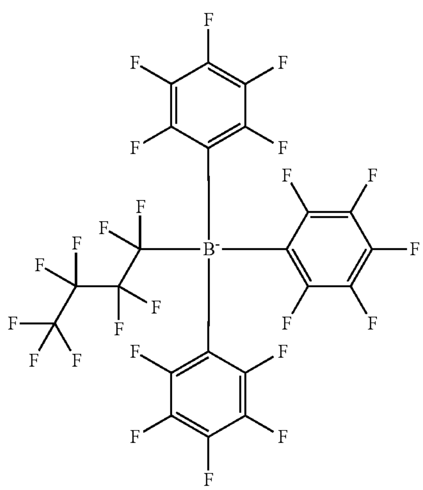 [SMILES: Fc1c(F)c(F)c([B-](c2c(F)c(F)c(F)c(F)c2F)(c2c(F)c(F)c(F)c(F)c2F)C(F)(F)C(F)(F)C(F)(F)C(F)(F)F)c(F)c1F]

Suitable specific examples of the cation moiety represented by the formula (biv) described above include iodonium ions such as 4-isopropylphenyl(p-tolyl)iodonium, and 4-isobutylphenyl(p-tolyl)iodonium; thioxanthone skeleton-containing sulfonium ions such as [4-(2-thioxanthonylthio)phenyl]diphenylsulfonium, 2-[(di-p-tolyl)sulfonio]thioxanthone, 2-[(diphenyl)sulfonio]thioxanthone, 4-(9-oxo-9H-thioxanthen-2-yl)thiophenyl-9-oxo-9H-thioxanthen-2-ylphenylsulfonium;

a cation moiety represented by the formula (biii) described below;

a cation moiety represented by the formula (c01) described below; and sulfonium ions given below.

[Chem. 61]

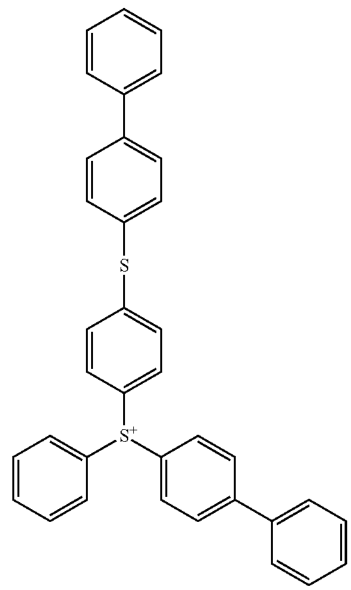

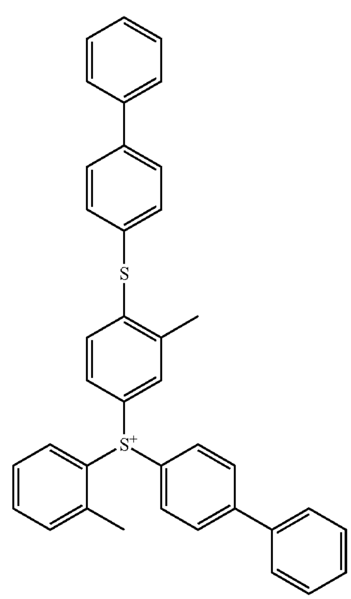

-continued
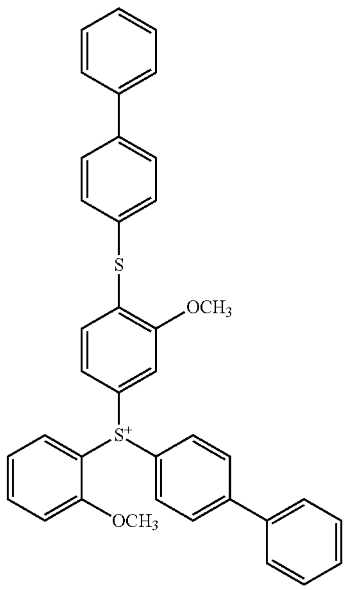
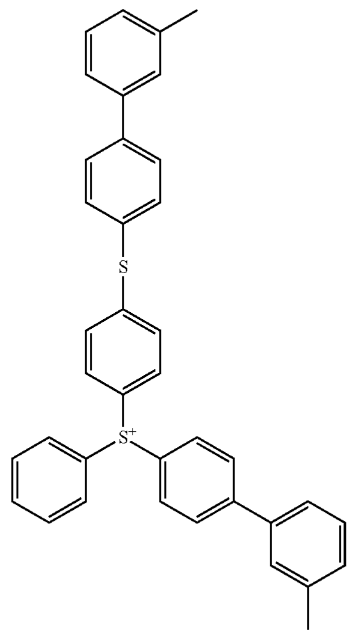
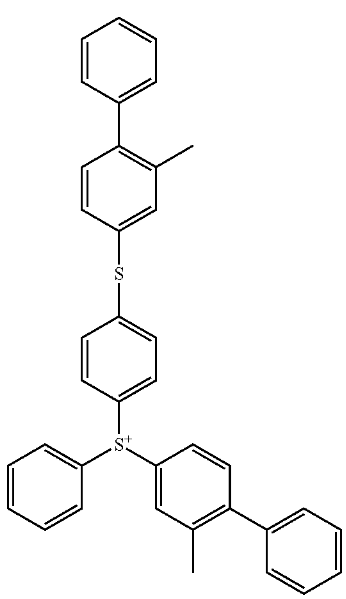 [SMILES: Cc1cc(Sc2ccc([S+](c3ccccc3)c3ccc(-c4ccccc4)c(C)c3)cc2)ccc1-c1ccccc1]
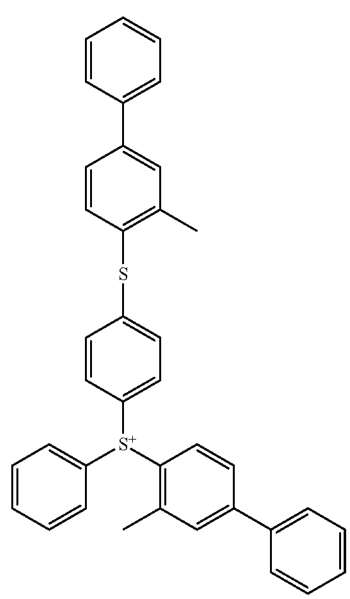

-continued
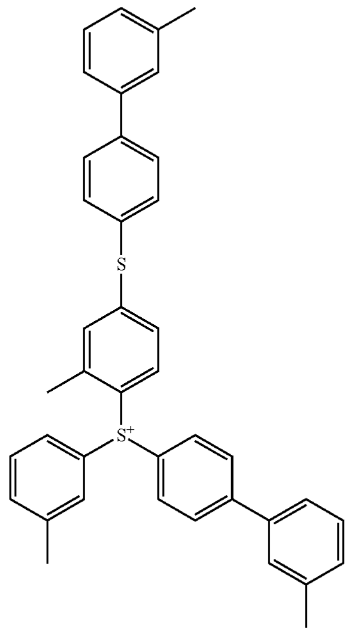
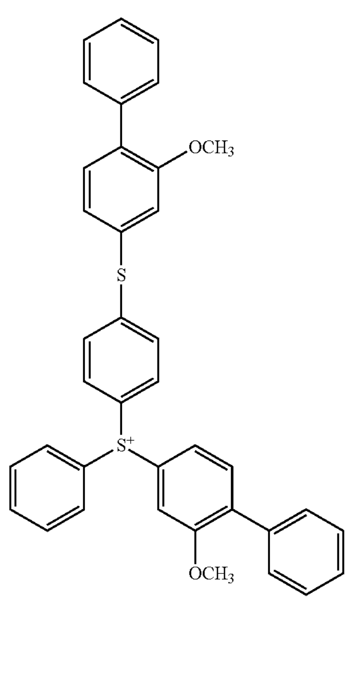
-continued
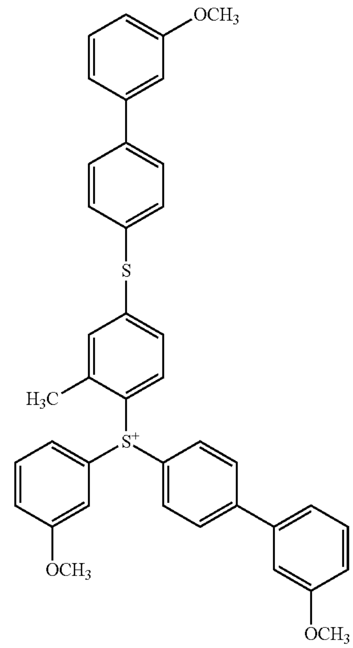
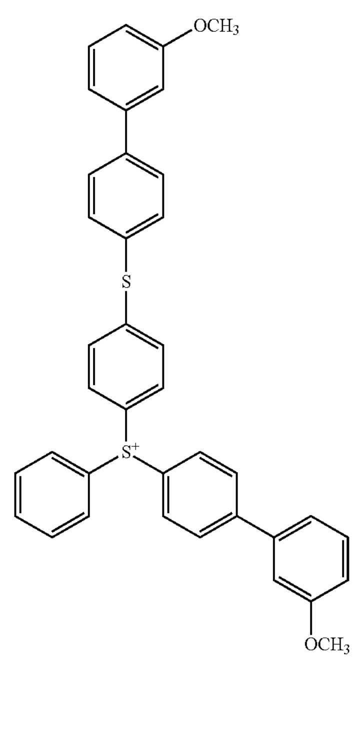

-continued
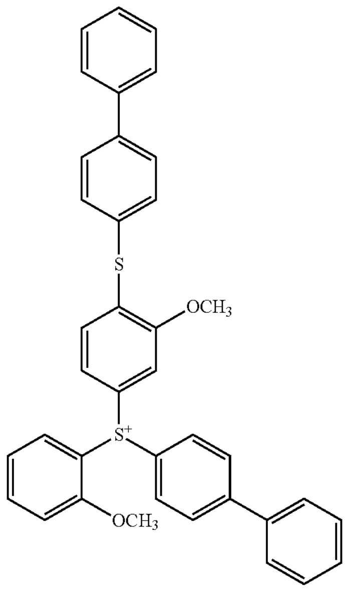
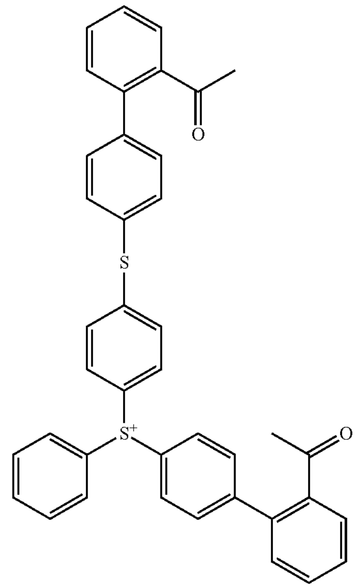
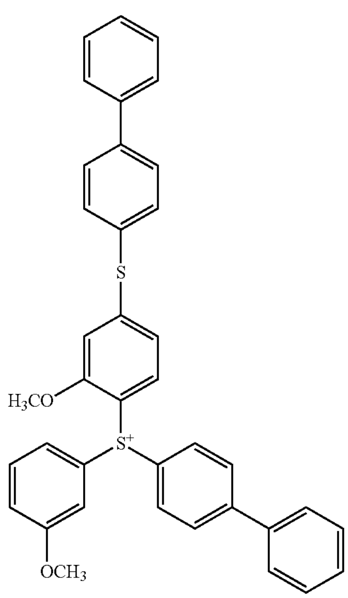
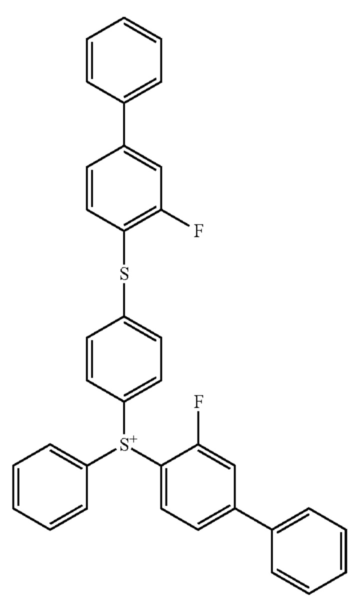

-continued

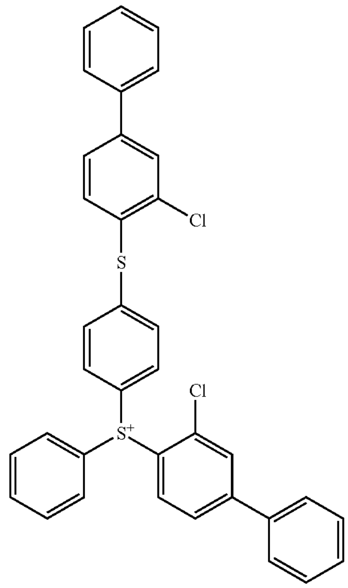

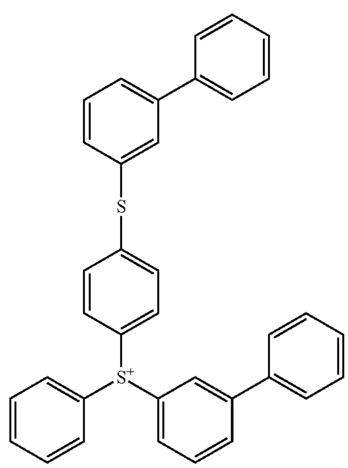

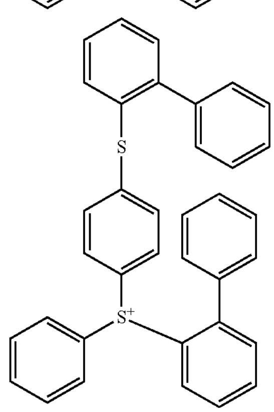

As described above, an aspect in which the cation moiety includes a cation moiety represented by the following formula (biii) is also preferable. When an onium salt as the cationic polymerization initiator includes a cation moiety represented by the formula (biii) functions as a thermally sensitive curing agent.

[Chem. 62]

$$R^{B02}-(D^{B})^{+}-(R^{B01})_{u} \qquad \text{(biii)}$$

(In the formula (biii), $R^{B01}$ is a monovalent organic group, $D^B$ is a Group 15 to 17 (IUPAC notation) element having an atomic value u, $R^{B02}$ may have an optionally substituted alkyl group or an optionally substituted aralkyl group. However, when $R^{B02}$ is an optionally substituted alkyl group, at least one of $R^{B01}$ is an optionally substituted alkyl group. u is an integer of 1 or more and 3 or less, a plurality of $R^{B01}$ may be the same as or different from each other, or the plurality of $R^{B01}$ bonded to form a ring together with $D^B$.)

$D^B$ in the formula (biii) is a Group 15 to 17 (IUPAC notation) element having an atomic value u. Note here that $D^B$ is the same as $R^{b010}$ in the formula (biv). Dis bonded to a benzyl group which may be substituted with organic groups $R^{B01}$ and $R^{B02}$ to form an onium ion. Among the Group 15 to 17 (IUPAC notation) elements, preferable elements are S (sulfur), N (nitrogen), I (iodine), and P (phosphorus). Corresponding onium ions are a sulfonium ion, an ammonium ion, an iodonium ion, and a phosphonium ion, and these are preferable because they are stable and easy to handle. A sulfonium ion and an iodonium ion are more preferable because they are excellent in cation polimerizablility and cross-linking reactivity.

In the formula (biii), $R^{B01}$ represents an organic group bonded to $D^B$. When a plurality of $R^{B01}$ is present, the plurality of $R^{B01}$ may be the same as or different from each other. Examples of $R^{B01}$ include an aromatic hydrocarbon group having 6 or more and 14 or less carbon atoms, an alkyl group having 1 or more and 18 or less carbon atoms, an alkenyl group having 2 or more and 18 or less carbon atoms, and an alkynyl group having 2 or more and 18 or less carbon atoms.

An aromatic hydrocarbon group, an alkyl group, an alkenyl group, and an alkynyl group as $R^{B01}$ include the same as those described for $R^{B09}$ in the formula (biv). When $R^{B01}$ is an aromatic hydrocarbon group, it may include a substituent, and examples of the substituent include a hydroxyl group, an alkoxy group, an alkyl carbonyl group, an aryl carbonyl group, an alkoxycarbonyl group, an aryloxycarbonyl group, an arylthiocarbonyl group, an acyloxy group, an arylthio group, an alkylthio group, an aryl group, a heterocyclic hydrocarbon group, aryloxy group, alkyl sulfinyl group, an aryl sulfinyl group, an alkyl sulfonyl group, an aryl sulfonyl group, a hydroxy(poly)alkyleneoxy group, an optionally substituted silyl group, optionally substituted amino group, a halogen atom, and the like.

Furthermore, in the formula (biii), a plurality of $R^{B01}$ is present, the plurality of $R^{B01}$ may form a ring together with $D^B$. The ring formed by the plurality of $R^{B01}$ and $D^B$ may include at least one bond selected from the group consisting of —O—, —S—, —SO—, —$SO_2$—, —NH—, —CO—, —COO—, and —CONH—.

In the formula (biii), specific examples of the alkyl group as $R^{B02}$ include a linear alkyl group having 1 or more and 18 or less carbon atoms, such as a methyl group, an ethyl group, an n-propyl group, an n-butyl group, an n-pentyl group, an n-octyl group, an n-decyl group, an n-dodecyl group, an n-tetradecyl group, an n-hexadecyl group, an n-octadecyl group; branched alkyl group having 3 or more and 18 or less carbon atoms, such as an isopropyl group, an isobutyl group, a sec-butyl group, a tert-butyl group, an isopentyl group, a neopentyl group, a tert-pentyl group, an isohexyl group, and an isooctadecyl group, a cycloalkyl group having 3 or more and 18 or less carbon atoms, such as a cyclopropyl group, a cyclobutyl group, a cyclopentyl group, a cyclohexyl group, and a 4-decyl cyclohexyl group, and the like. In the formula (biii), when $R^{B02}$ is an optionally substituted alkyl group, at least one of the $R^{B01}$ is an optionally substituted alkyl group.

In the formula (biii), specific examples of the aralkyl group as $R^{B02}$ include an alkyl group having 1 or more and 4 or less carbon atoms, substituted with an aryl group having 6 or more and 10 or less carbon atoms, such as a benzyl group, a 1-naphthyl methyl group, a 2-naphthyl methyl group, and the like.

In the formula (biii), specific examples of the substituted aralkyl group as $R^{B02}$ include an alkyl group having 1 or more and 4 or less carbon atoms, substituted with an optionally substituted aryl group having 6 or more and 10 or less carbon atoms, such as a 2-methyl benzyl group.

In the formula (biii), $R^{B02}$ is preferably an optionally substituted aralkyl group, and more preferably a cation moiety represented by the following formula (biii-1).

[Chem. 63]

(biii-1)

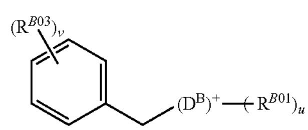

(In the formula (biii-1), $R^{B01}$, $D^B$, and u are the same as those in the formula (biii). $R^{B03}$ is a monovalent organic group, v is an integer of 0 or more and 5 or less. A plurality of $R^{B03}$ may be the same as or different from each other.)

In the formula (biii-1), a monovalent organic group as $R^{B03}$ is preferably an alkyl group, and examples thereof include the same as the alkyl group of $R^{B02}$ in the formula (biii). v is preferably 0 or 1.

Specific examples of the cation moiety represented by the formula (biii) or (biii-1) will be described below. D' in the following specific examples is a S atom or a Se atom, and preferably a S atom.

[Chem. 64]

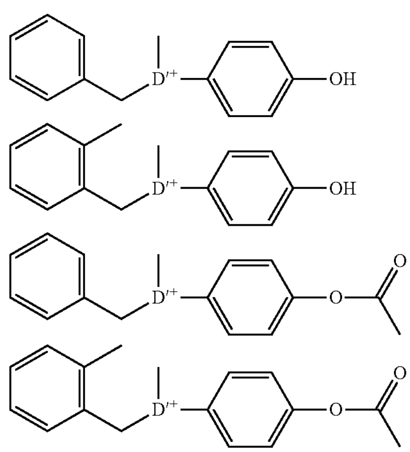

-continued

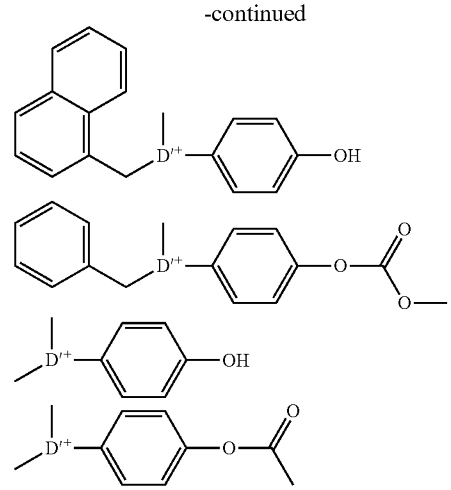

Examples of counter anions to a cation moiety represented by the formula (biii) or (biii-1) include the same as counter anions to a cation moiety represented by the formula (c01) described below. Examples thereof include preferably an anion moiety represented by the formula (bi) or an anion moiety represented by the formula (bii), and more preferably an anion moiety the formula (bi).

The onium salts (B01) is preferably a salt including the anions given as suitable specific examples of the anion represented by the formula (bi) or (bII), and the cation given as suitable specific examples of the counter cation represented by the formula (biv). Two or more suitable specific examples of the counter cation represented by the formula (b0iv) may be combined.

The content of the onium salt (B01) is preferably 10% by mass or more, more preferably 50% by mass or more, further more preferably 70% by mass or more, particularly preferably 90% by mass or more, and the most preferably 100% by mass with respect to the total amount of the onium salt (B01), and below-mentioned other cationic polymerization initiator (B02). Use of a cationic polymerization initiator in such a range of amount facilitates formation of metal oxide-containing film having excellent refractive index and yellowing resistance, and satisfactory heat resistance (pyrolysis resistance) and adhesion to a substrate.

Cationic Polymerization Initiator (B02) Other than Onium Salt (B01)

A cationic polymerization initiator may include cationic polymerization initiator (B02), which is different from onium salt (B01), alone or may not include the cationic polymerization initiator (B02) (hereinafter, also simply referred to as "the other cationic polymerization initiator (B02)") together with the onium salt (B01). A curable composition, when it includes other cationic polymerization initiators (B02), together with the onium salt (B01), can easily form metal oxide-containing film having excellent refractive index and yellowing resistance, and satisfactory heat resistance (pyrolysis resistance) and adhesion to a substrate.

Other cationic polymerization initiators (B02) can be a thermal cationic polymerization initiator (B02-1) or a photocationic polymerization initiator (B02-2), and is preferably a photocationic polymerization initiator (B02-2). The thermal cationic polymerization initiator (B02-1) and photocationic polymerization initiator (B02-2) will now be described.

Thermal Cationic Polymerization Initiator (B02-1)

Examples of the thermal cationic polymerization initiator (B02-1) include diphenyliodonium hexafluoroarsenate, diphenyliodonium hexafluorophosphate, diphenyliodonium trifluoromethanesulfonate, triphenylsulfonium tetrafluoroborate, tri-p-tolylsulfonium hexafluorophosphate, tri-p-tolylsulfonium trifluoromethanesulfonate, bis(cyclohexylsulfonyl)diazomethane, bis(tert-butylsulfonyl) diazomethane, bis(p-toluenesulfonyl)diazomethane, triphenylsulfonium trifluoromethanesulfonate, diphenyl-4-methylphenylsulfonium trifluoromethanesulfonate, diphenyl-2,4,6-trimethylphenylsulfonium-p-toluenesulfonate, and diphenyl-p-phenylthiophenylsulfonium hexafluorophosphate, and the like. Two or more of these may be used in combination.

Examples of commercially available thermal cationic polymerization initiators include diazonium salt type initiators such as AMERICURE Series (manufactured by American Can Co.) and ULTRASET Series (manufactured by ADEKA CORPORATION), WPAG Series (manufactured by Wako Pure Chemical Industries, Ltd.); iodonium salt type initiators such as UVE Series (manufactured by General Electric Company), FC Series (manufactured by 3M Company), UV9310C (manufactured by GE Toshiba Silicones Co., Ltd.), and WPI Series (manufactured by Wako Pure Chemical Industries, Ltd.); and sulfonium salt type initiators such as CYRACURE Series (manufactured by Union Carbide Corporation), UVI Series (manufactured by General Electric Company), FC Series (manufactured by 3M Company), CD Series (manufactured by Sartomer Co.), Optomer SP Series (manufactured by ADEKA CORPORATION), Optomer CP Series (manufactured by ADEKA CORPORATION), SAN-AID SI Series (manufactured by Sanshin Chemical Industry Co., Ltd.), CI Series (manufactured by Nippon Soda Co., Ltd.), WPAG Series (manufactured by Wako Pure Chemical Industries, Ltd.), and CPI Series (manufactured by San-Apro Ltd.) and the like.

Thermal cationic polymerization initiator (B02-1) preferably includes a compound composed of a cation moiety and an anion moiety, the cation moiety being a cation represented by the following formula (c0-I). Use of such a thermal cationic polymerization initiator (B02-1) enables the above-described curable compound (A) to be satisfactorily cured, thus enabling formation of a curd product having satisfactory heat resistance (pyrolysis resistance) and adhesion to the substrate.

[Chem. 65]

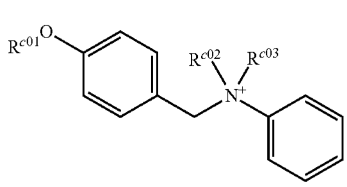

(c0-I)

(In the formula (c0-I), $R^{c01}$, $R^{c02}$, and $R^{c03}$ each independently is an alkyl group having 1 or more and 6 or less carbon atoms.)

In the formula (c0-I), suitable examples of the alkyl group as $R^{c01}$, $R^{c02}$, and $R^{c03}$ include a methyl group, an ethyl group, an n-propyl group, an isopropyl group, an n-butyl group, an isobutyl group, a sec-butyl group, a tert-butyl group, an n-pentyl group, and an n-hexyl group. The alkyl group is preferably a methyl group or an ethyl group, and more preferably a methyl group. It is particularly preferred that all $R^{c01}$, $R^{c02}$, and $R^{c03}$ are methyl groups.

Namely, a cation represented by the formula (c0-I) is preferably a cation represented by the following formula (c0-II).

[Chem. 66]

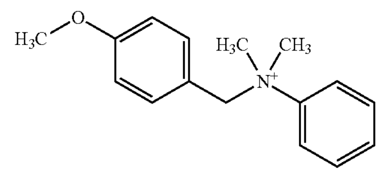

(c0-II)

Examples of a counter anion to a cation represented by the formula (c0-I) include $AsF_6^-$, $SbF_6^-$, $PF_6^-$, and $((C_6F_5)_4B)^-$. Of these, $((C_6F_5)_4B)^-$ is preferable. Note here that "$C_6F5$" represents a pentafluorophenyl group.

It is possible to use, as a compound composed of the cation moiety and the anion moiety represented by the formula (c0-I), compounds which are available as commercially available products. Examples of the commercially available product include CXC-1821 (manufactured by King Industries, Inc.).

Suitable specific examples of the compound composed of the cation moiety of a cation represented by the formula (c0-I) and the anion moiety include a quaternary ammonium salt composed of a cation represented by the formula (c0-II) and $AsF_6^-$, a quaternary ammonium salt composed of a cation represented by the formula (c0-II) and $SbF_6^-$, a quaternary ammonium salt composed of a cation represented by the formula (c0-II) and $PF_6^-$, and a quaternary ammonium salt composed of a cation represented by the formula (c0-II) and $((C_6F_5)_4B)^-$. Of these, a quaternary ammonium salt composed of a cation represented by the formula (c0-II) and $((C_6F_5)_4B)^-$ is more preferable.

The compound composed of the cation moiety of a cation represented by the formula (c0-I) and the anion moiety may be used alone or in combination of two or more types thereof.

The amount of the compound composed of the cation moiety represented by the formula (c0-I) and the anion moiety in the thermal cationic polymerization initiator (B02-1) is preferably 50% by mass or more, more preferably 70% by mass or more, still more preferably 80% by mass or more, particularly preferably 90% by mass or more, and most preferably 100% by mass.

There is no particular limitation on the content of the thermal cationic polymerization initiator (C1-1) in the curable composition as the energy-sensitive composition of the fifth aspect as long as the object of the present invention is not impaired. The content of the thermal cationic polymerization initiator in the curable composition is preferably 0.01 parts by mass or more and 30 parts by mass or less, more preferably 0.1 part by mass or more and 10 parts by mass or less, and particularly preferably 0.3 parts by mass or more and 5 parts by mass or less, based on 100 parts by mass of the curable compound (A). By using the thermal cationic polymerization initiator in the amount within the above range, it is possible to form a metal oxide-containing film having satisfactory heat resistance (pyrolysis resistance) and adhesion to the substrate, thus easily obtaining a curable composition having satisfactory curability.

Photocationic Polymerization Initiator (B02-2)

It is possible to use, as the photocationic polymerization initiator (B02-2), a polymerization initiator other than onium salt (B01) used for photocuring a cationic polymerizable curable composition without particular limitation. Suitable examples of the photocationic polymerization initiator (B02-2) include an iodonium salt and a sulfonium salt.

Specific examples of the iodonium salt include diphenyliodonium hexafluorophosphate, diphenyliodonium hexafluoroantimonate, di(4-nonylphenyl)iodonium hexafluorophosphate, and the like.

The photocationic polymerization initiator (B02-2) is preferably a sulfonium salt. Among these sulfonium salts, a sulfonium salt comprising the cation moiety comprising a cation represented by the following formula (c01) and the anion moiety (hereinafter also referred to as "sulfonium salt (Q)". When the onium salt (B01) is a sulfonium salt having the cation moiety comprising a cation represented by the following formula (c01), the sulfonium salt is classified into the onium salt (B01)) is preferable. When the curable composition comprises a sulfonium salt (Q), curing of the curable composition is easily allowed to particularly satisfactorily proceed.

[Chem. 67]

(c01)

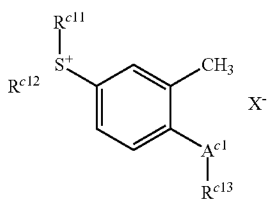

(In the formula (c01), $R^{c11}$ and $R^{c12}$ independently represent an alkyl group optionally substituted with a halogen atom, or a group represented by the following formula (c02), $R^{c11}$ and $R^{c12}$ may be combined with each other to form a ring together with the sulfur atom in the formula, $R^{c13}$ represents a group represented by the following formula (c03) or a group represented by the following formula (c04), $A^{c1}$ represents S, O, or Se, provided that $R^{c11}$ and $R^{c12}$ are not simultaneously an alkyl group optionally substituted with a halogen atom)

[Chem. 68]

(c02)

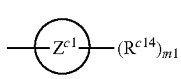

(In the formula (c02), a ring $Z^{c1}$ represents an aromatic hydrocarbon ring, $R^{c4}$ represents an alkyl group optionally substituted with a halogen atom, a hydroxy group, an alkoxy group, an alkylcarbonyl group, an alkoxycarbonyl group, an acyloxy group, an alkylthio group, a thienyl group, a thienylcarbonyl group, a furanyl group, a furanylcarbonyl group, a selenophenyl group, a selenophenylcarbonyl group, a aliphatic heterocyclic group, an alkylsulfinyl group, an alkylsulfonyl group, a hydroxy(poly)alkyleneoxy group, an optionally substituted amino group, a cyano group, a nitro group, or a halogen atom, and m1 represents an integer of 0 or more)

[Chem. 69]

(c03)

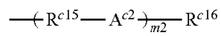

(In the formula (c03), $R^{c15}$ represents a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, an alkylene group optionally substituted with a cyano group, a nitro group or a halogen atom, or a group represented by the following formula (c05), $R^{c16}$ represents a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, an alkyl group optionally substituted with a cyano group, a nitro group or a halogen atom, or a group represented by the following formula (c06), $A^{c2}$ represents a single bond, S, O, a sulfinyl group, or a carbonyl group, and m2 represents 0 or 1)

[Chem. 70]

(c04)

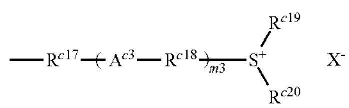

(In the formula (c04), $R^{c17}$ and $R^{c18}$ independently represent a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, an alkylene group optionally substituted with a cyano group, a nitro group or a halogen atom, or a group represented by the following formula (c05), $R^{c19}$ and $R^{c20}$ independently represent an alkyl group optionally substituted with a halogen atom, or a group represented by the formula (c02), $R^{c19}$ and $R^{c20}$ may be combined with each other to form a ring together with the sulfur atom in the formula, $A^{c3}$ represents a single bond, S, O, a sulfinyl group, or a carbonyl group, and m3 represents 0 or 1, provided that $R^{c19}$ and $R^{c20}$ are not simultaneously an alkyl group optionally substituted with a halogen atom)

[Chem. 71]

(c05)

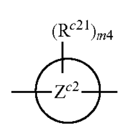

(In the formula (c05), a ring $Z^{c2}$ represents an aromatic hydrocarbon ring, $R^{c21}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, an aryl group, a heterocyclic group, an aryloxy group, an alkylsulfinyl group, an arylsulfinyl group, an alkylsulfonyl group, an arylsulfonyl group, a hydroxy (poly)alkyleneoxy group, an optionally substituted amino group, a cyano group, a nitro group, or a halogen atom, and m4 represents an integer of 0 or more)

[Chem. 72]

(c06)

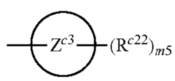

(In the formula (c06), a ring $Z^{c3}$ represents an aromatic hydrocarbon ring, $R^{c22}$ represents an alkyl group optionally substituted with a halogen atom, a hydroxy group, an alkoxy group, an alkylcarbonyl group, an arylcarbonyl group, an alkoxycarbonyl group, an aryloxycarbonyl group, an arylthiocarbonyl group, an acyloxy group, an arylthio group, an alkylthio group, a thienylcarbonyl group, a furanylcarbonyl group, an selenophenylcarbonyl group, an aryl group, a heterocyclic group, an aryloxy group, an alkylsulfinyl group, an arylsulfinyl group, an alkylsulfonyl group, an arylsulfonyl group, a hydroxy(poly)alkyleneoxy group, an optionally substituted amino group, a cyano group, a nitro group, or a halogen atom, and m5 represents an integer of 0 or more)

(Sulfonium Salt (Q))

A sulfonium salt (Q) will be described below. The sulfonium salt (Q) is characterized in that, in a benzene ring in the formula (c01), a methyl group is bonded to the carbon atom at the ortho-position with respect to the carbon atom to which Ac1 is bonded. Since the sulfonium salt (Q) has a methyl group at the above position, protons are easily generated as compared with a conventional sulfonium salt, leading to high sensitivity to active energy ray such as ultraviolet ray.

In the formula (c01), both $R^{c11}$ and $R^{c12}$ are preferably groups represented by the formula (c02). $R^{c11}$ and $R^{c12}$ may be the same or different with each other. In the formula (c01), $R^{c11}$ and $R^{c12}$ are combined with each other to form a ring together with a sulfur atom in the formula, and the number of ring-constituting atoms of the ring to be formed is preferably 3 or more and 10 or less, and more preferably, 5 or more and 7 or less, including a sulfur atom. The ring to be formed may be polycyclic, and preferably those in which 5- to 7-membered rings are fused.

In the formula (c01), both $R^{c11}$ and $R^{c12}$ are preferably phenyl groups.

In the formula (c01), $R^{c13}$ is preferably a group represented by the formula (c03).

In the formula (c01), $A^{c1}$ is preferably S or O, and more preferably S.

In the formula (c02), $R^{c14}$ is preferably an alkyl group optionally substituted with a halogen atom, a hydroxy group, an alkylcarbonyl group, a thienylcarbonyl group, a furanylcarbonyl group, a selenophenylcarbonyl group, an optionally substituted amino group, or a nitro group, and more preferably, an alkyl group optionally substituted with a halogen atom, an alkylcarbonyl group, or a thienylcarbonyl group. In the formula (c02), m1 can be selected according to types of the ring $Z^{c1}$ and may be, for example, an integer of 0 or more and 4 or less, preferably an integer of 0 or more and 3 or less, and more preferably an integer of 0 or more and 2 or less.

In the formula (c03), $R^{c15}$ is preferably an alkylene group; an alkylene group substituted with a hydroxy group, an optionally substituted amino group, or a nitro group; or a group represented by the formula (c05), and more preferably a group represented by the formula (c05). In the formula (c03), $R^{c16}$ is preferably an alkyl group; an alkyl group substituted with a hydroxy group, an optionally substituted amino group, or a nitro group; or a group represented by the formula (c06), and more preferably a group represented by the formula (c06). In the formula (c03), $A^{c2}$ is preferably S or O, and more preferably S. In the formula (c03), m2 is preferably 0.

In the formula (c04), $R^{c17}$ and $R^{c18}$ independently represent an alkylene group; an alkylene group substituted with a hydroxy group, an optionally substituted amino group, or a nitro group; or a group represented by the formula (c05), and more preferably, a group represented by the formula (c05). $R^{c17}$ and $R^{c18}$ may be the same or different with each other. In the formula (c04), both $R^{c19}$ and $R^{c2o}$ are preferably groups represented by the formula (c02). $R^{c19}$ and $R^{c20}$ may be the same or different with each other. In the formula (c04), $R^{c19}$ and $R^{c20}$ are combined with each other to form a ring together with a sulfur atom in the formula, and the number of ring-constituting atoms of the ring to be formed is preferably 3 or more and 10 or less, and more preferably 5 or more and 7 or less, including a sulfur atom. The ring to be formed may be polycyclic, and preferably those in which 5- to 7-membered rings are fused. In the formula (c04), $A^{c3}$ is preferably S or O, and more preferably S. In the formula (c04), m3 is preferably 0.

In the formula (c05), $R^{c21}$ is preferably an alkyl group optionally substituted with a halogen atom, a hydroxy group, an optionally substituted amino group, or a nitro group, and more preferably, an alkyl group optionally substituted with a halogen atom. In the formula (c05), m4 can be selected according to types of the ring $Z^2$ and may be, for example, an integer of 0 or more and 4 or less, preferably an integer of 0 or more and 3 or less, and more preferably an integer of 0 or more and 2 or less.

In the formula (c06), $R^{c22}$ is preferably an alkyl group optionally substituted with a halogen atom, a hydroxy group, an alkylcarbonyl group, a thienylcarbonyl group, a furanylcarbonyl group, a selenophenylcarbonyl group, an optionally substituted amino group, or a nitro group, and more preferably, an alkyl group optionally substituted with a halogen atom, an alkylcarbonyl group, or a thienylcarbonyl group. In the formula (c06), m5 can be selected according to types of the ring $Z^{c3}$ and may be, for example, an integer of 0 or more and 4 or less, preferably an integer of 0 or more and 3 or less, and more preferably an integer of 0 or more and 2 or less.

The cation represented by the formula (c01) generally forms a salt together with a monovalent anion $X^-$. $X^-$ is a monovalent anion corresponding to an acid (HX) generated by irradiating a sulfonium salt (Q) with active energy (such as heat, visible light, ultraviolet ray, electron beam, and X-ray). $X^-$ is suitably a monovalent polyatomic anion, and more preferably an anion represented by $M^1Y_{a0}^-$, $(Rf)_{b0}PF_{(6-b0)}^-$, $R^{X1}SO_3^-$, $(R^{X1}SO_2)_3C^-$, or $(R^{x1}SO_2)_2N^-$. $X^-$ may be also a halogen anion and examples thereof include fluoride ion, chloride ion, bromide ion, iodide ion, and the like.

$M^1$ represents a phosphorus atom, a boron atom, or an antimony atom. Y represents a halogen atom (preferably a fluorine atom).

Rf represents an alkyl group in which 80 mol % or more of hydrogen atoms are substituted with a fluorine atom (preferably an alkyl group having 1 or more and 8 or less carbon atoms). Examples of the alkyl group, which forms Rf by fluorine substitution, include a linear alkyl group (methyl, ethyl, propyl, butyl, pentyl, and octyl), a branched alkyl group (isopropyl, isobutyl, sec-butyl, and tert-butyl) and cycloalkyl group (cyclopropyl, cyclobutyl, cyclopentyl, and cyclohexyl), and the like. The proportion of the hydrogen atom of the alkyl group substituted with the fluorine atom in Rf is preferably 80 mol % or more, more preferably 90 mol % or more, and particularly preferably 100 mol %, based on the number of mols of the hydrogen atom originally possessed by the alkyl group. When the proportion of substitution with the fluorine atom is preferably within the above range, the photosensitivity of the sulfonium salt (Q) becomes more satisfactory. Particularly preferred Rf includes $CF_3$—, $CF_3CF_2^-$, $(CF_3)_2CF^-$, $CF_3CF_2CF_2^-$, $CF_3CF_2CF_2CF_2^-$, $(CF_3)_2CFCF_2^-$, $CF_3CF_2(CF_3)CF^-$, and $(CF_3)_3C^-$. b Rf(s) are mutually independent and may be the same or different with each other.

P represents a phosphorus atom and F represents a fluorine atom.

$R^{x1}$ represents an alkyl group having 1 or more and 20 or less carbon atoms, a fluoroalkyl group having 1 or more and 20 or less carbon atoms, or an aryl group having 6 or more and 20 or less carbon atoms, the alkyl group and the fluoroalkyl group may be linear, branched, or cyclic, and the alkyl group, the fluoroalkyl group, or the aryl group is not optionally substituted or optionally substituted. Examples of the substituent include a hydroxy group, an optionally substituted amino group (e.g., including those exemplified in the below-mentioned description with respect to the formulas (c02) to (c06)), a nitro group, and the like. A carbon chain in the alkyl group, fluoroalkyl group, or aryl group represented by $R^{x1}$ may have a heteroatom such as an oxygen atom, a nitrogen atom, or a sulfur atom. Particularly, the carbon chain in the alkyl group or fluoroalkyl group represented by $R^{x2}$ may have a divalent functional group (e.g., an ether bond, a carbonyl bond, an ester bond, an amino bond, an amide bond, an imide bond, a sulfonyl bond, a sulfonylamide bond, a sulfonylimide bond, a urethane bond, etc.). When the alkyl group, fluoroalkyl group or aryl group represented by $R^{x1}$ has the substituent, heteroatom, or functional group, the number of the substituent, heteroatom, or functional group may be 1, or 2 or more.

S represents a sulfur atom, 0 represents an oxygen atom, C represents a carbon atom, and N represents a nitrogen atom. a0 represents an integer of 4 or more and 6 or less. b0 is preferably an integer of 1 or more and 5 or less, more preferably an integer of 2 or more and 4 or less, and particularly preferably 2 or 3.

Examples of the anion represented by $M^1Y_a^-$ include an anion represented by $SbF_6^-$, $PF_6^-$, or $BF_4^-$.

Examples of the anion represented by $(Rf)_bPF_{6-b}^-$ include an anion represented by $(CF_3CF_2)_2PF_4^-$, $(CF_3CF_2)_3PF_3^-$, $(CF_3)_2CF)_2PF_4^-$, $((CF_3)_2CF_3PF_3^-$, $(CF_3CF_2CF_2)_2PF_4^-$, $(CF_3CF_2CF_2)_3PF_3^-$, $((CF_3)_2CFCF_2)_2PF_4^-$, $((CF_3)_2CFCF_2)_3PF_3^-$, $(CF_3CF_2CF_2CF_2)_2PF_4^-$, or $(CF_3CF_2CF_2CF_2)_3PF_3^-$, and the like. Of these, an anion represented by $(CF_3CF_2)_3PF_3^-$, $(CF_3CF_2CF_2)_3PF_3^-$, $((CF_3)_2CF)_3PF_3^-$, $((CF_3)_2CF)_2PF_4^-$, $((CF_3)_2CFCF_2)_3PF_3^-$, or $((CF_3)_2CFCF_2)_2PF_4^-$ is preferable.

Examples of the anion represented by $R^{x1}SO_3^-$ include a trifluoromethanesulfonic acid anion, a pentafluoroethanesulfonic acid anion, a heptafluoropropanesulfonic acid anion, a nonafluorobutanesulfonic acid anion, a pentafluorophenylsulfonic acid anion, a p-toluenesulfonic acid anion, a benzenesulfonic acid anion, a camphorsulfonic acid anion, a methanesulfonic acid anion, an ethanesulfonic acid anion, a propanesulfonic acid anion, and a butanesulfonic acid anion, and the like. Of these, a trifluoromethanesulfonic acid anion, a nonafluorobutanesulfonic acid anion, a methanesulfonic acid anion, a butanesulfonic acid anion, a camphorsulfonic acid anion, a benzenesulfonic acid anion, or a p-toluenesulfonic acid anion is preferable.

Examples of the anion represented by $(R^{x1}SO_2)_3C^-$ include an anion represented by $(CF_3SO_2)_3C^-$, $(C_2F_5SO_2)_3C^-$, $(C_3F_7SO_2)_3C^-$, or $(C_4F_9SO_2)_3C^-$ and the like.

Examples of the anion represented by $(R^{x1}SO_2)_2N^-$ include an anion represented by $(CF_3SO_2)_2N^-$, $(C_2F_5SO_2)_2N^-$, $(C_3F_7SO_2)_2N^-$, or $(C_4F_9SO_2)_2N^-$, and the like.

It is possible to use, as the monovalent polyatomic anion, in addition to an anion represented by $MY_a^-$, $(Rf)_bPF_{6-b}^-$, $R^{x2}SO_3^-$, $(R^{x1}SO_2)_3C^-$, or $(R^{x2}SO_2)_2N^-$, a perhalogen acid ion ($ClO_4^-$, $BrO_4^-$, etc.), a halogenated sulfonic acid ion ($FSO_3^-$, $ClSO_3^-$, etc.), a sulfuric acid ion ($CH_3SO_4^-$, $CF_3SO_4^-$, $HSO_4^-$, etc.), a carbonic acid ion ($HCO_3^-$, $CH_3CO_3^-$, etc.), an aluminic acid ion ($AlCl_4^-$, $AlF_4^-$, etc.), a hexafluorobismuthic acid ion ($BiF_6^-$), a carboxylic acid ion ($CH_3COO^-$, $CF_3COO^-$, $C_6H_5COO^-$, $CH_3C_6H_4COO^-$, $C_6F_5COO^-$, $CF_3C_6H_4COO^-$, etc.), an arylboric acid ion ($B(C_6H_5)_4^-$, $CH_3CH_2CH_2CH_2B(C_6H_5)_3^-$, etc.), a thiocyanic acid ion ($SCN^-$), and a nitric acid ion ($NO_3^-$), and the like.

Among these $X^-$(s), in view of the cationic polymerization properties, anions represented by $MY_a^-$, $(Rf)_bPF_{6-b}^-$, and $(R^{x1}SO_2)_3C^-$ are preferable and anions represented by $SbF_6^-$, $PF_6^-$, $CF_3CF_2)_3PF_3^-$, and $(CF_3SO_2)_3C^-$ are more preferable.

In the formulas (c02), (c05), and (c06), examples of the aromatic hydrocarbon ring include a benzene ring and a fused polycyclic aromatic hydrocarbon ring [fused di- to tetracyclic aromatic hydrocarbon rings, for example, a fused dicyclic hydrocarbon ring (e.g., a $C_{8-20}$ fused dicyclic hydrocarbon ring such as a naphthalene ring, and preferably a $C_{10-16}$ fused dicyclic hydrocarbon ring), a fused tricyclic aromatic hydrocarbon ring (e.g., an anthracene ring, a phenanthrene ring, etc.)], and the like. The aromatic hydrocarbon ring is preferably a benzene ring or a naphthalene ring, and more preferably a benzene ring.

In the formulas (c01) to (c06), examples of the halogen atom include a fluorine atom, a chlorine atom, a bromine atom, and an iodine atom.

In the formulas (c01) to (c06), examples of the alkyl group include a linear alkyl group having 1 or more and 18 or less carbon atoms (methyl, ethyl, n-propyl, n-butyl, n-pentyl, n-octyl, n-decyl, n-dodecyl, n-tetradecyl, n-hexadecyl, and n-octadecyl), a branched alkyl group having 3 or more and 18 or less carbon atoms (isopropyl, isobutyl, sec-butyl, tert-butyl, isopentyl, neopentyl, tert-pentyl, isohexyl, and isooctadecyl), and a cycloalkyl group having 3 or more and 18 or less carbon atoms (cyclopropyl, cyclobutyl, cyclopentyl, cyclohexyl, and 4-decylcyclohexy), and the like. In particular, in the formulas (c01), (c02), and (c04) to (c06), the alkyl group optionally substituted with a halogen atom means an alkyl group substituted with an alkyl group and a halogen atom. Examples of the alkyl group substituted with a halogen atom include a group in which at least one hydrogen atom in the linear alkyl group, branched alkyl group, or cycloalkyl group is substituted with a halogen atom (monofluoromethyl, difluoromethyl, trifluoromethyl, etc.). Of the alkyl groups optionally substituted with a halogen atom, $R^{c11}$, $R^{c12}$, $R^{c19}$, or $R^{c20}$ is particularly preferably a trifluoromethyl group, and $R^{c14}$, $R^{c16}$, $R^{c21}$, or $R^{c22}$ is particularly preferably a methyl group.

In the formulas (c02) to (c06), examples of the alkoxy group include a linear or branched alkoxy group having 1 or more and 18 or less carbon atoms (methoxy, ethoxy, propoxy, isopropoxy, butoxy, isobutoxy, sec-butoxy, tert-butoxy, hexyloxy, decyloxy, dodecyloxy, and octadecyloxy), and the like.

In the formulas (c02) to (c06), examples of the alkyl group in the alkylcarbonyl group include the above-mentioned linear alkyl group having 1 or more and 18 or less carbon atoms, branched alkyl group having 3 or more and 18 or less carbon atoms, or cycloalkyl group having 3 or more and 18 or less carbon atoms, and examples of the alkylcarbonyl group include a linear, branched, or cyclic alkylcarbonyl group having 2 or more and 18 or less carbon atoms (acetyl, propionyl, butanoyl, 2-methylpropionyl, heptanoyl, 2-methylbutanoyl, 3-methylbutanoyl, octanoyl, decanoyl, dodecanoyl, octadecanoyl, cyclopentanoyl group, and cyclohexanoyl group), and the like.

In the formulas (c03) to (c06), examples of the arylcarbonyl group include an arylcarbonyl group having 7 or more and 11 or less carbon atoms (benzoyl and naphthoyl), and the like.

In the formulas (a02) to (a06), examples of the alkoxycarbonyl group include a linear or branched alkoxycarbonyl group having 2 or more and 19 or less carbon atoms (methoxycarbonyl, ethoxycarbonyl, propoxycarbonyl, isopropoxycarbonyl, butoxycarbonyl, isobutoxycarbonyl, sec-butoxycarbonyl, tert-butoxycarbonyl, octyloxycarbonyl, tetradecyloxycarbonyl, and octadecyloxycarbonyl), and the like.

In the formulas (c03) to (c06), examples of the aryloxycarbonyl group include an aryloxycarbonyl group having 7 or more and 11 or less carbon atoms (phenoxycarbonyl and naphthoxycarbonyl), and the like.

In the formulas (c03) to (c06), examples of the arylthiocarbonyl group include an arylthiocarbonyl group having 7 or more and 11 or less carbon atoms (phenylthiocarbonyl and naphthoxythiocarbonyl), and the like.

In the formulas (c02) to (c06), examples of the acyloxy group include a linear or branched acyloxy group having 2 or more and 19 or less carbon atoms (acetoxy, ethylcarbonyloxy, propylcarbonyloxy, isopropylcarbonyloxy, butylcarbonyloxy, isobutylcarbonyloxy, sec-butylcarbonyloxy, tert-butylcarbonyloxy, octylcarbonyloxy, tetradecylcarbonyloxy, and octadecylcarbonyloxy), and the like.

In the formulas (c03) to (c06), examples of the arylthio group include an arylthio group having 6 or more and 20 or less carbon atoms (phenylthio, 2-methylphenylthio, 3-methylphenylthio, 4-methylphenylthio, 2-chlorophenylthio, 3-chlorophenylthio, 4-chlorophenylthio, 2-bromophenylthio, 3-bromophenylthio, 4-bromophenylthio, 2-fluorophenylthio, 3-fluorophenylthio, 4-fluorophenylthio, 2-hydroxyphenylthio, 4-hydroxyphenylthio, 2-methoxyphenylthio, 4-methoxyphenylthio, 1-naphthylthio, 2-naphthylthio, 4-[4-(phenylthio)benzoyl]phenylthio, 4-[4-(phenylthio)phenoxy]phenylthio, 4-[4-(phenylthio)phenyl]phenylthio, 4-(phenylthio)phenylthio, 4-benzoylphenylthio, 4-benzoyl-2-chlorophenylthio, 4-benzoyl-3-chlorophenylthio, 4-benzoyl-3-methylthiophenylthio, 4-benzoyl-2-methylthiophenylthio, 4-(4-methylthiobenzoyl)phenylthio, 4-(2-methylthiobenzoyl)phenylthio, 4-(p-methylbenzoyl)phenylthio, 4-(p-ethylbenzoyl)phenylthio 4-(p-isopropylbenzoyl)phenylthio, and 4-(p-tert-butylbenzoyl)phenylthio), and the like.

In the formulas (c02) to (c06), examples of the alkylthio group include a linear or branched alkylthio group having 1 or more and 18 or less carbon atoms (methylthio, ethylthio, propylthio, isopropylthio, butylthio, isobutylthio, sec-butylthio, tert-butylthio, pentylthio, isopentylthio, neopentylthio, tert-pentylthio, octylthio, decylthio, dodecylthio, and isooctadecylthio, and the like.

In the formulas (c03) to (c06), examples of the aryl group include an aryl group having 6 or more and 10 or less carbon atoms (phenyl, tolyl, dimethylphenyl, and naphthyl), and the like.

In the formula (c02), examples of the aliphatic heterocyclic group include an aliphatic heterocyclic group having 2 or more and 20 or less carbon atoms (preferably 4 or more and 20 or less) (e.g. pyrrolidinyl, tetrahydrofuranyl, tetrahydrothienyl, piperidinyl, tetrahydropyranyl, tetrahydrothiopyranyl, morpholinyl) and the like.

In the formulas (c03) to (c06), examples of the heterocyclic group include a heterocyclic group having 4 or more and 20 or less carbon atoms (e.g. thienyl, furanyl, selenophenyl, pyranyl, pyrrolyl, oxazolyl, thiazolyl, pyridyl, pyrimidyl, pyrazinyl, indolyl, benzofuranyl, benzothienyl, quinolyl, isoquinolyl, quinoxalinyl, quinazolinyl, carbazolyl, acridinyl, phenothiazinyl, phenazinyl, xanthenyl, thianthrenyl, phenoxazinyl, phenoxathiinyl, chromanyl, isochromanyl, dibenzothienyl, xanthonyl, thioxanthonyl, and dibenzofuranyl) and the like.

In the formulas (c03) to (c06), examples of the aryloxy group include an aryloxy group having 6 or more and 10 or less carbon atoms (phenoxy and naphthyloxy), and the like.

In the formulas (c02) to (c06), examples of the alkylsulfinyl group include a linear or branched sulfinyl group having 1 or more and 18 or less carbon atoms (methylsulfinyl, ethylsulfinyl, propylsulfinyl, isopropylsulfinyl, butylsulfinyl, isobutylsulfinyl, sec-butylsulfinyl, tert-butylsulfinyl, pentylsulfinyl, isopentylsulfinyl, neopentylsulfinyl, tert-pentylsulfinyl, octylsulfinyl, and isooctadecylsulfinyl), and the like.

In the formulas (c03) to (c06), examples of the arylsulfinyl group include an arylsulfinyl group having 6 or more and 10 or less carbon atoms (phenylsulfinyl, tolylsulfinyl, and naphthylsulfinyl), and the like.

In the formulas (c02) to (c06), examples of the alkylsulfonyl group include a linear or branched alkylsulfonyl group having 1 or more and 18 or less carbon atoms (methylsulfonyl, ethylsulfonyl, propylsulfonyl, isopropylsulfonyl, butylsulfonyl, isobutylsulfonyl, sec-butylsulfonyl, tert-butylsulfonyl, pentylsulfonyl, isopentylsulfonyl, neopentylsulfonyl, tert-pentylsulfonyl, octylsulfonyl, and octadecylsulfonyl), and the like.

In the formulas (c03) to (c06), examples of the arylsulfonyl group include an arylsulfonyl group having 6 or more and 10 or less carbon atoms (phenylsulfonyl, tolylsulfonyl (tosyl group) and naphthylsulfonyl), and the like.

In the formulas (c02) to (c06), examples of the hydroxy (poly)alkyleneoxy group include a hydroxy(poly)alkyleneoxy group represented by $HO(AO)_{q0}$— (wherein AO independently represents an ethyleneoxy group and/or a propyleneoxy group, and q0 represents an integer of 1 or more and 5 or less).

In the formulas (c02) to (c06), examples of the optionally substituted amino group include an amino group (—$NH_2$) and a substituted amino group having 1 or more and 15 or less carbon atoms (methylamino, dimethylamino, ethylamino, methylethylamino, diethylamino, n-propylamino, methyl-n-propylamino, ethyl-n-propylamino, n-propylamino, isopropylamino, isopropylmethylamino, isopropylethylamino, diisopropylamino, phenylamino, diphenylamino, methylphenylamino, ethylphenylamino, n-propylphenylamino, and isopropylphenylamino), and the like.

In the formulas (c03) and (c04), examples of the alkylene group include a linear or branched alkylene group having 1 or more and 18 or less carbon atoms (a methylene group, a 1,2-ethylene group, a 1,1-ethylene group, a propane-1,3-diyl group, a propane-1,2-diyl group, a propane-1,1-diyl group, a propane-2,2-diyl group, a butane-1,4-diyl group, a butane-1,3-diyl group, a butane-1,2-diyl group, a butane-1,1-diyl group, a butane-2,2-diyl group, a butane-2,3-diyl group, a pentane-1,5-diyl group, a pentane-1,4-diyl group, a hexane-1,6-diyl group, a heptane-1,7-diyl group, an octane-1,8-diyl group, a 2-ethylhexane-1,6-diyl group, a nonane-1,9-diyl group, a decane-1,10-diyl group, a undecane-1,11-diyl group, a dodecane-1,12-diyl group, a tridecane-1,13-diyl group, a tetradecane-1,14-diyl group, a pentadecane-1,15-diyl group, and a hexadecane-1,16-diyl group), and the like.

A sulfonium salt (Q) can be synthesized in accordance with, for example, WO2016/047784.

Specific examples of the cation represented by the formula (c01), the cation moiety of the sulfonium salt (Q), include the following. Specific examples of the anion moiety of the sulfonium salt (Q) can include conventionally known ones such as those provided in the description of $X^-$. The sulfonium salt (Q) comprising the cation moiety represented by the formula (c01) can be synthesized in accordance with the scheme, and it is possible to combine the cation moiety with a desired anion moiety by further performing salt exchange as needed.

[Chem. 73]

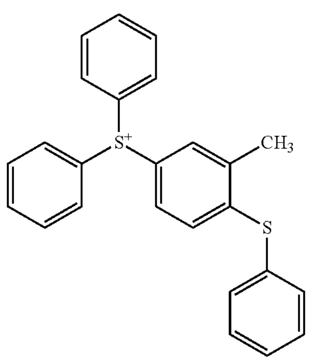

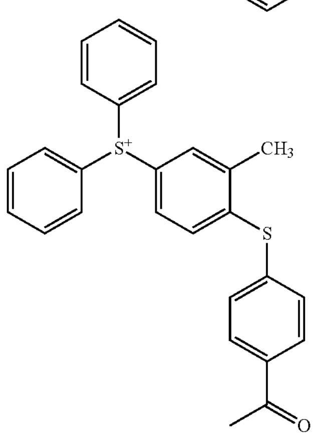

-continued

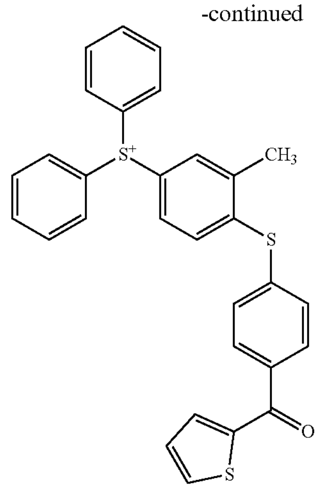

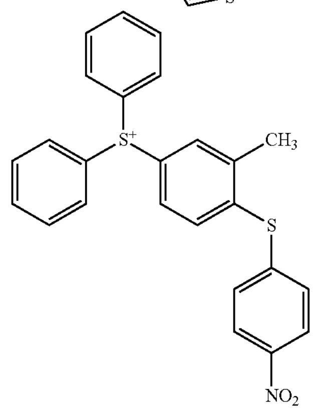

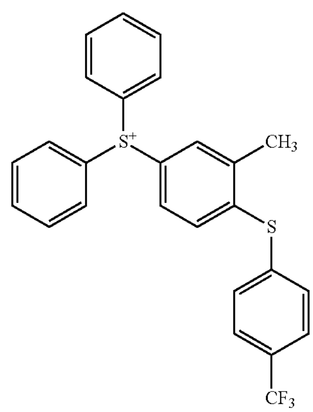

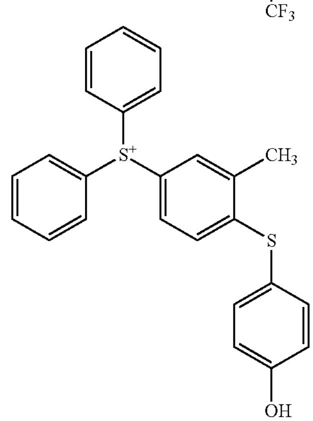

-continued

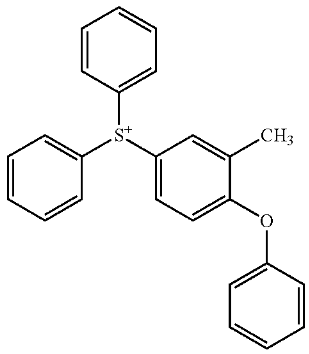

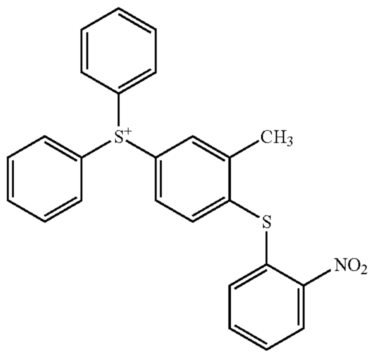

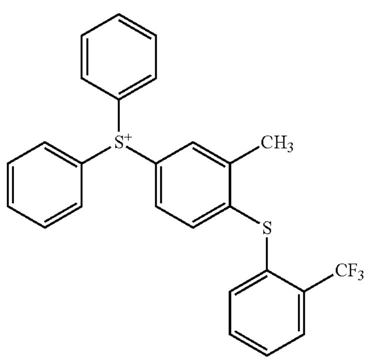

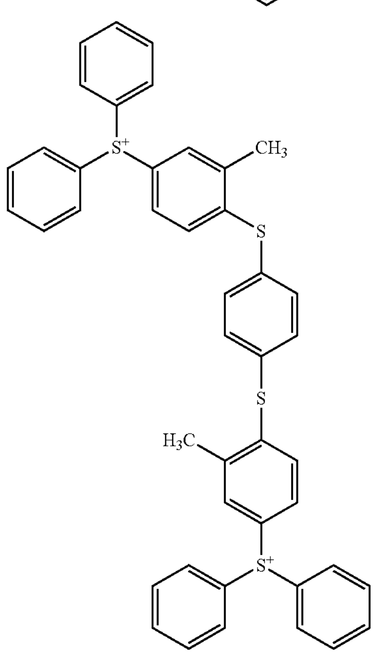

-continued

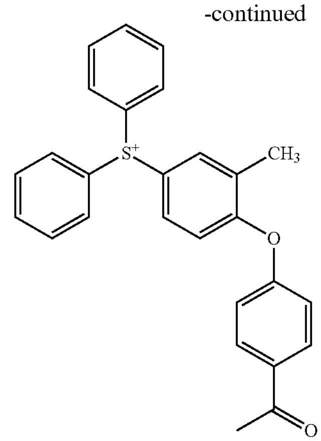

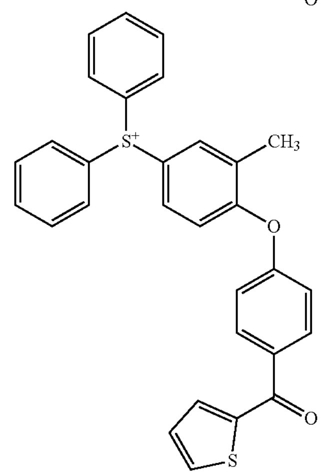

In the group of preferred cation moieties, the cation moiety represented by the following formula is more preferable.

[Chem. 74]

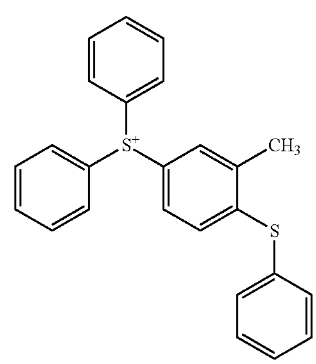

Another cationic polymerization initiator (B02) may comprise another photocationic polymerization initiator other than the sulfonium salt (Q), together with the sulfonium salt (Q). The content of the sulfonium salt (Q) in another cationic polymerization initiator (B02) is not particularly limited and, typically, is preferably 70% by mass or more, more preferably 80% by mass or more, particularly preferably 90% by mass or more, and most preferably 100% by mass.

The photocationic polymerization initiator (B02-2) may further comprise a photocationic polymerization initiator other than the above-described onium salt (B01) and sulfonium salt (Q), together with the sulfonium salt (Q). It is possible to use, as the photocationic polymerization initiator other than the above-described onium salt (B01) and sulfonium salt (Q), various cationic polymerization initiators, which have hitherto been used for cation polymerization, without particular limitation. As described above, the photocationic polymerization initiators other than the above-described onium salt (B01) and sulfonium salt (Q) are preferably onium salts such as an iodonium salt and a sulfonium salt, and more preferably other sulfonium salts other than the sulfonium salt (Q).

There is no particular limitation on the total content of the photocationic polymerization initiator in the curable composition, as long as curing of the curable composition satisfactorily proceeds. In view of the fact that it is easy to satisfactorily cure the curable composition, the content amount is typically 0.001 parts by mass or more and 30 parts by mass or less, more preferably 0.01 parts by mass or more and 10 parts by mass or less, and particularly preferably 0.1 parts by mass or more and 5 parts by mass or less with respect to 100 parts by mass of the curable compound.

Radical Polymerization Initiator

In the energy-sensitive composition of the fifth aspect, when the curable compound includes a radical polymerizable compound including an unsaturated double bond, there is no particular limitation on the radical polymerization initiator, and it is possible to use conventionally known photopolymerization initiators, which have hitherto been used for polymerization of a radical polymerizable compound including an unsaturated double bond. As such a radical polymerization initiator, a photopolymerization initiator described for energy-sensitive composition of the first aspect can be suitably used.

The content of the radical polymerization initiator is preferably 0.01 part by mass or more and 50 parts by mass or less, more preferably, 0.1 part by mass or more and 30 parts by mass or less, and particularly preferably 0.3 part by mass or more and 10 parts by mass or less, based on 100 parts by mass of the curable compound. When the content of the radical polymerization initiator is set within the above range, it is easy to satisfactorily cure the curable composition.

The radical polymerization initiator may be used in combination with a photoinitiation auxiliary. Examples of the photoinitiation auxiliary include thiol compounds such as triethanolamine, methyldiethanolamine, triisopropanolamine, methyl 4-dimethylaminobenzoate, ethyl 4-dimethylaminobenzoate, isoamyl 4-dimethylaminobenzoate, 2-ethylhexyl 4-dimethylaminobenzoate, 2-dimethylaminoethyl benzoate, N,N-dimethylpara-toluidine, 4,4'-bis(dimethylamino)benzophenone, 9,10-dimethoxyanthracene, 2-ethyl-9,10-dimethoxyanthracene, 9,10-diethoxyanthracene, 2-ethyl-9,10-diethoxyanthracene, 2-mercaptobenzothiazole, 2-mercaptobenzoxazole, 2-mercaptobenzimidazole, 2-mercapto-5-methoxybenzothiazole, 3-mercaptopropionic acid, methyl 3-mercaptopropionate, pentaerythritoltetramercaptoacetate, and 3-mercaptpropionate, and the like. These photoinitiation auxiliaries can be used alone or in combination of two or more types thereof.

A curable composition as the energy-sensitive composition of the fifth aspect may include a curing accelerator. When the curable composition contains the curing accelerator, curability of the curable composition and properties after curing are satisfactory.

Examples of the curing accelerator include a urea compound, a tertiary amine and salts thereof, imidazoles and salts thereof, phosphine-based compounds and derivatives thereof, carboxylic acid metal salts, Lewis acids, Bronsted acids and salts thereof, tetraphenylboronate, and the like.

Preferred specific examples of the curing accelerator include tertiary amines such as 1,8-diazabicyclo(5,4,0)undecene-7, triethylenediamine, benzyldimethylamine, triethanolamine, dimethylaminoethanol, and tris(dimethylaminomethyl)phenol; imidazoles such as 2-methylimidazole, 2-phenylimidazole, 2-phenyl-4-methylimidazole, and 2-heptadecylimidazole; phosphine-based compounds such as tributylphosphine, methyldiphenylphosphine, triphenylphosphine, diphenylphosphine, and phenylphosphine; tetraphenylphosphonium tetraphenylborate, triphenylphosphinetetraphenylborate, 2-ethyl-4-methylimidazoletetraphenylborate, and a tetraphenylboron salt of N-methylmorpholine tetraphenylborate, and the like.

Of the above-described curing accelerators, phosphine-based compounds and derivatives thereof, and tetraphenylboron salts are preferable. Of the above specific examples, triphenylphosphine and triphenylphosphine triphenylborane are preferable.

There is no particular limitation on the use amount of the curing accelerator as long as the object of the present invention is not impaired. The use amount of the curing accelerator is preferably 0.5 part by mass or more and 8 parts by mass or less, more preferably 1.5 parts by mass or more and 6 parts by mass or less, and particularly preferably 3 parts by mass or more and 4.5 parts by mass or less, based on 1 part by mass of the mass of the curing agent.

The curable composition as the energy-sensitive composition of the fifth aspect may include a sensitizer. When the curable composition includes the photocationic polymerization initiator, the curable composition preferably contains the sensitizer. It is possible to use, as the sensitizer, known sensitizers, which have hitherto been used in combination with various cationic polymerization initiators, without particular limitation.

Specific examples of the sensitizer include anthracene compounds such as anthracene, 9,10-dibutoxyanthracene, 9,10-dimethoxyanthracene, 9,10-diethoxyanthracene, 2-ethyl-9,10-dimethoxyanthracene, and 9,10-dipropoxyanthracene; pyrene; 1,2-benzanthracene; perylene; tetracene; coronene; thioxanthone compounds such as thioxanthone, 2-methylthioxanthone, 2-ethylthioxanthone, 2-chlorothioxanthone, 2-isopropylthioxanthone, and 2,4-diethylthioxanthone; phenothiazine compounds such as phenothiazine, N-methylphenothiazine, N-ethylphenothiazine, and N-phenylphenothiazine; xanthone; naphthalene compounds such as 1-naphthol, 2-naphthol, 1-methoxynaphthalene, 2-methoxynaphthalene, 1,4-dihydroxynaphthalene, and 4-methoxy-1-naphthol; ketones such as dimethoxyacetophenone, diethoxyacetophenone, 2-hydroxy-2-methyl-1-phenylpropan-1-one, 4'-isopropyl-2-hydroxy-2-methylpropiophenone, and 4-benzoyl-4'-methyldiphenyl sulfide; carbazole compounds such as N-phenylcarbazole, N-ethylcarbazole, poly-N-vinylcarbazole, and N-glycidylcarbazole; chrysene compounds such as 1,4-dimethoxychrysene and 1,4-di-α-methylbenzyloxychrysene; and phenanthrene compounds such as 9-hydroxyphenanthrene, 9-methoxyphenanthrene, 9-hydroxy-10-methoxyphenanthrene, and 9-hydroxy-10-ethoxyphenanthrene. These sensitizers may be used in combination of two or more types thereof.

The use amount of the sensitizer is not particularly limited and is preferably 1% by mass or more and 300% by mass or less, and more preferably 5% by mass or more and 200% by mass or less, based on the mass of the photocationic polymerization initiator. When using the sensitizer in the amount within the above range, it is easy to obtain the desired sensitization effect.

The curable composition as the energy-sensitive composition of the fifth aspect can optionally contain additives such as surfactants, thermal polymerization inhibitors, defoamers, silane coupling agents, colorants (pigments, dyes), resins (thermoplastic resins, alkali-soluble resins, etc.), inorganic fillers other than the metal oxide (A), and organic fillers. It is possible to use, as any additives, conventionally known ones. Examples of the surfactant include anionic, cationic, and nonionic compounds, examples of the thermal polymerization inhibitor include hydroquinone, hydroquinone monoethyl ether, and the like, and examples of the defoamer include silicone-based compounds, fluorine-based compounds, and the like.

The curable composition as the energy-sensitive composition of the fifth aspect preferably includes: a solvent for the purpose of adjusting the coatability and viscosity. As the solvent, an organic solvent is typically used. There is no particular limitation on types of the organic solvent as long as it can uniformly dissolve or disperse components contained in the curable composition.

Suitable examples of the organic solvent usable as the solvent are the same as suitable examples of the organic solvent in the energy-sensitive composition of the first aspect.

There is no particular limitation on the use amount of the solvent in the curable composition as the energy-sensitive composition of the fifth aspect. In view of the coatability of the curable composition, the use amount of the solvent is, for example, 30% by mass or more and 99.9% by mass or less, and preferably 50% by mass or more and 98% by mass or less, based on the entire curable composition. The viscosity of the curable composition is preferably adjusted within a range of 300 mPa·s or less. The viscosity of the curable composition is more preferably 60 mPa·s or less, and particularly preferably 30 mPa·s or less. There is particularly no lower limit and, for example, the viscosity is 0.1 mPa·s or more. The above-mentioned viscosity is a viscosity measured at 25° C. using an E-type viscometer.

When using the curable composition containing essential or optional components described above, it is possible to form a cured product having high refractive index. Therefore, the curable composition can be used for formation of a high refractive index material and a high refractive index film, which have hitherto been used in various applications. For example, when using the curable composition, it is possible to form a cured product having a refractive index of 1.70 or more, preferably 1.72 or more, more preferably 1.75 or more, still more preferably 1.80 or more, and most preferably 1.80 or more. Therefore, the curable composition is used, particularly preferably, for formation of a transparent coating film with which metal wiring, and the like is coated in a display element such as a touch panel. When the curable composition is used to form the transparent coating film, high refractive index of the transparent coating film renders metal wiring hardly visible.

The cured film formed using the curable composition is suitably used in a flexible display panel since cracking hardly occurs even when bent because of excellent bending resistance. For example, when a 50 nm-thick film made of the cured product of the curable composition is wound around a cylindrical stainless bar having a radius of 6 mm, and preferably 2 mm, cracking does not easily occur.

(6) Energy-Sensitive Composition of Sixth Aspect

An energy-sensitive composition of the sixth aspect is cationic curing type or anionic curing type curable composition including a metal oxide (A) and a base material component (B) together with an ionic liquid whose melting point is 140° C. or less. When the curable composition includes the above-mentioned ionic liquid, the curable composition can promote the curing reaction uniformly in the curable composition with low dependence on cationic polymerization or anionic polymerization. As a result, it is possible to form a metal oxide-containing film having excellent refractive index and yellowing resistance (in particular, yellowing resistance) and satisfactory heat resistance and adhesion to the substrate. Essential or optional components included in the curable composition will be described below.

(Curable Compound)

A curable composition preferably includes a curable compound having a functional group including at least one element selected from the group consisting of N, O, S, and Si from the viewpoint of refractive index and yellowing resistance, and viewpoint of heat resistance and adhesion to a substrate.

The curable compound having a functional group including at least one element selected from the group consisting of N, O, S, and Si tends to have relatively high refractive index. From the viewpoint of high refractive index, the curable compound preferably has a functional group including at least one element selected from the group consisting of N, S and O, and has a functional group including at least one element selected from the group consisting of N and S.

Examples of the functional groups including N include a triazine ring structure, an isocyanuric ring structure, a carbazole group, an imide group, a nitrile group, and the like. Examples of the curable compound having the functional group (A) including N include a polymer having a triazine ring, the above-described compound represented by the formula (a1-I) as an epoxy resin precursor, polyvinylcarbazole (PVK), polyimide, and the like. It is particularly preferable that the polymer having a triazine ring has relatively high refractive index (1.70 or more) from the structure.

Examples of the functional group including O include an epoxy group, an isocyanuric ring structure, a carboxyl group, an ester group, a ketone group, a hydroxyl group, and the like. Examples of the curable compound having a functional group including O include the above-described compound represented by the formula (b-01), the above-described epoxy compound as an epoxy resin precursor, and the like.

Examples of the functional group including S include a thiirane group, a sulfonyl group ($—SO_2—$), a thiol group, a thioester group, and the like. Examples of the curable compound having the functional group including S include the above-described compound represented by the formula (b-01), polyether sulfone (PES), polysulfone, polyphenyl sulfone, and the like. Examples of the curable compound having the functional group including Si include a siloxane compound having a siloxane skeleton, formed by siloxane bond (Si—O—Si). Examples of the siloxane skeleton in the siloxane compound can include a cyclic siloxane skeleton, cage or ladder type polysilsesquioxane skeleton.

A curable compound preferably includes at least one selected from the group consisting of an aromatic group, a triazine ring structure, an isocyanuric ring structure, and a cyclic siloxane structure from the viewpoint of refractive index and yellowing resistance, and viewpoint of heat resistance and adhesion to a substrate. The above-mentioned aromatic group is preferably an aromatic group forming cardo structure, from the viewpoint of refractive index and yellowing resistance, and viewpoint of heat resistance and adhesion to a substrate.

The curable compound preferably includes at least one selected from the group consisting of the above-described formula (b-01), a polymer having a triazine ring structure, the compound represented by the above formula (a1-I) as an epoxy resin precursor, and siloxane epoxy compound represented by the above-described formula ((a1-III) as an epoxy resin precursor, from the viewpoint of refractive index and yellowing resistance, and viewpoint of heat resistance and adhesion to a substrate.

When the curable compound includes the compound represented by the above formula (b-01), the amount of the above-described compound represented by the formula (b-01) in the curable compound is preferably 50% by mass or more, more preferably 70% by mass or more, further preferably 80% by mass or more, particularly preferably 90% by mass or more, and most preferably 100% by mass.

As the epoxy compound as the curable compound, the above-described epoxy compound as the epoxy resin precursor can be used.

Episulfide Compound

There is no specific limitation on the type of the episulfide compound as long as it does not interfere with the object of the present invention. Examples of preferred episulfide compound include compounds in which the oxygen atom in the epoxy group of the epoxy compound is substituted with a sulfur atom.

Vinyl Ether Compound

The curable compound may or may not include a vinyl ether compound including a vinyloxy group. The vinyl ether compound is not particularly limited as long as it is a compound having a vinyloxy group and being polymerizable. The vinyl ether compound may include an aromatic group, or may not include an aromatic group. The vinyl ether compound is preferably a compound having a vinyloxy group bonded to an aromatic group from the viewpoint of satisfactory pyrolysis resistance of a cured product.

Suitable specific examples of the vinyl ether compound include vinyl phenyl ether; aromatic monovinyl ether compounds such as 4-vinyloxytoluene, 3-vinyloxytoluene, 2-vinyloxytoluene, 1-vinyloxy-4-chlorobenzene, 1-vinyloxy-3-chlorobenzene, 1-vinyloxy-2-chlorobenzene, 1-vinyloxy-2,3-dimethylbenzene, 1-vinyloxy-2,4-dimethylbenzene, 1-vinyloxy-2,5-dimethylbenzene, 1-vinyloxy-2,6-dimethylbenzene, 1-vinyloxy-3,4-dimethylbenzene, 1-vinyloxy-3,5-dimethylbenzene, 1-vinyloxynaphthalene, 2-vinyloxynaphthalene, 2-vinyloxyfluorene, 3-vinyloxyfluorene, 4-vinyloxy-1,1'-biphenyl, 3-vinyloxy-1,1'-biphenyl, 2-vinyloxy-1,1'-biphenyl, 6-vinyloxytetralin, and 5-vinyloxytetralin; and aromatic divinyl ether compounds such as 1,4-divinyloxybenzene, 1,3-divinyloxybenzene, 1,2-divinyloxybenzene, 1,4-divinyloxynaphthalene, 1,3-divinyloxynaphthalene, 1,2-divinyloxynaphthalene, 1,5-divinyloxynaphthalene, 1,6-divinyloxynaphthalene, 1,7-divinyloxynaphthalene, 1,8-divinyloxynaphthalene, 2,3-divinyloxynaphthalene, 2,6-divinyloxynaphthalene, 2,7-divinyloxynaphthalene, 1,2-divinyloxyfluorene, 3,4-divinyloxyfluorene, 2,7-divinyloxyfluorene, 4,4'-divinyloxybiphenyl, 3,3'-divinyloxybiphenyl, 2,2'-divinyloxybiphenyl, 3,4'-divinyloxybiphenyl, 2,3'-divinyloxybiphenyl, 2,4'-divinyloxybiphenyl, and bisphenol A divinyl ether, and the like. These vinyl ether compounds can be used in combination of two or more types thereof.

Polymer Having Triazine Ring Structure

A polymer having a triazine ring structure is preferably used in mixture of the above-described other curable compounds. Examples of the above-mentioned polymer having a triazine ring structure (hereinafter, also referred to as a "triazine ring-containing polymer") include those represented by the following formulas (t1) to (t16).

[Chem. 75]

(t1)

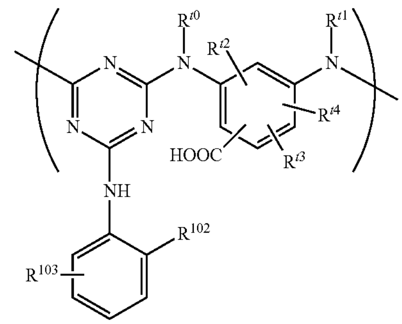

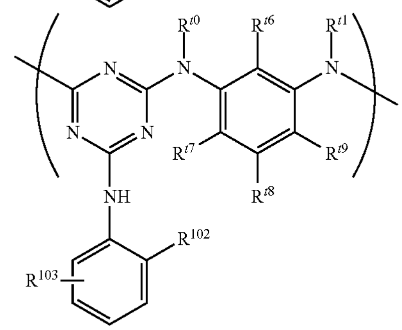

In the above formula, $R^{t0}$ and $R^{t1}$ each independently represent a hydrogen atom, an alkyl group, an alkoxy group, an aryl group or an aralkyl group. Both $R^{t0}$ and $R^{t1}$ are preferably a hydrogen atom from the viewpoint of enhancing the refractive index. $R^{t2}$ to $R^{t4}$, and $R^{t6}$ to $R^{t9}$ each independently represent a hydrogen atom, a halogen atom, a carboxyl group, a sulfo group, an alkyl group which may have a branched structure having 1 or more and 10 or less carbon atoms, an alkoxy group which may have a branched structure having 1 or more and 10 or less carbon atoms, and $R^{102}$ and $R^{103}$ each independently represent an alkyl group having 1 or more and 5 or less carbon atoms.

[Chem. 76]

(t2)

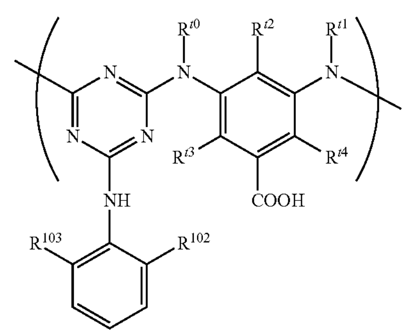

-continued

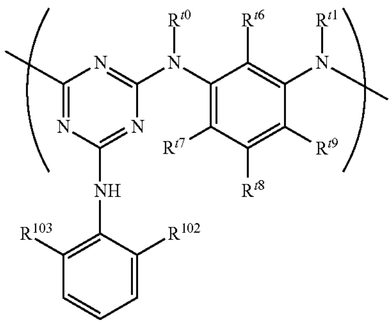

(In the formula, $R^{t0}$ to $R^{t4}$, $R^{t6}$ to $R^{t9}$, $R^{102}$ and $R^{103}$ have the same meanings as mentioned above)

[Chem. 77]

(t3)

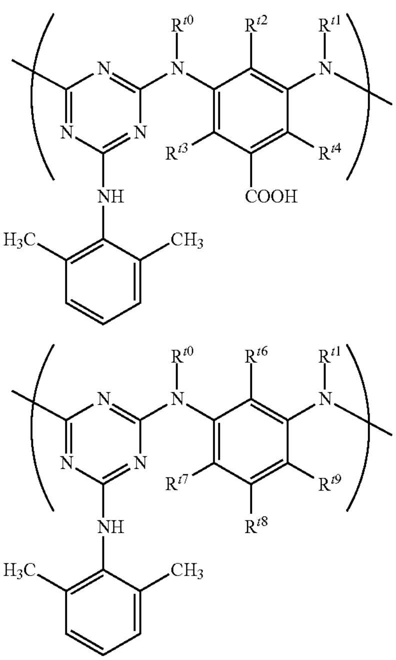

(In the formula, $R^{t0}$ to $R^{t4}$ and $R^{t6}$ to $R^{t9}$ have the same meanings as mentioned above)

[Chem. 78]

(t4)

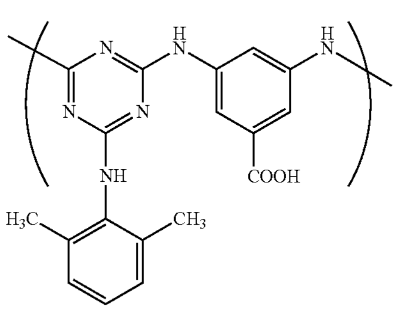

-continued

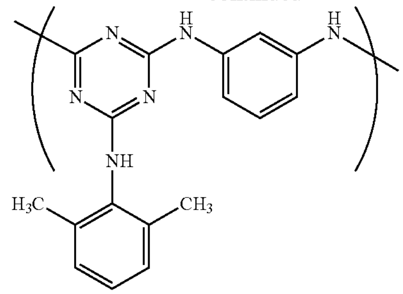

[Chem. 79]

(t5)

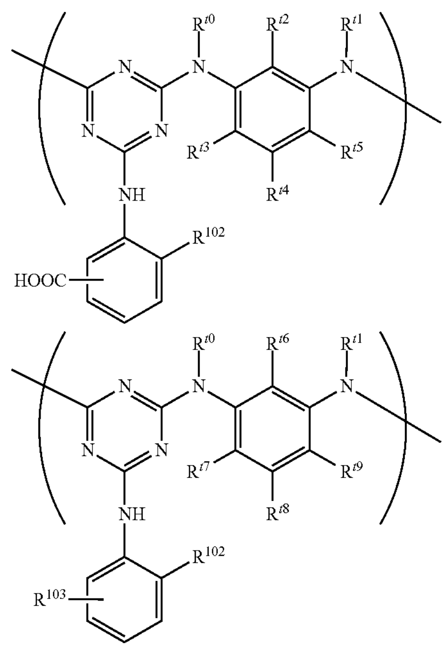

(In the formula, $R^{t0}$ to $R^{t4}$ and $R^{t6}$ to $R^{t9}$ have the same meanings as mentioned above; $R^{t5}$ represents a hydrogen atom, a halogen atom, a carboxyl group, a sulfo group, an alkyl group which may have a branched structure having 1 or more and 10 or less carbon atoms, or an alkoxy group which may have a branched structure having 1 or more and 10 or less carbon atoms; $R^{102}$ and $R^{103}$ each independently represent an alkyl group having 1 or more and 5 or less carbon atoms)

[Chem. 80]

(t6)

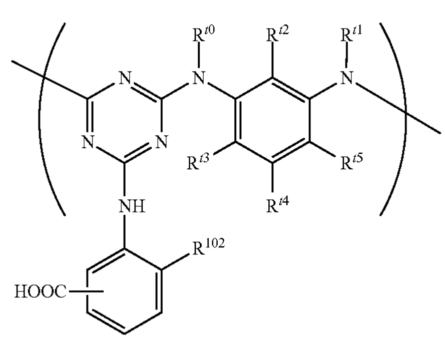

-continued
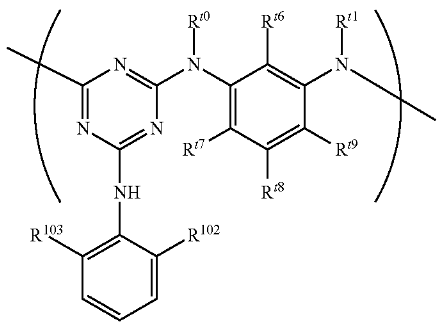
(In the formula, $R^{t0}$ to $R^{t9}$ and $R^{102}$ and $R^{103}$ have the same meanings as mentioned above)
[Chem. 81]
(t7)
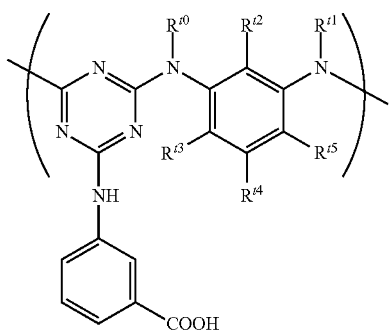
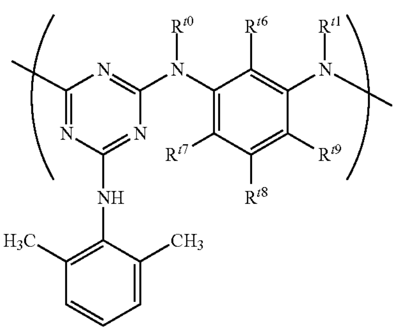
(In the formula, $R^{t0}$ to $R^{t9}$ have the same meanings as mentioned above)
[Chem. 82]
(t8)
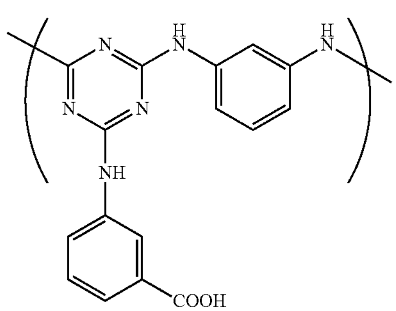
-continued
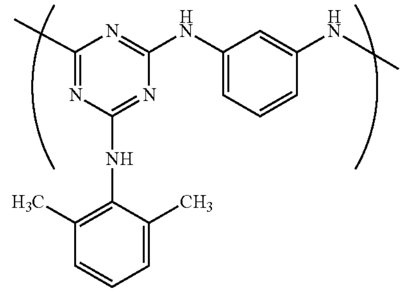
[Chem. 83]
(t9)
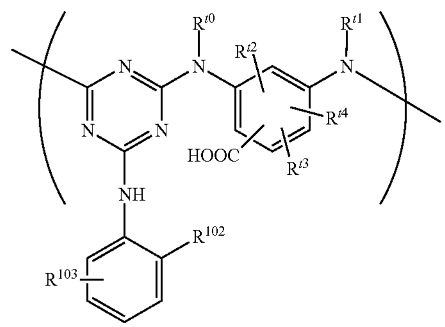
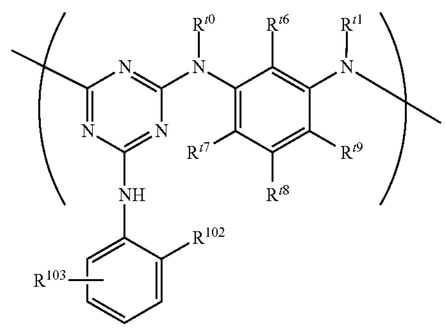
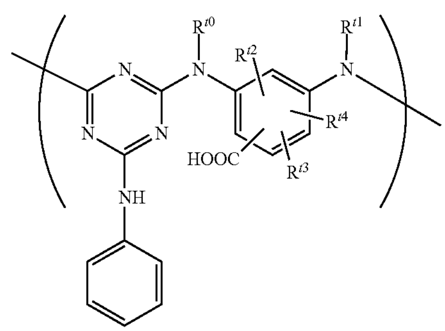
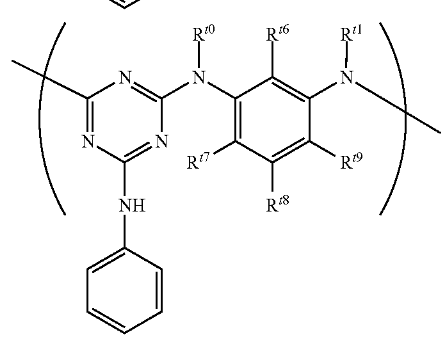

(In the formula, $R^{t0}$ to $R^{t4}$ and $R^{t6}$ to $R^{t9}$ have the same meanings as mentioned above; and $R^{102}$ and $R^{103}$ each independently represent an alkyl group having 1 or more and 5 or less carbon atoms)
[Chem. 84]
(t10)
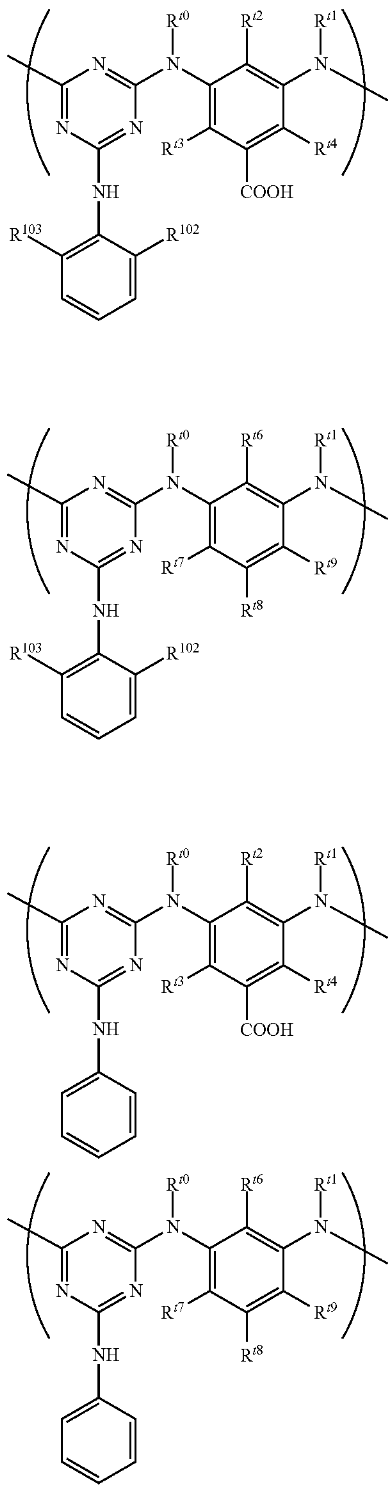
(In the formula, $R^{t0}$ to $R^{t4}$, $R^{t6}$ to $R^{t9}$, $R^{102}$ and $R^{103}$ have the same meanings as mentioned above)
[Chem. 85]
(t11)
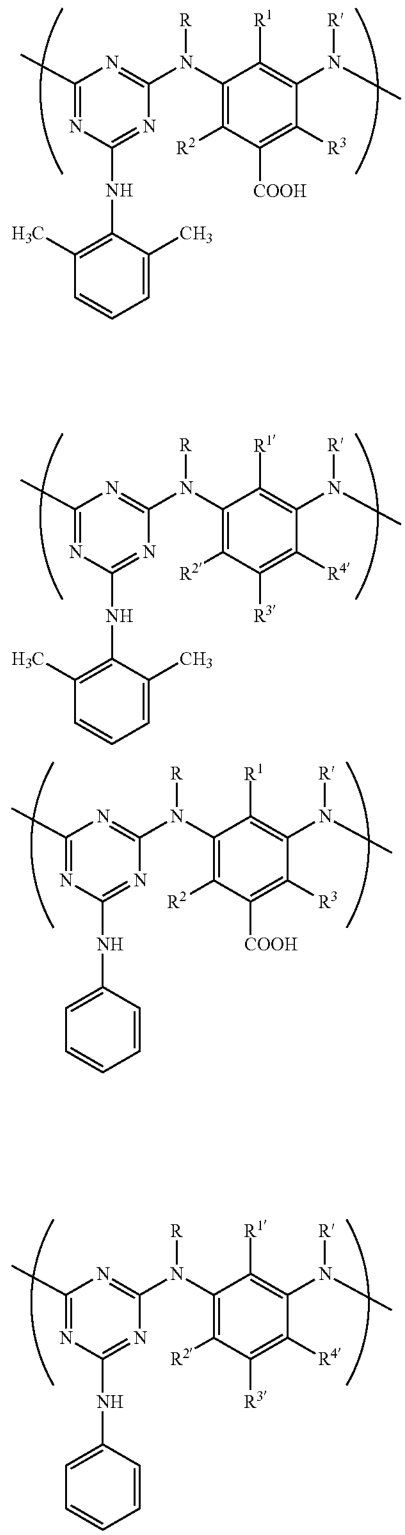

(In the formula, $R^{t0}$ to $R^{t4}$ and $R^{t6}$ to $R^{t9}$ have the same meanings as mentioned above)
[Chem. 86]
(t12)
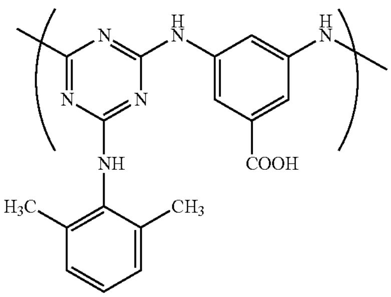
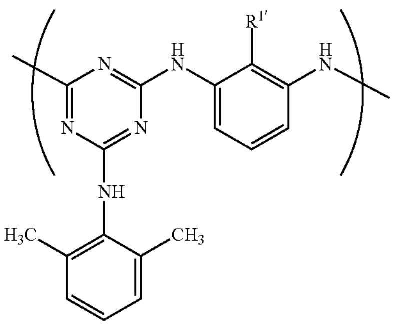
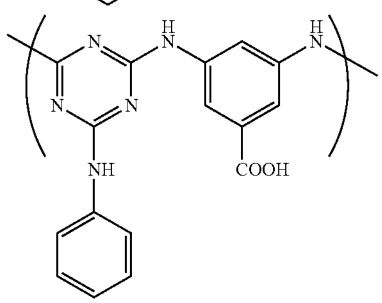
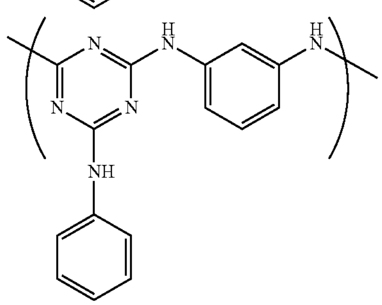
[Chem. 87]
(t13)
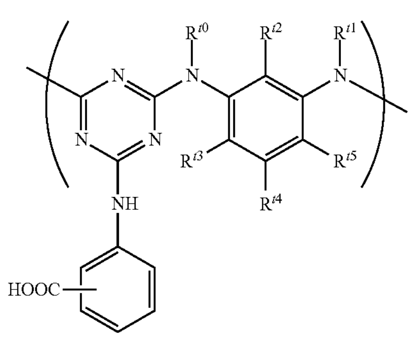
-continued
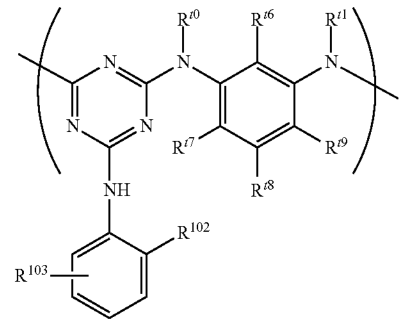
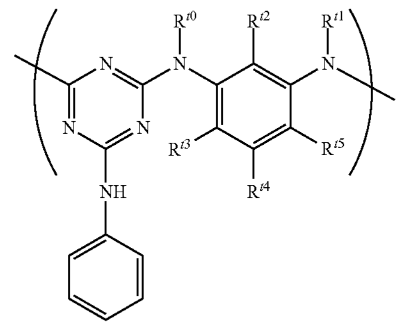
(In the formula, $R^{t0}$ to $R^{t9}$ have the same meanings as mentioned above; and $R^{102}$ and $R^{103}$ each independently represent an alkyl group having 1 or more and 5 or less carbon atoms)
[Chem. 88]
(t14)
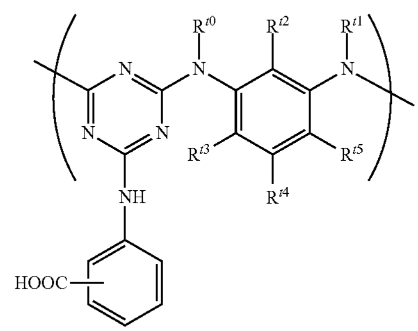
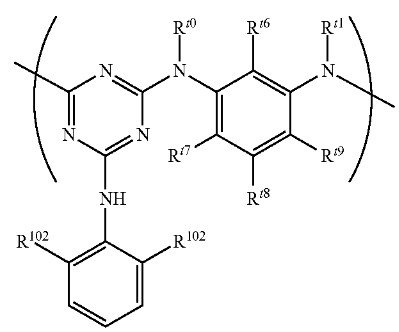

-continued

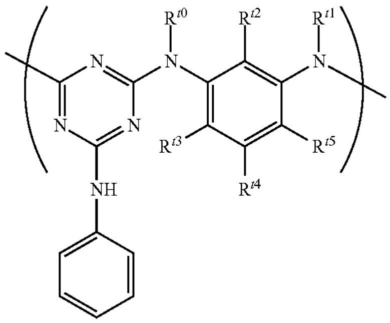

(In the formula, $R^{t0}$ to $R^{t9}$ and $R^{102}$ and $R^{103}$ have the same meanings as mentioned above)

[Chem. 89]

(t15)

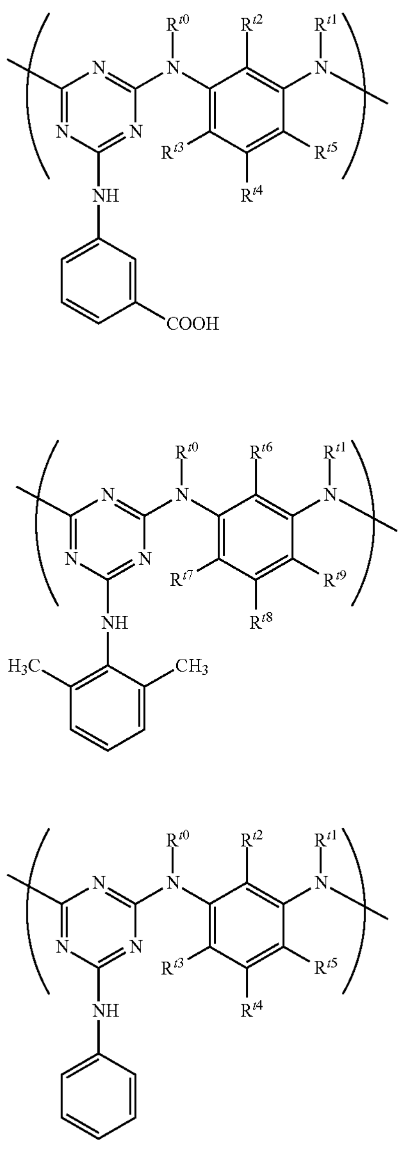

(In the formula, $R^{t0}$ to $R^{t9}$ have the same meanings as mentioned above)

[Chem. 90]

(t16)

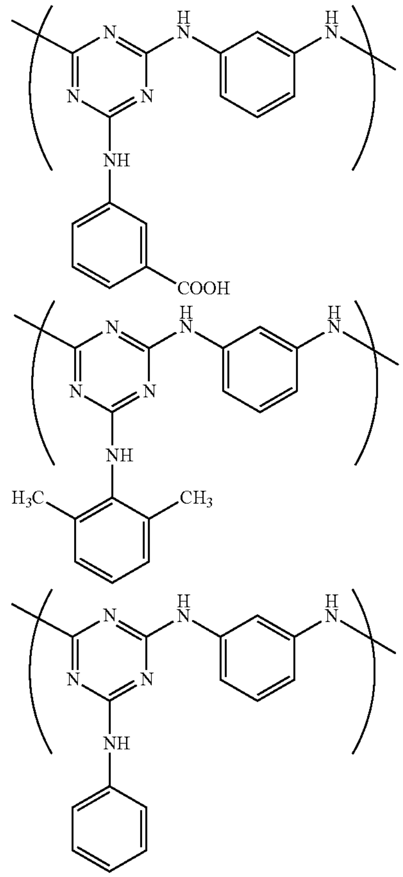

The weight-average molecular weight (Mw) of the triazine ring-containing polymer is not particularly limited. The weight-average molecular weight (Mw) of the triazine ring-containing polymer is preferably 500 or more and 500,000 or less, and more preferably 500 or more and 100,000 or less. In view of the fact that the advantageous effect of the present invention can be easily achieved, the weight-average molecular weight (Mw) is preferably 2,000 or more. In view of the fact that solubility is more enhanced, and the viscosity of the obtained solution is deteriorated, the weight-average molecular weight (Mw) is preferably 50,000 or less, more preferably 30,000 or less, and further preferably 10,000 or less. The weight average molecular weight (Mw) is an average molecular weight obtained in terms of standard polystyrene by gel permeation chromatography (hereinafter referred to as GPC) analysis.

The triazine ring-containing polymer can be produced by a technique disclosed in, for example, WO 2010/128661.

The triazine ring-containing polymer has at least one diamine terminal, and at least one of the diamine terminals is preferably sealed with a carbonyl-containing group such as an acyl group, an alkoxycarbonyl group, an aralkyloxy carbonyl group, or an aryloxy carbonyl group. In this way, when the terminal is sealed with a carbonyl-containing group, coloring of the triazine ring-containing polymer can be suppressed.

Specific examples of the acyl group include an acetyl group, an ethylcarbonyl group, an acryloyl group, a methacryloyl group, a benzoyl group, and the like. Specific examples of the alkoxycarbonyl group include a methoxycarbonyl group, an ethoxycarbonyl group, a tert-butoxycarbonyl group, and the like. Specific examples of the aralkyloxy carbonyl group include a benzyloxy carbonyl group and the like. Specific examples of the aryloxy carbonyl group include a phenoxy carbonyl group and the like. Among these, the terminal sealing group is preferably an acyl group, and more preferably an acryloyl group, a methacryloyl group, and an acetyl group in view of easiness in availability of reagent and the like.

As the method for sealing a terminal, a known method may be employed. For example, a treatment with an acid halide, an acid anhydride, or the like, may be employed. In this case, the use amount of the terminal sealant is preferably 0.05 equivalents or more and 10 equivalents or less, more preferably 0.1 equivalents or more and 5 equivalents or less, further more preferably 0.5 equivalents or more and 2 equivalents or less, with respect to 1 equivalent of amino group derived from excessive diamino compounds which have not been used for polymerization reaction.

The above-mentioned curable compound may be used alone or in mixture of a plurality of types thereof. The content of the curable compound in the curable composition is not particularly limited as long as the content is within a range where the objects of the present invention are not impaired. The content of the curable compound in the curable composition is preferably 60 parts by mass or more and 99.9 parts by mass or less, more preferably 75 parts by mass or more and 99.5 parts by mass or less, and particularly preferably 90 parts by mass or more and 99 parts by mass or less, when the total solid content of the curable composition is 100 parts by mass.

(Curing Agent)

A curable composition preferably includes a curing agent. As the curing agent, the same curing agents as those described for the energy-sensitive composition of the fifth aspect can be used.

The content of the cationic polymerization initiator as the curing agent in the curable composition is not particularly limited as long as the objects of the present invention are not impaired. The content of the cationic polymerization initiator in the curable composition is preferably 0.01 part by mass or more and 5 parts by mass or less, more preferably 0.05 parts by mass or more and 3 parts by mass or less, and particularly preferably 0.1 part by mass or more and 2 parts by mass or less with respect to 100 parts by mass of curable compound, which is a total amount of the above-described onium salt (B01) and the above-described other cationic polymerization initiator (B02). Furthermore, the content of the onium salt (B01) is preferably 10% by mass or more, more preferably 50% by mass or more, further more preferably 70% by mass or more, particularly preferably 90% by mass or more, and most preferably 100% by mass with respect to the total amount of sulfonium salt (B01) and the below-mentioned other cationic polymerization initiator (B02). Use of a cationic polymerization initiator in such a range of amount facilitates formation of metal oxide-containing film having excellent refractive index and yellowing resistance, and satisfactory heat resistance (pyrolysis resistance) and adhesion to a substrate.

When a curable composition is anionically polymerizable, an anionic polymerization initiator can also be used as a curing agent. The anionic polymerization initiator may be an anionic polymerization initiator by light or an anionic polymerization initiator by heat. For example, when the above-described epoxy compound is blended with a curable composition together with the anionic polymerization initiator, an anionic curing type curable composition is obtained. The anionic polymerization initiator by light is not particularly limited, and examples thereof can include photo-active carbamates such as triphenyl methanol, benzyl carbamate, and benzoin carbamate; amides such as O-carbamoyl hydroxylamide, O-carbamoyl oxime, aromatic sulfonamide, alpha-lactam, N-(2-allylethynyl)amide, and other amides; an oxime ester compound, α-amino acetophenone, a cobalt complex, and the like. Among these, 2-nitrobenzyl cyclohexyl carbamate, triphenyl methanol, o-carbamoyl hydroxylamide, o-carbamoyl oxime, [[(2,6-dinitro benzyl)oxy]carbonyl]cyclohexyl amine, bis[[(2-nitro benzyl)oxy]carbonyl]hexane 1,6-diamine, 4-(methylthiobenzoyl)-1-methyl-1-morpholinoethane, (4-morpholinobenzoyl)-1-benzyl-1-dimethyl amino propane, N-(2-nitrobenzyloxycarbonyl)pyrrolidine, hexamminecobalt(III) tris(triphenyl methyl borate), 2-benzyl-2-dimethylamino-1-(4-morpholinophenyl)-butanone, and the like, are preferable. Suitable examples other than the above include compounds such as compounds represented by the formula (d2) or (d3), which are decomposed and generate an imidazole compound by the action of light (and/or heat). As the anionic polymerization initiator by heat, compounds which have conventionally used can be used without particular limitation, and examples thereof include amine-epoxy adduct type thermal anionic polymerization initiator such as 2-benzyl-2-dimethylamino-1-(4-morpholinophenyl)-butane-1-one, a thermal base generator including amine-isocyanate compounds, or anion polymerization curing agents such as dicyandiamides, hydrazines, or aromatic diamines, or composite type anion polymerization curing agent including different types of curing agents, and the like. Examples of the amine-epoxy adduct thermal anionic polymerization initiator include "Amicure PN-23", "Amicure PN-40", "Amicure PN-50", "Amicure PN-H" (all of them are trade names of Ajinomoto Fine-Techno Co., Inc.), "Hardener X-3661S" (trade name of A.C.R. K.K.), "Hardener X-3670S" (trade name of A.C.R. K.K.), "Novacure HX-3742" (trade name of Asahi Chemical Industry Co., Ltd.), "HX-3721" (trade name of Asahi Chemical Industry Co., Ltd.), etc. Furthermore, examples of the thermal base generator including an amine-isocyanate compound "Fujicure FXE-1000" (trade name of FUJI KASEI CO., LTD), "Fujicure FXR-1030" (trade name of FUJI KASEI CO., LTD), and the like. Note here that 2-benzyl-2-dimethylamino-1-(4-morpholinophenyl)-butane-1-one may function as an anionic polymerization initiator also by the action of light in addition to the action of heat.

The content of the anionic polymerization initiator in a curable composition is not particularly limited within a range where the objects of the present invention are not impaired. The content of the anionic polymerization initiator in a curable composition is preferably 0.01 parts by mass or more and 5 parts by mass or less, more preferably 0.05 parts by mass or more and 3 parts by mass or less, and particularly preferably 0.1 parts by mass or more and 2 parts by mass or less with respect to 100 parts by mass of the curable compound.

(Ionic Liquid Whose Melting Point is 140° C. or Less (Hereinafter, Also Simply Referred to as "Ionic Liquid"))

An ionic liquid is a salt which can be melted in a temperature range of 140° C. or less, and preferably a stable salt which becomes liquid at 140° C. or less. The melting point of the ionic liquid is preferably 120° C. or less, more preferably 100° C. or less, and further preferably 80° C. or less, from the viewpoint that effect of the present invention is reliably achieved and view of coating property, and the like. When the curable composition includes a solvent, solubility of the ionic liquid to a solvent included in the curable composition at room temperature (25° C.) is preferably 70% by mass or more, more preferably 80% by mass or more, and particularly preferably 90% by mass or more from the viewpoint that effect of the present invention is reliably achieved and view of coating property, and suppressing of foreign matters.

Furthermore, the solubility refers to a mass when 70 parts by mass, 80 parts by mass or 90 parts by mass of ionic liquid, etc. are mixed with 100 parts by mass of solvent included in the curable composition, and treated with a shaker for 5 minutes, no precipitate is observed by visual inspection of the presence or absence of precipitate. Since the ionic liquid is a salt, good ionic conductivity is achieved. Since the ionic liquid has a melting point of 140° C. or less, the ionic liquid can diffuse into the curable composition. Furthermore, thermal decomposition temperature is relatively high. Accordingly, in the curable composition, with less dependency of whether polymerization is cation polymerization or anion polymerization, a curing reaction can be promoted uniformly. As a result, it is possible to form a metal oxide-containing film having excellent refractive index and yellowing resistance (in particular, yellowing resistance), and satisfactory heat resistance and adhesion to a substrate.

The ionic liquid preferably includes an organic cation and anion. The ionic liquid preferably includes a nitrogen-containing organic cation, a phosphorus-containing organic cation, or sulfur-containing organic cation, and a counter anion, and more preferably includes a nitrogen-containing organic cation or a phosphorus-containing organic cation, and a counter anion.

In view of satisfactory affinity with respect to the solvent mentioned below, the organic cation constituting the ionic liquid is preferably at least one selected from the group consisting of an alkyl chain quaternary ammonium cation, a piperidinium cation, a pyrimidinium cation, a pyrrolidinium cation, an imidazolium cation, a pyrimidinium cation, pyrazolium cation, a guanidinium cation, a morpholinium cation, a phosphonium cation, and a sulfonium cation, more preferably an alkyl chain quaternary ammonium cation, a piperidinium cation, a pyrrolidinium cation, an imidazolium cation, a morpholinium cation, or a phosphonium cation, and further preferably a pyrrolidinium cation, an imidazolium cation, or a phosphonium cation in view of advantageous effects of the present invention.

Specific examples of the alkyl chain quaternary ammonium cation include a quaternary ammonium cation represented by the following formula (L1). Specific examples thereof include a tetramethyl ammonium cation, an ethyl trimethyl ammonium cation, a diethyl dimethyl ammonium cation, a triethyl methyl ammonium cation, a tetraethyl ammonium cation, an octyl trimethyl ammonium cation, a hexyl trimethyl ammonium cation, a methyl trioctyl ammonium cation, and the like. Specific examples of the above-mentioned piperidinium cation include a piperidinium cation represented by the following formula (L2). Specific examples thereof include 1-propylpiperidinium cation, 1-pentylpiperidinium cation, 1,1-dimethylpiperidinium cation, 1-methyl-1-ethylpiperidinium cation, 1-methyl-1-propylpiperidinium cation, 1-methyl-1-butylpiperidinium cation, 1-methyl-1-pentylpiperidinium cation, 1-methyl-1-hexylpiperidinium cation, 1-methyl-1-heptylpiperidinium cation, 1-ethyl-1-propylpiperidinium cation, 1-ethyl-1-butylpiperidinium cation, 1-ethyl-1-pentylpiperidinium cation, 1-ethyl-1-hexylpiperidinium cation, 1-ethyl-1-heptylpiperidinium cation, 1,1-dipropylpiperidinium cation, 1-propyl-1-butylpiperidinium cation, 1,1-dibutylpiperidinium cation, and the like. Specific examples of the above-mentioned pyrimidinium cation include a 1,3-dimethyl-1,4,5,6-tetrahydro pyrimidinium cation, a 1,2,3-trimethyl-1,4,5,6-tetrahydro pyrimidinium cation, a 1,2,3,4-tetramethyl-1,4,5,6-tetrahydro pyrimidinium cation, a 1,2,3,5-tetramethyl-1,4,5,6-tetrahydro pyrimidinium cation, a 1,3-dimethyl-1,4-dihydropyrimidinium cation, a 1,3-dimethyl-1,6-dihydropyrimidinium cation, a 1,2,3-trimethyl-1,4-dihydropyrimidinium cation, a 1,2,3-trimethyl-1,6-dihydropyrimidinium cation, a 1,2,3,4-tetramethyl-1,4-dihydropyrimidinium cation, a 1,2,3,4-tetramethyl-1,6-dihydropyrimidinium cation, and the like.

Specific examples of the above-mentioned pyrrolidinium cation include a pyrrolidinium cation represented by the following formula (L3). More specific examples thereof include a 1,1-dimethyl pyrrolidinium cation, a 1-ethyl-1-methyl pyrrolidinium cation, a 1-methyl-1-propyl pyrrolidinium cation, a 1-methyl-1-butyl pyrrolidinium cation, a 1-methyl-1-pentyl pyrrolidinium cation, a 1-methyl-1-hexyl pyrrolidinium cation, a 1-methyl-1-heptyl pyrrolidinium cation, a 1-ethyl-1-propyl pyrrolidinium cation, a 1-ethyl-1-butyl pyrrolidinium cation, a 1-ethyl-1-pentyl pyrrolidinium cation, a 1-ethyl-1-hexyl pyrrolidinium cation, a 1-ethyl-1-heptyl pyrrolidinium cation, a 1,1-dipropyl pyrrolidinium cation, a 1-propyl-1-butyl pyrrolidinium cation, a 1,1-dibutyl pyrrolidinium cation, and the like. Specific examples of the above-mentioned imidazolium cation include an imidazolium cation represented by the following formula (L5). More specific examples include a 1,3-dimethylimidazolium cation, a 1,3-diethyl imidazolium cation, a 1-ethyl-3-methylimidazolium cation, a 1-propyl-3-methylimidazolium cation, a 1-butyl-3-methylimidazolium cation, a 1-hexyl-3-methylimidazolium cation, a 1-octyl-3-methylimidazolium cation, a 1-decyl-3-methylimidazolium cation, a 1-dodecyl-3-methylimidazolium cation, a 1-tetradecyl-3-methylimidazolium cation, 1,2-dimethyl-3-propyl imidazolium cation, a 1-ethyl-2,3-dimethylimidazolium cation, a 1-butyl-2,3-dimethylimidazolium cation, a 1-hexyl-2,3-dimethylimidazolium cation, and the like. Specific examples of the above-mentioned pyrimidinium cation include a pyrimidinium cation represented by the following formula (L6). More specific examples thereof include a 1-ethyl pyrimidinium cation, a 1-butyl pyrimidinium cation, a 1-hexyl pyrimidinium cation, a 1-butyl-3-methyl pyrimidinium cation, a 1-butyl-4-methyl pyrimidinium cation, a 1-hexyl-3-methyl pyrimidinium cation, a 1-butyl-3,4-dimethyl pyrimidinium cation, and the like.

Specific examples of the above-mentioned pyrazonium cation include 1,3-dimethyl-1,4,5,6-tetrahydro pyrimidinium cation, 1,2,3-trimethyl-1,4,5,6-tetrahydro pyrimidinium cation, 1,2,3,4-tetramethyl-1,4,5,6-tetrahydro pyrimidinium cation, 1,2,3,5-tetramethyl-1,4,5,6-tetrahydro pyrimidinium cation, 1,3-dimethyl-1,4-dihydropyrimidinium cation, 1,3-dimethyl-1,6-dihydropyrimidinium cation, 1,2,3-trimethyl-1,4-dihydropyrimidinium cation, 1,2,3-trimethyl-1,6-dihydropyrimidinium cation, 1,2,3,4-tetramethyl-1,4-dihydropyrimidinium cation, 1,2,3,4-tetramethyl-1,6-dihydropyrimidinium cation, and the like.

Specific examples of the above-mentioned phosphonium cation include a phosphonium cation represented by the following formula (L4). Specific examples thereof include tetraalkyl phosphonium cations such as a tetrabutyl phosphonium cation, a tributyl methyl phosphonium cation, and tributyl hexyl phosphonium cation, triethyl(methoxy methyl)phosphonium cation, and the like. Specific examples of the above-mentioned sulfonium cation include a triethyl sulfonium cation, a dimethyl ethyl sulfonium cation, a triethyl sulfonium cation, an ethyl methyl propyl sulfonium cation, a butyl dimethyl sulfonium cation, a 1-methyl tetrahydrothiophenium-one, 1-ethyl tetrahydrothiophenium cation, a 1-propyl tetrahydrothiophenium cation, a 1-butyl tetrahydrothiophenium cation, or a 1-methyl-[1,4]-thiooxonium cation, and the like. Among them, the above-mentioned sulfonium cation is preferably sulfonium cation having cyclic structure such as tetrahydrothiophenium or hexahydrothiopyrylium 5- or 6-membered ring, in which and a hetero atom such as an oxygen atom may be included in cyclic structure.

[Chem. 91]

(L1)

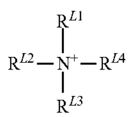

(L2)

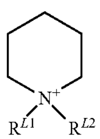

(L3)

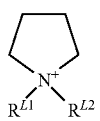

(L4)

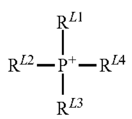

(L5)

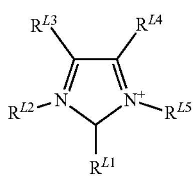

(L6)

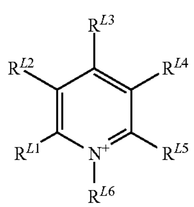

In the formulas (L1) to (L4), $R^{L1}$ to $R^{L4}$ each independently represent an alkyl group having 1 or more and 20 or less carbon atoms, or an alkoxy alkyl group represented by $R^{L7}$—O—$(CH_2)_{Ln}$— ($R^{L7}$ represents a methyl group or an ethyl group, and Ln represents an integer of 1 or more and 4 or less). In the formula (L5), $R^{L1}$ to $R^{L4}$ each independently represent an alkyl group having 1 or more and 20 or less carbon atoms, an alkoxy alkyl group represented by $R^{L7}$—O—$(CH_2)_{Ln}$— ($R^{L7}$ represents a methyl group, or an ethyl group, and Ln represents an integer of 1 or more and 4 or less), and a hydrogen atom. In the formula (L6), $R^{L1}$ to $R^{L6}$ each independently represent an alkyl group having 1 or more and 20 or less carbon atoms, an alkoxy alkyl group represented by $R^{L7}$—O—$(CH_2)_{Ln}$— ($R^{L7}$ represents a methyl group, or an ethyl group, and Ln represents an integer of 1 or more and 4 or less), and a hydrogen atom.

Anions constituting an ionic liquid (B) may be an organic anion or an inorganic anion. Since affinity of the ionic liquid (B) to the below-mentioned solvent (S) is good, an organic anion is satisfactory. The organic anion is preferably at least one selected from the group consisting of a carboxylic acid anion, an N-acylamino acid ion, an acidic amino acid anion, a neutral amino acid anion, an alkyl sulfuric acid anion, fluorine-containing compound anion, and a phenol-based anion, and more preferably a carboxylic acid anion or an N-acylamino acid ion.

Specific examples of the carboxylate anion include an acetate ion, a decanoate ion, a 2-pyrrolidone-5-carboxylate ion, a formate ion, an α-lipoate ion, a lactate ion, a tartarate ion, a hippurate ion, an N-methyl hippurate ion, and the like. Among them, an acetate ion, a 2-pyrrolidone-5-carboxylate ion, a formate ion, a lactate ion, a tartarate ion, a hippurate ion, an N-methyl hippurate ion are preferable, and an acetate ion, and an N-methyl hippurate ion are more preferable. Specific examples of the above-mentioned N-acylamino acid ion include an N-benzoylalanine ion, an N-acetylphenylalanine ion, an aspartate ion, a glycine ion, an N-acetyl glycine ion, and the like. Among them, an N-benzoyl alanine ion, an N-acetyl phenylalanine ion, and an N-acetyl glycine ion are preferable. An N-acetyl glycine ion more preferable.

Specific examples of the above-mentioned acidic amino acid anion include an aspartate ion, glutamate ion, and the like. Specific examples of the above-mentioned amino acid anion include a glycine ion, an alanine ion, and a phenylalanine ion. Specific examples of the alkyl sulfate anion include a methanesulfonate ion and the like; specific examples of the fluorine-containing compound anion include a trifluoromethanesulfonate ion, a hexafluorophosphonate ion, a trifluorotris(pentafluoroethyl)phosphonate ion, a bis(fluoroalkylsulfonyl)imide ion (for example, a bis(trifluoromethanesulfonyl)imide ion), trifluoroacetate ion, a tetrafluoroborate ion, and the like; specific examples of the phenolic anion include a phenol ion, a 2-methoxyphenol ion, a 2,6-di-tert-butylphenol ion, and the like.

From the viewpoint that the effect of the present invention is achieved more reliably, the inorganic anion is preferably at least one selected from the group consisting of $F^-$, $Cl^-$, $Br^-$, $I^-$, $BF_4^-$, $PF_6^-$, and $N(SO_2F)_2^-$, and more preferably $BF_4^-$, $PF_6^-$, or $N(SO_2F)_2^-$, and further preferably $BF_4^-$ or $PF_6^-$.

The ionic liquid can be produced by, for example, a technique disclosed in paragraph 0045 in WO2014/178254. The ionic liquid may be used alone or as a mixture of two or more types thereof. The content of the ionic liquid is not particularly limited as long as the effect of the present invention can be achieved, but the content is preferably 0.0001 parts by mass or more and 1 part by mass or less, more preferably 0.001 parts by mass or more and 1 part by mass or less, further preferably 0.002 parts by mass or more and 0.1 part by mass or less, and particularly preferably 0.003 parts by mass or more and 0.07 parts by mass or less with respect to 100 parts by mass of the curable compound.

(Curing Accelerator)

A curable composition may include a curing accelerator. When the curable composition includes the curing accelerator, a metal oxide-containing film which can achieve both the refractive index and yellowing resistance, enhance curability of the curable composition, and have particularly satisfactory heat resistance (pyrolysis resistance) and adhesion to a substrate.

Examples of the curing accelerator include the same as mentioned above, and preferably phosphine-based compounds and derivatives thereof, and tetraphenylboronate. Among the above-mentioned specific examples, triphenylphosphine and triphenylphosphine triphenylborane are preferable.

The use amount of the curing accelerator is not particularly limited within a range where the objects of the present invention are not impaired. The use amount of the curing accelerator is preferably 0.01 parts by mass or more and 5 parts by mass or less, more preferably 0.05 parts by mass or more and 3 parts by mass or less, and particularly preferably 0.1 parts by mass or more and 2 parts by mass or less with respect to 100 parts by mass of the curable compound 100 parts by mass.

(Sensitizer)

The curable composition may include a sensitizer. When the curable composition includes a cationic polymerization initiator or when the cationic polymerization initiator includes a sulfonium cation and/or an iodonium cation, the curable composition preferably comprises the sensitizer. It is possible to use, as the sensitizer, known sensitizers, which have hitherto been used in combination with various cationic polymerization initiators, without particular limitation. Suitable examples of the sensitizer include the same as those described for the energy-sensitive composition of the fifth aspect. Two or more of these sensitizers may be used in combination.

The use amount of the sensitizer is not particularly limited and is preferably 1% by mass or more and 300% by mass or less, and more preferably 5% by mass or more and 200% by mass or less, based on the mass of the photocationic polymerization initiator. When using the sensitizer in the amount within the above range, it is easy to obtain the desired sensitization effect.

(Antioxidant)

The curable compound may include or may not include an antioxidant. However, in view of yellowing resistance, the curable compound preferably includes an antioxidant. Examples of the antioxidant include a phenol compound, a phosphite ester compound, a thioether compound, and the like. More preferable examples include a phenol compound having a molecular weight of 500 or more, a phosphite ester compound having a molecular weight of 500 or more, a thioether compound having a molecular weight of 500 or more, and the like. Furthermore, the antioxidant is preferably a phenol compound, and more preferably a phenol compound having a molecular weight of 500 or more.

As the phenol compound, any phenol compounds known as a phenolic coloring inhibitor can be used. Preferable examples of the phenol compound include a hindered phenolic compound. In particular, a compound having a substituent at an adjacent position (ortho-position) to the phenolic hydroxyl group is preferable. As the substituent, a substituted or not-substituted alkyl group having 1 or more and 22 or less carbon atoms is preferable, a methyl group, an ethyl group, a propyl group, an isopropyl group, a butyl group, an isobutyl group, a tert-butyl group, a pentyl group, an isopentyl group, a tert-pentyl group, a hexyl group, an octyl group, an isooctyl group, and a 2-ethylhexyl group are more preferable. Furthermore, a compound having a phenol group and a phosphite group in the same molecule is also preferable.

Examples of the phosphite ester compound includes at least one compound selected from the group consisting of tris[2-[[2,4,8,10-tetrakis(1,1-dimethylethyl)dibenzo[d,f][1,3,2]dioxaphosphepine-6-yl]oxy]ethyl]amine, tris [2-[(4,6,9,11-tetra-tert-butyldibenzo[d,f][1,3,2]dioxaphosphepine-2-yl)oxy]ethyl]amine, and ethyl bis phosphite(2,4-ditert-butyl-6-methylphenyl).

The antioxidant is readily available as commercial products, and examples of the products include as Adeka Stab AO-20, Adeka Stab AO-30, Adeka Stab AO-40, Adeka Stab AO-50, Adeka Stab AO-50F, Adeka Stab AO-60, Adeka Stab AO-60G, Adeka Stab AO-80, Adeka Stab AO-330, Adeka Stab PEP-36A, Adeka Stab AO-412S (available from ADEKA Corporation), and the like.

The content of the antioxidant is preferably 0.01% by mass or more and 20% by mass or less, and more preferably 0.3% by mass or more and 15% by mass or less in components excluding a solvent of the curable composition. Only one type of coloring inhibitor may be used or two types or more coloring inhibitors may be used. When two types or more coloring inhibitors are used, it is preferable that the total amount is in the above-mentioned range.

(Other Components)

The curable composition can optionally contain additives such as surfactants, thermal polymerization inhibitors, defoamers, silane coupling agents, colorants (pigments, dyes), resins (thermoplastic resins, alkali-soluble resins, etc.), and organic fillers. It is possible to use, as any additives, conventionally known ones.

(Solvent)

The curable composition preferably includes a solvent for the purpose of adjusting the coatability and viscosity. As the solvent, an organic solvent is typically used. There is no particular limitation on types of the organic solvent as long as it can uniformly dissolve or disperse components contained in the curable composition.

Suitable examples of the organic solvent usable as the solvent are the same as suitable examples of the organic solvent in the energy-sensitive composition of the first aspect.

There is no particular limitation on the use amount of the solvent in the curable composition as the energy-sensitive composition of the fifth aspect. In view of the coatability of the curable composition, the use amount of the solvent is, for example, 30% by mass or more and 99.9% by mass or less, and preferably 50% by mass or more and 98% by mass or less, based on the entire curable composition.

(Metal Oxide-Containing Film)

A metal oxide-containing film obtained by curing the curable composition of the energy-sensitive composition of the sixth aspect has excellent refractive index and yellowing resistance, and satisfactory heat resistance and adhesion to a substrate. The thickness of the cured film is not particularly limited, but it is preferably 10 nm or more and 50 μm or less, more preferably 50 nm or more and 30 μm or less, and further preferably 100 nm or more and 10 μm or less, and particularly preferably 300 nm or more and 5 μm or less. The cured film is suitable for various applications, for example, a sealant for an OLED display device, an OLED light, hard coat, an insulating film, an antireflection film, an interlayer insulating film, a carbon hard mask, display panel material (flattening film, pixels for color filter, partition walls for organic electroluminescence, spacer), optical members (lens, micro lens, wafer level lens, optical fiber, light waveguides, prism sheets, holograms, high refractive index films, and retroreflection films) and the like. Furthermore, the cured film is excellent in flexibility, and cracking is less likely to occur, so that the cured film is used for a flexible display panel or flexible light. Furthermore, the cured film is particularly preferably used as a transparent film for coating metal wiring and the like in display device such as a touch panel.

(7) Silicon-Containing Resin Composition

As described above, a resin for forming a cured film by baking is also preferable as a precursor resin of the base material component (B). Examples of the resin for forming a cured film by baking include a silicon-containing resin. Preferable examples of the silicon-containing resin include at least one or more resin selected from a siloxane resin and polysilane. A metal oxide fine particle dispersion liquid including these silicon-containing resins is applied to obtain a metal oxide-containing film including a silicon-containing resin. The metal oxide-containing film is baked to obtain a silica-based metal oxide-containing film. Hereinafter, siloxane resin and polysilane will be described.

(Siloxane Resin)

The siloxane resin is not particularly limited as long as it is a type of resin that is soluble in the solvent described below. As the siloxane resin, a siloxane resin obtained by hydrolytic condensation of at least one type selected from a silane compound represented by the following formula (C-a) is suitably used, for example.

$$R^{Y0}_{(4-n0)}Si(OR')_{n0} \quad (C\text{-}a)$$

In the formula (C-a), $R^{Y0}$ represents a hydrogen atom, an alkyl group, an aryl group, or an aralkyl group, R' represents an alkyl group or a phenyl group, and n0 represents an integer of 2 or more and 4 or less. When a plurality of $R^{Y0}$ is bonded to Si, the plurality of $R^{Y0}$ may be the same or different from each other. A plurality of (OR') groups bonded to Si may also be the same or different from each other.

The alkyl group as $R^{Y0}$ is preferably a linear or branched alkyl group having 1 or more and 20 or less carbon atoms, more preferably a linear or branched alkyl group having 1 or more and 4 or less carbon atoms.

When $R^{Y0}$ is an aryl group or an aralkyl group, the aryl groups contained in these groups are not particularly limited as long as objects of the present invention are not inhibited. Examples of a suitable aryl group include the following groups.

[Chem. 92]

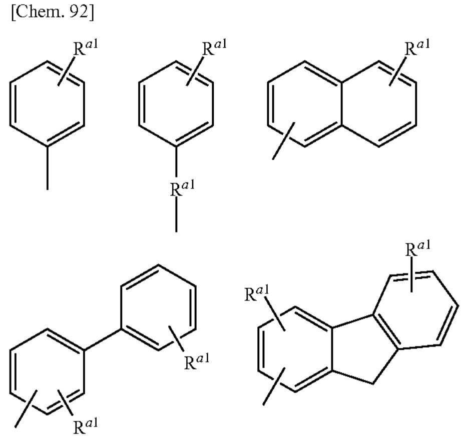

-continued

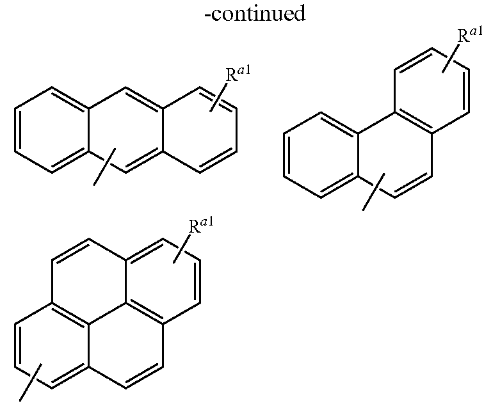

Among the groups represented by the above formulas, groups represented by the following formulas are preferable.

[Chem. 93]

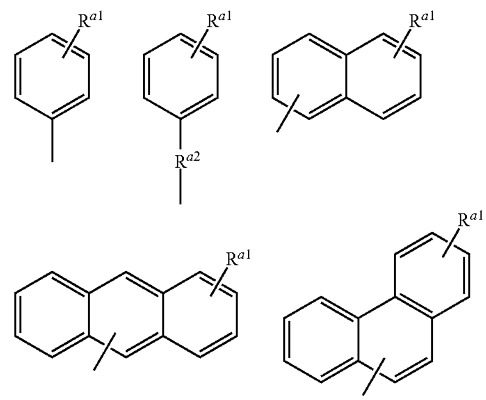

In the above formulas, $R^{a1}$ represents a hydrogen atom; a hydroxy group; an alkoxy group such as a methoxy group, an ethoxy group, a butoxy group, or a propoxy group; or a hydrocarbon group such as a methyl group, an ethyl group, a butyl group, or a propyl group. In the above formulas, $R^{a2}$ represents an alkylene group such as a methylene group, an ethylene group, a propylene group, or a butylene group.

When $R^{Y0}$ is an aryl group or an aralkyl group, specific and suitable examples include a benzyl group, a phenethyl group, a phenyl group, a naphthyl group, an anthracenyl group, a phenanthryl group, a biphenylyl group, a fluorenyl group, and a pyrenyl group.

The number of benzene rings in the aryl group or the aralkyl group is preferably 1 or more and 3 or less. When the number of benzene rings is 1 or more and 3 or less, production of the siloxane resin proceeds well, the resulting high degree of polymerization of the siloxane resin inhibits volatilization during baking, and thereby the silica film is easily formed. The aryl group or the aralkyl group may contain a hydroxy group as a substituent.

The alkyl group as R' is preferably a linear or branched alkyl group having 1 or more and 5 or less carbon atoms. The number of carbon atoms in the alkyl group as R' is preferably 1 or 2 particularly in terms of the hydrolysis rate. When n0 is 4 in the formula (C-a), the resulting silane compound (i) is represented by the following formula (C-b).

$$Si(OR^{Y1})_{a1}(OR^{Y2})_{b1}(OR^{Y3})_{c1}(OR^{Y4})_{d1} \quad (C\text{-}b)$$

In the formula (C-b), $R^{Y1}$, $R^{Y2}$, $R^{Y3}$ and $R^{Y4}$ each independently represent the same alkyl group or the same phenyl group as in R' above.

a1, b1, c1, and d1 are integers that satisfy $0 \le a1 \le 4$, $0 \le b1 \le 4$, $0 \le c1 \le 4$, $0 \le d1 \le 4$, and $a1+b1+c1+d1=4$.

When n0 is 3 in the formula (C-a), the resulting silane compound (ii) is represented by the following formula (C-c).

$$R^{Y5}Si(OR^{Y6})_{e1}(OR^{Y7})_{f1}(OR^{Y8})_{g1} \quad \text{(C-c)}$$

In the formula (C-c), $R^{Y5}$ represents a hydrogen atom or the same alkyl group, the same aryl group, or the same aralkyl group as in R above. $R^{Y6}$, $R^{Y7}$, and $R^{Y8}$ each independently represent the same alkyl group or the same phenyl group as in R' above.

e1, f1, and g1 are integers that satisfy $0 \le e \le 3$, $0 \le f \le 3$, $0 \le g1 \le 3$, and $e1+f1+g1=3$.

When n0 is 2 in the formula (C-a), the resulting silane compound (iii) is represented by the following formula (C-d).

$$R^{Y9}R^{Y10}Si(OR^{Y11})_{h1}(OR^{Y12})_{i1} \quad \text{(C-d)}$$

In the formula (C-d), $R^{Y9}$ and $R^{Y10}$ represent a hydrogen atom or the same alkyl group, the same aryl group, or the same aralkyl group as in R above. $R^{Y11}$ and $R^{Y12}$ each independently represent the same alkyl group or the same phenyl group as in R' above.

h1 and i1 are integers that satisfy $0 \le h1 \le 2$, $0 \le i1 \le 2$, and $h+i=2$.

Specific examples of the silane compound (i) include tetraalkoxysilanes such as tetramethoxysilane, tetraethoxysilane, tetrapropoxysilane, tetrabutoxysilane, tetrapentyloxysilane, tetraphenyloxysilane, trimethoxymonoethoxysilane, dimethoxydiethoxysilane, triethoxymonomethoxysilane, trimethoxymonopropoxysilane, monomethoxytributoxysilane, monomethoxytripentyloxysilane, monomethoxytriphenyloxysilane, dimethoxydipropoxysilane, tripropoxymonomethoxysilane, trimethoxymonobutoxysilane, dimethoxydibutoxysilane, triethoxymonopropoxysilane, diethoxydipropoxysilane, tributoxymonopropoxysilane, dimethoxymonoethoxymonobutoxysilane, diethoxymonomethoxymonobutoxysilane, diethoxymonopropoxymonobutoxysilane, dipropoxymonomethoxymonoethoxysilane, dipropoxymonomethoxymonobutoxysilane, dipropoxymonoethoxymonobutoxysilane, dibutoxymonomethoxymonoethoxysilane, dibutoxymonoethoxymonopropoxysilane, and monomethoxymonoethoxymonopropoxymonobutoxysilane. Among these, tetramethoxysilane and tetraethoxysilane are preferable.

Specific examples of the silane compound (ii) include hydrosilane compounds such as trimethoxysilane, triethoxysilane, tripropoxysilane, tripentyloxysilane, triphenyloxysilane, dimethoxymonoethoxysilane, diethoxymonomethoxysilane, dipropoxymonomethoxysilane, dipropoxymonoethoxysilane, dipentyloxylmonomethoxysilane, dipentyloxymonoethoxysilane, dipentyloxymonopropoxysilane, diphenyloxylmonomethoxysilane, diphenyloxymonoethoxysilane, diphenyloxymonopropoxysilane, methoxyethoxypropoxysilane, monopropoxydimethoxysilane, monopropoxydiethoxysilane, monobutoxydimethoxysilane, monopentyloxydiethoxysilane, and monophenyloxydiethoxysilane;

methylsilane compounds such as methyltrimethoxysilane, methyltriethoxysilane, methyltripropoxysilane, methyltripentyloxysilane, methyltriphenyloxysilane, methylmonomethoxydiethoxysilane, methylmonomethoxydipropoxysilane, methylmonomethoxydipentyloxysilane, methylmonomethoxydiphenyloxysilane, methylmethoxyethoxypropoxysilane, and methylmonomethoxymonoethoxymonobutoxysilane;

ethylsilane compounds such as ethyltrimethoxysilane, ethyltriethoxysilane, ethyltripropoxysilane, ethyltripentyloxysilane, ethyltriphenyloxysilane, ethylmonomethoxydiethoxysilane, ethylmonomethoxydipropoxysilane, ethylmonomethoxydipentyloxysilane, ethylmonomethoxydiphenyloxysilane, ethylmethoxyethoxypropoxysilane, and ethylmonomethoxymonoethoxymonobutoxysilane;

propylsilane compounds such as propyltrimethoxysilane, propyltriethoxysilane, propyltripropoxysilane, propyltripentyloxysilane, and propyltriphenyloxysilane, propylmonomethoxydiethoxysilane, propylmonomethoxydipropoxysilane, propylmonomethoxydipentyloxysilane, propylmonomethoxydiphenyloxysilane, propylmethoxyethoxypropoxysilane, and propylmonomethoxymonoethoxymonobutoxysilane;

butylsilane compounds such as butyltrimethoxysilane, butyltriethoxysilane, butyltripropoxysilane, butyltripentyloxysilane, butyltriphenyloxysilane, butylmonomethoxydiethoxysilane, butylmonomethoxydipropoxysilane, butylmonomethoxydipentyloxysilane, butylmonomethoxydiphenyloxysilane, butylmethoxyethoxypropoxysilane, and butylmonomethoxymonoethoxymonobutoxysilane;

phenylsilane compounds such as phenyltrimethoxysilane, phenyltriethoxysilane, phenyltripropoxysilane, phenyltripentyloxysilane, phenyltriphenyloxysilane, phenylmonomethoxydiethoxysilane, phenylmonomethoxydipropoxysilane, phenylmonomethoxydipentyloxysilane, phenylmonomethoxydiphenyloxysilane, phenylmethoxyethoxypropoxysilane, trimethoxy(2-phenylethyl)silane, and phenylmonomethoxymonoethoxymonobutoxysilane;

hydroxyphenylsilane compounds such as hydroxyphenyltrimethoxysilane, hydroxyphenyltriethoxysilane, hydroxyphenyltripropoxysilane, hydroxyphenyltripentyloxysilane, hydroxyphenyltriphenyloxysilane, hydroxyphenylmonomethoxydiethoxysilane, hydroxyphenylmonomethoxydipropoxysilane, hydroxyphenylmonomethoxydipentyloxysilane, hydroxyphenylmonomethoxydiphenyloxysilane, hydroxyphenylmethoxyethoxypropoxysilane, and hydroxyphenylmonomethoxymonoethoxymonobutoxysilane;

naphthylsilane compounds such as naphthyltrimethoxysilane, naphthyltriethoxysilane, naphthyltripropoxysilane, naphthyltripentyloxysilane, naphthyltriphenyloxysilane, naphthylmonomethoxydiethoxysilane, naphthylmonomethoxydipropoxysilane, naphthylmonomethoxydipentyloxysilane, naphthylmonomethoxydiphenyloxysilane, naphthylmethoxyethoxypropoxysilane, and naphthylmonomethoxymonoethoxymonobutoxysilane;

benzylsilane compounds such as benzyltrimethoxysilane, benzyltriethoxysilane, benzyltripropoxysilane, benzyltripentyloxysilane, benzyltriphenyloxysilane, benzylmonomethoxydiethoxysilane, benzylmonomethoxydipropoxysilane, benzylmonomethoxydipentyloxysilane, benzylmonomethoxydiphenyloxysilane, benzylmethoxyethoxypropoxysilane, and benzylmonomethoxymonoethoxymonobutoxysilane;

and hydroxybenzylsilane compounds such as hydroxybenzyltrimethoxysilane, hydroxybenzyltriethoxysilane, hydroxybenzyltripropoxysilane, hydroxybenzyltripentyloxysilane, hydroxybenzyltriphenyloxysilane, hydroxybenzylmonomethoxydiethoxysilane, hydroxybenzylmonomethoxydipropoxysilane, hydroxybenzylmonomethoxydipentyloxysilane, hydroxybenzylmonomethoxydiphenyloxysilane, hydroxybenzylmethoxyethoxypropoxysilane, and hydroxybenzylmonomethoxymonoethoxymonobutoxysilane.

Specific examples of the silane compound (iii) include hydrosilane compounds such as dimethoxysilane, diethoxysilane, dipropoxysilane, dipentyloxysilane, diphenyloxysilane, methoxyethoxysilane, methoxypropoxysilane, methoxypentyloxysilane, methoxyphenyloxysilane, ethoxypropoxysilane, ethoxypentyloxysilane, and ethoxyphenyloxysilane;

methylhydrosilane compounds such as methyldimethoxysilane, methylmethoxyethoxysilane, methyldiethoxysilane, methylmethoxypropoxysilane, methylmethoxypentyloxysilane, methylethoxypropoxysilane, methyldipropoxysilane, methyldipentyloxysilane, methyldiphenyloxysilane, and methylmethoxyphenyloxysilane;

ethylhydrosilane compounds such as ethyldimethoxysilane, ethylmethoxyethoxysilane, ethyldiethoxysilane, ethylmethoxypropoxysilane, ethylmethoxypentyloxysilane, ethylethoxypropoxysilane, ethyldipropoxysilane, ethyldipentyloxysilane, ethyldiphenyloxysilane, and ethylmethoxyphenyloxysilane;

propylhydrosilane compounds such as propyldimethoxysilane, propylmethoxyethoxysilane, propyldiethoxysilane, propylmethoxypropoxysilane, propylmethoxypentyloxysilane, propylethoxypropoxysilane, propyldipropoxysilane, propyldipentyloxysilane, propyldiphenyloxysilane, and propylmethoxyphenyloxysilane;

butylhydrosilane compounds such as butyldimethoxysilane, butylmethoxyethoxysilane, butyldiethoxysilane, butylmethoxypropoxysilane, butylmethoxypentyloxysilane, butylethoxypropoxysilane, butyldipropoxysilane, butyldipentyloxysilane, butyldiphenyloxysilane, and butylmethoxyphenyloxysilane;

phenylhydrosilane compounds such as phenyldimethoxysilane, phenylmethoxyethoxysilane, phenyldiethoxysilane, phenylmethoxypropoxysilane, phenylmethoxypentyloxysilane, phenylethoxypropoxysilane, phenyldipropoxysilane, phenyldipentyloxysilane, phenyldiphenyloxysilane, and phenylmethoxyphenyloxysilane;

hydroxyphenylhydrosilane compounds such as hydroxyphenyldimethoxysilane, hydroxyphenylmethoxyethoxysilane, hydroxyphenyldiethoxysilane, hydroxyphenylmethoxypropoxysilane, hydroxyphenylmethoxypentyloxysilane, hydroxyphenylethoxypropoxysilane, hydroxyphenyldipropoxysilane, hydroxyphenyldipentyloxysilane, hydroxyphenyldiphenyloxysilane, and hydroxyphenylmethoxyphenyloxysilane;

naphthylhydrosilane compounds such as naphthyldimethoxysilane, naphthylmethoxyethoxysilane, naphthyldiethoxysilane, naphthylmethoxypropoxysilane, naphthylmethoxypentyloxysilane, naphthylethoxypropoxysilane, naphthyldipropoxysilane, naphthyldipentyloxysilane, naphthyldiphenyloxysilane, and naphthylmethoxyphenyloxysilane;

benzylhydrosilane compounds such as benzyldimethoxysilane, benzylmethoxyethoxysilane, benzyldiethoxysilane, benzylmethoxypropoxysilane, benzylmethoxypentyloxysilane, benzylethoxypropoxysilane, benzyldipropoxysilane, benzyldipentyloxysilane, benzyldiphenyloxysilane, and benzylmethoxyphenyloxysilane;

hydroxybenzylhydrosilane compounds such as hydroxybenzyldimethoxysilane, hydroxybenzylmethoxyethoxysilane, hydroxybenzyldiethoxysilane, hydroxybenzylmethoxypropoxysilane, hydroxybenzylmethoxypentyloxysilane, hydroxybenzylethoxypropoxysilane, hydroxybenzyldipropoxysilane, hydroxybenzyldipentyloxysilane, hydroxybenzyldiphenyloxysilane, and hydroxybenzylmethoxyphenyloxysilane;

dimethylsilane compounds such as dimethyldimethoxysilane, dimethylmethoxyethoxysilane, dimethylmethoxypropoxysilane, dimethyldiethoxysilane, dimethyldipentyloxysilane, dimethyldiphenyloxysilane, dimethylethoxypropoxysilane, and dimethyldipropoxysilane;

diethylsilane compounds such as diethyldimethoxysilane, diethylmethoxyethoxysilane, diethylmethoxypropoxysilane, diethyldiethoxysilane, diethyldipentyloxysilane, diethyldiphenyloxysilane, diethylethoxypropoxysilane, and diethyldipropoxysilane;

dipropoxysilane compounds such as dipropyldimethoxysilane, dipropylmethoxyethoxysilane, dipropylmethoxypropoxysilane, dipropyldiethoxysilane, dipropyldipentyloxysilane, dipropyldiphenyloxysilane, dipropylethoxypropoxysilane, and dipropyldipropoxysilane;

dibutylsilane compounds such as dibutyldimethoxysilane, dibutylmethoxyethoxysilane, dibutylmethoxypropoxysilane, dibutyldiethoxysilane, dibutyldipentyloxysilane, dibutyldiphenyloxysilane, dibutylethoxypropoxysilane, and dibutyldipropoxysilane;

diphenylsilane compounds such as diphenyldimethoxysilane, diphenylmethoxyethoxysilane, diphenylmethoxypropoxysilane, diphenyldiethoxysilane, diphenyldipentyloxysilane, diphenyldiphenyloxysilane, diphenylethoxypropoxysilane, and diphenyldipropoxysilane;

di(hydroxyphenyl)silane compounds such as di(hydroxyphenyl)dimethoxysilane, di(hydroxyphenyl)methoxyethoxysilane, di(hydroxyphenyl)methoxypropoxysilane, di(hydroxyphenyl)diethoxysilane, di(hydroxyphenyl) dipentyloxysilane, di(hydroxyphenyl)diphenyloxysilane, di(hydroxyphenyl)ethoxypropoxysilane, and di(hydroxyphenyl)dipropoxysilane;

dinaphthylsilane compounds such as dinaphthyldimethoxysilane, dinaphthylmethoxyethoxysilane, dinaphthylmethoxypropoxysilane, dinaphthyldiethoxysilane, dinaphthyldipentyloxysilane, dinaphthyldiphenyloxysilane, dinaphthylethoxypropoxysilane, and dinaphthyldipropoxysilane;

dibenzylsilane compounds such as dibenzyldimethoxysilane, dibenzylmethoxyethoxysilane, dibenzylmethoxypropoxysilane, dibenzyldiethoxysilane, dibenzyldipentyloxysilane, dibenzyldiphenyloxysilane, dibenzylethoxypropoxysilane, and dibenzyldipropoxysilane;

di(hydroxybenzyl)silane compounds such as di(hydroxybenzyl)dimethoxysilane, di(hydroxybenzyl)methoxyethoxysilane, di(hydroxybenzyl)methoxypropoxysilane, di(hydroxybenzyl)diethoxysilane, di(hydroxybenzyl) dipentyloxysilane, di(hydroxybenzyl)diphenyloxysilane, di(hydroxybenzyl)ethoxypropoxysilane, and di(hydroxybenzyl)dipropoxysilane;

methylethylsilane compounds such as methylethyldimethoxysilane, methylethylmethoxyethoxysilane, methylethylmethoxypropoxysilane, methylethyldiethoxysilane, methylethyldipentyloxysilane, methylethyldiphenyloxysilane, methylethylethoxypropoxysilane, and methylethyldipropoxysilane;

methylpropylsilane compounds such as methylpropyldimethoxysilane, methylpropylmethoxyethoxysilane, methylpropylmethoxypropoxysilane, methylpropyldiethoxysilane, methylpropyldipentyloxysilane, methylpropyldiphenyloxysilane, methylpropylethoxypropoxysilane, and methylpropyldipropoxysilane;

methylbutylsilane compounds such as methylbutyldimethoxysilane, methylbutylmethoxyethoxysilane, methylbutylmethoxypropoxysilane, methylbutyldiethoxysilane, methylbutyldipentyloxysilane, methylbutyldiphenyloxysilane, methylbutylethoxypropoxysilane, and methylbutyldipropoxysilane;

methyl(phenyl)silane compounds such as methyl(phenyl) dimethoxysilane, methyl(phenyl)methoxyethoxysilane, methyl(phenyl)methoxypropoxysilane, methyl(phenyl)diethoxysilane, methyl(phenyl)dipentyloxysilane, methyl (phenyl)diphenyloxysilane, methyl(phenyl)ethoxypropoxysilane, and methyl(phenyl)dipropoxysilane;

methyl(hydroxyphenyl)silane compounds such as methyl (hydroxyphenyl)dimethoxysilane, methyl(hydroxyphenyl) methoxyethoxysilane, methyl(hydroxyphenyl)methoxypropoxysilane, methyl(hydroxyphenyl)diethoxysilane, methyl(hydroxyphenyl)dipentyloxysilane, methyl(hydroxyphenyl)diphenyloxysilane, methyl(hydroxyphenyl)ethoxypropoxysilane, and methyl(hydroxyphenyl)dipropoxysilane;

methyl(naphthyl)silane compounds such as methyl(naphthyl)dimethoxysilane, methyl(naphthyl)methoxyethoxysilane, methyl(naphthyl)methoxypropoxysilane, methyl(naphthyl) diethoxysilane, methyl(naphthyl)dipentyloxysilane, methyl (naphthyl)diphenyloxysilane, methyl(naphthyl)ethoxypropoxysilane, and methyl(naphthyl)dipropoxysilane;

methyl(benzyl)silane compounds such as methyl(benzyl) dimethoxysilane, methyl(benzyl)methoxyethoxysilane, methyl(benzyl)methoxypropoxysilane, methyl(benzyl)diethoxysilane, methyl(benzyl)dipentyloxysilane, methyl (benzyl)diphenyloxysilane, methyl(benzyl)ethoxypropoxysilane, and methyl(benzyl)dipropoxysilane;

methyl(hydroxybenzyl)silane compounds such as methyl (hydroxybenzyl)dimethoxysilane, methyl(hydroxybenzyl) methoxyethoxysilane, methyl(hydroxybenzyl)methoxypropoxysilane, methyl(hydroxybenzyl)diethoxysilane, methyl(hydroxybenzyl)dipentyloxysilane, methyl(hydroxybenzyl)diphenyloxysilane, methyl(hydroxybenzyl)ethoxypropoxysilane, and methyl(hydroxybenzyl)dipropoxysilane;

ethylpropylsilane compounds such as ethylpropyldimethoxysilane, ethylpropylmethoxyethoxysilane, ethylpropylmethoxypropoxysilane, ethylpropyldiethoxysilane, ethylpropyldipentyloxysilane, ethylpropyldiphenyloxysilane, ethylpropylethoxypropoxysilane, and ethylpropyldipropoxysilane;

ethylbutylsilane compounds such as ethylbutyldimethoxysilane, ethylbutylmethoxyethoxysilane, ethylbutylmethoxypropoxysilane, ethylbutyldiethoxysilane, ethylbutyldipentyloxysilane, ethylbutyldiphenyloxysilane, ethylbutylethoxypropoxysilane, and ethylbutyldipropoxysilane;

ethyl(phenyl)silane compounds such as ethyl(phenyl)dimethoxysilane, ethyl(phenyl)methoxyethoxysilane, ethyl(phenyl)methoxypropoxysilane, ethyl(phenyl)diethoxysilane, ethyl(phenyl)dipentyloxysilane, ethyl(phenyl)diphenyloxysilane, ethyl(phenyl)ethoxypropoxysilane, and ethyl(phenyl)dipropoxysilane;

ethyl(hydroxyphenyl)silane compounds such as ethyl(hydroxyphenyl)dimethoxysilane, ethyl(hydroxyphenyl) methoxyethoxysilane, ethyl(hydroxyphenyl)methoxypropoxysilane, ethyl(hydroxyphenyl)diethoxysilane, ethyl (hydroxyphenyl)dipentyloxysilane, ethyl(hydroxyphenyl) diphenyloxysilane, ethyl(hydroxyphenyl) ethoxypropoxysilane, and ethyl(hydroxyphenyl) dipropoxysilane;

ethyl(naphthyl)silane compounds such as ethyl(naphthyl) dimethoxysilane, ethyl(naphthyl)methoxyethoxysilane, ethyl(naphthyl)methoxypropoxysilane, ethyl(naphthyl)diethoxysilane, ethyl(naphthyl)dipentyloxysilane, ethyl (naphthyl)diphenyloxysilane, ethyl(naphthyl) ethoxypropoxysilane, and ethyl(naphthyl)dipropoxysilane;

ethyl(benzyl)silane compounds such as ethyl(benzyl)dimethoxysilane, ethyl(benzyl)methoxyethoxysilane, ethyl(benzyl)methoxypropoxysilane, ethyl(benzyl)diethoxysilane, ethyl(benzyl)dipentyloxysilane, ethyl(benzyl)diphenyloxysilane, ethyl(benzyl)ethoxypropoxysilane, and ethyl(benzyl)dipropoxysilane;

ethyl(hydroxybenzyl)silane compounds such as ethyl(hydroxybenzyl)dimethoxysilane, ethyl(hydroxybenzyl) methoxyethoxysilane, ethyl(hydroxybenzyl)methoxypropoxysilane, ethyl(hydroxybenzyl)diethoxysilane, ethyl (hydroxybenzyl)dipentyloxysilane, ethyl(hydroxybenzyl) diphenyloxysilane, ethyl(hydroxybenzyl) ethoxypropoxysilane, and ethyl(hydroxybenzyl) dipropoxysilane;

propylbutylsilane compounds such as propylbutyldimethoxysilane, propylbutylmethoxyethoxysilane, propylbutylmethoxypropoxysilane, propylbutyldiethoxysilane, propylbutyldipentyloxysilane, propylbutyldiphenyloxysilane, propylbutylethoxypropoxysilane, and propylbutyldipropoxysilane;

propyl(phenyl)silane compounds such as propyl(phenyl)dimethoxysilane, propyl(phenyl)methoxyethoxysilane, propyl (phenyl)methoxypropoxysilane, propyl(phenyl)diethoxysilane, propyl(phenyl)dipentyloxysilane, propyl(phenyl) diphenyloxysilane, propyl(phenyl)ethoxypropoxysilane, and propyl(phenyl)dipropoxysilane;

propyl(hydroxyphenyl)silane compounds such as propyl (hydroxyphenyl)dimethoxysilane, propyl(hydroxyphenyl) methoxyethoxysilane, propyl(hydroxyphenyl)methoxypropoxysilane, propyl(hydroxyphenyl)diethoxysilane, propyl(hydroxyphenyl)dipentyloxysilane, propyl(hydroxyphenyl)diphenyloxysilane, propyl(hydroxyphenyl)ethoxypropoxysilane, and propyl(hydroxyphenyl)dipropoxysilane;

propyl(naphthyl)silane compounds such as propyl(naphthyl) dimethoxysilane, propyl(naphthyl)methoxyethoxysilane, propyl(naphthyl)methoxypropoxysilane, propyl(naphthyl) diethoxysilane, propyl(naphthyl)dipentyloxysilane, propyl (naphthyl)diphenyloxysilane, propyl(naphthyl)ethoxypropoxysilane, and propyl(naphthyl)dipropoxysilane;

propyl(benzyl)silane compounds such as propyl(benzyl)dimethoxysilane, propyl(benzyl)methoxyethoxysilane, propyl (benzyl)methoxypropoxysilane, propyl(benzyl)diethoxysilane, propyl(benzyl)dipentyloxysilane, propyl(benzyl) diphenyloxysilane, propyl(benzyl)ethoxypropoxysilane, and propyl(benzyl)dipropoxysilane; and propyl(hydroxybenzyl)silane compounds such as propyl(hydroxybenzyl) dimethoxysilane, propyl(hydroxybenzyl)methoxyethoxysilane, propyl(hydroxybenzyl)methoxypropoxysilane, propyl (hydroxybenzyl)diethoxysilane, propyl(hydroxybenzyl) dipentyloxysilane, propyl(hydroxybenzyl) diphenyloxysilane, propyl(hydroxybenzyl) ethoxypropoxysilane, and propyl(hydroxybenzyl) dipropoxysilane.

By subjecting the above-described silane compounds to hydrolytic condensation according to a conventional procedure, the siloxane resin is obtained. The mass average molecular weight of the siloxane resin is preferably 300 or more and 30,000 or less, more preferably 500 or more and to 10,000 or less. Two or more siloxane resins having different mass average molecular weights may be mixed together. When the mass average molecular weight of the siloxane resin is within the above range, a metal oxide fine particle dispersion liquid having excellent film-forming properties and capable of forming a flat silica-based coating film tends to be obtained.

Examples of a suitable siloxane resin obtained by hydrolytic condensation of the above-described silane compound include a siloxane resin having a structural unit represented by the following formula (C-1-1). In the siloxane resin, the number of carbon atoms per one silicon atom is two or more.

[Chem. 94]

(C-1-a)

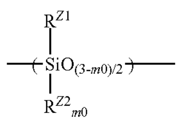

(In the formula (C-1-a), $R^{Z1}$ represents an alkyl group, an aryl group, or an aralkyl group; $R^{Z2}$ represents hydrogen, an alkyl group, an aryl group, or an aralkyl group; and m is 0 or 1.)

The alkyl group, the aryl group, or the aralkyl group in each of $R^{Z1}$ and $R^{Z2}$ is the same as the alkyl group, the aryl group, or the aralkyl group in the above formula (C-a). By using the siloxane resin having an alkyl group, an aryl group, or an aralkyl group described above, a silica-based metal oxide-containing film with excellent durability can be formed, and metal oxide fine particule dispersion liquid that can be easily filled into a very small space tends to be obtained.

The alkyl group is preferably an alkyl group having 1 or more and 5 or less carbon atoms, and examples thereof include a methyl group, an ethyl group, an n-propyl group, an isopropyl group, an n-butyl group, and a tert-butyl group. When an alkyl group having 1 or more and 5 or less carbon atoms is contained, a silica film with excellent heat resistance tends to be formed. Examples of the aryl group and the aralkyl group include a benzyl group, a phenethyl group, a phenyl group, a naphthyl group, an anthracenyl group, a phenanthryl group, a biphenyl group, a fluorenyl group, and a pyrenyl group.

Specific and preferable examples of the aryl group and the aralkyl group include those having the following structure.

[Chem. 95]

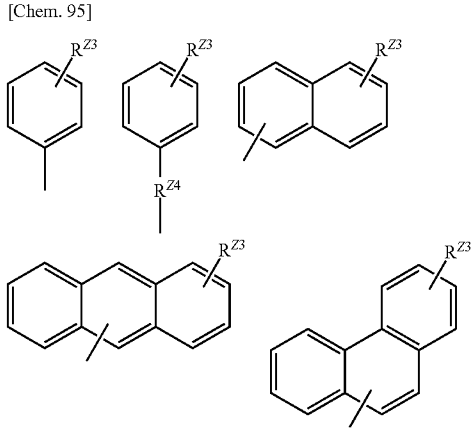

In the above formula, $R^{Z3}$ represents a hydrogen atom; a hydroxy group; an alkoxy group such as a methoxy group, an ethoxy group, a butoxy group, or a propoxy group; or a hydrocarbon group such as a methyl group, an ethyl group, a butyl group, or a propyl group, and $R^{Z4}$ represents an alkylene group such as a methylene group, an ethylene group, a propylene group, or a butylene group. The aromatic hydrocarbon group needs to have $R^{Z3}$ described above on at least one aromatic ring in the aromatic hydrocarbon group, and may have a plurality of $R^{Z3}$s. When a plurality of $R^{Z3}$s are contained, these $R^{Z3}$s may be the same or different from each other.

A group that is particularly preferable as $R^{Z1}$ is preferably a group having the following structure ($R^1$-a) or ($R^1$-b), particularly preferably ($R^1$-b).

[Chem. 96]

($R^1$-a)

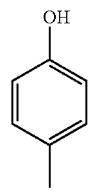

($R^1$-b)

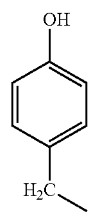

In the formula (C-1-a), m0 is preferably 0. In this case, the siloxane resin has a silsesquioxane skeleton. The siloxane resin is more preferably a ladder-type silsesquioxane.

The structural unit (unit skeleton) represented by the formula (C-1-a) preferably has 2 or more and 15 or less carbon atoms per one silicon atom.

The siloxane resin may have two or more structural units represented by the formula (C-1-a). The siloxane resin may also have a combination of siloxane resins including different structural units. Specific examples of the siloxane resin having two or more structural units represented by the formula (C-1-a) include siloxane resins represented by the following structural formulas (C-1-1) to (C-1-3).

[Chem. 97]

(C-1-1)

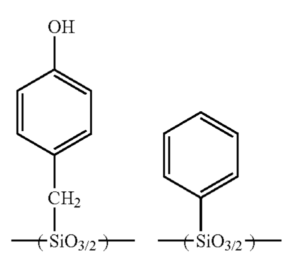

-continued

[Chem. 98]

(C-1-2)

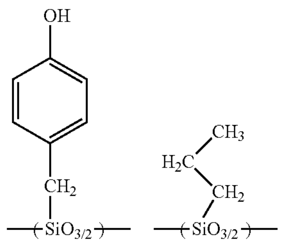

[Chem. 99]

(C-1-3)

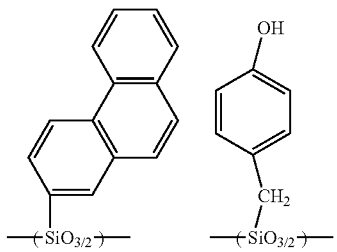

The siloxane resin may have, for example, a constituting unit represented by the following formula (C-1-4).

[Chem. 100]

(C-1-4)

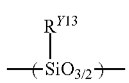

In the formula (C-1-4), $R^{Y13}$ represents an organic group having at least one group selected from the group consisting of a (meth)acrylic group, a vinyl group, and an epoxy group in the structure. The at least one group selected from the group consisting of a (meth)acrylic group, a vinyl group, and an epoxy group may be bonded to an Si atom directly or via a linking group. The linking group may be, for example, a linear or branched alkylene group having 1 or more and 10 or less carbon atoms, a linear or branched arylene group having 1 or more and 10 or less carbon atoms, or a divalent group in which these groups are combined. The linking group may have an ether bond, an amino bond, or an amide bond.

Examples of a constituting unit represented by (C-1-4) include, but are not limited to, the following units.

[Chem. 101]

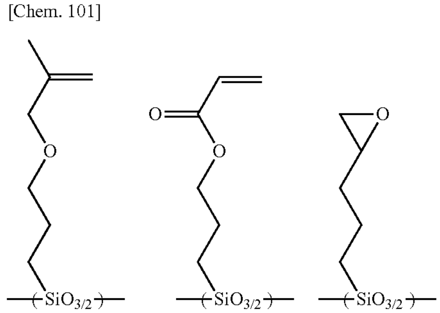

-continued

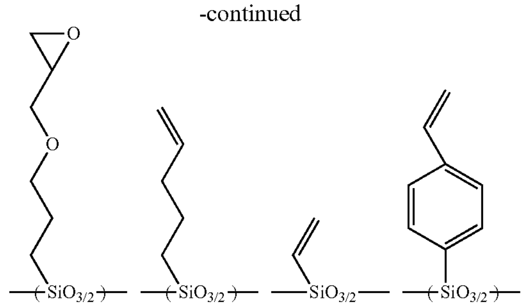

When $R^{Y13}$ has an epoxy group, examples of suitable $R^{Y13}$ include a 2-(3,4-epoxycyclohexyl)ethyl group and a 2-(3,4-epoxycyclohexyl)propyl group.

The siloxane resin may have, for example, a constituting unit represented by the following formula (C-1-5).

[Chem. 102]

(C-1-5)

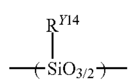

In the formula (C-1-5), $R^{Y14}$ represents an organic group having at least one carboxy group in the structure. The carboxy group is preferably bonded to an Si atom via a linking group, and the linking group is, for example, a linear or branched alkylene group having 1 or more and 10 or less carbon atoms, a cycloalkylene group, an arylene group, or a divalent group in which these groups are combined. The linking group may have an ether bond, an amino bond, an amide bond, or a vinyl bond, and preferably have an amide bond. Examples of $R^{Y14}$ include, but are not limited to, the following ones. In the following formulas, * represents the position where $R^{Y14}$ is bonded to Si in the formula (C-1-5).

[Chem. 103]

$* —(C_{10}H_{20})—COOH$

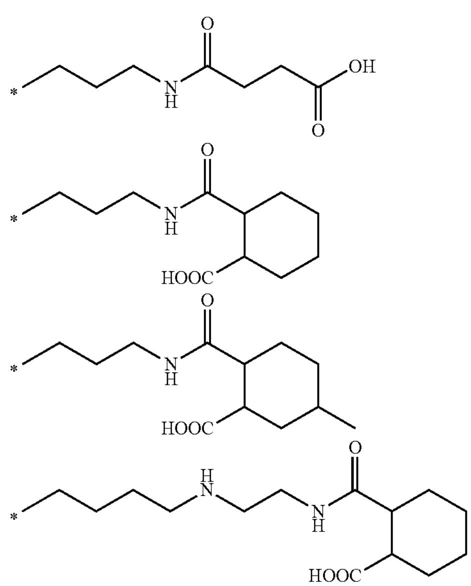

-continued

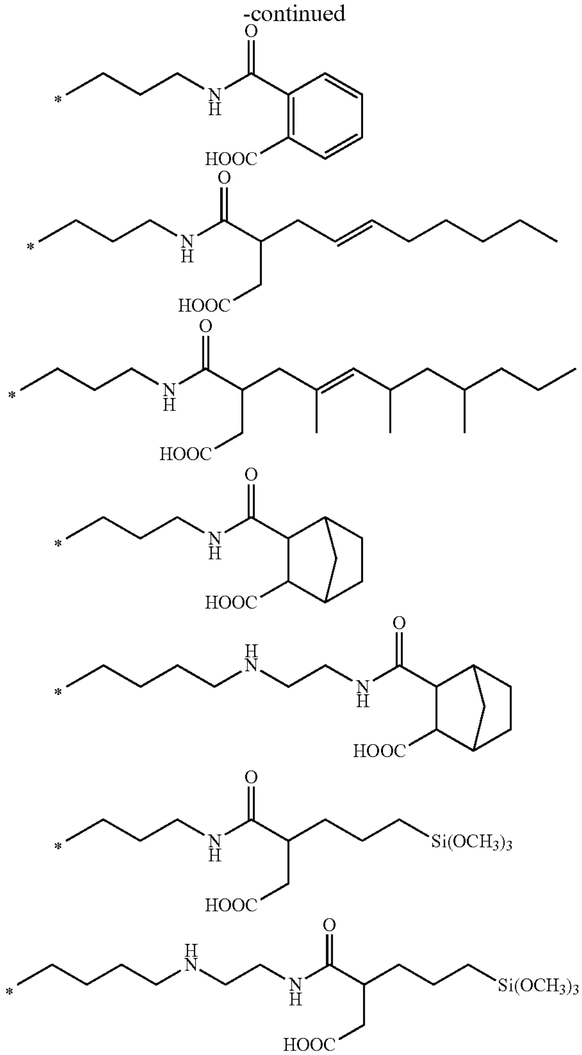

The metal oxide fine particle dispersion liquid including a silicon-containing resin as a base material component (B) may include a curing agent mentioned later. In the metal oxide fine particle dispersion liquid including a curing agent, (i) when the curing agent includes a curing agent that generates a base component by the action of light or heat, (ii) when the metal oxide fine particle dispersion liquid includes a photopolymerization initiator, a base generator, and the like, or described below, or
(iii) when a method for forming a metal oxide-containing film described below includes an exposure step,
the siloxane resin preferably has a constituting unit represented by the formula (C-1-4). Similarly, in a case (iv) in which at least one (but except those corresponding to the curing agent) selected from the group consisting of a photopolymerization initiator, an acid generator, and a base generator described below as other components is contained, the siloxane resin preferably has a constituting unit represented by the formula (C-1-4). The proportion of a constituting unit represented by the formula (C-1-4) in the siloxane resin is, for example, 10% by mol or more and 80% by mol or less. The siloxane resin may further have a structural unit represented by the formula (C-1-a) and/or a constituting unit represented by (C-1-5) as additional constituting units. The siloxane resin may have two or more types of a constituting unit represented by each formula.

When the method for producing a metal oxide-containing film described below includes a development step, the siloxane resin preferably has one or more constituting units selected from the group consisting of a constituting unit represented by the formula (C-1-5), a constituting unit having a structure represented by the formula ($R^1$-a), and a constituting unit having a structure represented by the formula ($R^1$-b). The proportion of the constituting unit selected from the group consisting of a constituting unit represented by the formula (C-1-5), a constituting unit having a structure represented by the formula ($R^1$-a), and a constituting unit having a structure represented by the formula ($R^1$-b) in the siloxane resin is, for example, 20% by mole or more and 90% by mole or less. In this case, the siloxane resin may further have a structural unit represented by the formula (C-1-a) and/or a constituting unit represented by the formula (C-1-4) as additional constituting units, and the siloxane resin is preferably a siloxane resin having a constituting unit represented by the formula (C-1-4) and a constituting unit represented by the formula (C-1-5). The siloxane resin may have two or more types of a constituting unit represented by each formula.

(Polysilane)

The structure of the polysilane is not particularly limited. The polysilane may have any of a linear chain structure, a branched chain structure, a mesh structure, and a cyclic structure, and preferably has a chain structure, namely, a linear chain structure or a branched chain structure. The polysilane may have a silanol group and/or an alkoxy group. Examples of a suitable polysilane include a polysilane essentially having at least one of the units represented by the following formulas (A5) and (A6) and optionally having at least one unit selected from units represented by the following formulas (A7), (A8), and (A9). The polysilane may have a silanol group or an alkoxy group bonded to a silicon atom.

[Chem. 104]

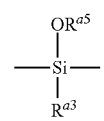

(A5)

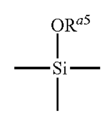

(A6)

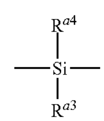

(A7)

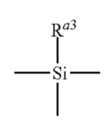

(A8)

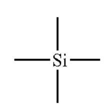

(A9)

(In the formulas (A5), (A7), and (A8), $R^{a3}$ and $R^{a4}$ each represent a hydrogen atom, an organic group, or a silyl group. $R^{a5}$ represents a hydrogen atom or an alkyl group.

When $R^{a5}$ is an alkyl group, the alkyl group is preferably an alkyl group having 1 or more and 4 or less carbon atoms, more preferably a methyl group or an ethyl group.)

Examples of the organic group as $R^{a3}$ and $R^{a4}$ include hydrocarbon groups such as alkyl groups, alkenyl groups, cycloalkyl groups, cycloalkenyl groups, aryl groups, and aralkyl groups, alkoxy groups, alkenyloxy groups, cycloalkoxy groups, cycloalkenyloxy groups, aryloxy groups, and aralkyloxy groups. Among these groups, alkyl groups, aryl groups, and aralkyl groups are preferable. Examples of suitable alkyl groups, aryl groups, and aralkyl groups are the same as the alkyl groups, the aryl groups, and the aralkyl groups as $R^{70}$ in the above formula (C-a).

When each of $R^{a3}$ and $R^{a4}$ is a silyl group, examples of the silyl group include a silyl group and $Si_{1-10}$ silanyl groups (such as $Si_{1-6}$ silanyl groups) such as a disilanyl group and a trisilanyl group. The polysilane preferably has a unit of the following (A10) to (A13).

[Chem. 205]

(A10)

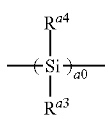

(A11)

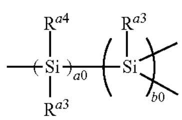

(A12)

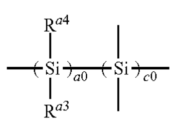

(A13)

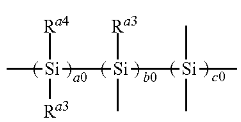

In (A10) to (A13), $R^{a3}$ and $R^{a4}$ are the same as $R^{a3}$ and $R^{a4}$ in the formulas (A5), (A7), and (A8). Each of a0, b0, and c0 is an integer of 2 or more and 1000 or less. Each of a0, b0, and c0 is preferably 10 or more and 500 or less, more preferably 10 or more and 100 or less. The constituting unit in each unit may be present in the unit either in a random manner or as a block.

Among the polysilanes described above, a polysilane in which an alkyl group is bonded to a silicon atom and an aryl group or an aralkyl group is also bonded to a silicon atom or a polysilane in which an alkyl group alone is bonded to a silicon atom is preferable. More specifically, a polysilane in which a methyl group is bonded to a silicon atom and a benzyl group is also bonded to a silicon atom, a polysilane in which a methyl group is bonded to a silicon atom and a phenyl group is also bonded to a silicon atom, or a polysilane in which a methyl group alone is bonded to a silicon atom is preferably used.

The mass average molecular weight of the polysilane is preferably 300 or more and 100000, more preferably 500 or more and 70000, further preferably 800 or more and 30000. Two or more polysilanes having different mass average molecular weights may be mixed together.

The content of the silicon-containing resin in the silicon-containing resin composition as metal oxide fine particle dispersion liquid is not particularly limited and may be determined depending on the desired film thickness. From the viewpoint of film-forming properties, the content of the silicon-containing resin in the silicon-containing resin composition is preferably 1% by mass and 50% by mass or less, more preferably 5% by mass or more and 40% by mass or less, particularly preferably 10% by mass and 35% by mass or less.

(Curing Agent)

The metal oxide fine particle dispersion liquid including the silicon-containing resin composition as the base material component (B) may include a curing agent for a silicon-containing resin. When the silicon-containing resin composition as the metal oxide fine particle dispersion liquid includes the curing agent, it is easy to form a metal oxide-containing film that is not readily subjected to dissolution, swelling, or deformation by the action of an organic solvent such as N-methyl-2-pyrrolidone, and has an excellent organic solvent resistance.

Examples of a suitable curing agent for a silicon-containing resin include Brønsted acids such as hydrochloric acid, sulfuric acid, nitric acid, benzenesulfonic acid, and p-toluenesulfonic acid; imidazoles such as 2-methylimidazole and 2-ethyl-4-methylimidazole; organic amines such as 2,4,6-tris(dimethylaminomethyl)phenol, benzylmethylamine, DBU (1,8-diazabicyclo[5.4.0]-7-undecene), and DCMU (3-(3,4-dichlorophenyl)-1,1-dimethylurea); phosphorus compounds represented by $PX^1_3$ (In the formula, $X^1$ is a halogen atom, a hydroxyl group, or an alkoxy group having 1 or more and 6 or less carbon atoms), such as phosphorus trichloride, phosphorus tribromide, phosphorous acid, trimethyl phosphite, triethyl phosphite, and tripropyl phosphite; phosphorus compounds represented by $PDX^1_3$ (In the formula, $X^1$ is a halogen atom, a hydroxyl group, or an alkoxy group having 1 or more and 6 or less carbon atoms), such as phosphorus oxytrichloride, phosphorus oxytribromide, phosphoric acid, trimethyl phosphate, triethyl phosphate, and tripropyl phosphate; diphosphorus pentaoxide; phosphorus compounds represented by $H(HPO_3)_xOH$ (wherein in the formula, x is an integer of 1 or more), such as polyphosphoric acid and polyphosphate ester; phosphorus compounds represented by $R^{D0}PX^1_2$ (In the formula, $R^{D0}$ is a hydrogen atom or an organic group having 1 or more and 30 or less carbon atoms, a hydrogen atom in the organic group may be substituted with a halogen atom. X' is a halogen atom, a hydroxyl group, or an alkoxy group having 1 or more and 6 or less carbon atoms), such as methyldichlorophosphine, ethyldichlorophosphine, methoxydichlorophosphine; phosphorus compounds represented by $R^{D0}POX^1_2$ (In the formula, $R^{D0}$ is a hydrogen atom or an organic group having 1 or more and 30 or less carbon atoms, a hydrogen atom in the organic group may be substituted with a halogen atom. $X^1$ is a halogen atom, a hydroxyl group, or an alkoxy group having 1 or more and 6 or less carbon atoms), such as dimethyl phosphite, diethyl phosphite, methyl phosphonate, dimethyl methylphosphonate, dichloride methylphosphonate, phenylphosphonic acid, dichloride phenylphosphonate, and diethyl benzylphosphonate; organophosphorus compounds such as tributylphosphine, triphenylphosphine, tris(p-tolyl)phosphine, tris(m-tolyl)phosphine, tris(o-tolyl)phosphine, diphenylcyclohexylphosphine, tricyclohexylphosphine, tris(dimethoxyphenyl)phosphine, ethyltriphenylphosphonium bromide, benzyltriphenylphosphonium chloride, and 1,4-bisdiphenylphosphinobutane; boron compounds represented by $BX^1_3$ (In the formula, $X^1$ is a halogen atom, a hydroxyl group, or an alkoxy group having 1 or more and 6 or less carbon atoms), such as boron trifluoride, boron trichloride, boric acid, trimethyl borate, triethyl borate, tripropyl borate, tributyl borate, triamyl borate, trihexyl borate, tricyclopentyl borate, tricyclohexyl borate, triallyl borate, triphenyl borate, ethyldimethyl borate; boron oxide ($B_2O_3$); boron compounds represented by $R^{D0}BX^1_2$ (In the formula, $R^{D0}$ is a hydrogen atom or an organic group having 1 or more and 30 or less carbon atoms, a hydrogen atom in the organic group may be substituted with a halogen atom. $X^1$ is a halogen atom, a hydroxyl group, or an alkoxy group having 1 or more and 6 or less carbon atoms) such as phenylboronic acid, diisopropoxy(methyl)borane, methylboronic acid, and cyclohexylboronic acid;

organophosphorus compound complexes such as triphenylphosphine triphenylborane, tetraphenylphosphonium tetra-p-tolyl borate, tetraphenylphosphonium tetraphenyl borate, tetraphenylphosphonium thiocyanate, tetraphenylphosphonium dicyanamide, and n-butyltriphenylphosphonium dicyanamide; complexes of a Lewis acid (such as boron trifluoride) and an organic amine (the organic amine is piperidine, for example); and amidines such as azabicycloundecene, diazabicycloundecene toluenesulfonic acid salt, or diazabicycloundecene octylic acid salt.

When the polysilane is used as the base material component (B), it is preferable to use, in addition to the curing agent or alone, a curing agent that generates a base component by the action of light or heat.

Curing Agent that Generates Base Component by Action of Heat

The curing agent that generates a base component by the action of heat is not particularly limited as long as it is a compound conventionally used as a heat-responsive base generator. As the curing agent that generates a base component by the action of heat, 2-benzyl-2-dimethylamino-1-(4-morpholinophenyl)-butan-1-one may be used, for example. 2-benzyl-2-dimethylamino-1-(4-morpholinophenyl)-butan-1-one also generates a base by the action of light.

A compound that generates an imidazole compound represented by the following formula (d1) by the action of heat (hereinafter, this compound is also called a heat-responsive imidazole generator) is also preferably used as the curing agent.

[Chem. 106]

(d1)

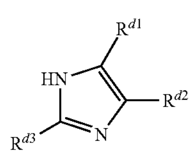

(In the formula (d1), $R^{d1}$, $R^{d2}$, and $R^{d3}$ each independently represent a hydrogen atom, a halogen atom, a hydroxy group, a mercapto group, a sulfide group, a silyl group, a silanol group, a nitro group, a nitroso group, a phosphino group, a sulfonato group, a phosphinyl group, a phosphonato group, or an organic group.)

As the organic group in $R^{d1}$, $R^{d2}$, and $R^{d3}$, an alkyl group, an alkenyl group, a cycloalkyl group, a cycloalkenyl group, an aryl group, an aralkyl group, and the like can be exemplified. The organic group can include a bond other than a hydrocarbon group such as a hetero atom, or a substituent. In addition, the organic group can be either a linear, a branched, or cyclic. The organic group is generally monovalent; however, it can also be an organic group of divalent or more in a case of forming a cyclic structure or the like.

$R^{d1}$ and $R^{d2}$ can be bonded to each other to form a cyclic structure, and can further include a hetero atom bond. As the cyclic structure, a heterocycloalkyl group, a heteroaryl group and the like can be exemplified, and the cyclic structure can also be a fused ring.

A bond included in the organic group of $R^{d1}$, $R^{d2}$, and $R^{d3}$ is not particularly limited as long as the effect of the present invention is not impaired. The organic group can include a bond including a hetero atom such as an oxygen atom, a nitrogen atom, a silicon atom and the like. Specific examples of the bond including a hetero atom include an ether bond, a thioether bond, a carbonyl bond, a thiocarbonyl bond, an ester bond, an amide bond, a urethane bond, an imino bond (—N=C(—$R^{d0}$)—, —C)(=N$R^{d0}$)—: $R^{d0}$ representing a hydrogen atom or an organic group), a carbonate bond, a sulfonyl bond, a sulfinyl bond, an azo bond and the like.

As the bond including a hetero atom which can be included in the organic group of $R^{d1}$, $R^{d2}$, and $R^{d3}$, an ether bond, a thioether bond, a carbonyl bond, a thiocarbonyl bond, an ester bond, an amide bond, a urethane bond, an imino bond (—N=C(—$R^{d0}$)—, —C(=N$R^{d0}$)—: $R^{d0}$ representing a hydrogen atom or a monovalent organic group), a carbonate bond, a sulfonyl bond, and a sulfinyl bond are preferable from the viewpoint of thermal resistance of the imidazole compound.

In a case in which the organic group of $R^{d1}$, $R^{d2}$, and $R^{d3}$ is a substituent other than a hydrocarbon group, $R^{d1}$, $R^{d2}$, and $R^{d3}$ are not particularly limited as long as the effect of the present invention is not impaired. Specific examples of $R^{d1}$, $R^{d2}$, and $R^{d3}$ include a halogen atom, a hydroxyl group, a mercapto group, a sulfide group, a cyano group, an isocyano group, a cyanato group, an isocyanato group, a thiocyanato group, an isothiocyanato group, a silyl group, a silanol group, an alkoxy group, an alkoxycarbonyl group, a carbamoyl group, a thiocarbamoyl group, a nitro group, a nitroso group, a carboxylate group, an acyl group, an acyloxy group, a sulfino group, a sulfonato group, a phosphino group, a phosphinyl group, a phosphonato group, an alkyl ether group, an alkenylether group, an alkylthioether group, an alkenylthioether group, an arylether group, an arylthioether group and the like. The hydrogen atom included in the substituent can be substituted by a hydrocarbon group. The hydrocarbon group included in the abovementioned substituent can be either linear, branched, or cyclic.

As $R^{d1}$, $R^{d2}$, and $R^{d3}$, a hydrogen atom, an alkyl group having 1 or more and 12 or less carbon atoms, an aryl group having 6 or more and 12 or less carbon atoms, an alkoxy group having 1 or more and 12 or less carbon atoms, and a halogen atom are preferable, and a hydrogen atom is more preferable.

The heat-responsive imidazole generator is not particularly limited, as long as an imidazole compound represented by the formula (d1) is generated by the action of heat. Compounds which are used as a heat-responsive imidazole generator are obtained by replacing the skeleton originating from amines which are generated upon heating from the compounds (heat-responsive base generator) which are conventionally contained in various compositions and generate amines by the action of heat, with the skeleton originating from the imidazole compounds represented by the formula (d1).

Examples of the preferred heat-responsive imidazole generator include the compounds represented by the following formula (d2):

[Chem. 107]

(d2)

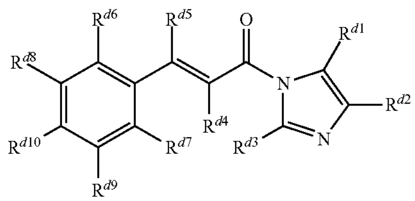

(In the formula (d2), $R^{d1}$, $R^{d2}$, and $R^{d3}$ each independently represent a hydrogen atom, a halogen atom, a hydroxy group, a mercapto group, a sulfide group, a silyl group, a silanol group, a nitro group, a nitroso group, a sulfonato group, a phosphino group, a phosphinyl group, a phosphonato group, or an organic group. $R^{d4}$ and $R^{d5}$ each independently represent a hydrogen atom, a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, or an organic group. $R^{d6}$, $R^{d7}$, $R^{d8}$, $R^{d9}$, and $R^{d10}$ each independently represent a hydrogen atom, a halogen atom, a hydroxy group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group. Two or more of $R^{d6}$, $R^{d7}$, $R^{d8}$, $R^{d9}$, and $R^{d10}$ may be bonded together to form a cyclic structure, or may include a bond of a hetero atom).

In the formula (d2), $R^{d1}$, $R^{d2}$, and $R^{d3}$ are the same as those explained regarding the formula (d1).

In the formula (d2), $R^{d4}$ and $R^{d5}$ each represent independently a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group or an organic group.

As the organic group in $R^{d4}$ and $R^{d5}$, those listed for $R^{d1}$, $R^{d2}$, and $R^{d3}$ can be exemplified. The organic group can include a hetero atom, as in the case of $R^{d1}$, $R^{d2}$, and $R^{d3}$. The organic group can be either linear, branched, or cyclic.

Among the above, $R^{d4}$ and $R^{d5}$ are preferably, respectively independently a hydrogen atom, an alkyl group having 1 or more and 10 or less carbon atoms, a cycloalkyl group having 4 or more and 13 or less carbon atoms, a cycloalkenyl group having 4 or more and 13 or less carbon atoms, an aryloxy alkyl group having 7 or more and 16 or less carbon atoms, an aralkyl group having 7 or more and 20 or less carbon atoms, an alkyl group having 2 or more and 11 or less carbon atoms having a cyano group, an alkyl group having 1 or more and 10 or less carbon atoms having a hydroxyl group, an alkoxy group having 1 or more and 10 or less carbon atoms, an amido group having 2 or more and 11 or less carbon atoms, an alkylthio group having 1 or more and 10 or less carbon atoms, an acyl group having 1 or more and 10 or less carbon atoms, an ester group (—$COOR^d$, —$OCOR^d$: $R^d$ representing a hydrocarbon group) having 2 or more and 11 or less carbon atoms, an aryl group having 6 or more and 20 or less carbon atoms, an aryl group having 6 or more and 20 or less carbon atoms in which an electron donating group and/or an electron withdrawing group are substituted, a benzyl group in which an electron-donating group and/or an electron withdrawing group are substituted, a cyano group, and a methylthio group. More preferably, $R^{d4}$ and $R^{d5}$ are both hydrogen atoms; or $R^{d4}$ is a methyl group and $R^{d5}$ is a hydrogen atom.

In the formula (d2), $R^{d6}$, $R^{d7}$, $R^{d8}$, $R^{d9}$, and $R^{d10}$ each independently represent a hydrogen atom, a halogen atom, a hydroxyl group, a mercapto group, a sulfide group, a silyl group, a silanol group, a nitro group, a nitroso group, a sulfino group, a sulfo group, a sulfonato group, a phosphino group, a phosphinyl group, a phosphono group, a phosphonato group, an amino group, an ammonio group, or an organic group.

As the organic group in $R^{d6}$, $R^{d7}$, $R^{d8}$, $R^{d9}$, and $R^{d10}$, those listed for $R^{d1}$, $R^{d2}$, and $R^{d3}$ can be exemplified. As in the case of $R^{b1}$ and $R^{b2}$, the organic group can include a bond other than a hydrocarbon group such as a hetero atom, or a substituent. The organic group can be either linear, branched, or cyclic.

At least two of $R^{d6}$, $R^{d7}$, $R^{d8}$, $R^{d9}$, and $R^{d10}$ can bind to form a cyclic structure, and these can further include a bond of hetero atoms. As the cyclic structure, a heterocycloalkyl group, a heteroaryl group and the like can be exemplified, and the cyclic structure can also be a fused ring. For example, $R^{d6}$, $R^{d7}$, $R^{d8}$, $R^{d9}$, and $R^{d10}$ can form a fused ring such as naphthalene, anthracene, phenanthrene, indene and the like, through bonding of at least two of these and sharing of an atom of a benzene ring to which $R^{d6}$, $R^{d7}$, $R^{d8}$, $R^{d9}$, and $R^{d10}$ are bound.

Among the above, $R^{d6}$, $R^{d7}$, $R^{d8}$, $R^{d9}$, and $R^{d10}$ are each preferably independently a hydrogen atom, an alkyl group having 1 or more and 10 or less carbon atoms, a cycloalkyl group having 4 or more and 13 or less carbon atoms, a cycloalkenyl group having 4 or more and 13 or less carbon atoms, an aryloxy alkyl group having 7 or more and 16 or less carbon atoms, an aralkyl group having 7 or more and 20 or less carbon atoms, an alkyl group having 2 or more and 11 or less carbon atoms substituted with a cyano group, an alkyl group having 1 or more and 10 or less carbon atoms substituted with a hydroxyl group, an alkoxy group having 1 or more and 10 or less carbon atoms, an amido group having 2 or more and 11 or less carbon atoms, an alkylthio group having 1 or more and 10 or less carbon atoms, an acyl group having 1 or more and 10 or less carbon atoms, an ester group having 2 or more and 11 or less carbon atoms, an aryl group having 6 or more and 20 or less carbon atoms, an aryl group having 6 or more and 20 or less carbon atoms in which an electron donating group and/or an electron withdrawing group are substituted, a benzyl group in which an electron-donating group and/or an electron withdrawing group are substituted, a cyano group, a methylthio group and a nitro group.

A case where two or more of $R^{d6}$, $R^{d7}$, $R^{d8}$, $R^{d9}$, and $R^{d10}$ are bonded together to form a fused ring such as naphthalene, anthracene, phenanthrene and indene by sharing the atoms of the benzene ring to which $R^{d6}$, $R^{d7}$, $R^{d8}$, $R^{d9}$, and $R^{d10}$ are attached is preferred.

Among the compounds represented by the formula (d2), compounds represented by the following formula (d3);

[Chem. 108]

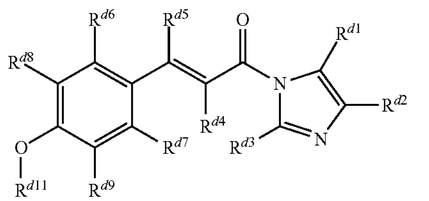

(d3)

(In the formula (d3), $R^{d1}$, $R^{d2}$, and $R^{d3}$ are used synonymously with those in the formulae (d1) and (d2). $R^{d4}$ to $R^{d9}$ are used synonymously with those in the formula (d2). $R^{d11}$ represents a hydrogen atom or an organic group. $R^{d6}$ and $R^{d7}$ shall not be a hydroxyl group. Two or more of $R^{d6}$, $R^{d7}$, $R^{d8}$, $R^{d9}$, and $R^{d10}$ may be bonded together to form a cyclic structure, or may include a bond of a hetero atom).

The compounds represented by the formula (d3) have good solubility in organic solvents because they have a substituent —O—$R^{b11}$.

In the formula (d3), $R^{d11}$ is a hydrogen atom or an organic group. In a case where $R^{d11}$ is an organic group, those exemplified with regard to $R^{d1}$, $R^{d2}$, and $R^{d3}$ may be referred to as the organic group. This organic group may include a hetero atom in the organic group. This organic group may be either linear, branched, or cyclic. For $R^{d11}$, a hydrogen atom or an alkyl or alkoxyalkyl group having 1 or more and 12 or less carbon atoms is preferred, and a methyl group, an ethyl group, an n-propyl group, an isopropyl group, an n-butyl group, an isobutyl group, a tert-butyl group, a methoxymethyl group, an ethoxymethyl group, a methoxyethyl group, an ethoxyethyl group, a propoxymethyl group, or a butoxymethyl group is more preferred.

Specific examples of the compounds particularly suitable for the heat-responsive imidazole generator are shown below.

[Chem. 109]

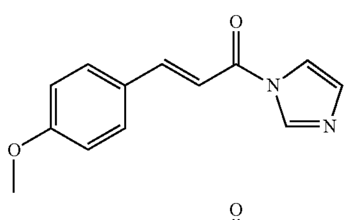

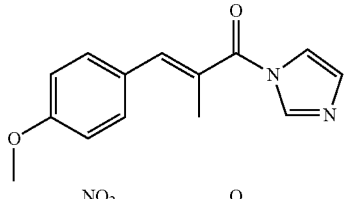

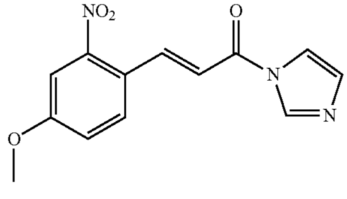

-continued

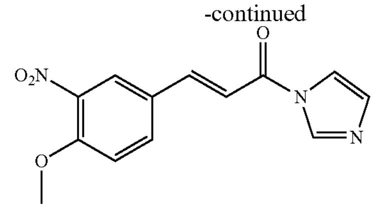

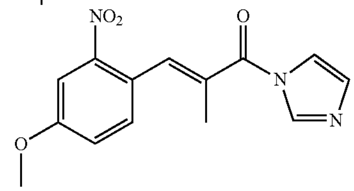

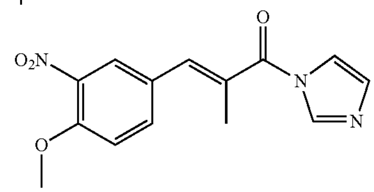

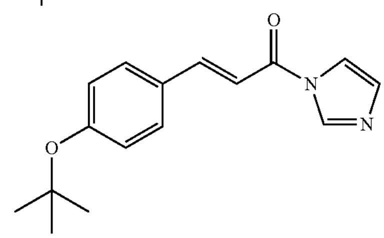

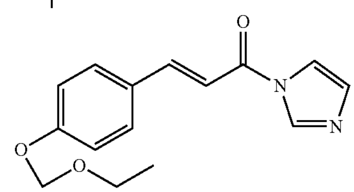

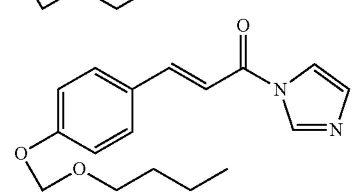

Note here that compound represented by the formula (d2) or (d3) may degrade by the action of light in addition to the action of heat, and may generate an imidazole compound.

Oxime Ester Compound

An oxime ester compound degrades by the action of light and generates a base. Suitable examples of the oxime ester compound are the same as the suitable examples of the oxime ester compound described for the energy-sensitive composition of the first aspect.

The silicon-containing resin composition may include two or more curing agents of different classifications or types. The content of the curing agent in the silicon-containing resin composition is typically preferably 0.01% by mass or more and 40% by mass or less, more preferably 0.1% by mass or more and 20% by mass or less, and particularly preferably 1% by mass or more and 10% by mass or less with respect to the mass of the solid content of the silicon-containing resin composition.

(Ionic Liquid)

The silicon-containing resin composition may include an ionic liquid. When the silicon-containing resin composition includes an ionic liquid, the dispersion stability of the metal oxide (A) in the silicon-containing resin composition can be further enhanced. As the ionic liquid, ionic liquids described for the energy-sensitive composition of the sixth aspect can be suitably used. The ionic liquid may be used alone or as mixture of two or more thereof. The content of the ionic liquid is not particularly limited as long as the effect of the present invention can be achieved. The content of the ionic liquid in the silicon-containing resin composition is preferably 10 parts by mass or more and 500 parts by mass or less, more preferably 90 parts by mass or more and 400 parts by mass or less, and further preferably 100 parts by mass or more and 300 parts by mass or less with respect to 100 parts by mass of the metal oxide (A).

(Solvent)

The silicon-containing resin composition usually includes a solvent. It is preferable that the solvent includes a solvent (S1) as a compound having a cyclic skeleton, and a hetero atom other than a hydrogen atom and a carbon atom. In other words, the solvent (S1) is a nonhydrocarbon solvent. Examples of the hetero atom which may be included in the solvent (S1) may include N, O, S, P, and the like.

When the solvent includes a solvent (S1), the dispersion stability of the metal oxide (A) can be further improved. It is presumed that the cyclic skeleton of the solvent (S1) has the effect of inhibiting aggregation with respect to the metal oxide (A).

As the cyclic skeleton of the solvent (S1), an alicyclic skeleton is preferable. Herein, a cyclic skeleton which does not exhibit aromatic property is used as an alicyclic skeleton. Furthermore, when the solvent (S1) has both an aromatic ring skeleton and an alicyclic skeleton, like a tetralin ring, the solvent (S1) has an alicyclic skeleton. Although the reason is not clear, it is presumed that the alicyclic skeleton is somewhat bulky compared with the aromatic ring skeleton having a planar three-dimensional structure, and this contributes favorably to the dispersion stabilization of the metal oxide (A).

The solvent (S1) preferably includes at least one bond selected from the group consisting of an ester bond (—CO—O—), an amide bond (—CO—NH—), a carbonate bond (—O—CO—O—), an ureido bond (—NH—CO—NH—), and a urethane bond (—O—CO—NH—). In this specification, simply referred to as an ester bond and an amide bond means "carboxylic ester bond" and "carboxylic amide bond", respectively. In the amide bond, the ureido bond, and the urethane bond, an organic group may be bonded to a nitrogen atom. Type of the organic group is not particularly limited. The organic group is preferably an alkyl group, more preferably an alkyl group having 1 or more and 6 or less carbon atoms, and further preferably a methyl group and an ethyl group. When the solvent (S1) includes these bonds, a silicon-containing resin can be easily dissolved well in a silicon-containing resin composition.

Preferable examples of the solvents (S1) include aromatic solvents such as anisole, phenetol, propyl phenyl ether, butyl phenyl ether, cresyl methyl ether, ethyl benzyl ether, diphenyl ether, dibenzyl ether, acetophenone, propiophenone, benzophenone, pyridine, pyrimidine, pyrazine, and pyridazine; alicyclic alcohols such as cyclopentanol, cyclohexanol, 1,4-cyclohexanediol, 1,3-cyclohexanediol, 1,4-cyclohexanedimethanol, and 1,3-cyclohexanedimethanol; alicyclic ethers such as cyclohexyl methyl ether, cyclohexyl ethyl ether, tetrahydrofuran, tetrahydropyran, and dioxane; alicyclic ketones such as cyclopentanone, cyclohexanone, cycloheptanone, 2-methylcyclohexanone, 1,4-cyclopentanedione, and 1,3-cyclopentanedione; lactones such as β-propiolactone, γ-butyrolactone, β-methyl-γ-butyrolactone, 5-valerolactone, ε-valerolactone, ε-caprolactone, α-methyl-s-caprolactone, and ε-methyl-ε-caprolactone; cyclic amides or cyclic ureas such as N-methyl-2-pyrrolidone, N-ethyl-2-pyrrolidone, 1,3-dimethyl-2-imidazolidinone, and N,N-dimethylpropyleneurea; and cyclic carbonates such as ethylene carbonate and propylene carbonate, and the like.

Furthermore, the solvent (S1) is preferably cycloalkyl ester of carboxylic acid. As the cycloalkyl ester of carboxylic acid, cycloalkyl ester of carboxylic acid represented by the following formula (s1) is preferable:

[Chem. 110]

(s1)

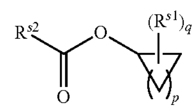

(In the formula (s1), $R^{s1}$ is an alkyl group having 1 or more and 3 or less carbon atoms, $R^{s2}$ is an alkyl group having 1 or more and 6 or less carbon atoms, p is an integer of 1 or more and 6 or less, and q is an integer of 0 or more and (p+1) or less.)

In the formula (s1), examples of $R^{s1}$ include a methyl group, an ethyl group, an n-propyl group, an isopropyl group, and a methyl group is preferable. In the formula (s1), examples of $R^{s2}$ include a methyl group, an ethyl group, an n-propyl group, an isopropyl group, an n-butyl group, an isobutyl group, a sec-butyl group, a tert-butyl group, an n-pentyl group, and an n-hexyl group. The alkyl group as $R^{s2}$ is preferably a methyl group, an ethyl group, an n-propyl group, an isopropyl group, and an n-butyl group, and more preferably a methyl group, and an ethyl group.

Suitable examples of carboxylic acid cycloalkyl esters represented by the formula (s1) include cyclopropyl acetate, cyclobutyl acetate, cyclopentyl acetate, cyclohexyl acetate, cycloheptyl acetate, cyclooctyl acetate, cyclopropyl propionate, cyclobutyl propionate, cyclopentyl propionate, cyclohexyl propionate, cycloheptyl propionate, and cyclooctyl propionate. Among these, from the viewpoint of easiness in availability and having a favorable boiling point, cyclopentyl acetate, and cyclohexyl acetate are preferable.

Among the above-described solvents (S1), carboxylic acid cycloalkyl ester represented by the formula (s1) is preferable, and cyclopentyl acetate, and cyclohexyl acetate are particularly preferable.

Suitable examples other than solvents (S1) include alcohols such as methanol, ethanol, propanol, and n-butanol; polyhydric alcohols such as ethylene glycol, diethylene glycol, propylene glycol, and dipropylene glycol; ketones such as acetone, methyl ethyl ketone, methyl-n-amyl ketone, methyl isoamyl ketone, and 2-heptanone; compound having an ester bond, such as ethylene glycol monoacetate, diethylene glycol monoacetate, propylene glycol monoacetate, or dipropylene glycol monoacetate; ether derivatives such as monomethyl ethers, monoethyl ethers, monopropyl ethers, monobutyl ethers, or monophenyl ethers of the polyhydric alcohols or compounds having the ester bond; esters such as methyl lactate, ethyl lactate, methyl acetate, ethyl acetate, butyl acetate, methyl pyruvate, ethyl pyruvate, methyl methoxypropionate, and ethyl ethoxypropionate; aromatic organic solvents such as ethylbenzene, diethylbenzene, amylbenzene, isopropylbenzene, toluene, xylene, cymene, and mesitylene; nitrogen-Containing organic solvent such as N,N,N',N'-tetramethylurea, N,N,2-trimethylpropionamide, N,N-dimethylacetamide, N,N-dimethylformamide, N,N-diethylacetamide, N,N-diethylformamide, and N-ethylpyrrolidone. Two or more of these solvents may be used in combination.

Preferable examples of solvents other than the solvent (S1) include propylene glycol monomethyl ether acetate (PGMEA), propylene glycol monomethyl ether (PGME), N,N,N',N'-tetramethylurea, and butanol.

When the solvent includes the solvent (S1), the content of the solvent (S1) in the solvent is preferably 30% by mass or more, more preferably 45% by mass or more and 99.99% by mass or less, and further preferably 50% by mass or more and 99% by mass or less.

When the silicon-containing resin composition includes polysilane as the base material component (B), from the viewpoint that crack of the metal oxide-containing film is suppressed, the water content of the silicon-containing resin composition is preferably 1.0% by mass or less, more preferably 0.5% by mass or less, further preferably 0.3% by mass or less, and particularly preferably less than 0.3% by mass. Note here that the water content of the silicon-containing resin composition can be measured by the Karl Fischer measurement method. Water of the silicon-containing resin composition is often derived from the solvent. Therefore, it is preferable that the solvent is dehydrated so that the amount of water in the silicon-containing resin composition becomes the above-mentioned amount.

The use amount of the solvent is not particularly limited as long as it does not impair the object of the present invention. In view of film formation, the solvent is used such that the solid content of the silicon-containing resin composition is preferably 1% by mass or more and 50% by mass or less, more preferably 10% by mass or more and 40% by mass or less.

(Other Components)

The silicon-containing resin composition may include various additives which have conventionally been used as silicon-containing resin compositions for formation of silica films, within a range where the objects of the present invention are not impaired. Examples of such additives include base generators, catalysts, sensitizers, silane coupling agents, adhesion enhancers, dispersants, surfactants, ultraviolet absorbers, antioxidants, anti-foaming agent, viscosity modifiers, resins, rubber particles, coloring agents, and the like. Note here that when the silicon-containing resin composition includes an alkali-soluble resin as a resin, the silicon-containing resin composition is provided with alkali developability. Furthermore, when the silicon-containing resin composition includes rubber particles, the formed metal oxide-containing film is provided with elasticity, and friability of the metal oxide-containing film is easily eliminated.

It is preferable that the silicon-containing resin composition includes a nitroxy compound which is a compound capable of being present stably as a nitroxide radical. It is preferable that the silicon-containing resin composition includes a nitroxy compound, because the amount of a residue remaining in the metal oxide-containing film (that is, silica-derived impurity generated by baking) can be reduced even when the baking temperature in formation of the silica-based metal oxide-containing film is low, for example, at 250° C. or less (for example, within the range of 200° C. or more and 250° C. or less). In a case where the amount of a residue remaining in the metal oxide-containing film is low, the generation of gas derived from the residue itself of the metal oxide-containing film or from a degradation product of the residue in the film is reduced even when the metal oxide-containing film is in a high-temperature atmosphere or in a reduced-pressure atmosphere.

Specific examples of a suitable, preferable (C) nitroxy compound include di-tert-butyl nitroxide, di-1,1-dimethylpropyl nitroxide, di-1,2-dimethylpropyl nitroxide, di-2,2-dimethylpropyl nitroxide, and compounds of the following formula. In the following formulas, Rills each independently represent an optionally substituted alkyl group having 1 or more and 20 or less carbon atoms, an optionally substituted aromatic group, or an optionally substituted alicyclic group.

[Chem. 111]

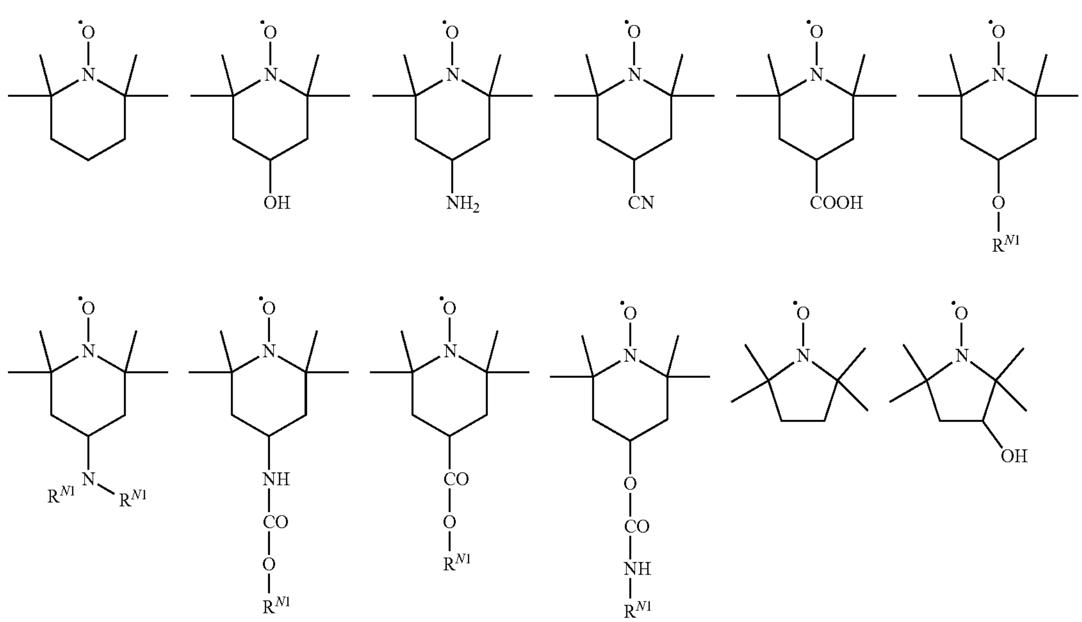

-continued
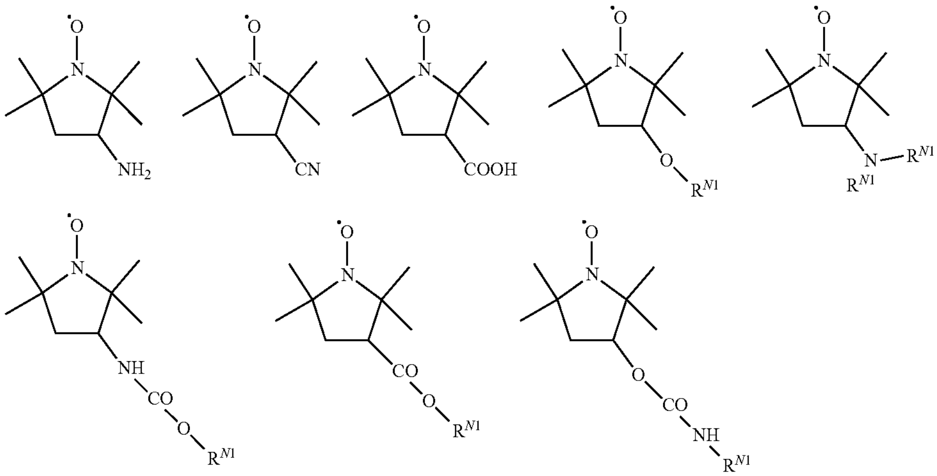
[Chem. 112]
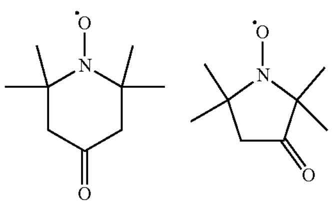
[Chem. 113]
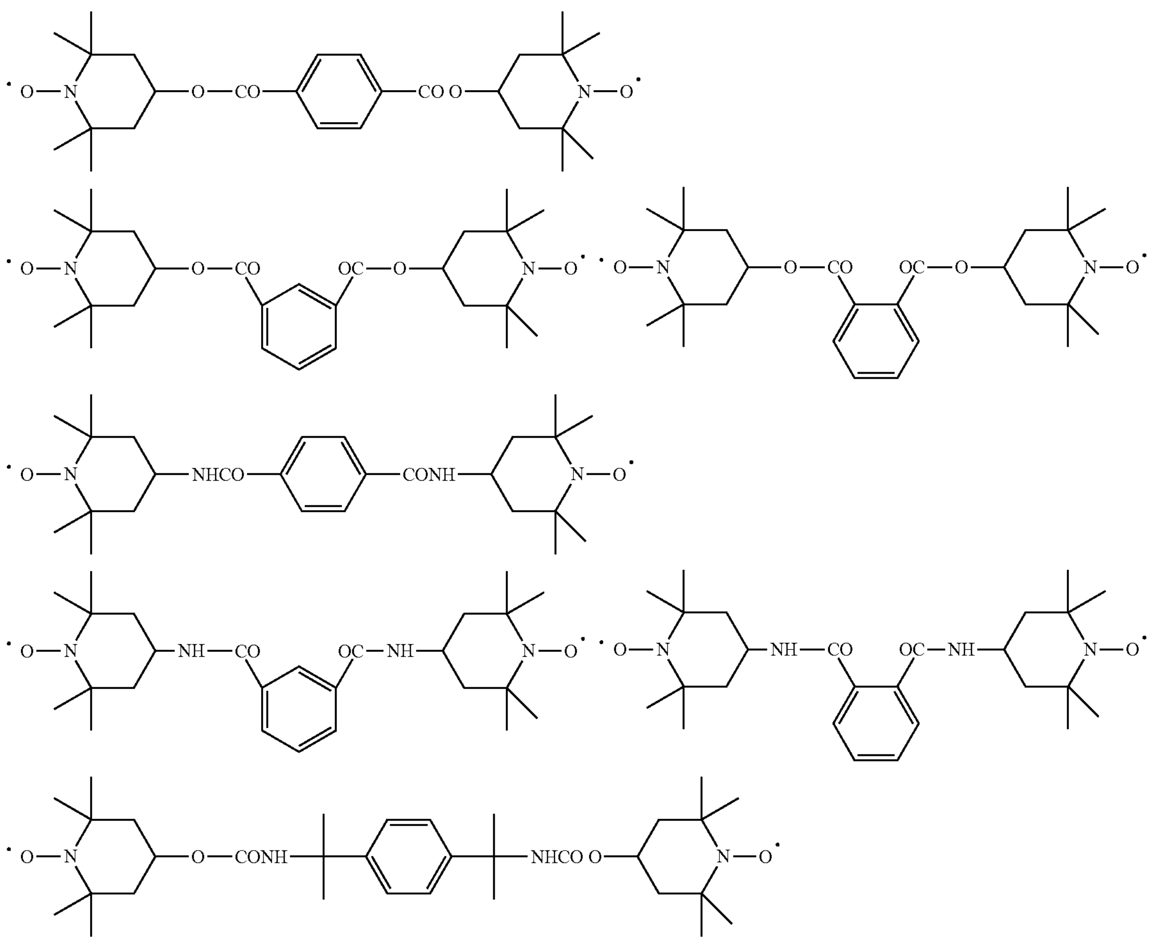

-continued

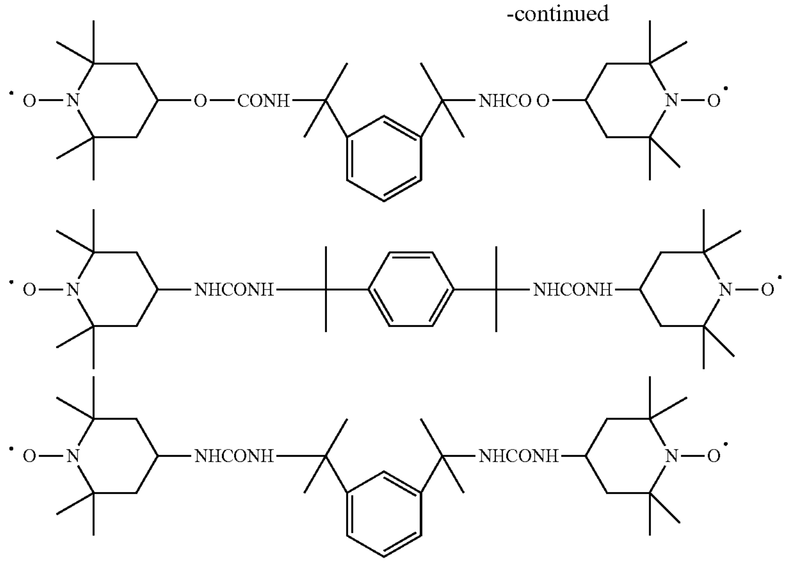

In particular, for easily reducing residue even at a lower baking temperature, examples of further preferable compounds as the nitroxy compound include 2,2,6,6-tetramethylpiperidine 1-oxyl free radical, 4-hydroxy-2,2,6,6-tetramethylpiperidine 1-oxyl free radical, 4-amino-2,2,6,6-tetramethylpiperidine 1-oxyl free radical, 4-carboxy-2,2,6,6-tetramethylpiperidine 1-oxyl free radical, 4-cyano-2,2,6,6-tetramethylpiperidine 1-oxyl free radical, 4-(methacrylic acid)-2,2,6,6-tetramethylpiperidine 1-oxyl free radical, 4-(acrylic acid)-2,2,6,6-tetramethylpiperidine 1-oxyl free radical, 4-oxo-2,2,6,6-tetramethylpiperidine 1-oxyl free radical, 3-carboxy-2,2,5,5-tetramethylpyrrolidine 1-oxyl free radical, 4-acetamide-2,2,6,6-tetramethylpiperidine 1-oxyl free radical, 4-(2-chloroacetamide)-2,2,6,6-tetramethylpiperidine 1-oxyl free radical, 4-hydroxy-2,2,6,6-tetramethylpiperidine 1-oxylbenzoate free radical, 4-isothiocyanato-2,2,6,6-tetramethylpiperidine 1-oxyl free radical, 4-(2-iodoacetamide)-2,2,6,6-tetramethylpiperidine 1-oxyl free radical, and 4-methoxy-2,2,6,6-tetramethylpiperidine 1-oxyl free radical. The nitroxy compound may be used alone or as a combination of two or more of these.

The content of the nitroxy compound in the silicon-containing resin composition may be very small. For easily reducing residue at a lower baking temperature, the content of the nitroxy compound in the silicon-containing resin composition is preferably 0.005% by mass or more, more preferably 0.009% by mass or more relative to the total mass of all the components of the silicon-containing resin composition except for the solvent. The content of the nitroxy compound in the silicon-containing resin composition is preferably 2% by mass or less, more preferably 1% by mass or less relative to the total mass of all the components of the silicon-containing resin composition except for the solvent.

The silicon-containing resin composition preferably includes an antioxidant. When the silicon-containing resin composition includes an antioxidant, it is possible to easily suppress deterioration of various effects obtained depending on types of the metal oxide (A) of the metal oxide-containing film. It is preferable that the antioxidant includes at least one antioxidants selected from the group consisting of phosphorus antioxidant, sulfur antioxidant, and phenol antioxidant.

Types of the phosphorus antioxidant are not particularly limited, and specific examples thereof include 3,9-bis(2,6-di-tert-butyl-4-methyl phenoxy)-2,4,8,10-tetraoxa-3,9-diphosphaspiro[5.5]undecane, diisodecylpentaerythritol diphosphite, bis(2,4-di-tert-butylphenyl)pentaerythritol diphosphite, 2,2'-methylenebis(4,6-di-tert-butyl-1-phenyloxy)(2-ethylhexyloxy)phosphorus, 6-[3-(3-tert-butyl-4-hydroxy-5-methylphenyl)propoxy]-2,4,8,10-tetra-tert-butyldibenz[d,f][1,3,2]dioxaphosphepin, triphenyl phosphite, triphenyl isodecyl phosphite, phenyl isodecyl phosphite, 4,4'-butylidene-bis(3-methyl-6-tert-butylphenyl ditridecyl)phosphite, octadecyl phosphite, tris(nonylphenyl) phosphite, 9,10-dihydro-9-oxa-10-phosphaphenanthrene-10-oxide, 10-(3,5-di-tert-butyl-4-hydroxybenzyl)-9,10-dihydro-9-oxa-10-phosphaphenanthrene-10-oxide, 10-decyloxy-9,10-dihydro-9-oxa-10-phosphaphenanthrene-10-oxide, tris(2,4-di-tert-butylphenyl)phosphite, cyclic neopentane tetrayl bis(2,4-di-tert-butylphenyl)phosphite, cyclic neopentane tetrayl bis(2,6-di-tert-butylphenyl)phosphite, 2,2-methylenebis(4,6-di-tert-butylphenyl)octyl phosphite, tris(2,4-di-tert-butylphenyl)phosphite, tetrakis(2,4-di-tert-butylphenyl)[1,1-biphenyl]-4,4'-diylbisphosphonite, bis[2,4-bis(1,1-dimethylethyl)-6-methylphenyl]ethyl ester, phosphonic acid, and the like.

Among the phosphorus antioxidants, in view of heat resistance and heat-resistant discoloring resistance of the metal oxide-containing film, 2,2'-methylenebis(4,6-di-tert-butyl-1-phenyloxy)(2-ethylhexyloxy)phosphorus, 3,9-bis(2,6-di-tert-butyl-4-methylphenoxy)-2,4,8,10-tetraoxa-3,9-diphosphospiro[5.5]undecane, and 6-[3-(3-tert-butyl-4-hydroxy-5-methylphenyl)propoxy]-2,4,8,10-tetra-tert-butyldibenz[d,f][1,3,2]dioxaphosphepin, and the like, are preferable.

Examples of commercially available phosphorus antioxidant may include Irgafos 168 (manufactured by BASF Corporation), Sumilizer GP (manufactured by SUMITOMO CHEMICAL COMPANY, LIMITED), and the like.

Types of the sulfur antioxidant are not particularly limited, and specific examples thereof include 2,2-bis({[3-(dodecylthio)propionyl]oxy}methyl)-1,3-propanediyl-bis[3-(dodecylthio)propionate], 2-mercaptobenzimidazole, dilauryl-3,3'-thiodipropionate, dimyristyl-3,3'-thiodipropionate, distearyl-3,3'-thiodipropionate, pentaerythricyl-tetrakis 3-laurylthiopropionate), 2-mercaptobenzimidazole, and the like.

Among the sulfur antioxidants, in view of heat resistance and heat-resistant discoloring resistance of the metal oxide-containing film, 2,2-bis({3-(dodecylthio)propionyl}oxy) methyl)1,3-propanediyl-bis[3-(dodecylthio)propionate], 2-mercaptobenzimidazole, and the like, are preferable.

Examples of commercially available sulfur antioxidant may include Irganox 1035 (manufactured by BASF Corporation), and the like.

Types of the phenol antioxidant are not particularly limited, and specific examples thereof include 3,9-bis[2-[3-(3-tert-butyl-4-hydroxy-5-methylphenyl)propionyloxy]-1,1-dimethylethoxy]-2,4,8,10-tetraoxaspiro[5.5]undecane, pentaerythricyl-tetrakis[3-(3,5-di-tert-butyl-4-hydroxyphenyl)propionate], 1,3,5-trimethyl-2,4,6-tris(3',5'-di-tert-butyl-4-hydroxybenzyl)benzene, triethylene glycol-bis[3-(3-tert-butyl-5-methyl-4-hydroxyphenyl)propionate], 4,4'-thiobis(6-tert-butyl-3-methylphenol), tris(3,5-di-tert-butyl-4-hydroxybenzyl)-isocyanurate, 1,3,5-tris(4-tert-butyl-3-hydroxy-2,6-dimethyl benzyl)-isocyanurate, 1,6-hexanediol-bis[3-(3,5-di-tert-butyl-4-hydroxy phenyl) propionate], 2,2-thio-diethylenebis[3-(3,5-di-tert-butyl-4-hydroxyphenyl)propionate], N,N'-hexamethylenebis(3,5-di-tert-butyl-4-hydroxy-hydrocinnamamide), 1,3,5-trimethyl-2,4,6-tris(3,5-di-tert-butyl-4-hydroxybenzyl)benzene, 2,4-bis[(octylthio)methyl]-O-cresol, 1,6-hexanediol-bis-[3-(3,5-di-tert-butyl-4-hydroxyphenyl)propionate], octadecyl-[3-(3,5-di-tert-butyl-4-hydroxyphenyl)propionate, 2,2'-methylenebis(4-methyl-6-tert-butylphenol), 4,4'-butylidene-bis(3-methyl-6-tert-butylphenol), 1,1,3-tris(2-methyl-4-hydroxy-5-tert-butylphenyl)butane, 1,3,5-tris(4-hydroxybenzyl)benzene, tetrakis[methylene-3-(3,5'-di-tert-butyl-4'-hydroxyphenylpropionate)]methane, and the like.

Among the phenol antioxidants, in view of heat resistance and heat-resistant discoloring resistance of the metal oxide-containing film, 3,9-bis[2-(3-(3-tert-butyl-4-hydroxy-5-methylphenyl)propionyloxy)-1,1-dimethylethoxy]-2,4,8,10-tetraoxaspiro[5.5]undecane, 1,3,5-trimethyl-2,4,6-tris(3',5'-di-tert-butyl-4-hydroxybenzyl)benzene, pentaerythricyl-tetrakis[3-(3,5-di-tert-butyl-4-hydroxyphenyl)propionate], triethylene glycol-bis[3-(3-tert-butyl-5-methyl-4-hydroxyphenyl)propionate], 4,4'-thiobis(6-tert-butyl-3-methylphenol), tris(3,5-di-tert-butyl-4-hydroxybenzyl)-isocyanurate, 1,3,5-tris(4-tert-butyl-3-hydroxy-2,6-dimethyl benzyl)-isocyanurate, 1,6-hexanediol-bis[3-(3,5-di-tert-butyl-4-hydroxyphenyl)propionate], 2,2-thio-diethylenebis[3-(3,5-di-tert-butyl-4-hydroxyphenyl) propionate], N,N'-hexamethylenebis(3,5-di-tert-butyl-4-hydroxy-hydrocinnamamide), 1,3,5-trimethyl-2,4,6-tris(3,5-di-tert-butyl-4-hydroxybenzyl) benzene, 2,4-bis[(octylthio) methyl]-O-cresol, and the like, are preferable.

Examples of commercially available phenol antioxidant may include Irganox 1010 (manufactured by BASF Corporation), ADK STAB AO-80 (manufactured by ADEKA Corporation), and the like.

The content of the antioxidant is, for example, 0.01% by mass or more and 30% by mass or less, preferably 0.1% by mass or more and 10% by mass or less, more preferably 0.5% by mass or more and 8% by mass or less, and further preferably 1% by mass or more and 5% by mass or less with respect to the total mass of the solid content of the silicon-containing resin composition. When the content is in the above-mentioned range, it is possible to suppress deterioration of various effects obtained depending on types of the metal oxide (A) of the metal oxide-containing film. Furthermore, when patterning is carried out by, for example, a printing method using a silicon-containing resin composition, peeling of the formed pattern can be easily suppressed.

A photosensitive or thermal sensitive metal oxide fine particle dispersion liquid or silicon-containing resin composition represented by the energy-sensitive composition of the first to sixth aspect may contain various additives if necessary. Examples of additives include a sensitizer, a curing accelerator, a filler, an adhesiveness-imparting agent, an antioxidant, an ultraviolet absorber, an aggregation inhibitor, a thermal polymerization inhibitor, an anti-foaming agent, a leveling agent, a surfactant, a thickener, and the like.

Examples of the sensitizers can include the compounds exemplified in the energy-sensitive composition of the fifth aspect. The sensitizers may be used alone, or in combination of two or more types thereof.

The content of the sensitizer, when each composition includes a photo acid generator, is preferably 0.1 or more and 6 or less, and more preferably 0.2 or more and 4 or less in molar ratio with respect to the photo acid generator. The content in the above-mentioned range improves sensitivity and curability of each composition.

Examples of the filler include well-known filler such as barium sulfate, barium titanate, silica, talc, clay, magnesium carbonate, calcium carbonate, and mica. The content of the filler is preferably 60% by mass or less, and more preferably 5% by mass or more and 40% by mass or less with respect to the solid content of each composition.

Examples of the surfactant include commercially available fluorochemical surfactants such as BM-1000 and BM-1100 (both manufactured by B.M-Chemie Co., Ltd.), Megafac F142D, Megafac F172, Megafac F173 and Megafac F183 (all manufactured by Dainippon Ink And Chemicals, Incorporated), Flolade FC-135, Flolade FC-170C, Flolade FC-430 and Flolade FC-431 (all manufactured by Sumitomo 3M Ltd.), Surflon S-112, Surflon S-113, Surflon S-131, Surflon S-141 and Surflon S-145 (all manufactured by Asahi Glass Co., Ltd.), SH-28PA, SH-190, SH-193, SZ-6032 and SF-8428 (all manufactured by Toray Silicone Co., Ltd.), but not limited thereto.

Examples of the thickener include ultrafine powdered silica, montmorillonite, and the like.

Examples of the anti-foaming agent and/or the leveling agent include a silicone high polymer, a fluorinated high polymer, and the like.

Examples of the adhesiveness-imparting agent include a silane coupling agent, and the like. Furthermore, the photosensitive composition or the silicon-containing resin composition of the first to sixth aspect include, as arbitrary additives, benzotriazole derivatives such as 1-(N,N-di(2-ethylhexyl)amino)methyl-1H-benzotriazole, 1-(N,N-di(2-ethylhexyl)amino)methyl-1H-methyl benzotriazole, carboxy benzotriazole, benzotriazole, methyl benzotriazole, dihydroxypropyl benzotriazole, and bis(aminomethyl)benzotriazole may be used alone or in combination of two or more types thereof.

The addition amounts of the various additives which may be contained in the metal oxide fine particle dispersion liquid may be appropriately adjusted in a range of, for example, 0.001% by mass or more and 10% by mass or less, and preferably 0.1% by mass or more and 5% by mass or less with respect to the entire composition unless otherwise noted.

<<Method for Preparing Metal Oxide Fine Particle Dispersion Liquid>>

A metal oxide fine particle dispersion liquid is prepared by mixing each of the above-mentioned components with a stirrer. The surface-modified metal oxide fine particles as the metal oxide (A) may be blended in the metal oxide fine particle dispersion liquid in a state in which the particles are dispersed in a dispersion medium, or may be blended in the metal oxide fine particle dispersion liquid with no or little dispersion medium included. Note here that the prepared photosensitive composition may be filtered, for example, through a membrane filter so that the prepared metal oxide fine particle dispersion liquid becomes homogeneous.

<<Method for Producing Metal Oxide-Containing Film>>

Use of a metal oxide fine particle dispersion liquid including the metal oxide (A) described above allows a metal oxide-containing film to be formed.

When the metal oxide fine particle dispersion liquid includes resin material such as polyacetal resin, polyamide resin, polycarbonate resin, polyester resin (polybutylene terephthalate, polyethylene terephthalate, polyethylene naphthalate, polyarylate, etc.), FR-AS resin, FR-ABS resin, AS resin, ABS resin, polyphenylene oxide resin, polyphenylene sulfide resin, polysulfone resin, polyether sulfone resin, polyetheretherketone resin, fluorinated resins, polyimide resin, polyamideimide resin, polyamidebismaleimide resin, polyetherimide resin, polybenzoxazole resin, polybenzothiazole resin, polybenzimidazole resin, silicone resin, BT resin, polymethylpentene, ultra high molecular weight polyethylene, FR-polypropylene, (meth)acrylic resin (for example, polymethylmethacrylate), polystyrene as base material component (B), method for forming metal oxide-containing film is the same as aforementioned.

When the metal oxide fine particle dispersion liquid includes a thermosetting material as the base material component (B), the metal oxide fine particle dispersion liquid is formed into a film by a method such as application, and then the formed film is cured by heating the obtained film at temperatures corresponding to types of curable material. Thus, a metal oxide-containing film can be formed.

When the metal oxide fine particle dispersion liquid is the above-mentioned various photosensitive compositions, typically, the metal oxide-containing film is produced by a method including:

applying a metal oxide fine particle dispersion liquid on the substrate to form a coating film; and exposing the coating film.

More specifically, firstly, a coating film is formed by a suitable coating method. For example, the metal oxide fine particle dispersion liquid can be applied on the substrate using a contact transfer-type coating applicator such as a roll coater, a reverse coater, and a bar coater, or a non-contact type coating applicator such as a spinner (a rotary coating applicator), a curtain flow coater, and inkjet, and dried to form the coating film. The drying method is not particularly limited, and, examples of the method include (1) a method for carrying out prebaking for 60 seconds or more and 120 seconds or less on a hot plate at a temperature of 80° C. or higher and 120° C. or lower, and preferably 90° C. or higher and 100° C. or lower; (2) a method for leaving at room temperature for several hours or more and several days or less; or (3) a method for placing in a hot-air heater or infrared ray heater for several tens of minutes or more and several hours or less to remove the solvent, and the like.

Next, the coating film is exposed by irradiation with electromagnetic waves position-selectively. When the metal oxide fine particle dispersion is a negative photosensitive composition hardened by exposure, the exposure may be carried out to an entire surface of the coating film. When the exposure is carried out position-selectively, the electromagnetic waves may be applied via a positive or negative mask, or may be directly applied. An exposure amount differs depending on the metal oxide fine particle dispersion, but, for example, about 5 $mJ/cm^2$ or more and 500 $mJ/cm^2$ or less is preferable.

When exposure is carried out to the entire surface of the coating film, the exposed coating film can be used as a metal oxide-containing film as it is. When exposure is carried out position-selectively, it is possible to obtain a metal oxide-containing film in which a coating film after exposure is developed with a developing solution and patterned into a desired shape. The developing method is not particularly limited, and, for example, an immersion method, a spray method or the like, can be used. Examples of the developing solution include an organic solution such as monoethanolamine, diethanolamine, and triethanolamine; and an aqueous solution of a sodium hydroxide, potassium hydroxide, sodium carbonate, ammonia, quaternary ammonium salt, or the like.

It is preferable that the patterned metal oxide-containing film after development is subjected to post-baking at about 200° C. or higher and 250° C. or lower.

When the metal oxide fine particle dispersion is a silicon-containing resin composition including a silicon-containing resin as the base material component (B), for producing the metal oxide-containing film, a coating film of the metal oxide fine particle dispersion as the silicon-containing resin composition is baked. In this case, the material of the substrate is not particularly limited as long as it can withstand baking. Examples of a suitable material of the substrate include inorganic materials such as metal, silicon, and glass, and heat resistant materials such as polycarbonate, polyethylene terephthalate, polyethersulfone, polyimide resin and polyamide-imide resin. The thickness of the substrate is not particularly limited, and the substrate may be a film or a sheet.

Then, the substrate having the coating film is baked. The method for baking is not particularly limited, and a typical baking method adopts use of an electric furnace or the like. A typical baking temperature is preferably 300° C. or more, more preferably 350° C. or more. The upper limit to the baking temperature is not particularly limited and it is, for example, 1000° C. or less. In the case in which the silicon-containing resin composition includes the above-described curing agent and/or nitroxy compound, it is possible to reduce residue (impurity derive from the silica film) in the metal oxide-containing film as a silica film even when the lower limit of the baking temperature is lowered to 200° C. The atmosphere for the baking is not particularly limited, and the baking may be carried out in an inert gas atmosphere such as a nitrogen atmosphere or an argon atmosphere, in a vacuum, or under reduced pressure. The baking may be carried out in the atmosphere or with appropriate control of the oxygen concentration.

The metal oxide-containing film formed by the above method is preferably used for a high refractive index film in an optical element, a passivation film in an electronic element, or the like in accordance with the performance of the metal oxide-containing film according to the composition of the metal oxide fine particle dispersion liquid.

EXAMPLES

Hereinafter, the present invention will be described more specifically with reference to Examples, but the scope of the present invention is not limited to these Examples.

Example 1

Firstly, 782 parts by mass of solution of zirconium 2-ethylhexanoate in mineral spirit (manufactured by Daiichi Kigenso Kagaku Kogyo Co., Ltd., concentration of zirconium 2-ethylhexanoate: 44% by mass) and 268 parts by mass of pure water were mixed with each other. The resulting mixture solution was charged into an autoclave. The atmosphere in the autoclave was substituted with nitrogen gas, and then, the mixture solution was heated to 180° C. with stirring. The stirring was continued at the same temperature for 16 hours. After completion of stirring, a solid inside the autoclave was collected by filtration. The collected solid was washed with acetone, and then dried. Then, 100 parts by mass of the dried solid was dispersed in 800 mL of toluene, resulting in a cloudy solution. The cloudy solution was filtered through a filter paper (No. 5C) to remove large particles. Toluene was sufficiently removed by evaporation from the filtrate using a rotary evaporator to obtain dried white zirconium oxide fine particles.

To 100 parts by mass of methyl ethyl ketone, 100 parts by mass of the obtained zirconium oxide fine particles and 10 parts by mass of carboxylic acid compound of the following formula (CA1) as the coating material were added. Then, zirconium oxide fine particles in methyl ethyl ketone were stirred for 10 minutes, and the surface of zirconium oxide fine particles was coated with the carboxylic acid compound of the following formula. From the liquid after stirring, methyl ethyl ketone was sufficiently removed by evaporation using a rotary evaporator to collect zirconium oxide. The collected zirconium oxide was a viscous liquid in a starch syrup state. The change in properties shows that the coating agent adheres to the surface of zirconium oxide. Furthermore, as to the nitrogen (N1s electron), when the observation results of raw material (CA1), the observation results of zirconium oxide fine particles before the CA1 coating treatment, and the observation results of zirconium oxide fine particles after the CA1 coating treatment are compared with each other by XPS, a peak derived from nitrogen (N1s electron) different from that of the raw material CA1, is observed in the zirconium oxide fine particles after the coating treatment. This also shows that the coating agent adheres to the surface of zirconium oxide.

[Chem. 114]

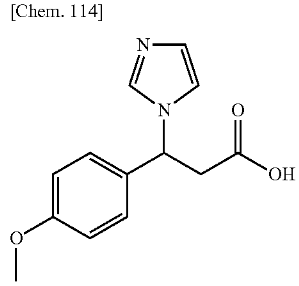

Using the obtained surface-modified zirconium oxide in a starch syrup state, dispersion stability was evaluated by the following method.

<Evaluation of Dispersion Stability in Organic Solvent>

A metal oxide fine particle dispersion liquid for evaluation of dispersion stability was obtained by homogeneously diffusing 50 parts by mass of surface-modified zirconium oxide in a starch syrup state in 100 parts by mass of methyl ethyl ketone (MEK). When the obtained metal oxide fine particle dispersion liquid was allowed to stand still at ordinary temperature for 30 days, the zirconium oxide fine particles remained dispersed stably. When the obtained metal oxide fine particle dispersion liquid was subsequently allowed to stand still for 60 days (total 90 days) at ordinary temperature, aggregation of zirconium oxide fine particles was observed by visual observation.

<Evaluation of Dispersion Stability in (Meth)Acrylic Resin-Containing Composition>

To 700 parts by mass of propylene glycol monomethyl ether acetate, 70 parts by mass of (meth)acrylic resin as a ternary copolymer of the following formula, 30 parts by mass of (meth)acrylic resin as a binary copolymer of the following formula, 5 parts by mass of curing agent represented by the following formula (naphthalic acid derivatives), and 45 parts by mass of surface-modified zirconium oxide in a starch syrup state were dissolved and dispersed to obtain a metal oxide fine particle dispersion liquid for evaluation of dispersion stability. Use amount of the zirconium oxide is 30% by mass of the solid content. Note here that the number at the lower right of each constituent unit in the following formula shows the content (% by mass) of each constituent unit in the resin.

[Chem. 115]

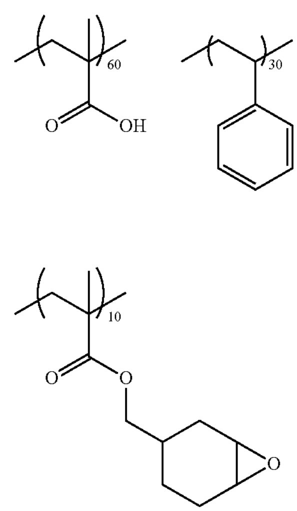

[Chem. 116]

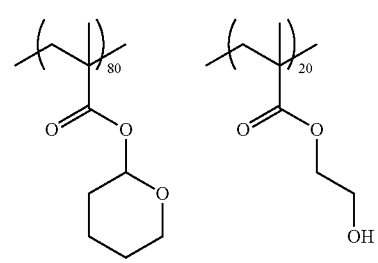

-continued

[Chem. 117]

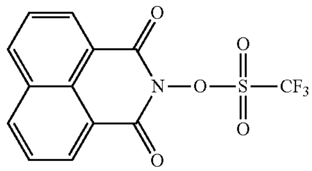

When the obtained metal oxide fine particle dispersion liquid was allowed to stand still at ordinary temperature for 30 days, the zirconium oxide fine particles remained dispersed stably.

<Evaluation of Diffusion Stability in Composition Containing Curable Aromatic Compound>

As the curable compound, the compound represented by the following formula was used.

[Chem. 118]

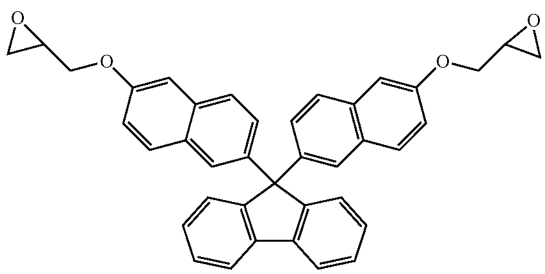

As the curable compound, the compound represented by the following formula, which is a photocationic polymerization initiator, was used.

[Chem. 119]

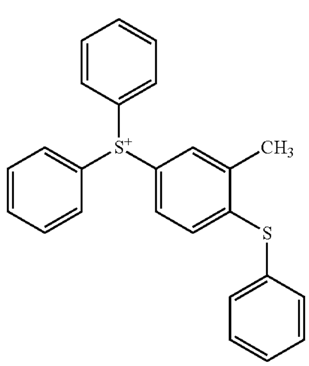

-continued

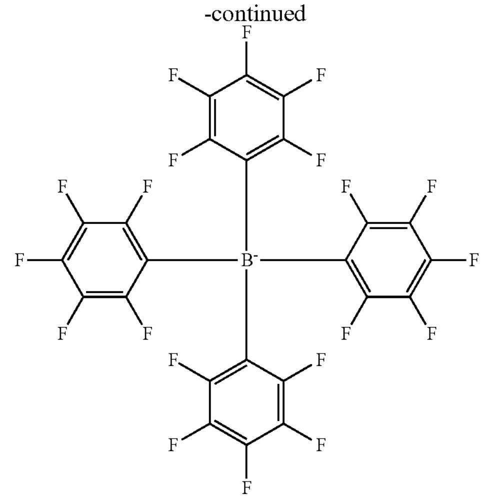

To propylene glycol monomethyl ether acetate, 69.95 parts by mass of the above-mentioned curable compound, 30 parts by mass of surface-modified zirconium oxide in a starch syrup state, and 0.35 parts by mass of the above curing agent were dissolved and dispersed so that the solid content concentration was 20% by mass to obtain metal oxide fine particle-containing dispersion liquid for evaluation of dispersion stability. When the obtained metal oxide fine particle dispersion liquid was allowed to stand still at ordinary temperature for 30 days, the zirconium oxide fine particles remained dispersed stably.

Example 2

Coating treatment of zirconium oxide fine particles was carried out using carboxylic acid compound (CA1) in the same manner as in Example 1 except that methyl ethyl ketone was changed to propylene glycol monomethyl ether. As in Example 1, the collected zirconium oxide was a viscous liquid in a starch syrup state. The change in properties shows that the coating agent adheres to the surface of zirconium oxide.

The obtained surface-modified zirconium oxide in a starch syrup state was used and evaluated for the dispersion stability as in Example 1. In evaluation of the dispersion stability in an organic solvent, when the metal oxide fine particle dispersion liquid was allowed to stand still at ordinary temperature for 30 days, the zirconium oxide fine particles remained dispersed stably. When the obtained metal oxide fine particle dispersion liquid was subsequently allowed to stand still for 60 days (total 90 days) at ordinary temperature, aggregation of zirconium oxide fine particles was observed by visual observation. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably.

Example 3

A mixed solution was obtained by mixing 50 parts by mass of dried white zirconium oxide fine particles and 50 parts by mass of 5% by mass aqueous solution of sodium hydroxide, and the obtained mixed solution and 10 parts by mass of carboxylic acid compound (CA1) were added to 50 parts by mass of propylene glycol monomethyl ether. Then, the zirconium oxide fine particles in propylene glycol monomethyl ether was stirred for 10 minutes, and the surface of the zirconium oxide fine particles was coated with carboxylic acid compound (CA1). From the liquid after stirring, propylene glycol monomethyl ether and water were sufficiently removed by evaporation using a rotary evaporator to collect zirconium oxide. The collected zirconium oxide was a viscous liquid in a starch syrup state. The change in properties shows that the coating agent adheres to the surface of zirconium oxide.

The obtained surface-modified zirconium oxide in a starch syrup state was used and evaluated for the dispersion stability as in Example 1. In evaluation of the dispersion stability in an organic solvent, when the metal oxide fine particle dispersion liquid was allowed to stand still at ordinary temperature for 30 days, the zirconium oxide fine particles remained dispersed stably. When the obtained metal oxide fine particle dispersion liquid was subsequently allowed to stand still for 60 days (total 90 days) at ordinary temperature, aggregation of zirconium oxide fine particles was observed by visual observation. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably.

Example 4

Fifty parts by mass of dried white zirconium oxide fine particles and 50 parts by mass of propylene glycol monomethyl ether were mixed with other. Then, to the mixture, a mixture solution in which 3 parts by mass of carboxylic acid compound (CA1) had been dissolved in 30 parts by mass of N,N,N',N'-tetramethylurea (TMU) in advance was added. Zirconium oxide fine particles were stirred for 10 minutes, and the surface of the zirconium oxide fine particles was coated with carboxylic acid compound (CA1). From the liquid after stirring, propylene glycol monomethyl ether and N,N,N',N'-tetramethylurea were sufficiently removed by evaporation using a rotary evaporator to collect zirconium oxide. The collected zirconium oxide was a viscous liquid in a starch syrup state. The change in properties shows that the coating agent adheres to the surface of zirconium oxide.

The obtained surface-modified zirconium oxide in a starch syrup state was used and evaluated for the dispersion stability as in Example 1. In evaluation of the dispersion stability in an organic solvent, even when the metal oxide fine particle dispersion liquid was allowed to stand still at ordinary temperature for 90 days, the zirconium oxide fine particles remained dispersed stably. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably. From comparison between Examples 1 to 3 and Example 4, it is shown that coating with the carboxylic acid compound (CA1) in the presence of N,N,N',N'-tetramethylurea as a compound having an amide structure improved the dispersion stability of zirconium oxide fine particles in the organic solvent.

Example 5

Coating treatment of zirconium oxide fine particles was carried out using carboxylic acid compound (CA1) in the same manner as in Example 2 except that carboxylic acid compound (CA1) was used as 5% by mass N,N,N',N'-tetramethylurea solution. As in Example 1, the collected zirconium oxide was a viscous liquid in a starch syrup state. The change in properties shows that the coating agent adheres to the surface of zirconium oxide.

The obtained surface-modified zirconium oxide in a starch syrup state was used and evaluated for the dispersion stability as in Example 1. In evaluation of the dispersion stability in an organic solvent, even when the metal oxide fine particle dispersion liquid was allowed to stand still at ordinary temperature for 90 days, the zirconium oxide fine particles remained dispersed stably. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably. From comparison between Examples 1 to 3 and Example 5, it is shown that coating with the carboxylic acid compound (CA1) in the presence of N,N,N',N'-tetramethylurea as a compound having an amide structure improved the dispersion stability of zirconium oxide fine particles in the organic solvent.

Comparative Example 1

Coating treatment of zirconium oxide fine particles was carried out in the same manner as in Example 1 except that a carboxylic acid compound (CA1) was changed to 3-mathacryloxypropyltrimethoxysilane. The collected zirconium oxide after coating treatment was a wet and sticky solid. The change in properties shows that the coating agent adheres to the surface of zirconium oxide.

The obtained surface-modified zirconium oxide was used and evaluated for the dispersion stability as in Example 1. Note here that evaluation of dispersion stability in organic solvents is omitted. As a result, in evaluation of dispersion stability in composition containing a curable aromatic compound, at a stage in which the metal oxide fine particle dispersion liquid was allowed to stand still for two hours, aggregation of zirconium oxide fine particles was observed. In evaluation of dispersion stability in a composition containing a (meth)acrylic resin, at a stage in which a metal oxide fine particle dispersion liquid was allowed to stand still for one day, aggregation of zirconium oxide fine particles was observed.

Comparative Example 2

Coating treatment of zirconium oxide fine particles was carried out in the same manner as in Example 1 except that carboxylic acid compound (CA1) was changed to phthalic acid mono-2-acryloyloxyethyl ester. The collected zirconium oxide after coating treatment was a wet and sticky solid. The change in properties shows that the coating agent adheres to the surface of zirconium oxide.

The obtained surface-modified zirconium oxide was used and evaluated for the dispersion stability as in Example 1. Note here that evaluation of dispersion stability in organic solvents is omitted. As a result, in evaluation of dispersion stability in composition containing a curable aromatic compound, at a stage in which the metal oxide fine particle dispersion liquid was allowed to stand still for six hours, aggregation of zirconium oxide fine particles was observed. In evaluation of dispersion stability in a composition containing a (meth)acrylic resin, at a stage in which a metal oxide fine particle dispersion liquid was allowed to stand still for one day, aggregation of zirconium oxide fine particles was observed.

Comparative Example 3

Coating treatment of zirconium oxide fine particles was carried out in the same manner as in Example 1 except that carboxylic acid compound (CA1) was changed to succinic acid mono-2-acryloyloxyethyl ester. As a result, the mixed liquid during the coating treatment was gelled, and zirconium oxide after the coating treatment was not able to be collected.

Example 6

Coating treatment of zirconium oxide fine particles was carried out in the same manner as in Example 2 except that zirconium oxide coated with carboxylic acid compound (CA1) was changed to the wet and sticky solid-state zirconium oxide obtained in Comparative Example 1. As in Example 1, the collected zirconium oxide was a viscous liquid in a starch syrup state. The change in properties shows that the coating agent adheres to the surface of zirconium oxide.

The obtained surface-modified zirconium oxide in a starch syrup state was used and evaluated for the dispersion stability as in Example 1. In evaluation of the dispersion stability in an organic solvent, when the metal oxide fine particle dispersion liquid was allowed to stand still at ordinary temperature for 30 days, the zirconium oxide fine particles remained dispersed stably. When the obtained metal oxide fine particle dispersion liquid was subsequently allowed to stand still for 60 days (total 90 days) at ordinary temperature, aggregation of zirconium oxide fine particles was observed by visual observation. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably.

Example 7

Coating treatment of zirconium oxide fine particles was carried out in the same manner as in Example 4 except that zirconium oxide coated with carboxylic acid compound (CA1) was changed to the wet and sticky solid-state zirconium oxide obtained in Comparative Example 1. As in Example 1, the collected zirconium oxide was a viscous liquid in a starch syrup state. The change in properties shows that the coating agent adheres to the surface of zirconium oxide.

The obtained surface-modified zirconium oxide in a starch syrup state was used and evaluated for the dispersion stability as in Example 1. In evaluation of the dispersion stability in an organic solvent, even when the metal oxide fine particle dispersion liquid was allowed to stand still at ordinary temperature for 90 days, the zirconium oxide fine particles remained dispersed stably. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably. From comparison between Examples 1 to 3 and Example 6, it is shown that coating with the carboxylic acid compound (CA1) in the presence of N,N,N',N'-tetramethylurea as a compound having an amide structure improved the dispersion stability of zirconium oxide fine particles in the organic solvent.

Example 8

Coating treatment of zirconium oxide fine particles was carried out in the same manner as in Example 1 except that carboxylic acid compound (CA1) was changed to L-arginine (CA2) as a carboxylic acid compound. As in Example 1, the collected zirconium oxide was a viscous liquid in a starch syrup state. The change in properties shows that the coating agent adheres to the surface of zirconium oxide.

[Chem. 120]

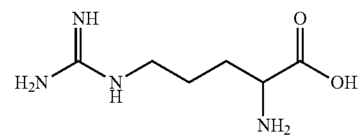

The obtained surface-modified zirconium oxide in a starch syrup state was used and evaluated for the dispersion stability as in Example 1. In evaluation of the dispersion stability in an organic solvent, when the metal oxide fine particle dispersion liquid was allowed to stand still at ordinary temperature for 30 days, the zirconium oxide fine particles remained dispersed stably. When the obtained metal oxide fine particle dispersion liquid was subsequently allowed to stand still for 60 days (total 90 days) at ordinary temperature, aggregation of zirconium oxide fine particles was observed by visual observation. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably.

Example 9

Coating treatment of zirconium oxide fine particles was carried out in the same manner as in Example 2 except that carboxylic acid compound (CA1) was changed to L-arginine (CA2) as a carboxylic acid compound. As in Example 1, the collected zirconium oxide was a viscous liquid in a starch syrup state. The change in properties shows that the coating agent adheres to the surface of zirconium oxide.

The obtained surface-modified zirconium oxide in a starch syrup state was used and evaluated for the dispersion stability as in Example 1. In evaluation of the dispersion stability in an organic solvent, when the metal oxide fine particle dispersion liquid was allowed to stand still at ordinary temperature for 30 days, the zirconium oxide fine particles remained dispersed stably. When the obtained metal oxide fine particle dispersion liquid was subsequently allowed to stand still for 60 days (total 90 days) at ordinary temperature, aggregation of zirconium oxide fine particles was observed by visual observation. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably.

Example 10

Coating treatment of zirconium oxide fine particles was carried out in the same manner as in Example 3 except that carboxylic acid compound (CA1) was changed to L-arginine (CA2) as a carboxylic acid compound. As in Example 1, the collected zirconium oxide was a viscous liquid in a starch syrup state. The change in properties shows that the coating agent adheres to the surface of zirconium oxide.

The obtained surface-modified zirconium oxide in a starch syrup state was used and evaluated for the dispersion stability as in Example 1. In evaluation of the dispersion stability in an organic solvent, when the metal oxide fine particle dispersion liquid was allowed to stand still for 30 days, the zirconium oxide fine particles remained dispersed stably, but when the obtained metal oxide fine particle dispersion liquid was subsequently allowed to stand still for 60 days (total 90 days) at ordinary temperature, aggregation of zirconium oxide fine particles was observed by visual observation. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably.

Example 11

Coating treatment of zirconium oxide fine particles was carried out in the same manner as in Example 4 except that carboxylic acid compound (CA1) was changed to L-arginine (CA2) as a carboxylic acid compound. As in Example 1, the collected zirconium oxide was a viscous liquid in a starch syrup state. The change in properties shows that the coating agent adheres to the surface of zirconium oxide.

The obtained surface-modified zirconium oxide in a starch syrup state was used and evaluated for the dispersion stability as in Example 1. In evaluation of the dispersion stability in an organic solvent, even when the metal oxide fine particle dispersion liquid was allowed to stand still at ordinary temperature for 90 days, the zirconium oxide fine particles remained dispersed stably. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably. From comparison of Examples 1 to 3 and Example 10 with Example 11, it is shown that coating with the carboxylic acid compound (CA2) in the presence of N,N,N',N'-tetramethylurea as a compound having an amide structure improved the dispersion stability of zirconium oxide fine particles in the organic solvent.

Example 12

Coating treatment of zirconium oxide fine particles was carried out in the same manner as in Example 5 except that carboxylic acid compound (CA1) was changed to L-arginine (CA2) as a carboxylic acid compound. As in Example 1, the collected zirconium oxide was a viscous liquid in a starch syrup state. The change in properties shows that the coating agent adheres to the surface of zirconium oxide.

The obtained surface-modified zirconium oxide in a starch syrup state was used and evaluated for the dispersion stability as in Example 1. In evaluation of the dispersion stability in an organic solvent, even when the metal oxide fine particle dispersion liquid was allowed to stand still at ordinary temperature for 90 days, the zirconium oxide fine particles remained dispersed stably. Both in evaluation of dispersion stability in a (meth)acrylic resin-containing composition, and evaluation of diffusion stability in a composition containing a curable aromatic compound, even when the metal oxide fine particle dispersion liquid was allowed to stand still at ordinary temperature for 30 days, the zirconium oxide fine particles remained dispersed stably. From comparison of Examples 1 to 3 and Example 10 with Example 12, it is shown that coating with the carboxylic acid compound (CA2) in the presence of N,N,N',N'-tetramethylurea as a compound having an amide structure improved the dispersion stability of zirconium oxide fine particles in the organic solvent.

Example 13

50 parts by mass of zirconium oxide to which a carboxylic acid compound (CA1) obtained by coating treatment as in Example 5 adheres, and 18 parts by mass of copolymer of 40% by mass of 4-hydroxyphenyl methacrylate and 60% by mass of glycidyl methacrylate were dispersed in 50 parts by mass of methyl isobutyl ketone to obtain a metal oxide fine particle dispersion liquid. The weight-average molecular weight of the above-mentioned copolymer was 6000. When the obtained metal oxide fine particle dispersion liquid was allowed to stand still at ordinary temperature for 30 days, the zirconium oxide fine particles remained dispersed stably.

Example 14

A metal oxide fine particle dispersion liquid was obtained in the same manner as in Example 13 except that the copolymer was changed to a copolymer of 72% by mass of 4-oxatetracyclo-[6.2.1.0$^{2,7}$0$^{3,5}$]undecanyl acrylate, 18% by mass of methacrylic acid, and 10% by mass of tricyclodecyl methacrylate. The weight-average molecular weight of the above-mentioned copolymer was 10000. When the obtained metal oxide fine particle dispersion liquid was allowed to stand still at ordinary temperature for 30 days, the zirconium oxide fine particles remained dispersed stably.

Example 15

Furthermore, a metal oxide fine particle dispersion liquid was obtained in the same manner as in Example 13 except that 2 parts by mass of 1,2-naphthoquinonediazide-5-sulfonic acid ester of 4-[2-[4-[1,1-bis(4-hydroxyphenyl)ethyl]phenyl]propan-2-yl]phenol (3 moles), which is a photosensitive agent, was added, and the solid content concentration of the metal oxide fine particle dispersion liquid was adjusted to 20% by mass by dilution with methyl isobutyl ketone. The obtained metal oxide fine particle dispersion liquid can be used as a positive type photosensitive composition. When the obtained metal oxide fine particle dispersion liquid was allowed to stand still at ordinary temperature for 30 days, the zirconium oxide fine particles remained dispersed stably.

The obtained metal oxide fine particle dispersion liquid was applied on a glass substrate with a spin coater. The coating film was prebaked at 110° C. for 120 seconds, and then was exposed with broadband light using an ultraviolet curing device via a line-and-space pattern mask having a line width of 20 μm and space width of 20 μm, using an ultraviolet curing device. The exposed coating film was subjected to developing treatment in an alkali developing solution at 26° C. As the developing solution, a concentration of 0.825% by mass NaOH—$Na_2CO_3$ mixture aqueous solution was used. The exposed coating film was rinsed with pure water to remove unnecessary parts in the exposed coating film. Then, the developed coating film was subjected to post-baking at 230° C. for 20 minutes to form a patterned coating film.

Example 16

Furthermore, a metal oxide fine particle dispersion liquid was obtained in the same manner as in Example 15 except that 9 mass of dipentaerythritol hexaacrylate which is a photopolymerizable compound was added, 2 parts by mass of 1,2-naphthoquinonediazide-5-sulfonic acid ester of 4-[2-[4-[1,1-bis(4-hydroxyphenyl)ethyl]phenyl]propan-2-yl] phenol (3 moles) was changed to 2 parts by mass of the compound having the following structure, which is a photopolymerization initiator. The obtained metal oxide fine particle dispersion liquid can be used as a negative type photosensitive composition. When the obtained metal oxide fine particle dispersion liquid was allowed to stand still at ordinary temperature for 30 days, the zirconium oxide fine particles remained dispersed stably.

[Chem. 121]

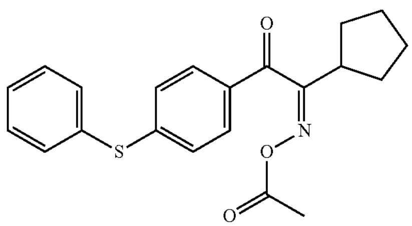

The obtained metal oxide fine particle dispersion liquid was applied on a glass substrate with a spin coater. The coating film was prebaked at 90° C. for 120 seconds to form a coating film having a film thickness of 1.0 μm. Next, the coating film was exposed with broadband light via a line-and-space pattern mask having a line width of 20 μm and space width of 20 μm, using an ultraviolet curing device. The exposed coating film was developed in a concentration of 2.38% by mass aqueous solution of tetramethylammonium hydroxide (TMAH) at 23° C. to remove unnecessary parts. Then, the developed coating film was subjected to post-baking at 230° C. for 20 minutes to form a patterned coating film.

Example 17

A metal oxide fine particle dispersion liquid was obtained in the same manner as in Example 16 except that the photopolymerization initiator was changed to a compound having the following structure. The obtained metal oxide fine particle dispersion liquid can be used as a negative type photosensitive composition. When the obtained metal oxide fine particle dispersion liquid was allowed to stand still at ordinary temperature for 30 days, the zirconium oxide fine particles remained dispersed stably. Furthermore, when a patterned cured film was formed by photolithography as in Example 16 using the obtained metal oxide fine particle dispersion liquid. A satisfactorily patterned cured film was formed as in Example 16.

[Chem. 122]

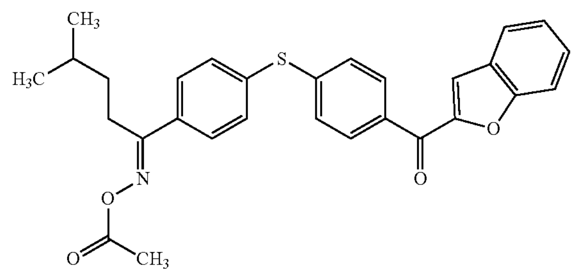

What is claimed is:

1. A method for producing surface-modified metal oxide fine particles, the method comprising coating at least a part of surfaces of metal oxide fine particles with a carboxylic acid compound represented by the following formula (1):

[Chem. 3]

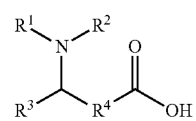

(1)

wherein, in the formula (1), $R^1$ and $R^2$ are each independently a hydrogen atom or a monovalent organic group, $R^1$ and $R^2$ may be bonded to each other to form a ring, the ring may include one or more elements selected from the group consisting of N, S, and O as a ring constituent element; $R^3$ is a monovalent organic group; and $R^4$ is a methylene group or a single bond, and/or carboxylate derived from the carboxylic acid compound represented by the formula (1), wherein the average particle diameter of the metal oxide fine particles is 1 nm or more and 50 nm or less, wherein the coating with the carboxylic acid compound and/or the carboxylate carried out to metal oxide fine particles applied as particles to be surface modified, the metal oxide fine particles applied as particles to be surface modified being prepared in a solution or a suspension containing a compound having an amide structure, or being dispersed in a presence of a dispersion medium comprising a compound having an amide structure, wherein the compound having the amide structure include a compound represented by the following formula (S01):

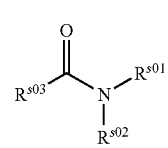

(S01)

wherein in the formula (s01), $R^{s01}$ and $R^{s02}$ are each independently an alkyl group having 1 or more and 3 or less carbon atoms, $R^{s03}$ is a group represented by the following formula (S01-1) or the following formula (S01-2):

(S01-1)

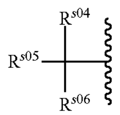

(S01-2)

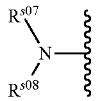

wherein, in the formula (S01-1), $R^{s04}$ is a hydrogen atom or a hydroxyl group, $R^{s05}$ and $R^{s06}$ are each independently an alkyl group having 1 or more and 3 or less carbon atoms, and wherein in the formula (S01-2), $R^{s07}$ and $R^{s08}$ are each independently hydrogen atom or an alkyl group having 1 or more and 3 or less carbon atoms.

2. The method for producing surface-modified metal oxide fine particles according to claim 1, wherein in the formula (1), the $R^1$ and the $R^2$ are bonded to each other to form an imidazole ring.

3. The method for producing surface-modified metal oxide fine particles according to claim 1, wherein the metal oxide fine particles comprise at least one metal element selected from the group consisting of Ag, Cu, In, Sn, Ti, Hf, Al, Zr, Zn, Sn, and Ce.

4. A method for producing metal oxide fine particles applied as particles to be surface modified, the method comprising preparing metal oxide fine particles in a solution or a suspension containing a compound having an amide structure, or dispersing metal oxide fine particles in a presence of a dispersion medium including a compound having an amide structure, wherein the average particle diameter of the metal oxide fine particles is 1 nm or more and 50 nm or less, wherein the compound having the amide structure include a compound represented by the following formula (S01):

(S01)

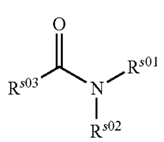

wherein in the formula (S01), $R^{s01}$ and $R^{s02}$ are each independently an alkyl group having 1 or more and 3 or less carbon atoms, $R^{s03}$ is a group represented by the following formula (S01-1) or the following formula (S01-2):

(S01-1)

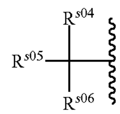

(S01-2)

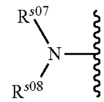

wherein, in the formula (S01-1), $R^{s04}$ is a hydrogen atom or a hydroxyl group, $R^{s05}$ and $R^{s06}$ are each independently an alkyl group having 1 or more and 3 or less carbon atoms, wherein in the formula (S01-2), $R^{s07}$ and $R^{s08}$ are each independently hydrogen atom or an alkyl group having 1 or more and 3 or less carbon atoms.

5. The method for producing metal oxide fine particles applied as particles to be surface modified according to claim 4, wherein the metal oxide fine particles comprise at least one metal element selected from the group consisting of Ag, Cu, In, Sn, Ti, Hf, Al, Zr, Zn, Sn, and Ce.

6. The method for producing metal oxide fine particles applied as particles to be surface modified according to claim 4, wherein the metal oxide fine particles applied as particles to be surface modified are subjected to coating treatment with a compound represented by the following formula (1):

(1)

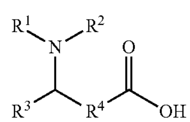

wherein in the formula (1), $R^1$ and $R^2$ are each independently a hydrogen atom, or a monovalent organic group, $R^1$, and $R^2$ may be bonded to each other to form a ring, the ring may include one or more elements selected from the group consisting of N, S, and O as a ring constituent element; $R^3$ is a monovalent organic group; and $R^4$ is a methylene group or a single bond, and/or carboxylate derived from the carboxylic acid compound represented by the formula (1).

7. The method for producing improved metal oxide fine particles applied as particles to be surface modified according to claim 6, wherein in the formula (1), the $R^1$ and the $R^2$ are bonded to each other to form an imidazole ring.

* * * * *